(12) United States Patent
Murakami et al.

(10) Patent No.: US 12,231,195 B2
(45) Date of Patent: *Feb. 18, 2025

(54) INTEGRATED CIRCUIT

(71) Applicant: Panasonic Intellectual Property Corporation of America, Torrance, CA (US)

(72) Inventors: Yutaka Murakami, Kanagawa (JP); Tomohiro Kimura, Osaka (JP); Mikihiro Ouchi, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,183

(22) Filed: Jun. 20, 2023

(65) Prior Publication Data

US 2023/0336222 A1 Oct. 19, 2023

Related U.S. Application Data

(63) Continuation of application No. 17/537,057, filed on Nov. 29, 2021, now Pat. No. 11,711,122, which is a
(Continued)

(30) Foreign Application Priority Data

Jan. 13, 2017 (JP) .................................. 2017-004543
Mar. 29, 2017 (JP) .................................. 2017-065889

(51) Int. Cl.
*H04B 7/0456* (2017.01)
*H04L 5/00* (2006.01)
(Continued)

(52) U.S. Cl.
CPC ............. *H04B 7/0456* (2013.01); *H04L 5/00* (2013.01); *G06F 17/16* (2013.01); *H04W 72/21* (2023.01); *H04W 72/23* (2023.01)

(58) Field of Classification Search
CPC ................. H04W 72/23; H04W 52/42; H04W 72/044; H04W 72/30; H04W 72/21; H04W 4/06;
(Continued)

(56) References Cited

U.S. PATENT DOCUMENTS 6,560,276 B1 * 5/2003 Long ..................... H04L 7/0029
455/182.2
6,823,002 B1 * 11/2004 Betts ......................... H04L 5/16
375/219
(Continued)

FOREIGN PATENT DOCUMENTS

CN 103477584 A 12/2013
CN 104272622 A 1/2015
(Continued)

OTHER PUBLICATIONS

3GPP TS 36.211 V13.0.0, "3rd Generation Partnership Project; Technical Specification Group Radio Access Network; Evolved Universal Terrestrial Radio Access (E-UTRA); Physical channels and modulation (Release 13)," Dec. 2015, 141 pages.
(Continued)

*Primary Examiner* — Eva Y Puente
(74) *Attorney, Agent, or Firm* — Seed IP Law Group LLP

(57) ABSTRACT

A precoding process is performed on a first baseband signal and a second baseband signal to generate a first precoding signal and a second precoding signal. A pilot signal is inserted into the first precoding signal and phase change is performed on the second precoding signal. A pilot signal is inserted into the phase changed second precoding signal,
(Continued)

and phase change is further performed on the phase-changed second precoding signal with the pilot signal inserted.

5 Claims, 60 Drawing Sheets

Related U.S. Application Data continuation of application No. 16/990,669, filed on Aug. 11, 2020, now Pat. No. 11,218,198, which is a continuation of application No. 16/090,625, filed as application No. PCT/JP2017/014739 on Apr. 11, 2017, now Pat. No. 10,790,886.

(60) Provisional application No. 62/437,627, filed on Dec. 21, 2016, provisional application No. 62/329,028, filed on Apr. 28, 2016, provisional application No. 62/328,389, filed on Apr. 27, 2016.

(51) Int. Cl.
    H04W 72/21      (2023.01)
    H04W 72/23      (2023.01)
    G06F 17/16      (2006.01)

(58) Field of Classification Search
    CPC .............. H04W 72/0446; H04W 16/28; H04L 5/0023; H04L 5/0048; H04L 25/0391; H04L 5/005; H04L 27/36; H04L 1/0071; H04L 5/0053; H04L 5/0007; H04B 7/0456; H04B 7/0413; H04B 7/0697; H04B 7/0682; H04B 7/0617; H04B 7/0469; H04B 7/10; H04B 7/0615
    USPC ......................................................... 375/308
    See application file for complete search history.

(56) References Cited

U.S. PATENT DOCUMENTS

| | | | |
|---|---|---|---|
| 8,000,401 B2 | 8/2011 | Lee et al. | |
| 8,811,200 B2 * | 8/2014 | Breit ..................... | H04L 1/0027 |
| | | | 375/349 |
| 11,218,198 B2 * | 1/2022 | Murakami ................ | H04L 5/00 |
| 2004/0174812 A1 | 9/2004 | Murakami et al. | |
| 2006/0013330 A1 | 1/2006 | Ha | |
| 2008/0049863 A1 | 2/2008 | Heiskala | |
| 2010/0162075 A1 | 6/2010 | Brannstrom et al. | |
| 2010/0322349 A1 | 12/2010 | Lee et al. | |
| 2012/0224651 A1 | 9/2012 | Murakami et al. | |
| 2014/0205032 A1 | 7/2014 | Murakami et al. | |
| 2014/0219389 A1 | 8/2014 | Murakami et al. | |
| 2015/0147994 A1 | 5/2015 | Tsai et al. | |
| 2015/0171937 A1 | 6/2015 | Murakami et al. | |
| 2015/0280945 A1 | 10/2015 | Tan et al. | |
| 2016/0087736 A1 | 3/2016 | Murakami et al. | |
| 2016/0233941 A1 | 8/2016 | Murakami et al. | |
| 2018/0262246 A1 | 9/2018 | Faxér et al. | |
| 2018/0279358 A1 | 9/2018 | Babaei et al. | |
| 2018/0367192 A1 | 12/2018 | O'Shea et al. | |
| 2019/0052510 A1 | 2/2019 | Murakami et al. | |
| 2019/0123792 A1 | 4/2019 | Murakami et al. | |
| 2021/0234636 A1 | 7/2021 | Handte et al. | |

FOREIGN PATENT DOCUMENTS

| | | |
|---|---|---|
| CN | 105340202 A | 2/2016 |
| EP | 2854318 A1 | 4/2015 |
| EP | 3361657 A1 | 8/2018 |
| EP | 3480967 A1 | 5/2019 |
| EP | 3487140 A1 | 5/2019 |
| EP | 3553960 A1 | 10/2019 |
| JP | 2003179573 A | 6/2003 |
| JP | 2015046868 A | 3/2015 |
| JP | 2015233316 A | 12/2015 |
| WO | WO 2007052941 A1 | 5/2007 |
| WO | WO 2010004586 A2 | 1/2010 |
| WO | WO 2013175774 A1 | 11/2013 |
| WO | WO 2015022170 A1 | 2/2015 |
| WO | 2015/064081 A1 | 5/2015 |
| WO | WO 2017150418 A1 | 9/2017 |

OTHER PUBLICATIONS

Armin Dammann et al., "Standard comfortable antenna diversity techniques for OFDM and its applications to the DVB-T system", IEEE Globecom 2001, Nov. 25, 2001, pp. 3100-3105.
Association of Radio Industries and Businesses, "OFDMA/TDMA TDD Broadband Wireless Access System (XGP)," Arib Standard, Arib STD-T95 Version 3.4, Dec. 3, 2015, 987 pages.
David Vargas et al., "MIMO for DVB-NGH, The Next Generation Mobile TV Broadcasting," IEEE Communications Magazine, vol. 57, No. 7, Jul. 15, 2013, pp. 130-137.
English Translation of Chinese Search Report dated May 21, 2021 for the related Chinese Patent Application No. 201780020445.8, 3 pages.
English Translation of Chinese Search Report dated Oct. 10, 2020 for the related Chinese Patent Application No. 201780020445.8, 3 pages.
English Translation of Russian Office Action dated Jun. 29, 2020 for the related Russian Patent Application No. 2019103133, 5 pages.
Ericsson, "NB-LTE—UL Modulation," R1-156012, Agenda Item: 7.2.6.2.2, 3GPP TSG-RAN1 #82bits, Malmo, Sweden, Oct. 5-9, 2015, 6 pages.
F. Petenaude and M.L Moher, "A new symbol timing tracking algorithm for pi /2-BPSK and pi /4-QPSK modulations," [Conference Record] SUPERCOMM/ICC '92 Discovering a New World of Communications, Chicago, IL, USA, 1992, pp. 1588-1592 vol. 3. Internet: https://ieeexplore.ieee.org/document/268024.
Huawei, HiSilicon, "NB-PUSCH design," R1-161809, Agenda Item: 2.3.1, 3GPP TSG RAN WG1 Nb-Iot Ad-Hoc Meeting #2, Sophia-Antipolis, France, Mar. 22-24, 2016, 6 pages.
Huawei, Hisilicon, "On UE single-tone EVM," R4-160618, Agenda Item: 6.23.3, 3GPP TSG-RAN WG4 Meeting #78, St. Julian's, Malta, Feb. 15-19, 2016, 3 pages.
Huawei, Hisilicon, "WF on phase rotation of single tone NB-PUSCH," R1-162001, Agenda item: 2.3.2, 3GPP TSG RAN WG1NB-IoT Ad-Hoc Meeting #2, Sophia-Antipolis, France, Mar. 22-24, 2016, 3 pages.
IEEE p802.11n(TM)/D3.00, Draft Standard for Information Technology—Telecommunications and information exchange between systems—Local and metropolitan area networks—Specific requirements—Part 11: Wireless LAN Medium Access Control (MAC) and Physical Layer (PHY) specifications: Amendment4: Enhancement for Higher Throughput, Sep. 2007.
Indian Examination Report dated Mar. 12, 2012 for the related Indian Patent Application No. 201847038804, 5 pages.
International Search Report of PCT application No. PCT/JP2017/014739 dated Jun. 27, 2017.
Khan, "LTE for 4G Mobile Broadband; Air Interface Technologies and Performance," Cambridge, 509 pages.
Result of consultation dated May 19, 2021, for the corresponding European Patent Application No. 17789240.3, 3 pages.
The Extended European Search Report dated Mar. 14, 2019 for the related European Patent Application No. 17789240.3.
English Translation of Chinese Search Report dated May 1, 2024 for the corresponding Chinese Patent Application No. 202210319973.6, 2 pages.

* cited by examiner

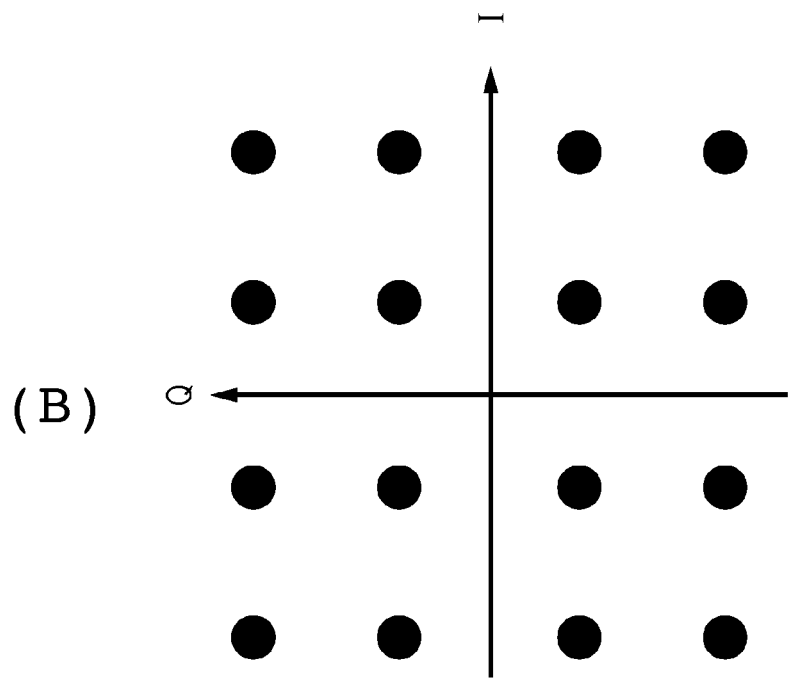
FIG. 12
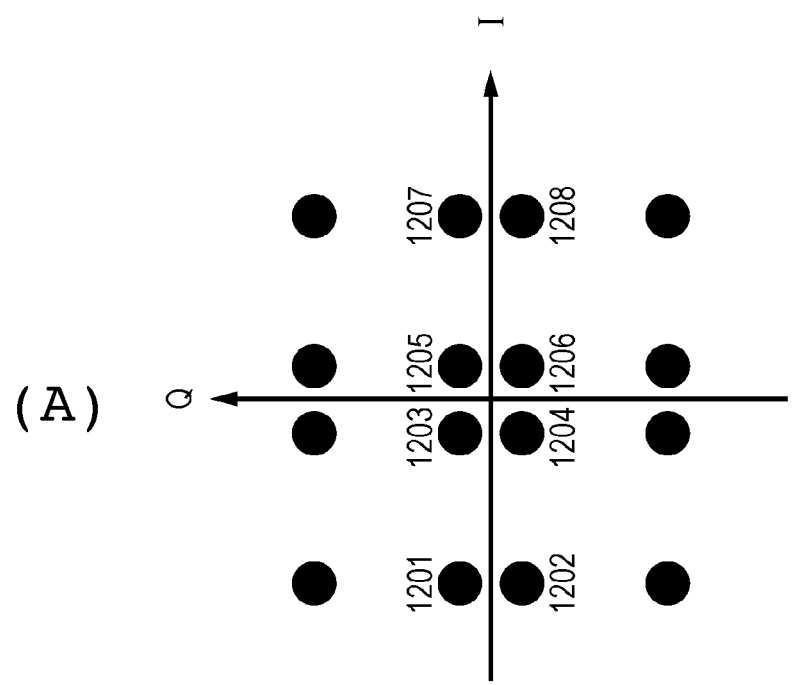

INTEGRATED CIRCUIT

TECHNICAL FIELD

The present disclosure relates to a transmission apparatus and a transmission method for performing communication using multi-antenna.

BACKGROUND ART

In a line of sight (LOS) environment where direct waves are dominant, examples of a communication method using multi-antenna include a communication method called multiple-input multiple-output (MIMO). This is a method described in NPTL 1 as a transmission method for obtaining good reception quality.

FIG. 17 is a diagram illustrating one example of a configuration of a transmission apparatus described in NPTL 1, based on the digital video broadcasting-next generation handheld (DVB-NGH) standard when a number of transmission antennas is two and a number of transmission modulated signals (transmission streams) is two. In the transmission apparatus, data 003 encoded by encoder 002 is divided by divider 004 into data 005A and data 005B. Data 005A undergoes an interleaving process by interleaver 004A and a mapping process by mapper 006A. Similarly, data 005B undergoes the interleaving process by interleaver 004B and the mapping process by mapper 006B. Weight combiners 008A and 008B receive mapped signals 007A and 007B, perform weighting on the signals, and generate weighted signals 009A and 016B, respectively. Weighte--d signal 016B then undergoes phase change. Then, wireless units 010A and 010B perform, for example, processes such as a process related to orthogonal frequency division multiplexing (OFDM), frequency conversion, and amplification. Then transmission signal 011A is transmitted from antenna 012A, and transmission signal 011B is transmitted from antenna 012B.

CITATION LIST

Non-Patent Literatures

NPTL 1: "MIMO for DVB-NGH, the next generation mobile TV broadcasting," IEEE Commun. Mag., vol. 57, no. 7, pp. 130–137, July 2013.

NPTL 2: "Standard conformable antenna diversity techniques forOFDM and its application to the DVB-T system," IEEE Globecom 2001, pp. 3100-3105, November 2001.

NPTL 3: IEEE P802.11n (D3.00) Draft STANDARD for Information Technology-Telecommunications and information exchange between systems-Local and metropolitan area networks-Specific requirements-Part11: Wireless LAN Medium Access Control (MAC) and Physical Layer (PHY) specifications, 2007.

SUMMARY OF THE INVENTION

However, in the conventional configuration, a case of transmitting a single-stream signal is not taken into consideration. Therefore, details of a transmission method for improving reception quality of single-stream data have not been studied.

The present disclosure relates to a transmission apparatus and a transmission method for transmitting a single-stream signal and a multiple-stream signal together even when a multi-carrier transmission scheme such as the OFDM scheme is used. One aspect of the present disclosure can improve reception quality of single-stream data and improve reception quality of multiple-stream data in a propagation environment including line-of sight (LOS).

A transmission apparatus according to the present disclosure includes: a weight combiner that performs a precoding process on a first baseband signal and a second baseband signal to generate a first precoding signal and a second precoding signal; a first pilot inserter that inserts a pilot signal into the first precoding signal; a first phase changer that performs phase change on the second precoding signal; a second pilot inserter that inserts a pilot signal into the phase changed second precoding signal output by the first phase changer; and a second phase changer that further performs phase change on the phase-changed second precoding signal with the pilot signal inserted by the second pilot inserter.

A transmission method according to the present disclosure includes: performing a precoding process on a first baseband signal and a second baseband signal to generate a first precoding signal and a second precoding signal; inserting a pilot signal into the first precoding signal; performing phase change on the second precoding signal; inserting a pilot signal into the phase changed second precoding signal that undergoes the phase change; and further performing phase change on the phase-changed second precoding signal with the pilot signal inserted.

Note that these comprehensive or specific aspects may be implemented using a system, a method, an integrated circuit, a computer program, or a recording medium, and these comprehensive or specific aspects may be implemented using any combination of a system, a apparatus, a method, an integrated circuit, a computer program, and a recording medium.

The transmission apparatus of the present disclosure can improve reception quality of single-stream data and improve reception quality of multiple-stream data in a propagation environment including line-of sight (LOS).

BRIEF DESCRIPTION OF DRAWINGS

FIG. 12 is a diagram illustrating an exemplary modulation method to be used by a mapper of FIG. 1.

DESCRIPTION OF EMBODIMENTS

Exemplary embodiments of the present disclosure will be described in detail below with reference to the drawings.

First Exemplary Embodiment

A transmission method, a transmission apparatus, a reception method, and a reception apparatus of the present exemplary embodiment will be described in detail.

Figure 1:
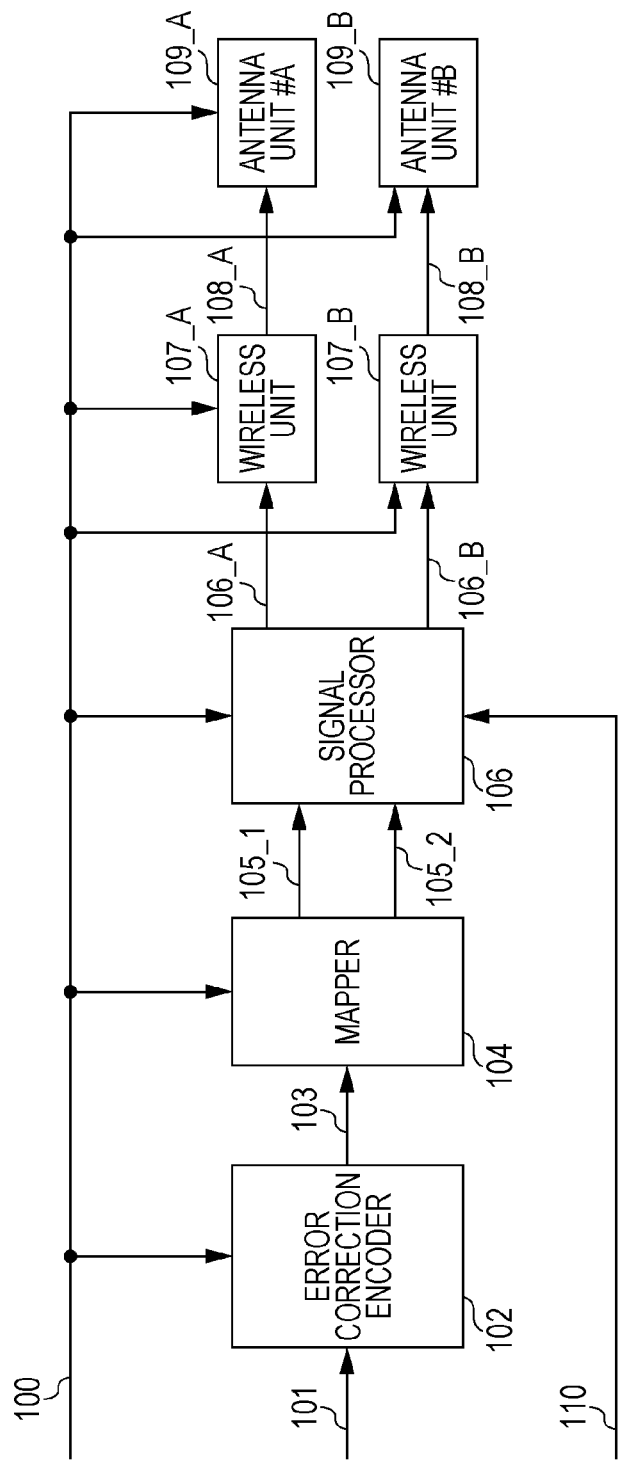
FIG. 1 is a diagram illustrating one exemplary configuration of a transmission apparatus according to the present exemplary embodiment.

FIG. 1 is a diagram illustrating one exemplary configuration of the transmission apparatus such as a base station, an access point, and a broadcasting station according to the present exemplary embodiment. Error correction encoding 102 receives data 101 and control signal 100, performs error correction encoding based on information about an error correction code included in control signal 100 (e.g., information about the error correction code, code length (block length), coding rate), and then outputs encoded data 103. Note that error correction encoder 102 may include an interleaver, and if error correction encoder 102 includes an interleaver, the error correction encoder 102 may rearrange data after encoding and output encoded data 103.

Mapper 104 receives encoded data 103 and control signal 100, performs mapping according to a modulation scheme based on information about a modulated signal included in control signal 100, and then outputs mapped signal (baseband signal) 105_1 and mapped signal (baseband signal)

105_2. Note that mapper 104 generates mapped signal 105_1 by using a first series and generates mapped signal 105_2 by using a second series. At this time, it is assumed that the first series differs from the second series.

Signal processor 106 receives mapped signals 105_1 and 105_2, signal group 110, and control signal 100, performs signal processing based on control signal 100, and then outputs signal-processed signals 106_A and 106_B. At this time, signal-processed signal 106_A is represented as u1(i), and signal-processed signal 106_B is represented as u2(i) (i is a symbol number, and for example, i is an integer equal to or greater than 0). Note that the signal processing will be described later with reference to FIG. 2.

Wireless unit 107_A receives signal-processed signal 106_A and control signal 100, performs processing on signal-processed signal 106_A based on control signal 100, and then outputs transmission signal 108_A. Then, transmission signal 108_A is output as a radio wave from antenna unit #A (109_A).

Similarly, wireless unit 107_B receives signal-processed signal 106_B and control signal 100, performs processing on signal-processed signal 106_B based on control signal 100, and then outputs transmission signal 108_B. Then, transmission signal 108_B is output as a radio wave from antenna unit #B (109_B).

Antenna unit #A (109_A) receives control signal 100. At this time, antenna unit #A performs processing on transmission signal 108_A based on control signal 100 and then outputs the processed signal as a radio wave. However, antenna unit #A (109_A) does not necessarily receive control signal 100.

Similarly, antenna unit #B (109_B) receives control signal 100. At this time, antenna unit #B performs processing on transmission signal 108_B based on control signal 100 and then outputs a radio wave. However, antenna unit #B (109_B) does not necessarily receive control signal 100.

Note that control signal 100 may be generated based on information transmitted from a apparatus serving as a communication partner of the apparatus illustrated in FIG. 1. Alternatively, the apparatus of FIG. 1 may include an input unit and control signal 100 may be generated based on information input from the input unit.

Figure 2:
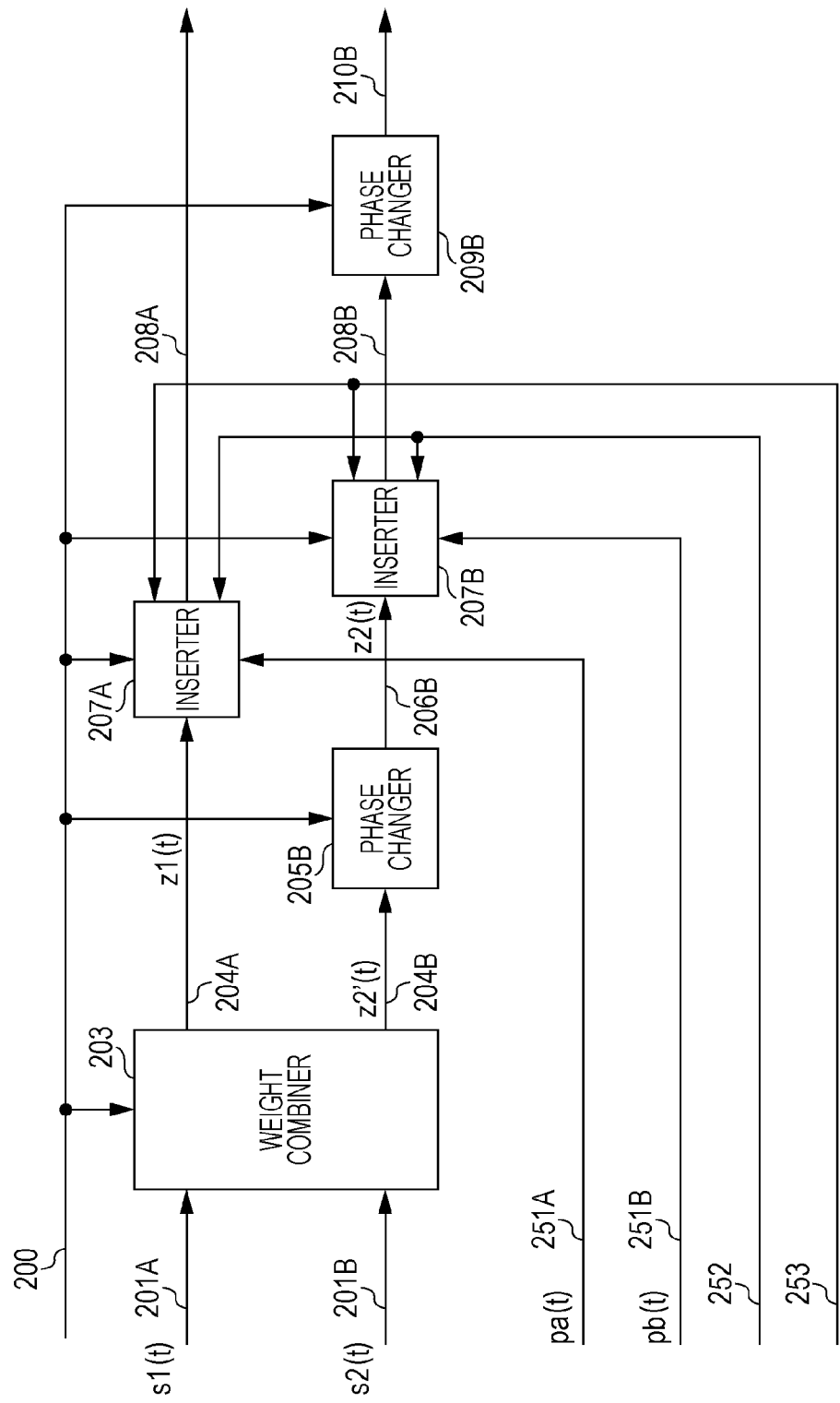
FIG. 2 is a diagram illustrating one exemplary configuration of a signal processor of FIG. 1.

FIG. 2 is a diagram illustrating one exemplary configuration of signal processor 106 in FIG. 1. Weight combiner (precoder) 203 receives mapped signal 201A (corresponding to mapped signal 105_1 of FIG. 1), mapped signal 201B (corresponding to mapped signal 105_2 of FIG. 1), and control signal 200 (corresponding to control signal 100 of FIG. 1). Weight combiner (precoder) 203 performs weighting (precoding) based on control signal 200, and then outputs weighted signal 204A and weighted signal 204B. At this time, mapped signal 201A is represented as s1(t), mapped signal 201B as s2(t), weighted signal 204A as z1(t), and weighted signal 204B as z2'(t). Note that t is time as one example. It is assumed that s1(t), s2(t), z1(t), and z2'(t) are defined as complex numbers (hence may be real numbers).

Weight combiner (precoder) 203 performs the following calculation.

[Formula 1]

$$\begin{pmatrix} z1(i) \\ z2'(i) \end{pmatrix} = \begin{pmatrix} a & b \\ c & d \end{pmatrix} \begin{pmatrix} s1(i) \\ s2(i) \end{pmatrix} \qquad \text{Formula (1)}$$

In formula (1), a, b, c, and d can be defined using complex numbers. Therefore, a, b, c, and d are defined as complex numbers, but may be defined as real numbers. Note that i is a symbol number.

Then, phase changer 205B receives weighted signal 204B and control signal 200. Based on control signal 200, phase changer 205B performs phase change on weighted signal 204B and then outputs phase-changed signal 206B. Note that phase-changed signal 206B is represented as z2(t), and z2(t) is defined as a complex number (z2(t) may be a real number).

A specific operation of phase changer 205B will be described. For example, phase changer 205B performs phase change of y(i) on z2'(i). Therefore, z2(i) can be represented as z2(i)=y(i)×z2'(i) (i is a symbol number (i is an integer equal to or greater than 0)).

For example, a phase change value is set as follows (N is an integer equal to or greater than 2, and N is a phase change cycle). If N is set as an odd number equal to or greater than 3, data reception quality may improve.

[Formula 2]

$$y(i) = e^{j\frac{2 \times \pi \times i}{N}} \qquad \text{Formula (2)}$$

j is an imaginary unit. However, formula (2) is merely an example and the phase change value is not limited to this formula. Therefore, it is assumed that the phase change value y(i) is represented as y(i)=$e^{j \times \delta(i)}$.

At this time, z1(i) and z2(i) can be represented by the following formula.

[Formula 3]

$$\begin{pmatrix} z1(i) \\ z2(i) \end{pmatrix} = \begin{pmatrix} 1 & 0 \\ 0 & y(i) \end{pmatrix} \begin{pmatrix} a & b \\ c & d \end{pmatrix} \begin{pmatrix} s1(i) \\ s2(i) \end{pmatrix} = \begin{pmatrix} 1 & 0 \\ 0 & e^{j \times \delta(i)} \end{pmatrix} \begin{pmatrix} a & b \\ c & d \end{pmatrix} \begin{pmatrix} s1(i) \\ s2(2) \end{pmatrix} \qquad \text{Formula (3)}$$

Note that δ(i) is a real number. z1(i) and z2(i) are transmitted from the transmission apparatus at the same time and at the same frequency (same frequency band).

In formula (3), the phase change value is not limited to formula (2), and for example, a method for periodically or regularly changing the phase can be considered.

It is assumed that a (precoding) matrix in formulas (1) and (3) is as represented by formula (4).

[Formula 4]

$$\begin{pmatrix} a & b \\ c & d \end{pmatrix} = F \qquad \text{Formula (4)}$$

For example, it is considered to use the following matrix for matrix F.

[Formula 5]

$$F = \begin{pmatrix} \beta \times e^{j0} & \beta \times \alpha \times e^{j0} \\ \beta \times \alpha \times e^{j0} & \beta \times e^{j\pi} \end{pmatrix} \qquad \text{Formula (5)}$$

or

[Formula 6]

$$F = \frac{1}{\sqrt{\alpha^2+1}}\begin{pmatrix} e^{j0} & \alpha \times e^{j0} \\ \alpha \times e^{j0} & e^{j\pi} \end{pmatrix} \quad \text{Formula (6)}$$

or

[Formula 7]

$$F = \begin{pmatrix} \beta \times e^{j0} & \beta \times \alpha \times e^{j\pi} \\ \beta \times \alpha \times e^{j0} & \beta \times e^{j0} \end{pmatrix} \quad \text{Formula (7)}$$

or

[Formula 8]

$$F = \frac{1}{\sqrt{\alpha^2+1}}\begin{pmatrix} e^{j0} & \alpha \times e^{j\pi} \\ \alpha \times e^{j0} & e^{j0} \end{pmatrix} \quad \text{Formula (8)}$$

or

[Formula 9]

$$F = \begin{pmatrix} \beta \times \alpha \times e^{j0} & \beta \times e^{j\pi} \\ \beta \times e^{j0} & \beta \times \alpha \times e^{j0} \end{pmatrix} \quad \text{Formula (9)}$$

or

[Formula 10]

$$F = \frac{1}{\sqrt{\alpha^2+1}}\begin{pmatrix} \alpha \times e^{j0} & e^{j\pi} \\ e^{j0} & \alpha \times e^{j0} \end{pmatrix} \quad \text{Formula (10)}$$

or

[Formula 11]

$$F = \begin{pmatrix} \beta \times \alpha \times e^{j0} & \beta \times e^{j0} \\ \beta \times e^{j0} & \beta \times \alpha \times e^{j\pi} \end{pmatrix} \quad \text{Formula (11)}$$

or

[Formula 12]

$$F = \frac{1}{\sqrt{\alpha^2+1}}\begin{pmatrix} \alpha \times e^{j0} & e^{j0} \\ e^{j0} & \alpha \times e^{j\pi} \end{pmatrix} \quad \text{Formula (12)}$$

Note that in formulas (5) to (12), $\alpha$ may be a real number or an imaginary number, and $\beta$ may be a real number or an imaginary number. However, $\alpha$ is not 0 (zero). $\beta$ is also not 0 (zero).

or

[Formula 13]

$$F = \begin{pmatrix} \beta \times \cos\theta & \beta \times \sin\theta \\ \beta \times \sin\theta & -\beta \times \cos\theta \end{pmatrix} \quad \text{Formula (13)}$$

or

[Formula 14]

$$F = \begin{pmatrix} \cos\theta & \sin\theta \\ \sin\theta & -\cos\theta \end{pmatrix} \quad \text{Formula (14)}$$

or

[Formula 15]

$$F = \begin{pmatrix} \beta \times \cos\theta & -\beta \times \sin\theta \\ \beta \times \sin\theta & \beta \times \cos\theta \end{pmatrix} \quad \text{Formula (15)}$$

or

[Formula 16]

$$F = \begin{pmatrix} \cos\theta & -\sin\theta \\ \sin\theta & \cos\theta \end{pmatrix} \quad \text{Formula (16)}$$

or

[Formula 17]

$$F = \begin{pmatrix} \beta \times \sin\theta & -\beta \times \cos\theta \\ \beta \times \cos\theta & \beta \times \sin\theta \end{pmatrix} \quad \text{Formula (17)}$$

or

[Formula 18]

$$F = \begin{pmatrix} \sin\theta & -\cos\theta \\ \cos\theta & \sin\theta \end{pmatrix} \quad \text{Formula (18)}$$

or

[Formula 19]

$$F = \begin{pmatrix} \beta \times \sin\theta & \beta \times \cos\theta \\ \beta \times \cos\theta & -\beta \times \sin\theta \end{pmatrix} \quad \text{Formula (19)}$$

or

[Formula 20]

$$F = \begin{pmatrix} \sin\theta & \cos\theta \\ \cos\theta & -\sin\theta \end{pmatrix} \quad \text{Formula (20)}$$

Note that in formulas (13), (15), (17), and (19), $\beta$ may be a real number or an imaginary number. However, $\beta$ is not 0 (zero) ($\theta$ is a real number).

or

[Formula 21]
$$F(i) = \begin{pmatrix} \beta \times e^{j\theta_{11}(i)} & \beta \times \alpha \times e^{j(\theta_{11}(i)+\lambda)} \\ \beta \times \alpha \times e^{j\theta_{21}(i)} & \beta \times e^{j(\theta_{21}(i)+\lambda+\pi)} \end{pmatrix} \quad \text{Formula (21)}$$

or

[Formula 22]
$$F(i) = \frac{1}{\sqrt{\alpha^2+1}} \begin{pmatrix} e^{j\theta_{11}(i)} & \alpha \times e^{j(\theta_{11}(i)+\lambda)} \\ \alpha \times e^{j\theta_{21}(i)} & e^{j(\theta_{21}(i)+\lambda+\pi)} \end{pmatrix} \quad \text{Formula (22)}$$

or

[Formula 23]
$$F(i) = \begin{pmatrix} \beta \times \alpha \times e^{j\theta_{21}(i)} & \beta \times e^{j(\theta_{21}(i)+\lambda+\pi)} \\ \beta \times e^{j\theta_{11}(i)} & \beta \times \alpha \times e^{j(\theta_{11}(i)+\lambda)} \end{pmatrix} \quad \text{Formula (23)}$$

or

[Formula 24]
$$F(i) = \frac{1}{\sqrt{\alpha^2+1}} \begin{pmatrix} \alpha \times e^{j\theta_{21}(i)} & e^{j(\theta_{21}(i)+\lambda+\pi)} \\ e^{j\theta_{11}(i)} & \alpha \times e^{j(\theta_{11}(i)+\lambda)} \end{pmatrix} \quad \text{Formula (24)}$$

or

[Formula 25]
$$F(i) = \begin{pmatrix} \beta \times e^{j\theta_{11}} & \beta \times \alpha \times e^{j(\theta_{11}+\lambda(i))} \\ \beta \times \alpha \times e^{j\theta_{21}} & \beta \times e^{j(\theta_{21}+\lambda(i)+\pi)} \end{pmatrix} \quad \text{Formula (25)}$$

or

[Formula 26]
$$F(i) = \frac{1}{\sqrt{\alpha^2+1}} \begin{pmatrix} e^{j\theta_{11}} & \alpha \times e^{j(\theta_{11}+\lambda(i))} \\ \alpha \times e^{j\theta_{21}} & e^{j(\theta_{21}+\lambda(i)+\pi)} \end{pmatrix} \quad \text{Formula (26)}$$

or

[Formula 27]
$$F(i) = \begin{pmatrix} \beta \times \alpha \times e^{j\theta_{21}} & \beta \times e^{j(\theta_{21}+\lambda(i)+\pi)} \\ \beta \times e^{j\theta_{11}} & \beta \times \alpha \times e^{j(\theta_{11}+\lambda(i))} \end{pmatrix} \quad \text{Formula (27)}$$

or

[Formula 28]
$$F(i) = \frac{1}{\sqrt{\alpha^2+1}} \begin{pmatrix} \alpha \times e^{j\theta_{21}} & e^{j(\theta_{21}+\lambda(i)+\pi)} \\ e^{j\theta_{11}} & \alpha \times e^{j(\theta_{11}+\lambda(i))} \end{pmatrix} \quad \text{Formula (28)}$$

or

[Formula 29]
$$F = \begin{pmatrix} \beta \times e^{j\theta_{11}} & \beta \times \alpha \times e^{j(\theta_{11}+\lambda)} \\ \beta \times \alpha \times e^{j\theta_{21}} & \beta \times e^{j(\theta_{21}+\lambda+\pi)} \end{pmatrix} \quad \text{Formula (29)}$$

or

[Formula 30]
$$F = \frac{1}{\sqrt{\alpha^2+1}} \begin{pmatrix} e^{j\theta_{11}} & \alpha \times e^{j(\theta_{11}+\lambda)} \\ \alpha \times e^{j\theta_{21}} & e^{j(\theta_{21}+\lambda+\pi)} \end{pmatrix} \quad \text{Formula (30)}$$

or

[Formula 31]
$$F = \begin{pmatrix} \beta \times \alpha \times e^{j\theta_{21}} & \beta \times e^{j(\theta_{21}+\lambda+\pi)} \\ \beta \times e^{j\theta_{11}} & \beta \times \alpha \times e^{j(\theta_{11}+\lambda)} \end{pmatrix} \quad \text{Formula (31)}$$

or

[Formula 32]
$$F = \frac{1}{\sqrt{\alpha^2+1}} \begin{pmatrix} \alpha \times e^{j\theta_{21}} & e^{j(\theta_{21}+\lambda+\pi)} \\ e^{j\theta_{11}} & \alpha \times e^{j(\theta_{11}+\lambda)} \end{pmatrix} \quad \text{Formula (32)}$$

However, $\theta_{11}(i)$, $\theta_{21}(i)$, and $\lambda(i)$ are functions of i (symbol number) (real numbers), $\lambda$ is for example a fixed value (real number) (is not necessarily a fixed value), a may be a real number or an imaginary number, and $\beta$ may be a real number or an imaginary number. However, a is not 0 (zero). $\beta$ is also not 0 (zero). $\theta_{11}$ and $\theta_{21}$ are real numbers.

In addition, it is possible to implement each exemplary embodiment of the present specification even by using precoding matrices other than these matrices.

or

[Formula 33]
$$F(i) = \begin{pmatrix} 1 & 0 \\ 0 & 1 \end{pmatrix} \quad \text{Formula (33)}$$

or

[Formula 34]
$$F(i) = \begin{pmatrix} \beta & 0 \\ 0 & \beta \end{pmatrix} \quad \text{Formula (34)}$$

or

[Formula 35]
$$F(i) = \begin{pmatrix} 1 & 0 \\ 0 & -1 \end{pmatrix} \quad \text{Formula (35)}$$

or

[Formula 36]

$$F(i) = \begin{pmatrix} \beta & 0 \\ 0 & -\beta \end{pmatrix} \quad \text{Formula (36)}$$

Note that β of formulas (34) and (36) may be a real number or an imaginary number. However, β is also not 0 (zero).

Inserter 207A receives weighted signal 204A, pilot symbol signal (pa(t)) (t: time) (251A), preamble signal 252, control information symbol signal 253, and control signal 200. Based on information about a frame structure included in control signal 200, inserter 207A outputs baseband signal 208A based on the frame structure.

Similarly, inserter 207B receives phase-changed signal 206B, pilot symbol signal (pb(t)) (251B), preamble signal 252, control information symbol signal 253, and control signal 200. Based on the information about the frame structure included in control signal 200, inserter 207B outputs baseband signal 208B based on the frame structure.

Phase changer 209B receives baseband signal 208B and control signal 200, performs phase change on baseband signal 208B based on control signal 200, and then outputs phase-changed signal 210B. Baseband signal 208B is a function of symbol number i (i is an integer equal to or greater than 0) and is represented as x'(i). Then, phase-changed signal 210B (x(i)) can be represented as $x(i) = e^{j \times \varepsilon(i)} \times x'(i)$ (j is an imaginary unit).

Note that as will be described later, an operation of phase changer 209B may be cyclic delay diversity (CDD) (cyclic shift diversity (CSD)) described in NPTL 2 and NPTL 3. Phase changer 209B is characterized by performing phase change on symbols in a frequency axis direction. Phase changer 209B performs phase change on data symbols, pilot symbols, control information symbols, and the like.

Figure 3:
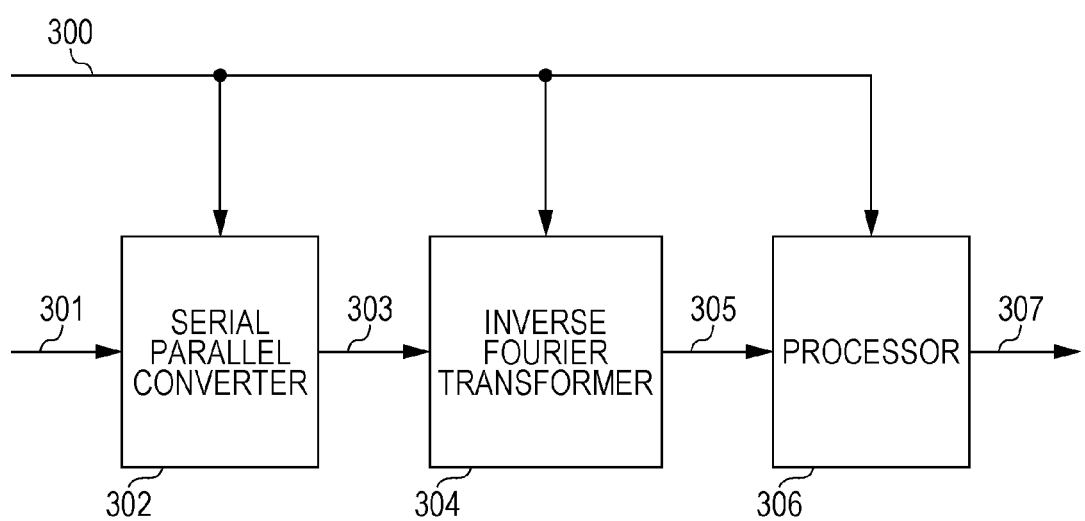
FIG. 3 is a diagram illustrating one exemplary configuration of a wireless unit of FIG. 1.

FIG. 3 is one exemplary configuration of wireless units 107_A and 107_B of FIG. 1. Serial parallel converter 302 receives signal 301 and control signal 300 (corresponding to control signal 100 of FIG. 1), performs serial parallel conversion based on control signal 300, and then outputs serial-parallel-converted signal 303.

Inverse Fourier transformer 304 receives serial-parallel-converted signal 303 and control signal 300, performs inverse Fourier transform (for example, inverse fast Fourier transform (IFFT)) based on control signal 300, and then outputs inverse-Fourier-transformed signal 305.

Processor 306 receives inverse-Fourier-transformed signal 305 and control signal 300, performs processes such as frequency conversion and amplification based on control signal 300, and then outputs modulated signal 307.

For example, when signal 301 is signal-processed signal 106_A of FIG. 1, modulated signal 307 corresponds to transmission signal 108_A of FIG. 1. Meanwhile, when signal 301 is signal-processed signal 106_B of FIG. 1, modulated signal 307 corresponds to transmission signal 108_B of FIG. 1.

Figure 4:
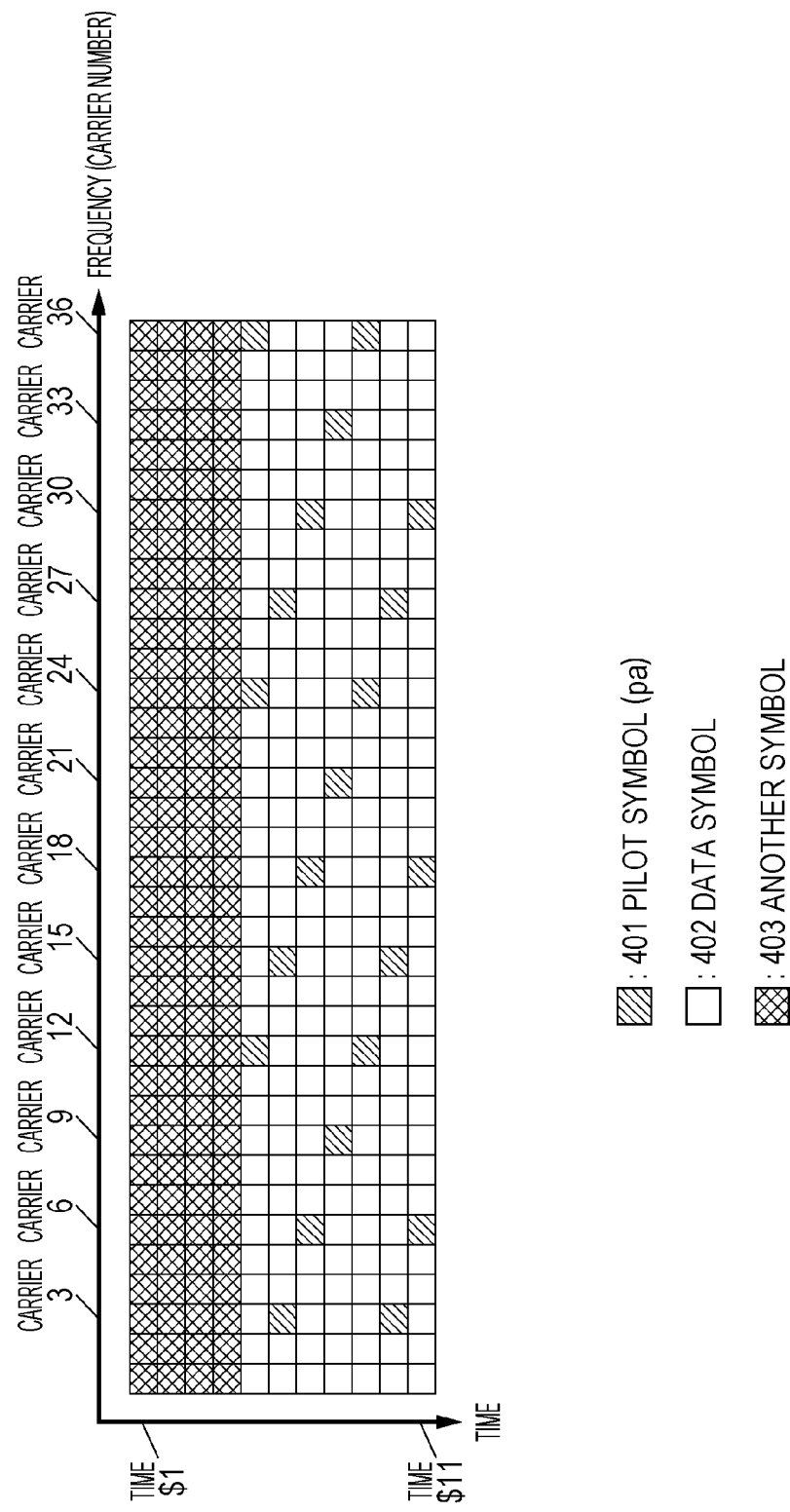
FIG. 4 is a diagram illustrating one exemplary frame structure of a transmission signal of FIG. 1.

FIG. 4 is a frame structure of transmission signal 108_A of FIG. 1. In FIG. 4, a horizontal axis represents a frequency (carrier), and a vertical axis represents time. Since the multi-carrier transmission scheme such as OFDM is used, symbols are present in a carrier direction. FIG. 4 illustrates symbols of carrier 1 to carrier 36. Also, FIG. 4 illustrates symbols from time $1 to time $11.

Reference numeral 401 of FIG. 4 represents a pilot symbol (pilot signal 251A of FIG. 2 (corresponding to pa(t))), 402 represents a data symbol, and 403 represents another symbol. At this time, the pilot symbol is, for example, a phase shift keying (PSK) symbol, a symbol for the reception apparatus that receives this frame to perform channel estimation (estimation of propagation path fluctuation), frequency offset and phase fluctuation estimation. For example, the transmission apparatus of FIG. 1 and the reception apparatus that receives the frame of FIG. 4 preferably share a method for transmitting the pilot symbol.

Meanwhile, mapped signal 201A (mapped signal 105_1 of FIG. 1) is named "stream #1", and mapped signal 201B (mapped signal 105_2 of FIG. 1) is named "stream #2". Note that this point is also the same in the following description.

Data symbol 402 is a symbol corresponding to baseband signal 208A generated by signal processing according to FIG. 2. Therefore, data symbol 402 is one of "a symbol including both a symbol of "stream #1" and a symbol of "stream #2"", "the symbol of "stream #1"", and "the symbol of "stream #2"". This is determined by a structure of a precoding matrix used by weight combiner 203.

The other symbol 403 is a symbol corresponding to preamble signal 242 and control information symbol signal 253 in FIG. 2. However, the other symbol may include symbols other than the preamble and the control information symbol. At this time, the preamble may transmit data (for control), and includes a symbol for signal detection, a symbol for performing frequency synchronization and time synchronization, a symbol for channel estimation (symbol for estimating propagation path fluctuation) and other symbols. The control information symbol is a symbol including control information for the reception apparatus that has received the frame of FIG. 4 to implement demodulation and decoding of the data symbol.

For example, carriers 1 to 36 at time $1 to time $4 in FIG. 4 are the other symbol 403. Carriers 1 to 11 at time $5 are data symbol 402. Thereafter, carrier 12 at time $5 is pilot symbol 401, carriers 13 to 23 at time $5 are data symbol 402, carrier 24 at time $5 is pilot symbol 401, . . . , carriers 1 and 2 at time $6 are data symbol 402, carrier 3 at time $6 is pilot symbol 401, . . . , carrier 30 at time $11 is pilot symbol 401, and carriers 31 to 36 at time $11 are data symbol 402.

Figure 5:
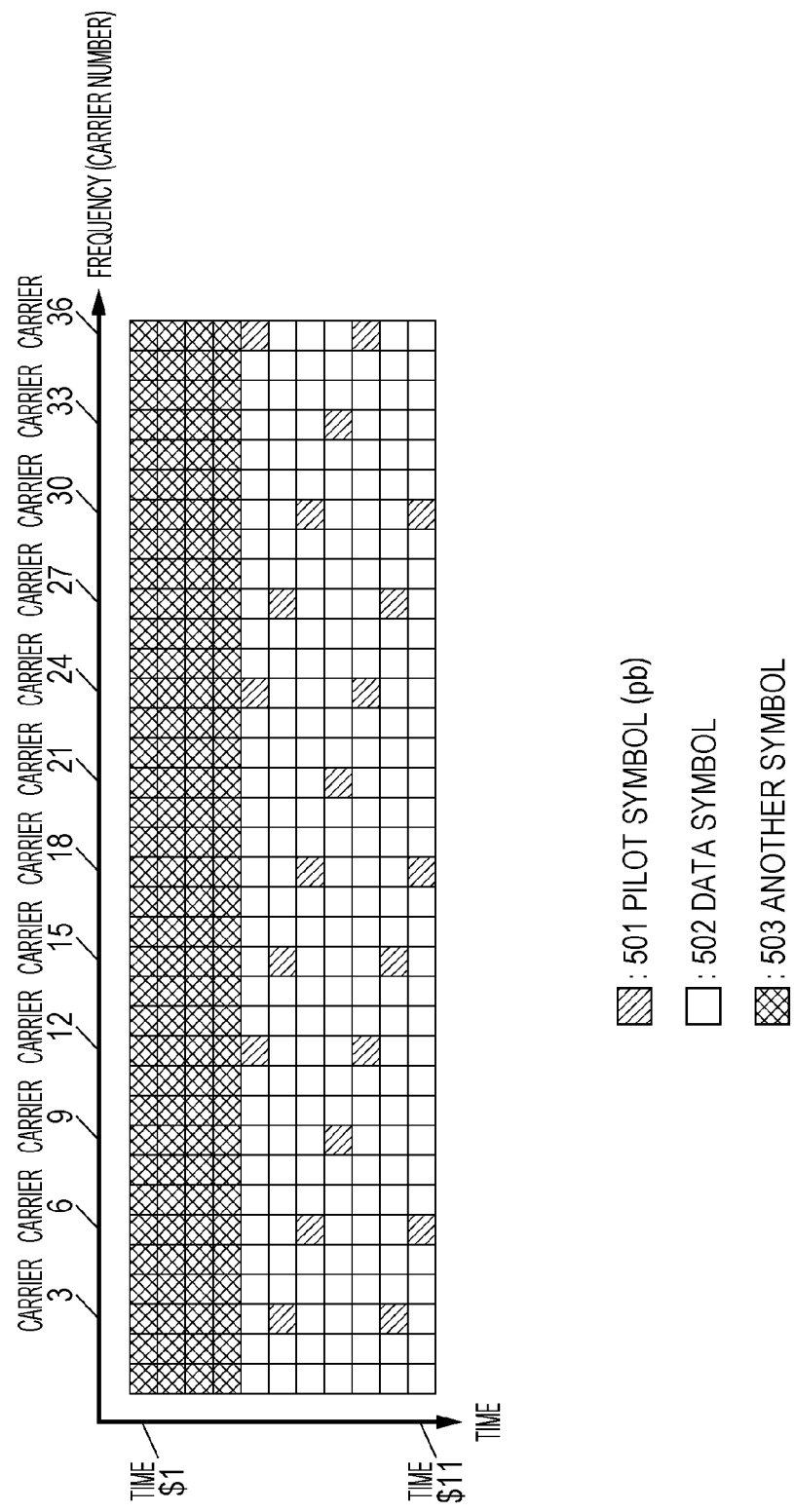
FIG. 5 is a diagram illustrating one exemplary frame structure of the transmission signal of FIG. 1.

FIG. 5 is a frame structure of transmission signal 108_B of FIG. 1. In FIG. 5, a horizontal axis represents a frequency (carrier), and a vertical axis represents time. Since the multi-carrier transmission scheme such as OFDM is used, symbols are present in a carrier direction. FIG. 5 illustrates symbols of carrier 1 to carrier 36. Also, FIG. 5 illustrates symbols from time $1 to time $11.

Reference numeral 501 of FIG. 5 represents a pilot symbol (pilot signal 251B of FIG. 2 (corresponding to pb(t))), 502 represents a data symbol, and 503 represents another symbol. At this time, the pilot symbol is, for example, a PSK symbol, a symbol for the reception apparatus that receives this frame to perform channel estimation (estimation of propagation path fluctuation), frequency offset and phase fluctuation estimation. For example, the transmission apparatus of FIG. 1 and the reception apparatus that receives the frame of FIG. 5 preferably share a method for transmitting the pilot symbol.

Data symbol 502 is a symbol corresponding to baseband signal 208B generated by signal processing according to FIG. 2. Therefore, data symbol 502 is one of "a symbol including both a symbol of "stream #1" and a symbol of "stream #2"", "the symbol of "stream #1"", and "the symbol of "stream #2"". This is determined by a structure of a precoding matrix used by weight combiner 203.

The other symbol 503 is a symbol corresponding to preamble signal 252 and control information symbol signal 253 in FIG. 2. However, the other symbol may include symbols other than the preamble and the control information symbol. At this time, the preamble may transmit data (for control), and includes a symbol for signal detection, a symbol for performing frequency synchronization and time synchronization, a symbol for channel estimation (symbol for estimating propagation path fluctuation) and other symbols. The control information symbol is a symbol including control information for the reception apparatus that has received the frame of FIG. 5 to implement demodulation and decoding of the data symbol.

For example, carriers 1 to 36 at time $1 to time $4 in FIG. 5 are the other symbol 403. Carriers 1 to 11 at time $5 are data symbol 402. Thereafter, carrier 12 at time $5 is pilot symbol 401, carriers 13 to 23 at time $5 are data symbol 402, carrier 24 at time $5 is pilot symbol 401, . . . , carriers 1 and 2 at time $6 are data symbol 402, carrier 3 at time $6 is pilot symbol 401, . . . , carrier 30 at time $11 is pilot symbol 401, and carriers 31 to 36 at time $11 are data symbol 402.

When a symbol is present at carrier A and time $B of FIG. 4 and when a symbol is present at carrier A and time $B of FIG. 5, the symbol at carrier A and time $B of FIG. 4 and the symbol at carrier A and time $B of FIG. 5 are transmitted at the same time and the same frequency. Note that the frame structure is not limited to the frame structures in FIGS. 4 and 5, and FIGS. 4 and 5 are merely examples of the frame structure.

The other symbols in FIGS. 4 and 5 are symbols corresponding to "preamble signal 252 and control information symbol signal 253 in FIG. 2". Therefore, the other symbol 503 of FIG. 5 at the same time and the same frequency (same carrier) as the other symbol 403 of FIG. 4 transmits the same data (same control information) when the control information is transmitted.

Note that it is assumed that the reception apparatus simultaneously receives the frame of FIG. 4 and the frame of FIG. 5, but even by receiving only the frame of FIG. 4 or only the frame of FIG. 5, the reception apparatus can obtain the data transmitted by the transmission apparatus.

Figure 6:
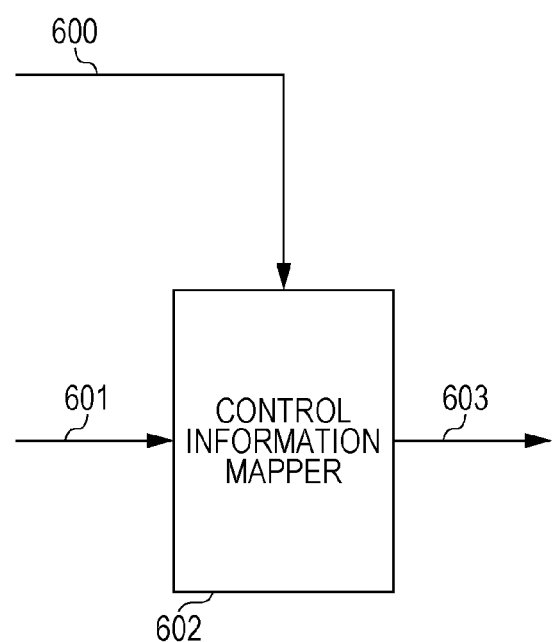
FIG. 6 is a diagram illustrating one exemplary configuration of a part regarding control information generation of FIG. 2.

FIG. 6 is a diagram illustrating one exemplary configuration of a part regarding control information generation for generating control information symbol signal 253 of FIG. 2.

Control information mapper 602 receives data 601 regarding control information and control signal 600, performs mapping on data 601 regarding the control information by a modulation method based on control signal 600, and then outputs control-information-mapped signal 603. Note that control-information-mapped signal 603 corresponds to control information symbol signal 253 of FIG. 2.

Figure 7:
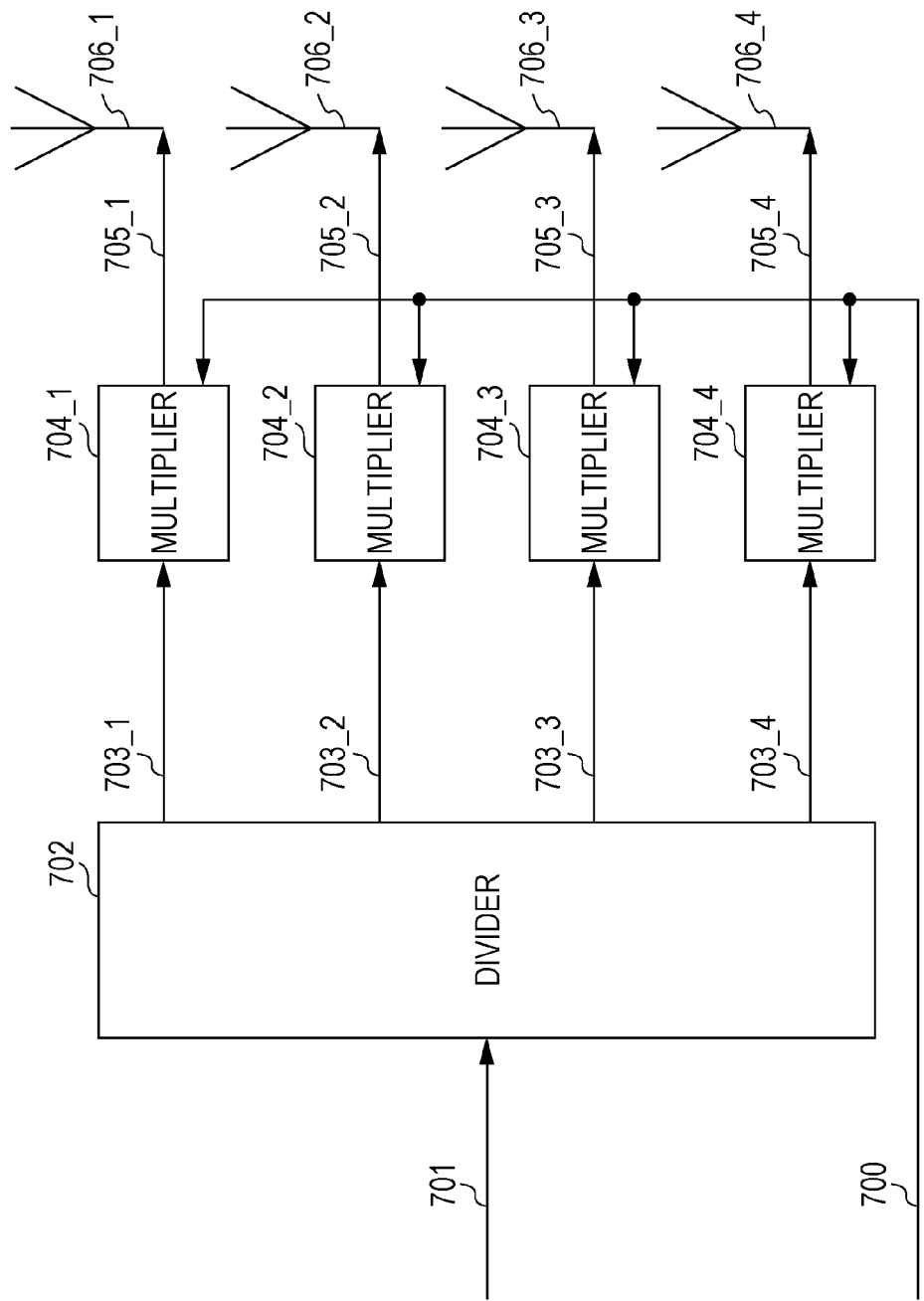
FIG. 7 is a diagram illustrating one exemplary configuration of an antenna unit of FIG. 1.

FIG. 7 is a diagram illustrating one exemplary configuration of antenna unit #A (109_A) and antenna unit #B (109_B) of FIG. 1. This is an example in which antenna unit #A (109_A) and antenna unit #B (109_B) each include a plurality of antennas.

Divider 702 receives and divides transmission signal 701 to output transmission signals 703_1, 703_2, 703_3, and 703_4.

Multiplier 704_1 receives transmission signal 703_1 and control signal 700, multiplies transmission signal 7031 by a multiplication coefficient based on information about the multiplication coefficient included in control signal 700, and then outputs multiplied signal 705_1. Multiplied signal 705_1 is output as a radio wave from antenna 7061.

When transmission signal 703_1 is Tx1(t) (t: time) and the multiplication coefficient is W1 (W1 can be defined as a complex number and hence may be a real number), multiplied signal 705_1 is represented as Tx1(t)×W1.

Multiplier 704_2 receives transmission signal 703_2 and control signal 700, multiplies transmission signal 7032 by a multiplication coefficient based on information about the multiplication coefficient included in control signal 700, and then outputs multiplied signal 705_2. Multiplied signal 705_2 is output as a radio wave from antenna 706_2.

When transmission signal 703_2 is Tx2(t) and the multiplication coefficient is W2 (W2 can be defined as a complex number and hence may be a real number), multiplied signal 705_2 is represented as Tx2(t)×W2.

Multiplier 704_3 receives transmission signal 703_3 and control signal 700, multiplies transmission signal 7033 by a multiplication coefficient based on information about the multiplication coefficient included in control signal 700, and then outputs multiplied signal 705_3. Multiplied signal 705_3 is output as a radio wave from antenna 706_3.

When transmission signal 703_3 is Tx3(t) and the multiplication coefficient is W3 (W3 can be defined as a complex number and hence may be a real number), multiplied signal 705_3 is represented as Tx3(t)×W3.

Multiplier 704_4 receives transmission signal 703_4 and control signal 700, multiplies transmission signal 7034 by a multiplication coefficient based on information about the multiplication coefficient included in control signal 700, and then outputs multiplied signal 705_4. Multiplied signal 705_4 is output as a radio wave from antenna 706_4.

When transmission signal 703_4 is Tx4(t) and the multiplication coefficient is W4 (W4 can be defined as a complex number and hence may be a real number), multiplied signal 705_4 is represented as Tx4(t)×W4.

Note that "an absolute value of W1, an absolute value of W2, an absolute value of W3, and an absolute value of W4 may be equal to each other". This corresponds to phase change being performed. Of course, the absolute value of W1, the absolute value of W2, the absolute value of W3, and the absolute value of W4 are not necessarily equal to each other.

Also, in FIG. 7, an example in which the antenna unit includes four antennas (and four multipliers) has been described, but a number of antennas is not limited to four, and the antenna unit is required at least to include two or more antennas.

When the configuration of antenna unit #A (109_A) of FIG. 1 is as illustrated in FIG. 7, transmission signal 701 corresponds to transmission signal 108_A of FIG. 1. Also, when the configuration of antenna unit #B (109_B) of FIG. 1 is as illustrated in FIG. 7, transmission signal 701 corresponds to transmission signal 108_B of FIG. 1. However, antenna unit #A (109_A) and antenna unit #B (109_B) do not need to be configured as illustrated in FIG. 7. As described above, the antenna units do not need to receive control signal 100.

Figure 8:
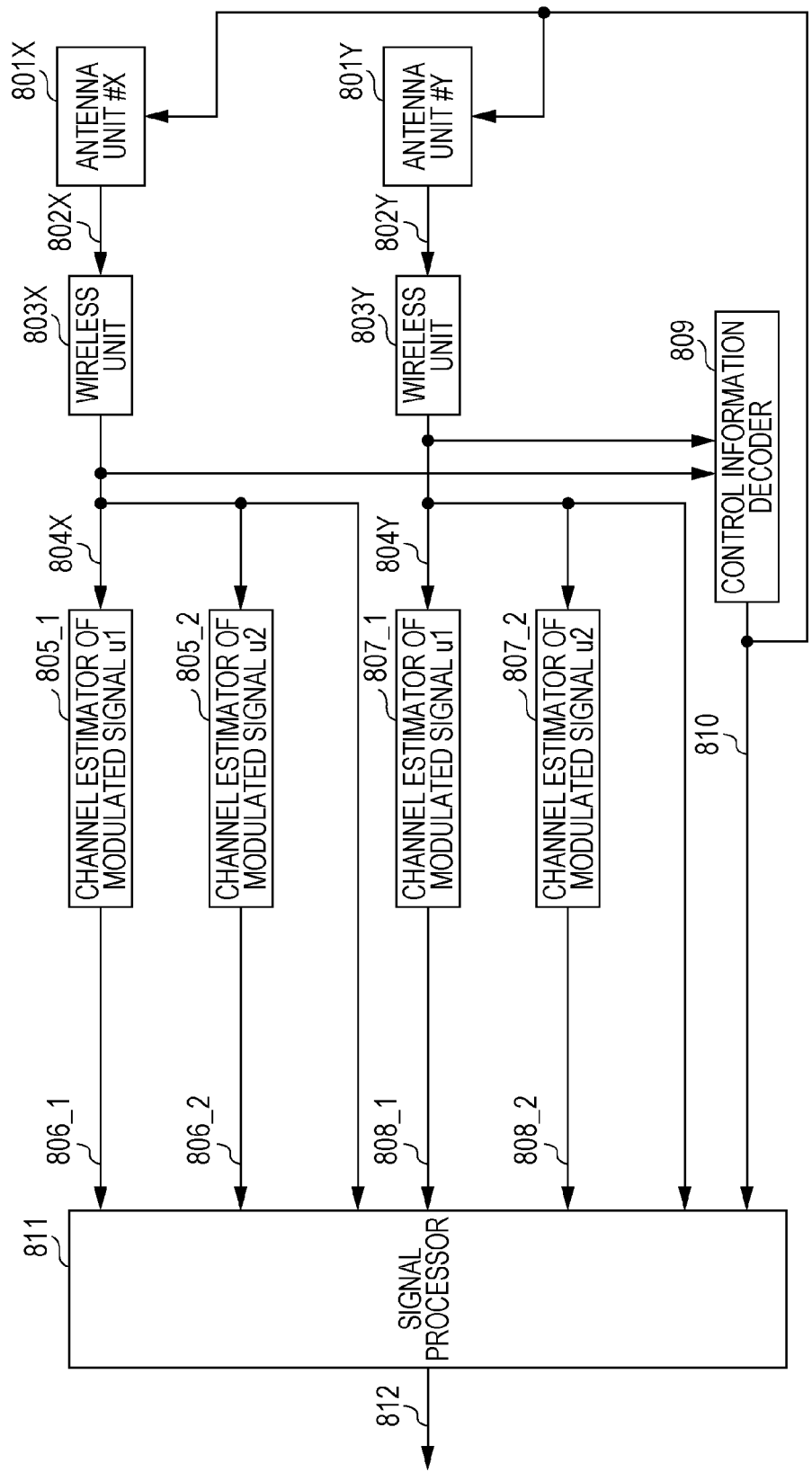
FIG. 8 is a diagram illustrating one exemplary configuration of a reception apparatus according to the present exemplary embodiment.

FIG. 8 is a diagram illustrating one exemplary configuration of the reception apparatus that receives a modulated signal of, for example, the transmission signal of the frame structure of FIG. 4 or 5 transmitted by the transmission apparatus of FIG. 1.

Wireless unit 803X receives reception signal 802X received by antenna unit #X (801X), performs processes such as frequency conversion and Fourier transform, and outputs baseband signal 804X.

Similarly, wireless unit 803Y receives reception signal 802Y received by antenna unit #Y (801Y), performs processes such as frequency conversion and Fourier transform, and outputs baseband signal 804Y.

Note that although FIG. 8 illustrates the configuration in which antenna unit #X (801X) and antenna unit #Y (801Y) each receive control signal 810, antenna unit #X (801X) and antenna unit #Y (801Y) do not necessarily receive control signal 810 in the configuration. An operation when control signal 810 is present as an input will be described in detail later.

Figure 9:
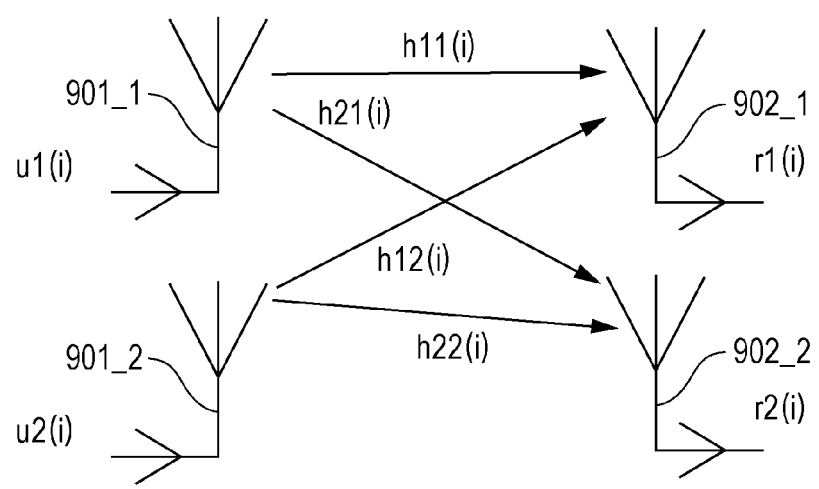
FIG. 9 is a diagram illustrating a diagram illustrating a relationship between the transmission apparatus and the reception apparatus.

Meanwhile, FIG. 9 is a diagram illustrating a relationship between the transmission apparatus and the reception apparatus. Antennas 901_1 and 901_2 of FIG. 9 are transmission antennas, and antenna 901_1 of FIG. 9 corresponds to antenna unit #A (109_A) of FIG. 1. Antenna 901_2 of FIG. 9 corresponds to antenna unit #B (109_B) of FIG. 1.

Antennas 902_1 and 902_2 of FIG. 9 are reception antennas, and antenna 902_1 of FIG. 9 corresponds to antenna unit #X (801X) of FIG. 8. Antenna 902_2 of FIG. 9 corresponds to antenna unit #Y (801Y) of FIG. 8.

As illustrated in FIG. 9, a signal transmitted from transmission antenna 901_1 is u1(i), a signal transmitted from transmission antenna 901_2 is u2(i), a signal received by reception antenna 902_1 is r1(i), and a signal received by reception antenna 902_2 is r2(i). Note that i denotes a symbol number, and for example, i is an integer equal to or greater than 0.

Then, a propagation coefficient from transmission antenna 901_1 to reception antenna 902_1 is h11(i), a propagation coefficient from transmission antenna 901_1 to reception antenna 902_2 is h21(i), a propagation coefficient from transmission antenna 901_2 to reception antenna 902_1 is h12(i), and a propagation coefficient from transmission antenna 901_2 to reception antenna 902_2 is h22(i). Then, the following relational expression holds true.

[Formula 37]

$$\begin{pmatrix} r1(i) \\ r2(i) \end{pmatrix} = \begin{pmatrix} h11(i) & h12(i) \\ h21(i) & h22(i) \end{pmatrix} \begin{pmatrix} u1(i) \\ u2(i) \end{pmatrix} + \begin{pmatrix} n1(i) \\ n2(i) \end{pmatrix} \quad \text{Formula (37)}$$

Note that n1(i) and n2(i) are noise.

Channel estimator 805_1 of modulated signal u1 of FIG. 8 receives baseband signal 804X, estimates the channel of modulated signal u1, that is, estimates h11(i) of formula (37) by using the preamble and/or the pilot symbol in FIGS. 4 and 5, and outputs channel estimation signal 806_1.

Channel estimator 805_2 of modulated signal u2 receives baseband signal 804X, estimates the channel of modulated signal u2, that is, estimates hi 2(i) of formula (37) by using the preamble and/or the pilot symbol in FIGS. 4 and 5, and outputs channel estimation signal 806_2.

Channel estimator 807_1 of modulated signal u1 receives baseband signal 804Y, estimates the channel of modulated signal u1, that is, estimates h21(i) of formula (37) by using the preamble and/or the pilot symbol in FIGS. 4 and 5, and outputs channel estimation signal 808_1.

Channel estimator 807_2 of modulated signal u2 receives baseband signal 804Y, estimates the channel of modulated signal woo2, that is, estimates h22(i) of formula (37) by using the preamble and/or the pilot symbol in FIGS. 4 and 5, and outputs channel estimation signal 808_2.

Control information decoder 809 receives baseband signals 804X and 804Y, demodulates and decodes control information included in "the other symbol" in FIGS. 4 and 5, and outputs control signal 810 including the control information.

Signal processor 811 receives channel estimation signals 806_1, 8062, 808_1, and 8082, baseband signals 804X and 804Y, and control signal 810. Signal processor 811 performs demodulation and decoding by using a relationship of formula (37) and based on the control information in control signal 810 (for example, information about the modulation scheme and the error correction code related scheme), and outputs reception data 812.

Note that control signal 810 is not necessarily generated by the method as illustrated in FIG. 8. For example, control signal 810 of FIG. 8 may be generated based on information transmitted by a apparatus serving as a communication partner of the apparatus illustrated in FIG. 8 (FIG. 1). Alternatively, the apparatus of FIG. 8 may include an input unit and control signal 810 may be generated based on information input from the input unit.

Figure 10:
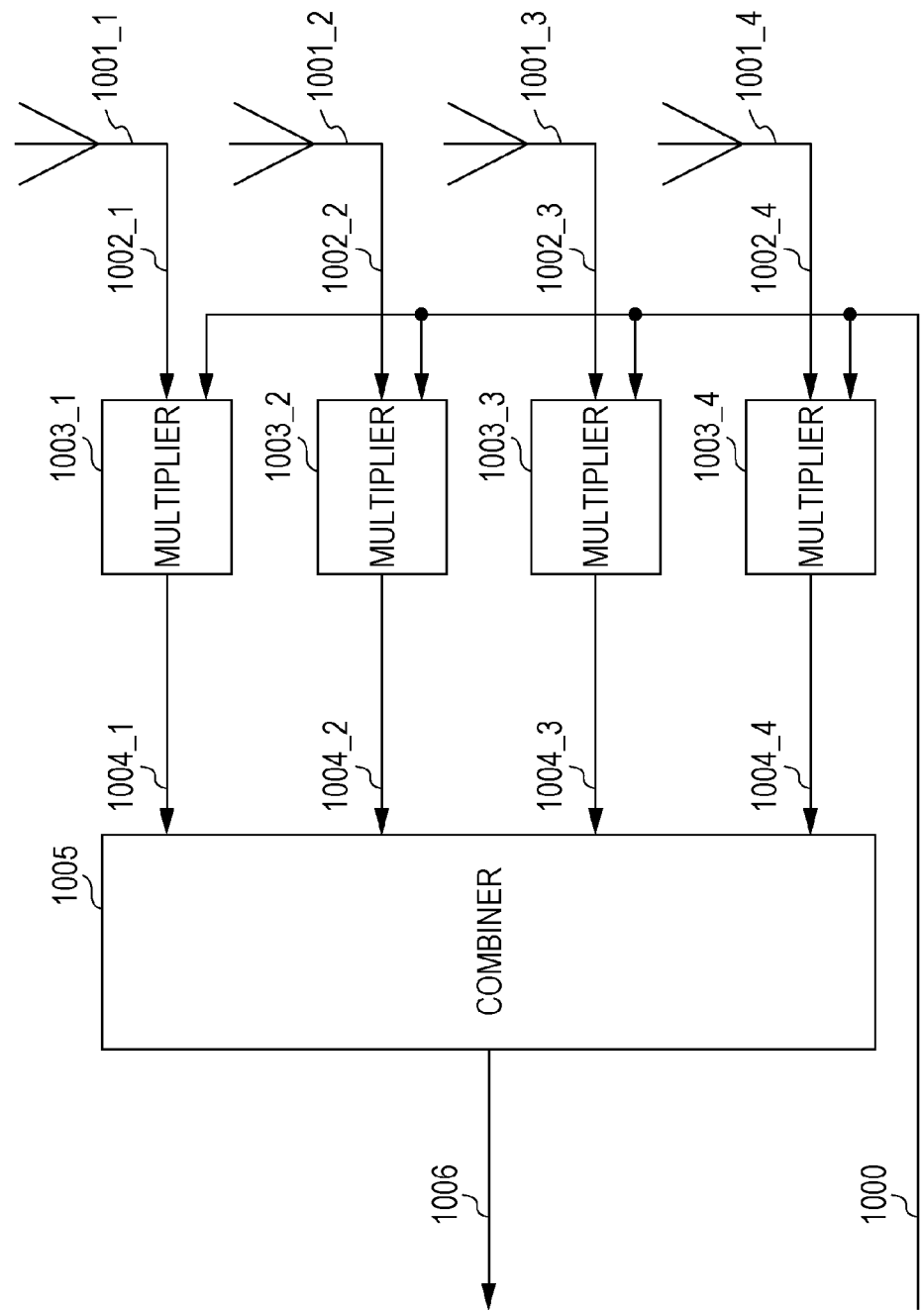
FIG. 10 is a diagram illustrating one exemplary configuration of an antenna unit of FIG. 8.

FIG. 10 is a diagram illustrating one exemplary configuration of antenna unit #X (801X) and antenna unit #Y (801Y) of FIG. 8. This is an example in which antenna unit #X (801X) and antenna unit #Y (801Y) each include a plurality of antennas.

Multiplier 1003_1 receives reception signal 1002_1 received by antenna 1001_1 and control signal 1000, multiplies reception signal 1002_1 by a multiplication coefficient based on information about the multiplication coefficient included in control signal 1000, and then outputs multiplied signal 1004_1.

When reception signal 1002_1 is Rx1(t) (t: time) and the multiplication coefficient is D1 (D1 can be defined as a complex number and hence may be a real number), multiplied signal 1004_1 is represented as Rx1(t)×D1.

Multiplier 1003_2 receives reception signal 1002_2 received by antenna 1001_2 and control signal 1000, multiplies reception signal 1002_2 by a multiplication coefficient based on information about the multiplication coefficient included in control signal 1000, and then outputs multiplied signal 1004_2.

When reception signal 1002_2 is Rx2(t) and the multiplication coefficient is D2 (D2 can be defined as a complex number and hence may be a real number), multiplied signal 1004_2 is represented as Rx2(t)×D2.

Multiplier 1003_3 receives reception signal 1002_3 received by antenna 1001_3 and control signal 1000, multiplies reception signal 1002_3 by a multiplication coefficient based on information about the multiplication coefficient included in control signal 1000, and then outputs multiplied signal 1004_3.

When reception signal 1002_3 is Rx3(t) and the multiplication coefficient is D3 (D3 can be defined as a complex number and hence may be a real number), multiplied signal 1004_3 is represented as Rx3(t)×D3.

Multiplier 1003_4 receives reception signal 1002_4 received by antenna 1001_4 and control signal 1000, multiplies reception signal 1002_4 by a multiplication coefficient based on information about the multiplication coefficient included in control signal 1000, and then outputs multiplied signal 1004_4.

When reception signal 1002_4 is Rx4(t) and the multiplication coefficient is D4 (D4 can be defined as a complex number and hence may be a real number), multiplied signal 1004_4 is represented as Rx4(t)×D4.

Combiner 1005 receives multiplied signals 1004_1, 10042, 1004_3, and 1004_4, combines multiplied signals 1004_1, 1004_2, 10043, and 1004_4, and then outputs combined signal 1006. Note that combined signal 1006 is represented as Rx1(t)×D1+Rx2(t)×D2+Rx3(t)×D3+Rx4(t)×D4.

In FIG. 10, an example in which the antenna unit includes four antennas (and four multipliers) has been described, but the number of antennas is not limited to four, and the antenna unit is required at least to include two or more antennas.

When the configuration of antenna unit #X (801X) of FIG. 8 is as illustrated in FIG. 10, reception signal 802X corresponds to combined signal 1006 of FIG. 10, and control signal 710 corresponds to control signal 1000 of FIG. 10. Also, when the configuration of antenna unit #Y (801Y) of FIG. 8 is as illustrated in FIG. 10, reception signal 802Y corresponds to combined signal 1006 of FIG. 10, and control signal 710 corresponds to control signal 1000 of FIG. 10. However, antenna unit #X (801X) and antenna unit #Y (801Y) are not necessarily configured as illustrated in FIG. 10. As described above, the antenna units do not necessarily receive control signal 710.

Note that control signal 800 may be generated based on information transmitted by a apparatus serving as a communication partner. Alternatively, the apparatus may include an input unit and control signal 800 may be generated based on information input from the input unit.

Next, characteristics of signal processor 106 of the transmission apparatus illustrated in FIG. 1 into which phase changer 205B and phase changer 209B are inserted as illustrated in FIG. 2, and advantageous effects thereof will be described.

As described with reference to FIGS. 4 and 5, phase changer 205B performs precoding (weighting) on mapped signal $s1(i)$ (201A) (i is a symbol number and is an integer equal to or greater than 0) obtained by performing mapping using the first series, and mapped signal $s2(i)$ (201B) obtained by performing mapping using the second series. Phase changer 205B performs phase change on one of obtained weighted signals 204A and 204B. Then, weighted signal 204A and phase-changed signal 206B are transmitted at the same frequency and at the same time. Therefore, in FIGS. 4 and 5, phase change is performed on data symbol 502 of FIG. 5. In FIG. 2, since phase changer 205B performs phase change on weighted signal 204B, phase change is performed on data symbol 502 of FIG. 5. When phase change is performed on weighted signal 204A, phase change is performed on data symbol 402 of FIG. 4. This point will be described later.

Figure 11:
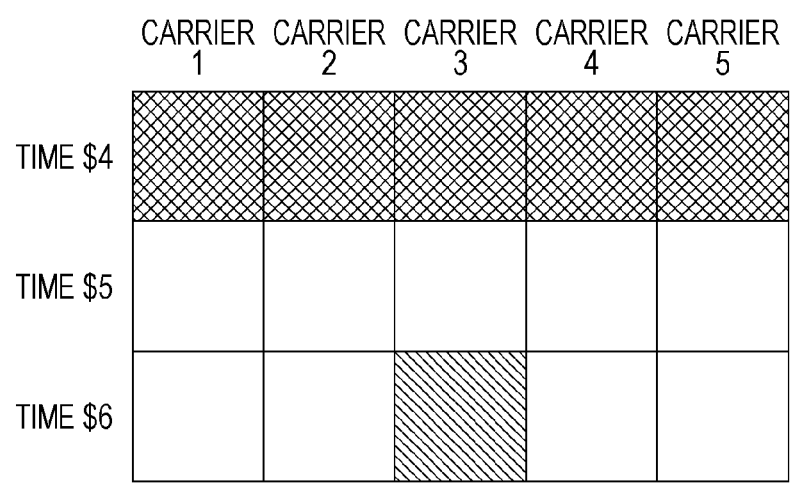
FIG. 11 is a diagram illustrating a part of the frame of FIG. 5.

For example, FIG. 11 is a diagram illustrating carriers 1 to 5 and time $4 to $6 extracted from the frame of FIG. 5. Note that as in FIG. 5, reference numeral 501 represents a pilot symbol, reference numeral 502 represents a data symbol, and reference numeral 503 represents the other symbol.

As described above, in the symbols illustrated in FIG. 11, phase changer 205B performs phase change on the data symbol of (carrier 1, time $5), the data symbol of (carrier 2, time $5), the data symbol of (carrier 3, time $5), the data symbol of (carrier 4, time $5), the data symbol of (carrier 5, time $5), the data symbol of (carrier 1, time $6), the data symbol of (carrier 2, time $6), the data symbol of (carrier 4, time $6), and the data symbol of (carrier 5, time $6).

Therefore, in the symbols illustrated in FIG. 11, the phase change value of the data symbol of (carrier 1, time $5) is "$e^{j\times\delta 15(i)}$", the phase change value of the data symbol of (carrier 2, time $5) is "$e^{j\times\delta 25(i)}$", the phase change value of the data symbol of (carrier 3, time $5) is "$e^{j\times\delta 35(i)}$", the phase change value of the data symbol of (carrier 4, time $5) is "$e^{j\times\delta 45(i)}$", the phase change value of the data symbol of (carrier 5, time $5) is "$e^{j\times\delta 55(i)}$", the phase change value of the data symbol of (carrier 1, time $6) is "$e^{j\times\delta 16(i)}$", the phase change value of the data symbol of (carrier 2, time $6) is "$e^{j\times\delta 26(i)}$", the phase change value of the data symbol of (carrier 4, time $6) is "$e^{j\times\delta 46(i)}$", and the phase change value of the data symbol of (carrier 5, time $6) is "$e^{j\times\delta 56(i)}$".

Meanwhile, in the symbols illustrated in FIG. 11, phase changer 205B does not perform phase change on the other symbol of (carrier 1, time $4), the other symbol of (carrier 2, time $4), the other symbol of (carrier 3, time $4), the other symbol of (carrier 4, time $4), the other symbol of (carrier 5, time $4), or the pilot symbol of (carrier 3, time $6).

This point is a characteristic point of phase changer 205B. Note that as illustrated in FIG. 4, data carriers are arranged at "the same carrier and the same time" as the symbols to be subjected to phase change in FIG. 11, including the data symbol of (carrier 1, time $5), the data symbol of (carrier 2, time $5), the data symbol of (carrier 3, time $5), the data symbol of (carrier 4, time $5), the data symbol of (carrier 5, time $5), the data symbol of (carrier 1, time $6), the data symbol of (carrier 2, time $6), the data symbol of (carrier 4, time $6), and the data symbol of (carrier 5, time $6). That is, in FIG. 4, (carrier 1, time $5) is a data symbol, (carrier 2, time $5) is a data symbol, (carrier 3, time $5) is a data symbol, (carrier 4, time $5) is a data symbol, (carrier 5, time $5) is a data symbol, (carrier 1, time $6) is a data symbol, (carrier 2, time $6) is a data symbol, (carrier 4, time $6) is a data symbol, and (carrier 5, time $6) is a data symbol. That is, phase changer 205B performs phase change on the data symbols performing MIMO transmission (transmitting multiple streams).

Note that examples of phase change to be performed on data symbols by phase changer 205B include a method for performing periodical phase change (phase change cycle N) on the data symbols by formula (2). However, the method for performing phase change on data symbols is not limited to this method.

Doing this will improve data reception quality in the data symbol reception apparatus performing MIMO transmission (transmitting multiple streams) in an environment where direct waves are dominant, particularly in the LOS environment. This point will be described.

For example, it is assumed that the modulation scheme to be used by mapper 104 of FIG. 1 is quadrature phase shift keying (QPSK). Mapped signal 201A in FIG. 2 is a QPSK signal, and mapped signal 201B is also a QPSK signal. That is, two QPSK streams are transmitted. Then, signal processor 811 of FIG. 8 obtains, for example, 16 candidate signal points by using channel estimation signals 806_1 and 806_2. QPSK allows transmission of two bits, and a total of four bits can be transmitted by two streams. Therefore, 2$^4$=16 candidate signal points are present. Note that other 16 candidate signal points are obtained using channel estimation signals 808_1 and 808_2, which however will be described in a similar way; therefore, the following description will be made focusing on the 16 candidate signal points obtained using channel estimation signals 806_1 and 806_2.

FIG. 12 is a diagram illustrating one example of this state. In both FIGS. 12(A) and 12(B), a horizontal axis is in-phase I and a vertical axis is quadrature Q, and 16 candidate signal points are present on the in-phase quadrature (IQ) plane. One of the 16 candidate signal points is the signal point transmitted by the transmission apparatus. Therefore, these are called "16 candidate signal points".

In an environment where direct waves are dominant, particularly in the LOS environment, the following cases are considered.

First Case:

Consider a case where phase changer 205B of FIG. 2 is not present (that is, a case where phase change by phase changer 205B of FIG. 2 is not performed).

In the "first case", since phase change is not performed, there is a possibility of falling into the state as illustrated in FIG. 12(A). When falling into the state of FIG. 12(A), since there are portions where the signal points are dense (distance between the signal points are short) such as "signal points 1201 and 1202", "signal points 1203, 1204, 1205 and 1206", and "signal points 1207 and 1208", data reception quality may deteriorate in the reception apparatus of FIG. 8.

To overcome this problem, phase changer 205B is inserted in FIG. 2. Insertion of phase changer 205B will lead to a mixture of the symbol numbers where the signal points are dense (distance between signal points is short) as illustrated in FIG. 12(A), and the symbol numbers where "distance between signal points is long" as illustrated in FIG. 12(B), depending on symbol number i. Introduction of an error correction code for this state will provide high error correction capability and allow the reception apparatus of FIG. 8 to obtain high data reception quality.

Note that in FIG. 2, phase changer 205B of FIG. 2 does not perform phase change on "pilot symbols and preambles" for performing channel estimation for demodulating (detecting) data symbols such as pilot symbols and preambles. This makes it possible to implement in data symbols "a mixture of the symbol numbers where the signal points are dense (distance between signal points is short) as illustrated in FIG. 12(A), and the symbol numbers where "distance between signal points is long" as illustrated in FIG. 12(B), depending on symbol number i".

However, even when phase changer 205B of FIG. 2 performs phase change on "pilot symbols and preambles" for performing channel estimation for demodulating (detecting) data symbols such as pilot symbols and preambles, it may be possible "to implement in data symbols "a mixture of the symbol numbers where the signal points are dense (distance between signal points is short) as illustrated in FIG. 12(A), and the symbol numbers where "distance between signal points is long" as illustrated in FIG. 12(B), depending on symbol number i"". In this case, phase change needs to be performed through addition of some condition to the pilot symbol and preamble. For example, a method for providing a rule different from a phase change rule for data symbols and "performing phase change on pilot symbols and/or preambles" is considered. As an example, there is a method for periodically performing phase change of a cycle N on data symbols, and for periodically performing phase change of a cycle M on pilot symbols and/or preambles (N and M are each an integer equal to or greater than 2).

As described earlier, phase changer 209B receives baseband signal 208B and control signal 200, performs phase change on baseband signal 208B based on control signal 200, and outputs phase-changed signal 210B. Baseband signal 208B is a function of symbol number i (i is an integer equal to or greater than 0) and is represented as x'(i). Then, phase-changed signal 210B (x(i)) can be represented as $x(i)=e^{j\times\varepsilon(i)}\times x'(i)$ (j is an imaginary unit). The operation of phase changer 209B may be cyclic delay diversity (CDD) (cyclic shift diversity (CSD)) described in NPTL 2 and NPTL 3. Phase changer 209B is characterized by performing phase change on symbols in a frequency axis direction. For example, phase change is performed on symbols such as data symbols, pilot symbols, and control information symbols. Therefore, in this case, target symbols of symbol number i are symbols such as data symbols, pilot symbols, control information symbols, and preambles (the other symbols). In the case of FIG. 2, phase changer 209B, which performs phase change on baseband signal 208B, performs phase change on each symbol illustrated in FIG. 5. When performing phase change on baseband signal 208A of FIG. 2, phase changer 209B performs phase change on each symbol illustrated in FIG. 4. This point will be described later.

Therefore, in the frame of FIG. 5, phase changer 209B of FIG. 2 performs phase change on all the symbols of carriers 1 to 36 and time $1 (in this case, all the symbols are the other symbol 503).

Similarly,

"phase changer 209B of FIG. 2 performs phase change on all the symbols of carriers 1 to 36 and time $2 (in this case, all the symbols are the other symbol 503)", "phase changer 209B of FIG. 2 performs phase change on all the symbols of carriers 1 to 36 and time $3 (in this case, all the symbols are the other symbol 503)", "phase changer 209B of FIG. 2 performs phase change on all the symbols of carriers 1 to 36 and time $4 (in this case, all the symbols are the other symbol 503)", "phase changer 209B of FIG. 2 performs phase change on all the symbols of carriers 1 to 36 and time $5 (in this case, all the symbols are pilot symbol 501 or data symbol 502)", "phase changer 209B of FIG. 2 performs phase change on all the symbols of carriers 1 to 36 and time $6 (in this case, all the symbols are pilot symbol 501 or data symbol 502)", "phase changer 209B of FIG. 2 performs phase change on all the symbols of carriers 1 to 36 and time $7 (in this case, all the symbols are pilot symbol 501 or data symbol 502)", "phase changer 209B of FIG. 2 performs phase change on all the symbols of carriers 1 to 36 and time $8 (in this case, all the symbols are pilot symbol 501 or data symbol 502)", "phase changer 209B of FIG. 2 performs phase change on all the symbols of carriers 1 to 36 and time $9 (in this case, all the symbols are pilot symbol 501 or data symbol 502)", "phase changer 209B of FIG. 2 performs phase change on all the symbols of carriers 1 to 36 and time $10 (in this case, all the symbols are pilot symbol 501 or data symbol 502)", and "phase changer 209B of FIG. 2 performs phase change on all the symbols of carriers 1 to 36 and time $11 (in this case, all the symbols are pilot symbol 501 or data symbol 502)".

Figure 13:
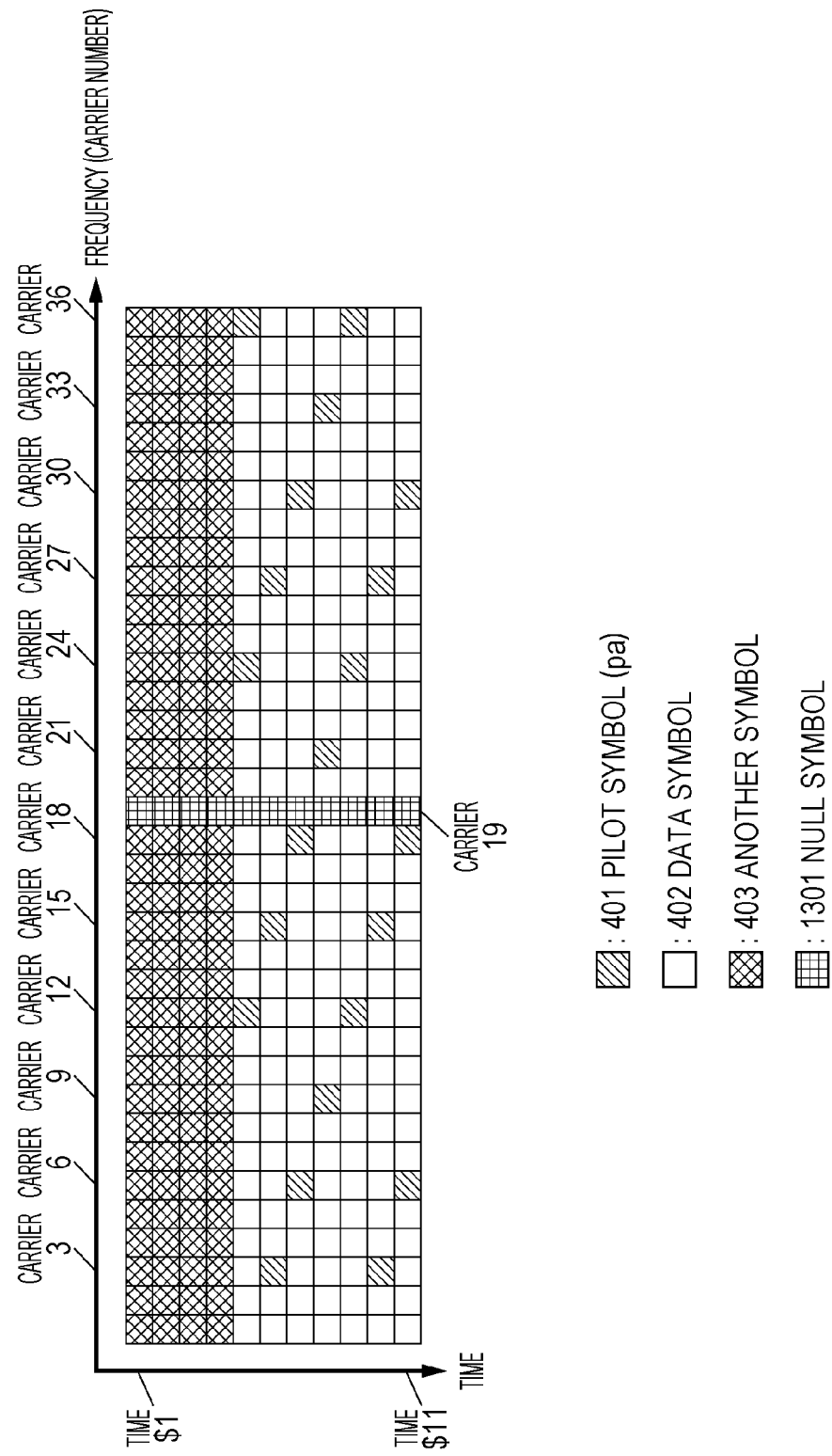
FIG. 13 is a diagram illustrating one exemplary frame structure of the transmission signal of FIG. 1.

FIG. 13 is a diagram illustrating a frame structure different from FIG. 4 of transmission signal 108_A of FIG. 1. In FIG. 13, those operating in the same way as in FIG. 4 are denoted with the same reference numerals. In FIG. 13, a horizontal axis represents a frequency (carrier), and a vertical axis represents time. As in FIG. 4, since a multi-carrier transmission scheme such as OFDM is used, symbols are present in a carrier direction. FIG. 13 illustrates symbols of carrier 1 to carrier 36, as in FIG. 4. Also, FIG. 13 illustrates symbols of time $1 to time $11, as in FIG. 4.

In FIG. 13, null symbol 1301 is inserted in addition to pilot symbol 401 (pilot signal 251A of FIG. 2 (corresponding to pa(t))), data symbol 402, and the other symbol 403.

It is assumed that null symbol 1301 has an in-phase component I of zero (0) and a quadrature component Q of zero (0). Note that although this is called "null symbol" here, this is not limited to this naming method.

In FIG. 13, the null symbols are inserted at carrier 19. Note that a method for inserting the null symbols is not limited to the structure illustrated in FIG. 13. For example, the null symbols may be inserted at a specified time, the null symbols may be inserted in a specified frequency and time domain, the null symbols may be inserted consecutively in a time/frequency domain, or the null symbols may be discretely inserted in a time/frequency domain.

Figure 14:
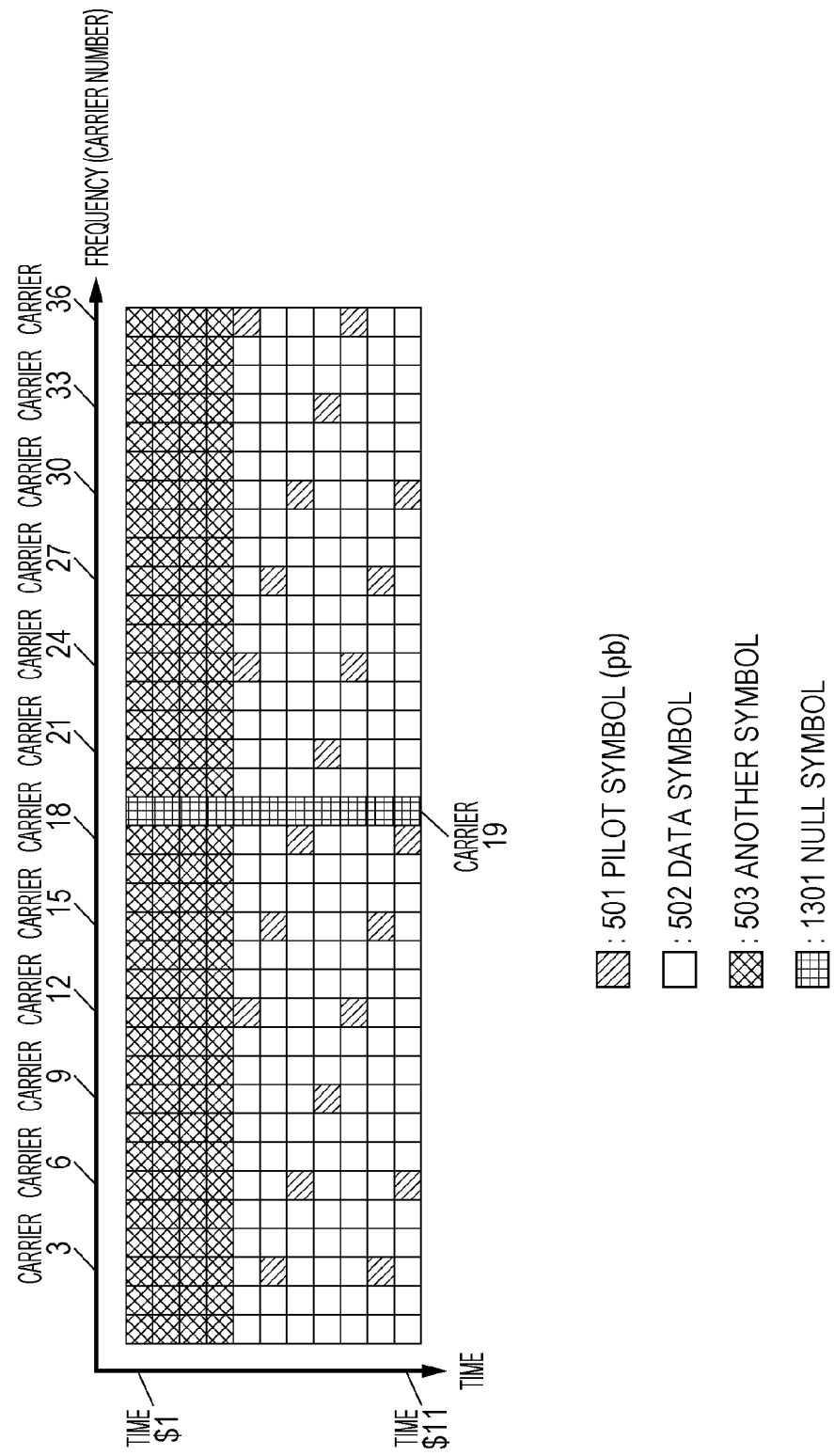
FIG. 14 is a diagram illustrating one exemplary frame structure of the transmission signal of FIG. 1.

FIG. 14 is a diagram illustrating a frame structure different from FIG. 5 of transmission signal 108_B of FIG. 1. In FIG. 14, those operating in the same way as in FIG. 5 are denoted with the same reference numerals. In FIG. 14, a horizontal axis represents a frequency (carrier), and a vertical axis represents time. As in FIG. 5, since the multicarrier transmission scheme such as OFDM is used, symbols are present in a carrier direction. FIG. 14 illustrates symbols of carrier 1 to carrier 36, as in FIG. 5. Also, FIG. 14 illustrates symbols of time $1 to time $11, as in FIG. 5.

In FIG. 14, null symbol 1301 is inserted in addition to pilot symbol 501 (pilot signal 251B of FIG. 2 (corresponding to pb(t))), data symbol 502, and the other symbol 503.

It is assumed that null symbol 1301 has an in-phase component I of zero (0) and a quadrature component Q of zero (0). Note that although this is called "null symbol" here, this is not limited to this naming method.

In FIG. 14, the null symbols are inserted at carrier 19. Note that a method for inserting the null symbols is not limited to the structure illustrated in FIG. 14. For example, the null symbols may be inserted at a specified time, the null symbols may be inserted in a specified frequency and time domain, the null symbols may be inserted consecutively in a time/frequency domain, or the null symbols may be discretely inserted in a time/frequency domain.

When a symbol is present at carrier A and time $B of FIG. 13 and when a symbol is present at carrier A and time $B of FIG. 14, the symbol at carrier A and time $B of FIG. 13 and the symbol at carrier A and time $B of FIG. 14 are transmitted at the same time and the same frequency. Note that the frame structures of FIGS. 13 and 14 are merely examples.

The other symbols in FIGS. 13 and 14 are symbols corresponding to "preamble signal 252 and control information symbol signal 253 in FIG. 2". Therefore, the other symbol 503 of FIG. 14 at the same time and the same frequency (same carrier) as the other symbol 403 of FIG. 13 transmits the same data (same control information) when the control information is transmitted.

Note that it is assumed that the reception apparatus simultaneously receives the frame of FIG. 13 and the frame of FIG. 14, but even by receiving only the frame of FIG. 13 or only the frame of FIG. 14, the reception apparatus can obtain data transmitted by the transmission apparatus.

Phase changer 209B receives baseband signal 208B and control signal 200, performs phase change on baseband signal 208B based on control signal 200, and then outputs phase-changed signal 210B. Baseband signal 208B is a function of symbol symbol number i (i is an integer equal to or greater than 0) and is represented as x'(i). Then, phase-changed signal 210B (x(i)) can be represented as $x(i)=e^{j \times \varepsilon(i)} \times x'(i)$ (j is an imaginary unit). The operation of phase changer 209B may be cyclic delay diversity (CDD) (cyclic shift diversity (CSD)) described in NPTL 2 and NPTL 3. Phase changer 209B is characterized by performing phase change on symbols in a frequency axis direction. For example, phase change is performed on symbols such as data symbols, pilot symbols, and control information symbols. At this time, the null symbol can also be considered as a phase change target. Therefore, in this case, target symbols of symbol number i are symbols such as data symbols, pilot symbols, control information symbols, preambles (the other symbols) and null symbols. However, even if phase change is performed on the null symbol, the signal before the phase change and the signal after the phase change are the same (in-phase component I is zero (0) and quadrature component Q is zero (0)). Therefore, it can be interpreted that the null symbol is not the phase change target. In the case of FIG. 2, phase changer 209B, which performs phase change on baseband signal 208B, performs phase change on each symbol illustrated in FIG. 14. When performing phase change on baseband signal 208A of FIG. 2, phase changer 209B performs phase change on each symbol illustrated in FIG. 13. This point will be described later.

Therefore, in the frame of FIG. 14, phase changer 209B of FIG. 2 performs phase change on all the symbols of carriers 1 to 36 and time $1 (in this case, all the symbols are the other symbol 503). However, the handling of phase change of null symbol 1301 is as described above.

Similarly,

"phase changer 209B of FIG. 2 performs phase change on all the symbols of carriers 1 to 36 and time $2 (in this case, all the symbols are the other symbol 503). However, the handling of phase change of null symbol 1301 is as described above".

"Phase changer 209B of FIG. 2 performs phase change on all the symbols of carriers 1 to 36 and time $3 (in this case, all the symbols are the other symbol 503). However, the handling of phase change of null symbol 1301 is as described above".

"Phase changer 209B of FIG. 2 performs phase change on all the symbols of carriers 1 to 36 and time $4 (in this case, all the symbols are the other symbol 503). However, the handling of phase change of null symbol 1301 is as described above".

"Phase changer 209B of FIG. 2 performs phase change on all the symbols of carriers 1 to 36 and time $5 (in this case, all the symbols are pilot symbol 501 or data symbol 502). However, the handling of phase change of null symbol 1301 is as described above".

"Phase changer 209B of FIG. 2 performs phase change on all the symbols of carriers 1 to 36 and time $6 (in this case, all the symbols are pilot symbol 501 or data symbol 502). However, the handling of phase change of null symbol 1301 is as described above".

"Phase changer 209B of FIG. 2 performs phase change on all the symbols of carriers 1 to 36 and time $7 (in this case, all the symbols are pilot symbol 501 or data symbol 502). However, the handling of phase change of null symbol 1301 is as described above".

"Phase changer 209B of FIG. 2 performs phase change on all the symbols of carriers 1 to 36 and time $8 (in this case, all the symbols are pilot symbol 501 or data symbol 502). However, the handling of phase change of null symbol 1301 is as described above".

"Phase changer 209B of FIG. 2 performs phase change on all the symbols of carriers 1 to 36 and time $9 (in this case, all the symbols are pilot symbol 501 or data symbol 502). However, the handling of phase change of null symbol 1301 is as described above".

"Phase changer 209B of FIG. 2 performs phase change on all the symbols of carriers 1 to 36 and time $10 (in this case, all the symbols are pilot symbol 501 or data symbol 502). However, the handling of phase change of null symbol 1301 is as described above".

"Phase changer 209B of FIG. 2 performs phase change on all the symbols of carriers 1 to 36 and time $11 (in this case, all the symbols are pilot symbol 501 or data symbol 502). However, the handling of phase change of null symbol 1301 is as described above".

The phase change value in phase changer 209B is represented as Ω(i). Baseband signal 208B is x'(i), and phase-changed signal 210B is x(i). Therefore, x(i)=Ω(i)×x'(i) holds true.

For example, the phase change value is set as follows. Q is an integer equal to or greater than 2, and Q is a phase change cycle.

[Formula 38]

$$\Omega(i) = e^{j\frac{2\times\pi\times i}{Q}} \quad \text{Formula (38)}$$

j is an imaginary unit. However, formula (38) is merely an example and the phase change value is not limited to this formula.

For example, Ω(i) may be set to perform phase change so as to have the cycle Q.

Furthermore, for example, in FIGS. 5 and 14, the same phase change value may be provided to the same carrier, and the phase change value may be set for each carrier. For example, this will be as follows.

For carrier 1 in FIGS. 5 and 14, regardless of time, the phase change value is as follows.

[Formula 39]

$$e^{j\times 0\times \pi} \quad \text{Formula (39)}$$

For carrier 2 in FIGS. 5 and 14, regardless of time, the phase change value is as follows.

[Formula 40]

$$e^{j\frac{1\times\pi}{6}} \quad \text{Formula (40)}$$

For carrier 3 in FIGS. 5 and 14, regardless of time, the phase change value is as follows.

[Formula 41]

$$e^{j\frac{2\times\pi}{6}} \quad \text{Formula (41)}$$

For carrier 4 in FIGS. 5 and 14, regardless of time, the phase change value is as follows.

[Formula 42]

$$e^{j\frac{3\times\pi}{6}} \quad \text{Formula (42)}$$

Operation examples of phase changer 209B of FIG. 2 have been described above.

Advantageous effects that can be obtained by phase changer 209B of FIG. 2 will be described.

It is assumed that the control information symbol is included in the other symbols 403 and 503 of "the frames of FIGS. 4 and 5" or "the frames of FIGS. 13 and 14". As described earlier, when transmitting the control information, the other symbol 503 of FIG. at the same time and the same frequency (same carrier) as the other symbol 403 transmits the same data (same control information).

Here, consider the following cases.

Case 2:

The control information symbol is transmitted using one of antenna unit #A (109_A) and antenna unit #B (109_B) of FIG. 1.

When transmission is performed as in "case 2", since the number of antennas that transmit the control information symbol is 1, a gain of space diversity is smaller than in a case of "transmitting the control information symbol using both antenna unit #A (109_A) and antenna unit #B (109_B)", and thus data reception quality deteriorates even if the reception apparatus of FIG. 8 performs reception in "case 2". Therefore, in terms of improvement in data reception quality, it is preferable "to transmit the control information symbol using both "antenna unit #A (109_A) and antenna unit #B (109_B)".

Case 3:

The control information symbol is transmitted using both of antenna unit #A (109_A) and antenna unit #B (109_B) of FIG. 1. However, phase changer 209B in FIG. 2 does not perform phase change.

When transmission is performed as in "case 3", since the modulated signal transmitted from antenna unit #A 109_A is the same as the modulated signal transmitted from antenna unit #B 109_B (or there is a specified phase shift), depending on a radio wave propagation environment, the reception apparatus of FIG. 8 may have a very poor reception signal and both of the modulated signals may be affected by the same multipath. This will cause a problem that data reception quality deteriorates in the reception apparatus of FIG. 8.

To alleviate this problem, phase changer 209B is provided in FIG. 2. This enables phase change in a time or frequency direction, allowing the reception apparatus of FIG. 8 to reduce the possibility of a poor reception signal. Also, it is likely that there is a difference between an influence of the multipath received by the modulated signal transmitted from antenna unit #A 109_A and an influence of the multipath received by the modulated signal transmitted from antenna unit #B 109_B. Therefore, it is likely that a diversity gain is obtained, whereby data reception quality improves in the reception apparatus of FIG. 8.

For the above reason, phase changer 209B is provided in FIG. 2 to perform phase change.

The other symbol 403 and the other symbol 503 include, other than the control information symbol, for example, a symbol for signal detection, a symbol for performing frequency synchronization and time synchronization, and a symbol for channel estimation (symbol for estimating propagation path fluctuation) for demodulating and decoding the control information symbol. In addition, "the frames of FIGS. 4 and 5" or "the frames of FIGS. 13 and 14" include pilot symbols 401 and 501. Using these symbols will make it possible to demodulate and decode the control information symbol more accurately.

In "the frames of FIGS. 4 and 5" or "the frames of FIGS. 13 and 14", data symbol 402 and data symbol 502 transmit multiple streams (perform MIMO transmission) by using the same frequency (band) and the same time. Demodulating these data symbols requires to use the symbol for signal detection, the symbol for frequency synchronization and time synchronization, and the symbol for channel estimation (symbol for estimating propagation path fluctuation) included in the other symbol 403 and the other symbol 503.

At this time, as described above, phase changer 209B performs phase change on "the symbol for signal detection, the symbol for frequency synchronization and time synchronization, and the symbol for channel estimation (symbol for estimating propagation path fluctuation) included in the other symbol 403 and the other symbol 503".

Under such circumstances, if this process is not reflected in data symbol 402 and data symbol 502 (in data symbol 502 for the case described above), when the reception apparatus demodulates and decodes data symbol 402 and data symbol 502, it is necessary to perform demodulation and decoding reflecting the process for the phase change performed by phase changer 209B, and the process is likely to be complicated. This is because phase changer 209B performs phase change on "the symbol for signal detection, the symbol for frequency synchronization and time synchronization, and the symbol for channel estimation (symbol for estimating propagation path fluctuation) included in the other symbol 403 and the other symbol 503".

However, as illustrated in FIG. 2, when phase changer 209B performs phase change on data symbol 402 and data symbol 502 (on data symbol 502 for the case described above), there is an advantage that the reception apparatus can (easily) demodulate and decode data symbol 402 and data symbol 502 by using the channel estimation signal (propagation path fluctuation estimation signal) estimated using "the symbol for signal detection, the symbol for frequency synchronization and time synchronization, and the symbol for channel estimation (symbol for estimating propagation path fluctuation) included in the other symbol 403 and the other symbol 503".

In addition, as illustrated in FIG. 2, when phase changer 209B performs phase change on data symbol 402 and data symbol 502 (on data symbol 502 for the case described above), it is possible to reduce an influence of a sharp drop in electric field intensity in a frequency axis in the multipath. This may improve data reception quality of data symbol 402 and data symbol 502.

Thus, a characteristic point is that "the target symbol on which phase changer 205B performs phase change" is different from "the target symbol on which phase changer 209B performs phase change".

As described above, phase changer 205B of FIG. 2 performing phase change can improve data reception quality of data symbol 402 and data symbol 502 in the reception apparatus, particularly in the LOS environment. Furthermore, phase changer 209B of FIG. 2 performing phase change will improve, for example, reception quality of the control information symbol included in "the frames of FIGS. 4 and 5" or "the frames of FIGS. 13 and 14" in the reception apparatus. Phase changer 209B of FIG. 2 performing phase change will also simplify demodulation and decoding operations of data symbol 402 and data symbol 502.

Note that phase changer 205B of FIG. 2 performing phase change can improve data reception quality of data symbol 402 and data symbol 502 in the reception apparatus, particularly in the LOS environment. Furthermore, phase changer 209B of FIG. 2 performing phase change on data symbol 402 and data symbol 502 will improve reception quality of data symbol 402 and data symbol 502.

Note that FIG. 2 illustrates the configuration in which phase changer 209B is provided in a downstream stage of inserter 207B to perform phase change on baseband signal 208B; however, the configuration for obtaining both the effect of the phase change by phase changer 205B and the effect of the phase change by phase changer 209B is not limited to the configuration illustrated in FIG. 2. For example, this configuration may be modified as follows. That is, phase changer 209B may be removed from the configuration of FIG. 2, baseband signal 208B output from inserter 207B may be signal-processed signal 106_B, phase changer 209A that performs the same operation as the operation of phase changer 209B may be added to a downstream stage of inserter 207A, and phase-changed signal 210A produced after phase change on baseband signal 208A by phase changer 209A may be signal-processed signal 106_A. Even with such a configuration, as in the case of FIG. 2, phase changer 205B of FIG. 2 performing phase change will improve data reception quality of data symbol 402 and data symbol 502 in the reception apparatus, particularly in the LOS environment. Furthermore, phase changer 209A performing phase change on data symbol 402 and data symbol 502 will improve reception quality of data symbol 402 and data symbol 502.

Furthermore, this can improve reception quality of the control information symbol included in "the frames of FIGS. 4 and 5" or "the frames of FIGS. 13 and 14" in the reception apparatus.

Supplementary 1

In the first exemplary embodiment and the like, it has been described that the operation of "phase changer B" may be CDD (CSD) described in NPTL 2 and NPTL 3. This point will be supplemented.

Figure 15:
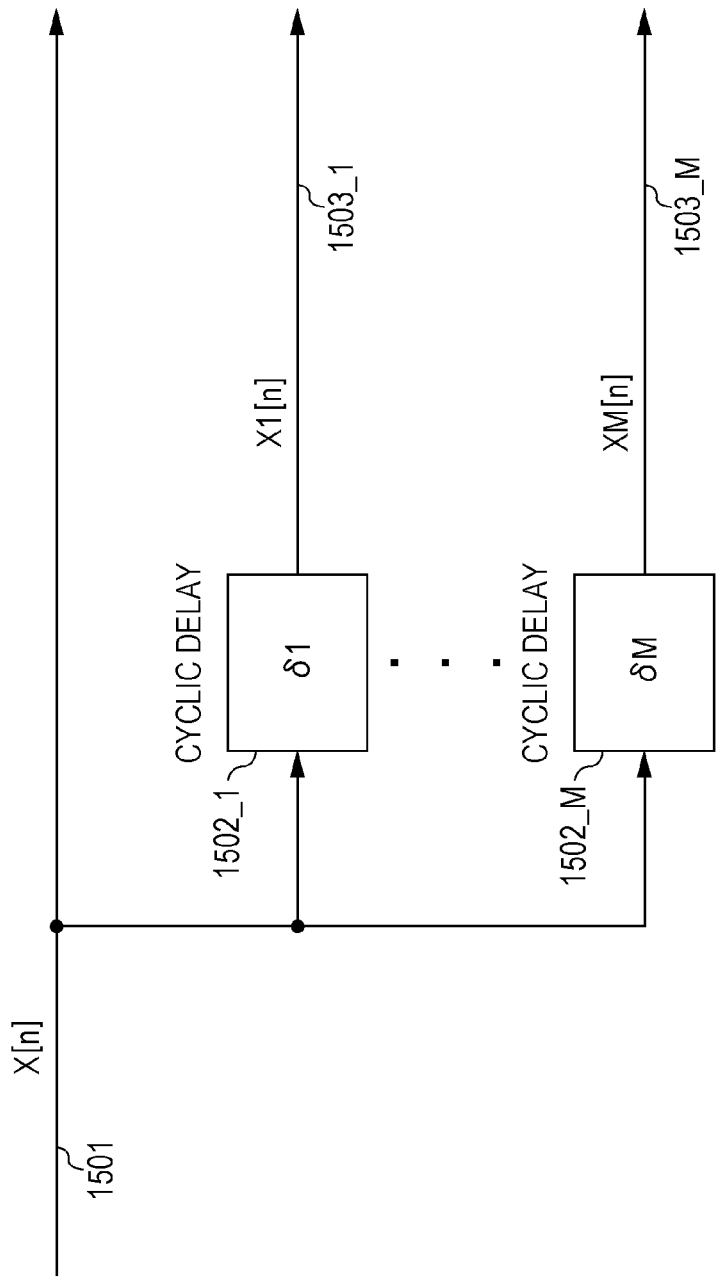
FIG. 15 is a diagram illustrating one exemplary configuration when cyclic delay diversity (CCD) is used.

FIG. 15 is a diagram illustrating the configuration when CDD (CSD) is used. Reference numeral 1501 is a modulated signal when cyclic delay is not performed and is represented as X[n].

Cyclic delay unit 1502_1 receives modulated signal 1501, performs a cyclic delay process, and outputs cyclic-delay-processed signal 1503_1. When cyclic-delay-processed signal 1503_1 is X1 [n], X1 [n] is represented by the following formula.

[Formula 43]

$$X1[n]=X[(n-\delta 1) \bmod N] \quad \text{Formula (43)}$$

Note that δ1 is a cyclic delay amount (δ1 is a real number), X[n] includes N symbols (N is an integer equal to or greater than 2), and therefore n is an integer between 0 and N−1 inclusive.

Cyclic delay unit 1502_M receives modulated signal 1501, performs the cyclic delay process, and outputs cyclic-delay-processed signal 1503_M. When cyclic-delay-processed signal 1503_M is XM[n], XM[n] is represented by the following formula.

[Formula 44]

$$XM[n]=X[(n-\delta M) \bmod N] \quad \text{Formula (44)}$$

Note that κM is a cyclic delay amount (δM is a real number), X[n] includes N symbols (N is an integer equal to or greater than 2), and therefore n is an integer between 0 and N−1 inclusive.

Therefore, cyclic delay unit 1502_i (i is an integer between 1 and M inclusive (M is an integer equal to or greater than 1)) receives modulated signal 1501, performs the cyclic delay process, and outputs cyclic-delay-processed signal 1503_i. When cyclic-delay-processed signal 1503_i is Xi[n], Xi[n] is represented by the following formula.

[Formula 45]

$$Xi[n]=X[(n-\delta i) \bmod N] \quad \text{Formula (45)}$$

Note that δi is a cyclic delay amount (δi is a real number), X[n] includes N symbols (N is an integer equal to or greater than 2), and therefore n is an integer between 0 and N−1 inclusive.

Then, cyclic-delay-processed signal 1503_i is transmitted from antenna i. Therefore, cyclic-delay-processed signal 1503_1, . . . , cyclic-delay-processed signal 1503_M are transmitted from different antennas.

This can provide a diversity effect by cyclic delay (in particular, this can reduce an adverse effect of a delay wave), and improve data reception quality in the reception apparatus.

For example, phase changer 209B of FIG. 2 may be replaced with the cyclic delay unit illustrated in FIG. 15, and phase changer 209B may operate in the same manner as the cyclic delay unit.

Therefore, phase changer 209B of FIG. 2 provides the cyclic delay amount 8 (8 is a real number), and an input signal of phase changer 209B is represented as Y[n]. When an output signal of phase changer 209B is represented as Z[n], Z[n] is represented by the following formula.

[Formula 46]

$$Z[n]=Y[(n-\delta)\bmod N] \quad \text{Formula (46)}$$

Note that Y[n] includes N symbols (N is an integer equal to or greater than 2), and therefore n is an integer between 0 and N−1 inclusive.

Next, a relationship between the cyclic delay amount and the phase change will be described.

For example, consider a case where CDD (CSD) is applied to OFDM. Note that carrier arrangement when OFDM is used is as illustrated in FIG. 16.

Figure 16:
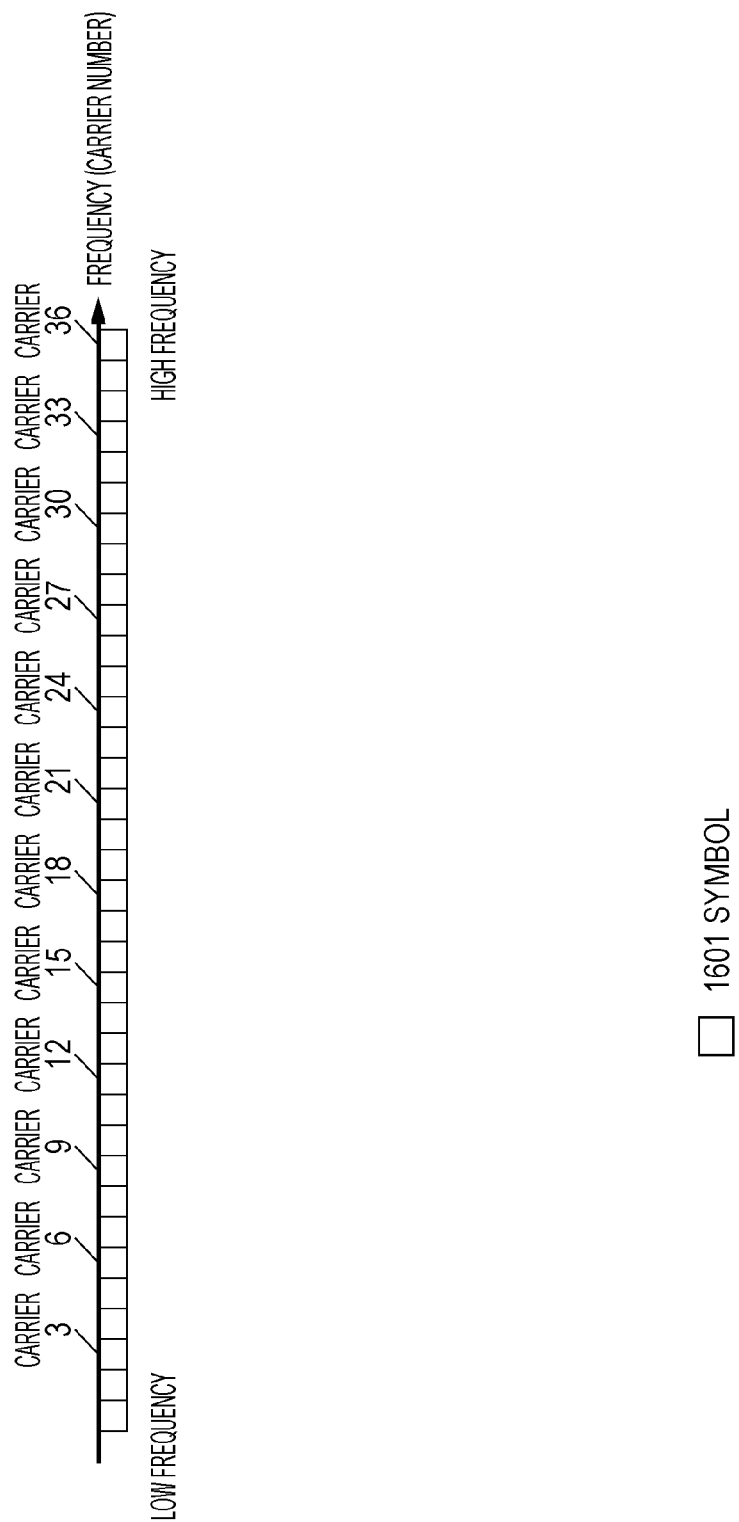
FIG. 16 is a diagram illustrating one exemplary carrier arrangement when OFDM is used.

In FIG. 16, reference numeral 1601 is a symbol, a horizontal axis is a frequency (carrier number), and carriers are arranged in ascending order from low frequencies to high frequencies. Therefore, when the carrier with the lowest frequency is "carrier 1", this is followed by "carrier 2" "carrier 3" "carrier 4" . . . .

For example, phase changer 209B of FIG. 2 provides cyclic delay amount t. Then, phase change value Ω[i] at "carrier i" is represented as follows.

[Formula 47]

$$\Omega[i]e^{j\times \mu \times i} \quad \text{Formula (47)}$$

Note that is a value that can be obtained from the cyclic delay amount, fast Fourier transform (FFT) size, and the like.

When the baseband signal at "carrier i" and time t before phase change (before cyclic delay process) is v'[i][t], signal v[i][t] at "carrier i" and time t after phase change can be represented as v[i][t]=Ω[i]×v'[i][t].

Supplementary 2

Of course, a combination of a plurality of exemplary embodiments and other information described in this specification may be performed.

Each exemplary embodiment and other information are merely examples. For example, even when "modulation scheme, error correction coding scheme (error correction code, code length, coding rate, and the like to be used), control information, and the like" are exemplified, or another "modulation scheme, error correction coding scheme (error correction code, code length, coding rate, and the like to be used), control information, and the like" are applied, each exemplary embodiment can be performed with the same configuration.

Regarding the modulation scheme, even when a modulation scheme other than the modulation scheme described in this specification is used, the exemplary embodiments and other information described in this specification can be implemented. For example, amplitude phase shift keying (APSK) (e.g., 16APSK, 64APSK, 128APSK, 256APSK, 1024APSK, 4096APSK, and the like), pulse amplitude modulation (PAM) (e.g., 4PAM, 8PAM, 16PAM, 64PAM, 128PAM, 256PAM, 1024PAM, 4096PAM, and the like), phase shift keying (PSK) (e.g., BPSK, QPSK, 8PSK, 16PSK, 64PSK, 128PSK, 256PSK, 1024PSK, 4096PSK, and the like), and quadrature amplitude modulation (QAM) (e.g., 4QAM, 8QAM, 16QAM, 64QAM, 128QAM, 256QAM, 1024QAM, 4096QAM, and the like) may be applied. In each modulation scheme, uniform mapping and nonuniform mapping may be used.

A method for arranging signal points such as 2, 4, 8, 16, 64, 128, 256, and 1024 signal points in an I-Q plane (modulation scheme having signal points such as 2, 4, 8, 16, 64, 128, 256, and 1024 signal points) is not limited to the method for arranging the signal points of the modulation scheme described in this specification. Therefore, a function of outputting in-phase components and quadrature components based on a plurality of bits is a function of the mapper, and thereafter, performing precoding and phase change is one effective function of the present disclosure.

When "∀" or "∃" is present in this specification, "∀" represents a universal quantifier, and "∃" represents an existential quantifier.

When there is a complex plane in this specification, for example, a unit of phase, such as argument, is "radian".

When a complex plane is used, the complex plane can be displayed in a polar form as a display of complex numbers in polar coordinates. When a point (a, b) on the complex plane corresponds to a complex number z=a+jb (both a and b are real numbers and j is an imaginary unit), if this point is represented as [r, θ] in polar coordinates, a=r×cosθ, b=r×sinθ and formula (48) hold true.

[Formula 48]

$$r=\sqrt{a^2+b^2} \quad \text{Formula (48)}$$

r is an absolute value of z (r=|z|), and θ is an argument. z=a+jb is represented as $re^{j\theta}$.

In this specification, the reception apparatus and the antenna of the terminal may be configured separately. For example, the reception apparatus includes an interface for receiving a signal received by the antenna or a signal obtained by performing frequency conversion on the signal received by the antenna through a cable, and the reception apparatus performs subsequent processing.

Data or information obtained by the reception apparatus is thereafter converted into video and sound, and displayed on a display (monitor), or the sound is output from a speaker. Furthermore, the data or information obtained by the reception apparatus may undergo signal processing regarding video and sound (signal processing is not necessarily performed). Then, the data or information may be output from an RCA terminal (video terminal, sound terminal), universal serial bus (USB), high-definition multimedia interface (HDMI) (registered trademark), digital terminal, and the like provided in the reception apparatus.

In this specification, for example, communication and broadcasting apparatuses such as a broadcasting station, a base station, an access point, a terminal, and a mobile phone are considered to include the transmission apparatus. At this time, communication apparatuses such as a television, a radio, a terminal, a personal computer, a mobile phone, an access point, and a base station are considered to include the reception apparatus. Also, it is considered that the transmission apparatus and the reception apparatus in the present disclosure are apparatuses having a communication function, and that the apparatus is in such a form that the apparatus can be connected to an apparatus for executing an application such as a television, a radio, a personal computer, and a mobile phone by understanding some kind of interface.

Also, according to the present exemplary embodiment, symbols other than the data symbol, such as, for example, the pilot symbol (preamble, unique word, postamble, reference symbol, and the like), and the control information symbol may be arranged in the frame in any way. Here, some symbols are named the pilot symbol and the symbol for control information, but any naming method can be used, and a function itself is important.

The pilot symbol is, for example, a symbol modulated using PSK modulation known by a receiver and a transmitter (or, by synchronization, a receiver may be able to know the symbol transmitted by a transmitter). Using this symbol, the receiver performs frequency synchronization, time synchronization, channel estimation (of each modulated signal) (estimation of channel state information (CSI)), detection of a signal, and the like.

The symbol for control information is a symbol for transmitting information that needs to be transmitted to a communication partner in order to implement communication other than data (such as application) (for example, modulation scheme, error correction coding scheme, and coding rate of error correction coding scheme used for communication, setting information in upper layers, and the like).

Note that the present disclosure is not limited to each exemplary embodiment, and various modifications can be made for implementation. For example, each exemplary embodiment describes a case of implementation as a communication apparatus, but the present disclosure is not limited to this case, and it is also possible to perform this communication method as software.

Also, a precoding switching method in a method for transmitting two modulated signals from two antennas has been described above, but this is not restrictive. The present disclosure can be implemented similarly by a method for performing precoding on four mapped signals, generating four modulated signals, and transmitting the signals from four antennas, that is, by a method for performing precoding on N mapped signals, generating N modulated signals, and transmitting the signals from N antennas, and similarly by a precoding switching method for changing precoding weight (matrix).

In this specification, terms such as "precoding" and "precoding weight" are used, but a naming method itself may be any method. In the present disclosure, the signal processing itself is important.

Different pieces of data may be transmitted or the same data may be transmitted by streams s1 ($t$) and s2($t$).

In both of the transmission antenna of the transmission apparatus and the reception antenna of the reception apparatus, one antenna illustrated in the drawings may include a plurality of antennas.

The transmission apparatus needs to notify the reception apparatus of the transmission method (MIMO, SISO, space-time block code, interleave scheme), modulation scheme, and error correction coding scheme. This is omitted depending on the exemplary embodiment. This is present in the frame transmitted by the transmission apparatus. By obtaining this, the reception apparatus changes the operation.

Note that, for example, a program for performing the communication method described above may be stored in advance in a read only memory (ROM), and the program may be executed by a central processor unit (CPU).

Furthermore, the program for performing the communication method may be stored in a computer readable storage medium, the program stored in the storage medium may be recorded in a random access memory (RAM) of a computer to cause the computer to operate according to the program.

Also, each configuration such as each exemplary embodiment described above may be implemented as a large scale integration (LSI), which is typically an integrated circuit. These may be individually integrated into one chip, or may be integrated into one chip so as to include all the configurations or part of configurations of each exemplary embodiment. Here, LSI is mentioned, but this chip may be called an integrated circuit (IC), system LSI, super LSI, or ultra LSI, depending on a degree of integration. Also, a method for circuit integration is not limited to LSI, and circuit integration may be implemented using a dedicated circuit or a general-purpose processor. A field programmable gate array (FPGA), which is programmable after manufacture of an LSI, or a reconfigurable processor, in which connections or settings of circuit cells within the LSI are reconfigurable, may be used.

Furthermore, if advanced semiconductor technologies or other related technologies yield a circuit integration technology that can substitute for LSI, the functional blocks may of course be integrated using such a technology. Adaptation of the biotechnology may be possible.

The present disclosure can be widely applied to radio systems that transmit different modulated signals from a plurality of antennas. Also, the present disclosure can be applied to a case where MIMO transmission is performed in a wired communication system having a plurality of transmission places (for example, a power line communication (PLC) system, an optical communication system, and a digital subscriber line (DSL) system).

Second Exemplary Embodiment

The present exemplary embodiment will describe a method for implementing a configuration different from the configuration of FIG. 2 in the first exemplary embodiment.

FIG. 1 is a diagram illustrating one exemplary configuration of a transmission apparatus such as, for example, a base station, an access point, and a broadcasting station according to the present exemplary embodiment. Details have been described in the first exemplary embodiment, and thus description thereof will be omitted.

Signal processor 106 receives mapped signals 105_1 and 105_2, signal group 110, and control signal 100, performs signal processing based on control signal 100, and then outputs signal-processed signals 106_A and 106_B. At this time, signal-processed signal 106_A is represented as u1($i$), and signal-processed signal 106_B is represented as u2($i$) ($i$ is a symbol number, and for example, i is an integer equal to or greater than 0). Note that details of the signal processing will be described with reference to FIG. 18.

Figure 18:
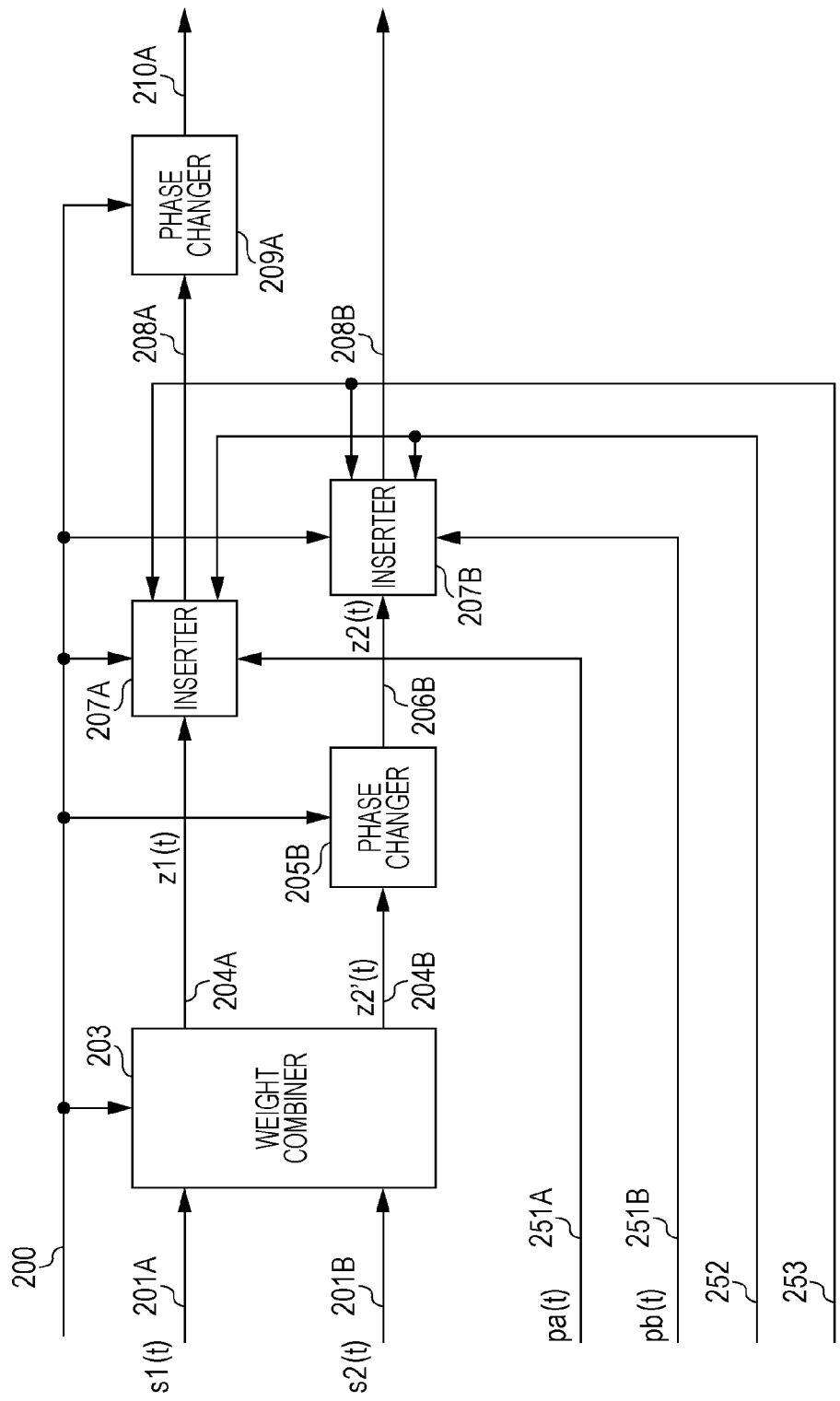
FIG. 18 is a diagram illustrating one exemplary configuration of the signal processor of FIG. 1.

FIG. 18 is a diagram illustrating one example in a configuration of signal processor 106 in FIG. 1. Weight combiner (precoder) 203 receives mapped signal 201A (corresponding to mapped signal 105_1 of FIG. 1), mapped signal 201B (corresponding to mapped signal 105_2 of FIG. 1), and control signal 200 (corresponding to control signal

100 of FIG. 1). Weight combiner (precoder) 203 performs weighting (precoding) based on control signal 200, and then outputs weighted signal 204A and weighted signal 204B. At this time, mapped signal 201A is represented as s1 ($t$), mapped signal 201B as s2($t$), weighted signal 204A as z1 ($t$), and weighted signal 204B as z2'($t$). Note that t is time as one example. It is assumed that s1 ($t$), s2($t$), z1 ($t$), and z2'($t$) are defined as complex numbers (hence may be real numbers).

Here, each signal is handled as a function of time, but each signal may be a function of "frequency (carrier number)" or a function of "time and frequency". Alternatively, each signal may be a function of "symbol number". This point also applies to the first exemplary embodiment.

Weight combiner (precoder) 203 performs calculation of formula (1).

Then, phase changer 205B receives weighted signal 204B and control signal 200. Based on control signal 200, phase changer 205B performs phase change on weighted signal 204B and then outputs phase-changed signal 206B. Note that phase-changed signal 206B is represented as z2($t$), and z2($t$) is defined as a complex number (z2($t$) may be a real number).

A specific operation of phase changer 205B will be described. For example, phase changer 205B performs phase change of y(i) on z2'($i$). Therefore, z2($i$) can be represented as z2($i$)=y(i)×z2'($i$) (i is a symbol number (i is an integer equal to or greater than 0)).

For example, a phase change value is set by formula (2). N is an integer equal to or greater than 2, and N is a phase change cycle. If N is set as an odd number equal to or greater than 3, data reception quality may improve. However, formula (2) is merely an example and the phase change value is not limited to this formula. Therefore, it is assumed that the phase change value y(i) is represented as y(i)=$e^{j \times \delta(i)}$.

At this time, z1($i$) and z2($i$) can be represented by formula (3). Note that $\delta$(i) is a real number. z1($i$) and z2($i$) are transmitted from the transmission apparatus at the same time and at the same frequency (same frequency band). In formula (3), the phase change value is not limited to formula (2), and for example, a method for periodically or regularly changing the phase can be considered.

As described in the first exemplary embodiment, formulas (5) to (36) and the like are considered as a (precoding) matrix in formulas (1) and (3). However, the precoding matrix is not limited to these formulas. This also applies to the first exemplary embodiment.

Inserter 207A receives weighted signal 204A, pilot symbol signal (pa(t)) (t: time) (251A), preamble signal 252, control information symbol signal 253, and control signal 200. Based on information about a frame structure included in control signal 200, inserter 207A outputs baseband signal 208A based on the frame structure.

Similarly, inserter 207B receives phase-changed signal 206B, pilot symbol signal (pb(t)) (251B), preamble signal 252, control information symbol signal 253, and control signal 200. Based on the information about the frame structure included in control signal 200, inserter 207B outputs baseband signal 208B based on the frame structure.

Phase changer 209A receives baseband signal 208A and control signal 200, performs phase change on baseband signal 208A based on control signal 200, and then outputs phase-changed signal 210A. Baseband signal 208A is a function of symbol number i (i is an integer equal to or greater than 0) and is represented as x'(i). Then, phase-changed signal 210A (x(i)) can be represented as x(i)=$e^{j \times \varepsilon(i)} \times$x'(i) (j is an imaginary unit).

Note that as described in the first exemplary embodiment, an operation of phase changer 209A may be cyclic delay diversity (CDD) (cyclic shift diversity (CSD)) described in NPTL 2 and NPTL 3. Phase changer 209A is characterized by performing phase change on the symbols present in a frequency axis direction (performing phase change on data symbols, pilot symbols, control information symbols, and other symbols).

FIG. 3 is a diagram illustrating one exemplary configuration of wireless units 107_A and 107_B of FIG. 1. Details have been described in the first exemplary embodiment, and thus description thereof will be omitted.

FIG. 4 is a diagram illustrating the frame structure of transmission signal 108_A of FIG. 1. Details have been described in the first exemplary embodiment, and thus description thereof will be omitted.

FIG. 5 is a diagram illustrating the frame structure of transmission signal 108_B of FIG. 1. Details have been described in the first exemplary embodiment, and thus description thereof will be omitted.

When a symbol is present at carrier A and time $B of FIG. 4 and when a symbol is present at carrier A and time $B of FIG. 5, the symbol at carrier A and time $B of FIG. 4 and the symbol at carrier A and time $B of FIG. 5 are transmitted at the same time and the same frequency. Note that the frame structure is not limited to the frame structures in FIGS. 4 and 5, and FIGS. 4 and 5 are merely examples of the frame structure.

The other symbols in FIGS. 4 and 5 are symbols corresponding to "preamble signal 252 and control information symbol signal 253 in FIG. 2". Therefore, the other symbol 503 of FIG. 5 at the same time and the same frequency (same carrier) as the other symbol 403 of FIG. 4 transmits the same data (same control information) when the control information is transmitted.

Note that it is assumed that the reception apparatus simultaneously receives the frame of FIG. 4 and the frame of FIG. 5, but even by receiving only the frame of FIG. 4 or only the frame of FIG. 5, the reception apparatus can obtain the data transmitted by the transmission apparatus.

FIG. 6 is a diagram illustrating one exemplary configuration of a part regarding control information generation for generating control information signal 253 of FIG. 2. Details have been described in the first exemplary embodiment, and thus description thereof will be omitted.

FIG. 7 is a diagram illustrating one exemplary configuration of antenna unit #A (109_A) and antenna unit #B (109_B) of FIG. 1. This is an example in which antenna unit #A (109_A) and antenna unit #B (109_B) each include a plurality of antennas. Details of FIG. 7 have been described in the first exemplary embodiment, and thus description thereof will be omitted.

FIG. 8 is a diagram illustrating one exemplary configuration of the reception apparatus that receives a modulated signal of, for example, the transmission signal of the frame structure of FIG. 4 or 5 transmitted by the transmission apparatus of FIG. 1. Details have been described in the first exemplary embodiment, and thus description thereof will be omitted.

FIG. 10 is a diagram illustrating one exemplary configuration of antenna unit #X (801X) and antenna unit #Y (801Y) of FIG. 8. This is an example in which antenna unit #X (801X) and antenna unit #Y (801Y) each include a plurality of antennas. Details of FIG. 10 have been described in the first exemplary embodiment, and thus description thereof will be omitted.

Next, as illustrated in FIG. 18, phase changer 205B and phase changer 209A are inserted into signal processor 106 of the transmission apparatus illustrated in FIG. 1. Features and advantageous effects thereof will be described.

As described with reference to FIGS. 4 and 5, phase changer 205B performs precoding (weighting) on mapped signal s1($i$) (201A) (i is a symbol number and is an integer equal to or greater than 0) obtained by performing mapping using the first series, and mapped signal s2($i$) (201B) obtained by performing mapping using the second series. Phase changer 205B performs phase change on one of obtained weighted signals 204A and 204B. Then, weighted signal 204A and phase-changed signal 206B are transmitted at the same frequency and at the same time. Therefore, in FIGS. 4 and 5, phase change is performed on data symbol 502 of FIG. 5. In FIG. 18, phase changer 205, which performs phase change on weighted signal 204B, performs phase change on data symbol 502 of FIG. 5. When phase change is performed on weighted signal 204A, phase change is performed on data symbol 402 of FIG. 4. This point will be described later.

For example, FIG. 11 is a diagram illustrating carriers 1 to 5 and time $4 to $6 extracted from the frame of FIG. 5. Note that as in FIG. 5, reference numeral 501 represents a pilot symbol, reference numeral 502 represents a data symbol, and reference numeral 503 represents the other symbol.

As described above, in the symbols illustrated in FIG. 11, phase changer 205B performs phase change on the data symbol of (carrier 1, time $5), the data symbol of (carrier 2, time $5), the data symbol of (carrier 3, time $5), the data symbol of (carrier 4, time $5), the data symbol of (carrier 5, time $5), the data symbol of (carrier 1, time $6), the data symbol of (carrier 2, time $6), the data symbol of (carrier 4, time $6), and the data symbol of (carrier 5, time $6).

Therefore, in the symbols illustrated in FIG. 11, the phase change value of the data symbol of (carrier 1, time $5) is "$e^{j \times \delta 15(i)}$", the phase change value of the data symbol of (carrier 2, time $5) is "$e^{j \times \delta 25(i)}$", the phase change value of the data symbol of (carrier 3, time $5) is "$e^{j \times \delta 35(i)}$", the phase change value of the data symbol of (carrier 4, time $5) is "$e^{j \times \delta 45(i)}$", the phase change value of the data symbol of (carrier 5, time $5) is "$e^{j \times \delta 55(i)}$", the phase change value of the data symbol of (carrier 1, time $6) is "$e^{j \times \delta 16(i)}$", the phase change value of the data symbol of (carrier 2, time $6) is "$e^{j \times \delta 26(i)}$", the phase change value of the data symbol of (carrier 4, time $6) is "$e^{j \times \delta 46(i)}$", and the phase change value of the data symbol of (carrier 5, time $6) is "$e^{j \times \delta 56(i)}$".

Meanwhile, in the symbols illustrated in FIG. 11, phase changer 205B does not perform phase change on the other symbol of (carrier 1, time $4), the other symbol of (carrier 2, time $4), the other symbol of (carrier 3, time $4), the other symbol of (carrier 4, time $4), the other symbol of (carrier 5, time $4), or the pilot symbol of (carrier 3, time $6).

This point is a characteristic point of phase changer 205B. Note that as illustrated in FIG. 4, data carriers are arranged at "the same carrier and the same time" as the symbols to be subjected to phase change in FIG. 11, including the data symbol of (carrier 1, time $5), the data symbol of (carrier 2, time $5), the data symbol of (carrier 3, time $5), the data symbol of (carrier 4, time $5), the data symbol of (carrier 5, time $5), the data symbol of (carrier 1, time $6), the data symbol of (carrier 2, time $6), the data symbol of (carrier 4, time $6), and the data symbol of (carrier 5, time $6). That is, in FIG. 4, (carrier 1, time $5) is a data symbol, (carrier 2, time $5) is a data symbol, (carrier 3, time $5) is a data symbol, (carrier 4, time $5) is a data symbol, (carrier 5, time $5) is a data symbol, (carrier 1, time $6) is a data symbol, (carrier 2, time $6) is a data symbol, (carrier 4, time $6) is a data symbol, and (carrier 5, time $6) is a data symbol. That is, phase changer 205B performs phase change on the data symbols performing MIMO transmission (transmitting multiple streams).

Note that examples of phase change to be performed on data symbols by phase changer 205B include a method for performing periodical phase change (phase change cycle N) on the data symbols by formula (2). However, the method for performing phase change on data symbols is not limited to this method.

Doing this will improve reception quality in the data symbol reception apparatus performing MIMO transmission (transmitting multiple streams) in an environment where direct waves are dominant, particularly in the LOS environment. This point will be described.

For example, it is assumed that the modulation scheme to be used by mapper 104 of FIG. 1 is quadrature phase shift keying (QPSK). Mapped signal 201A of FIG. 18 is a QPSK signal, and mapped signal 201B is also a QPSK signal. That is, two QPSK streams are transmitted. Then, signal processor 811 of FIG. 8 obtains, for example, 16 candidate signal points by using channel estimation signals 806_1 and 806_2. QPSK allows transmission of two bits, and a total of four bits can be transmitted by two streams. Therefore, 2^4=16 candidate signal points are present. Note that other 16 candidate signal points are obtained using channel estimation signals 808_1 and 808_2, which however will be described in a similar way; therefore, the following description will be made focusing on the 16 candidate signal points obtained using channel estimation signals 806_1 and 806_2.

FIG. 12 is a diagram illustrating one example of this state. In both FIGS. 12(A) and 12(B), a horizontal axis is in-phase I and a vertical axis is quadrature Q, and 16 candidate signal points are present on the in-phase quadrature (IQ) plane. One of the 16 candidate signal points is the signal point transmitted by the transmission apparatus. Therefore, these are called "16 candidate signal points".

In an environment where direct waves are dominant, particularly in the LOS environment,
First Case:
Consider a case where phase changer 205B of FIG. 18 is not present (that is, a case where phase changer 205B of FIG. 18 does not perform phase change).

In the "first case", since phase change is not performed, there is a possibility of falling into the state as illustrated in FIG. 12(A). When falling into the state of FIG. 12(A), since there are portions where the signal points are dense (distance between the signal points are short) such as "signal points 1201 and 1202", "signal points 1203, 1204, 1205 and 1206", and "signal points 1207 and 1208", data reception quality may deteriorate in the reception apparatus of FIG. 8.

To overcome this problem, phase changer 205B is inserted in FIG. 18. Insertion of phase changer 205B will lead to a mixture of the symbol numbers where the signal points are dense (distance between signal points is short) as illustrated in FIG. 12(A), and the symbol numbers where "distance between signal points is long" as illustrated in FIG. 12(B), depending on symbol number i. Introduction of an error correction code for this state will provide high error correction capability and allow the reception apparatus of FIG. 8 to obtain high data reception quality.

Note that in FIG. 18, phase changer 205B of FIG. 18 does not perform phase change on "pilot symbols and preambles" for performing channel estimation for demodulating (detecting) data symbols such as pilot symbols and preambles. This makes it possible to implement in data symbols "a mixture of the symbol numbers where the signal points are dense (distance between signal points is short) as illustrated in FIG. 12(A), and the symbol numbers where "distance between signal points is long" as illustrated in FIG. 12(B), depending on symbol number i".

However, even when phase changer 205B of FIG. 18 performs phase change on "pilot symbols and preambles" for performing channel estimation for demodulating (detecting) data symbols such as pilot symbols and preambles, this may "make it possible to implement in data symbols "a mixture of the symbol numbers where the signal points are dense (distance between signal points is short) as illustrated in FIG. 12(A), and the symbol numbers where "distance between signal points is long" as illustrated in FIG. 12(B), depending on symbol number i"". In this case, phase change needs to be performed through addition of some condition to the pilot symbol and preamble. For example, a method for providing a rule different from a phase change rule for data symbols and "performing phase change on pilot symbols and/or preambles" is considered. As an example, there is a method for periodically performing phase change of a cycle N on data symbols, and for periodically performing phase change of a cycle M on pilot symbols and/or preambles (N and M are each an integer equal to or greater than 2).

As described above, phase changer 209A receives baseband signal 208A and control signal 200, performs phase change on baseband signal 208A based on control signal 200, and then outputs phase-changed signal 210A. Baseband signal 208A is a function of symbol number i (i is an integer equal to or greater than 0) and is represented as x'(i). Then, phase-changed signal 210A (x(i)) can be represented as $x(i)=e^{j\times\varepsilon(i)}\times x'(i)$ (j is an imaginary unit). The operation of phase changer 209A may be cyclic delay diversity (CDD) (cyclic shift diversity (CSD)) described in NPTL 2 and NPTL 3. Phase changer 209A is characterized by performing phase change on the symbols present in the frequency axis direction (performing phase change on symbols such as data symbols, pilot symbols, and control information symbols. Therefore, in this case, target symbols of symbol number i are symbols such as data symbols, pilot symbols, control information symbols, and preambles (the other symbols). In the case of FIG. 18, phase changer 209A, which performs phase change on baseband signal 208A, performs phase change on each symbol illustrated in FIG. 4.

Therefore, in the frame of FIG. 4, phase changer 209A of FIG. 18 performs phase change on all the symbols of carriers 1 to 36 and time $1 (in this case, all the symbols are the other symbol 403).

Similarly,

"phase changer 209A of FIG. 18 performs phase change on all the symbols of carriers 1 to 36 and time $2 (in this case, all the symbols are the other symbol 403)", "phase changer 209A of FIG. 18 performs phase change on all the symbols of carriers 1 to 36 and time $3 (in this case, all the symbols are the other symbol 403)", "phase changer 209A of FIG. 18 performs phase change on all the symbols of carriers 1 to 36 and time $4 (in this case, all the symbols are the other symbol 403)", "phase changer 209A of FIG. 18 performs phase change on all the symbols of carriers 1 to 36 and time $5 (in this case, all the symbols are pilot symbol 401 or data symbol 402)", "phase changer 209A of FIG. 18 performs phase change on all the symbols of carriers 1 to 36 and time $6 (in this case, all the symbols are pilot symbol 401 or data symbol 402)", "phase changer 209A of FIG. 18 performs phase change on all the symbols of carriers 1 to 36 and time $7 (in this case, all the symbols are pilot symbol 401 or data symbol 402)", "phase changer 209A of FIG. 18 performs phase change on all the symbols of carriers 1 to 36 and time $8 (in this case, all the symbols are pilot symbol 401 or data symbol 402)", "phase changer 209A of FIG. 18 performs phase change on all the symbols of carriers 1 to 36 and time $9 (in this case, all the symbols are pilot symbol 401 or data symbol 402)", "phase changer 209A of FIG. 18 performs phase change on all the symbols of carriers 1 to 36 and time $10 (in this case, all the symbols are pilot symbol 401 or data symbol 402)", and "phase changer 209A of FIG. 18 performs phase change on all the symbols of carriers 1 to 36 and time $11 (in this case, all the symbols are pilot symbol 401 or data symbol 402)".

. . .

FIG. 13 is a diagram illustrating the frame structure of transmission signal 108_A of FIG. 1 different from FIG. 4. Details have been described in the first exemplary embodiment, and thus description thereof will be omitted.

FIG. 14 is a diagram illustrating the frame structure of transmission signal 108_B of FIG. 1 different from FIG. 5. Details have been described in the first exemplary embodiment, and thus description thereof will be omitted.

When a symbol is present at carrier A and time $B of FIG. 13 and when a symbol is present at carrier A and time $B of FIG. 14, the symbol at carrier A and time $B of FIG. 13 and the symbol at carrier A and time $B of FIG. 14 are transmitted at the same time and the same frequency. Note that the frame structures of FIGS. 13 and 14 are merely examples.

The other symbols in FIGS. 13 and 14 are symbols corresponding to "preamble signal 252 and control information symbol signal 253 in FIG. 18". Therefore, the other symbol 503 of FIG. 14 at the same time and the same frequency (same carrier) as the other symbol 403 of FIG. 13 transmits the same data (same control information) when the control information is transmitted.

Note that it is assumed that the reception apparatus simultaneously receives the frame of FIG. 13 and the frame of FIG. 14, but even by receiving only the frame of FIG. 13 or only the frame of FIG. 14, the reception apparatus can obtain data transmitted by the transmission apparatus.

Phase changer 209A receives baseband signal 208A and control signal 200, performs phase change on baseband signal 208A based on control signal 200, and then outputs phase-changed signal 210A. Baseband signal 208A is a function of symbol symbol number i (i is an integer equal to or greater than 0) and is represented as x'(i). Then, phase-changed signal 210A (x(i)) can be represented as $x(i)=e^{j\times\varepsilon(i)}\times x'(i)$ (j is an imaginary unit). The operation of phase changer 209A may be cyclic delay diversity (CDD) (cyclic shift diversity (CSD)) described in NPTL 2 and NPTL 3. Phase changer 209A is characterized by performing phase change on symbols in a frequency axis direction. For example, phase change is performed on symbols such as data symbols, pilot symbols, and control information symbols. At this time, the null symbol can also be considered as a phase change target. Therefore, in this case, target symbols of symbol number i are symbols such as data symbols, pilot symbols, control information symbols, preambles (the other symbols) and null symbols. However, even if phase change is performed on the null symbol, the signal before the phase change and the signal after the phase change are the same (in-phase component I is zero (0) and quadrature component Q is zero (0)). Therefore, it can be interpreted that the null symbol is not the phase change target. In the case of FIG. 18, phase changer 209A, which performs phase change on baseband signal 208A, performs phase change on each symbol illustrated in FIG. 13.

Therefore, in the frame of FIG. 13, phase changer 209A of FIG. 18 performs phase change on all the symbols of carriers 1 to 36 and time $1 (in this case, all the symbols are the other symbol 403). However, the handling of phase change of null symbol 1301 is as described above.

Similarly,

"phase changer 209A of FIG. 18 performs phase change on all the symbols of carriers 1 to 36 and time $2 (in this case, all the symbols are the other symbol 403). However, the handling of phase change of null symbol 1301 is as described above".

"Phase changer 209A of FIG. 18 performs phase change on all the symbols of carriers 1 to 36 and time $3 (in this case, all the symbols are the other symbol 403). However, the handling of phase change of null symbol 1301 is as described above".

"Phase changer 209A of FIG. 18 performs phase change on all the symbols of carriers 1 to 36 and time $4 (in this case, all the symbols are the other symbol 403). However, the handling of phase change of null symbol 1301 is as described above".

"Phase changer 209A of FIG. 18 performs phase change on all the symbols of carriers 1 to 36 and time $5 (in this case, all the symbols are pilot symbol 401 or data symbol 402). However, the handling of phase change of null symbol 1301 is as described above".

"Phase changer 209A of FIG. 18 performs phase change on all the symbols of carriers 1 to 36 and time $6 (in this case, all the symbols are pilot symbol 401 or data symbol 402). However, the handling of phase change of null symbol 1301 is as described above".

"Phase changer 209A of FIG. 18 performs phase change on all the symbols of carriers 1 to 36 and time $7 (in this case, all the symbols are pilot symbol 401 or data symbol 402). However, the handling of phase change of null symbol 1301 is as described above".

"Phase changer 209A of FIG. 18 performs phase change on all the symbols of carriers 1 to 36 and time $8 (in this case, all the symbols are pilot symbol 401 or data symbol 402). However, the handling of phase change of null symbol 1301 is as described above".

"Phase changer 209A of FIG. 18 performs phase change on all the symbols of carriers 1 to 36 and time $9 (in this case, all the symbols are pilot symbol 401 or data symbol 402). However, the handling of phase change of null symbol 1301 is as described above".

"Phase changer 209A of FIG. 18 performs phase change on all the symbols of carriers 1 to 36 and time $10 (in this case, all the symbols are pilot symbol 401 or data symbol 402). However, the handling of phase change of null symbol 1301 is as described above".

"Phase changer 209A of FIG. 18 performs phase change on all the symbols of carriers 1 to 36 and time $11 (in this case, all the symbols are pilot symbol 401 or data symbol 402). However, the handling of phase change of null symbol 1301 is as described above".

The phase change value in phase changer 209A is represented as $\Omega(i)$. Baseband signal 208A is x'(i), and phase-changed signal 210A is x(i). Therefore, $x(i)=\Omega(i) \times x'(i)$ holds true.

For example, the phase change value is set by formula (38). Q is an integer equal to or greater than 2, and Q is a phase change cycle. j is an imaginary unit. However, formula (38) is merely an example and the phase change value is not limited to this formula.

For example, $\Omega(i)$ may be set to perform phase change so as to have the cycle Q.

Furthermore, for example, in FIGS. 4 and 13, the same phase change value may be provided to the same carrier, and the phase change value may be set for each carrier. For example, this will be as follows.

For carrier 1 in FIGS. 4 and 13, regardless of time, the phase change value is formula (39).

For carrier 2 in FIGS. 4 and 13, regardless of time, the phase change value is formula (40).

For carrier 3 in FIGS. 4 and 13, regardless of time, the phase change value is formula (41).

For carrier 4 in FIGS. 4 and 13, regardless of time, the phase change value is formula (42).

Operation examples of phase changer 209A of FIG. 18 have been described above.

Advantageous effects that can be obtained by phase changer 209A of FIG. 18 will be described.

It is assumed that the control information symbol is included in the other symbols 403 and 503 of "the frames of FIGS. 4 and 5" or "the frames of FIGS. 13 and 14". As described earlier, when transmitting the control information, the other symbol 503 of FIG. 5 at the same time and the same frequency (same carrier) as the other symbol 403 transmits the same data (same control information).

Here, consider the following cases.

Case 2:

The control information symbol is transmitted using one of antenna unit #A (109_A) and antenna unit #B (109_B) of FIG. 1.

When transmission is performed as in "case 2", since the number of antennas that transmit the control information symbol is 1, a gain of space diversity is smaller than in a case of "transmitting the control information symbol using both antenna unit #A (109_A) and antenna unit #B (109_B)", and thus data reception quality deteriorates even if the reception apparatus of FIG. 8 performs reception in "case 2". Therefore, in terms of improvement in data reception quality, it is preferable "to transmit the control information symbol using both "antenna unit #A (109_A) and antenna unit #B (109_B) ".

Case 3:

The control information symbol is transmitted using both of antenna unit #A (109_A) and antenna unit #B (109_B) of FIG. 1. However, phase changer 209A in FIG. 18 does not perform phase change.

When transmission is performed as in "case 3", since the modulated signal transmitted from antenna unit #A 109_A is the same as the modulated signal transmitted from antenna unit #B 109_B (or there is a specified phase shift), depending on a radio wave propagation environment, the reception apparatus of FIG. 8 may have a very poor reception signal and both of the modulated signals may be affected by the same multipath. This will cause a problem that data reception quality deteriorates in the reception apparatus of FIG. 8.

To alleviate this problem, phase changer 209A is provided in FIG. 18. This enables phase change in a time or frequency direction, allowing the reception apparatus of FIG. 8 to reduce the possibility of a poor reception signal. Also, it is likely that there is a difference between an influence of the multipath received by the modulated signal transmitted from antenna unit #A 109_A and an influence of the multipath received by the modulated signal transmitted from antenna unit #B 109_B. Therefore, it is likely that a diversity gain is obtained, whereby data reception quality improves in the reception apparatus of FIG. 8.

For the above reason, phase changer 209A is provided in FIG. 18 to perform phase change.

The other symbol 403 and the other symbol 503 include, other than the control information symbol, for example, a symbol for signal detection, a symbol for performing frequency synchronization and time synchronization, and a symbol for channel estimation (symbol for estimating propagation path fluctuation) for demodulating and decoding the control information symbol. In addition, "the frames of FIGS. 4 and 5" or "the frames of FIGS. 13 and 14" include pilot symbols 401 and 501. Using these symbols will make it possible to demodulate and decode the control information symbol more accurately.

In "the frames of FIGS. 4 and 5" or "the frames of FIGS. 13 and 14", data symbol 402 and data symbol 502 transmit multiple streams (perform MIMO transmission) by using the same frequency (band) and the same time. Demodulating these data symbols requires to use the symbol for signal detection, the symbol for frequency synchronization and time synchronization, and the symbol for channel estimation (symbol for estimating propagation path fluctuation) included in the other symbol 403 and the other symbol 503.

At this time, as described above, phase changer 209A performs phase change on "the symbol for signal detection, the symbol for frequency synchronization and time synchronization, and the symbol for channel estimation (symbol for estimating propagation path fluctuation) included in the other symbol 403 and the other symbol 503".

Under such circumstances, if this process is not reflected in data symbol 402 and data symbol 502 (in data symbol 402 for the case described above), when the reception apparatus demodulates and decodes data symbol 402 and data symbol 502, it is necessary to perform demodulation and decoding reflecting the process for the phase change performed by phase changer 209A, and the process is likely to be complicated. This is because phase changer 209A performs phase change on "the symbol for signal detection, the symbol for frequency synchronization and time synchronization, and the symbol for channel estimation (symbol for estimating propagation path fluctuation) included in the other symbol 403 and the other symbol 503".

However, as illustrated in FIG. 18, when phase changer 209A performs phase change on data symbol 402 and data symbol 502 (on data symbol 402 for the case described above), there is an advantage that the reception apparatus can (easily) demodulate and decode data symbol 402 and data symbol 502 by using the channel estimation signal (propagation path fluctuation estimation signal) estimated using "the symbol for signal detection, the symbol for frequency synchronization and time synchronization, and the symbol for channel estimation (symbol for estimating propagation path fluctuation) included in the other symbol 403 and the other symbol 503".

In addition, as illustrated in FIG. 18, when phase changer 209A performs phase change on data symbol 402 and data symbol 502 (on data symbol 402 for the case described above), it is possible to reduce an influence of a sharp drop in electric field intensity in a frequency axis in the multipath. This may improve data reception quality of data symbol 402 and data symbol 502.

Thus, a characteristic point is that "the target symbol on which phase changer 205B performs phase change" is different from "the target symbol on which phase changer 209A performs phase change".

As described above, phase changer 205B of FIG. 18 performing phase change will improve data reception quality of data symbol 402 and data symbol 502 in the reception apparatus, particularly in the LOS environment. Furthermore, phase changer 209A of FIG. 18 performing phase change will improve, for example, reception quality of the control information symbol included in "the frames of FIGS. 4 and 5" or "the frames of FIGS. 13 and 14" in the reception apparatus. Phase changer 209A of FIG. 18 performing phase change will also simplify demodulation and decoding operations of data symbol 402 and data symbol 502.

Note that phase changer 205B of FIG. 18 performing phase change will improve data reception quality of data symbol 402 and data symbol 502 in the reception apparatus, particularly in the LOS environment. Furthermore, phase changer 209A of FIG. 18 performing phase change on data symbol 402 and data symbol 502 will improve reception quality of data symbol 402 and data symbol 502.

Note that Q in formula (38) may be an integer equal to or less than −2, and at this time, the phase change cycle is the absolute value of Q. This point can also be applied to the first exemplary embodiment.

Third Exemplary Embodiment

The present exemplary embodiment will describe a method for implementing a configuration different from the configuration of FIG. 2 in the first exemplary embodiment.

FIG. 1 is a diagram illustrating one exemplary configuration of a transmission apparatus such as, for example, a base station, an access point, and a broadcasting station according to the present exemplary embodiment. Details have been described in the first exemplary embodiment, and thus description thereof will be omitted.

Signal processor 106 receives mapped signals 105_1 and 105_2, signal group 110, and control signal 100, performs signal processing based on control signal 100, and then outputs signal-processed signals 106_A and 106_B. At this time, signal-processed signal 106_A is represented as u1($i$), and signal-processed signal 106_B is represented as u2($i$) ($i$ is a symbol number, and for example, i is an integer equal to or greater than 0). Note that details of the signal processing will be described with reference to FIG. 19.

Figure 19:
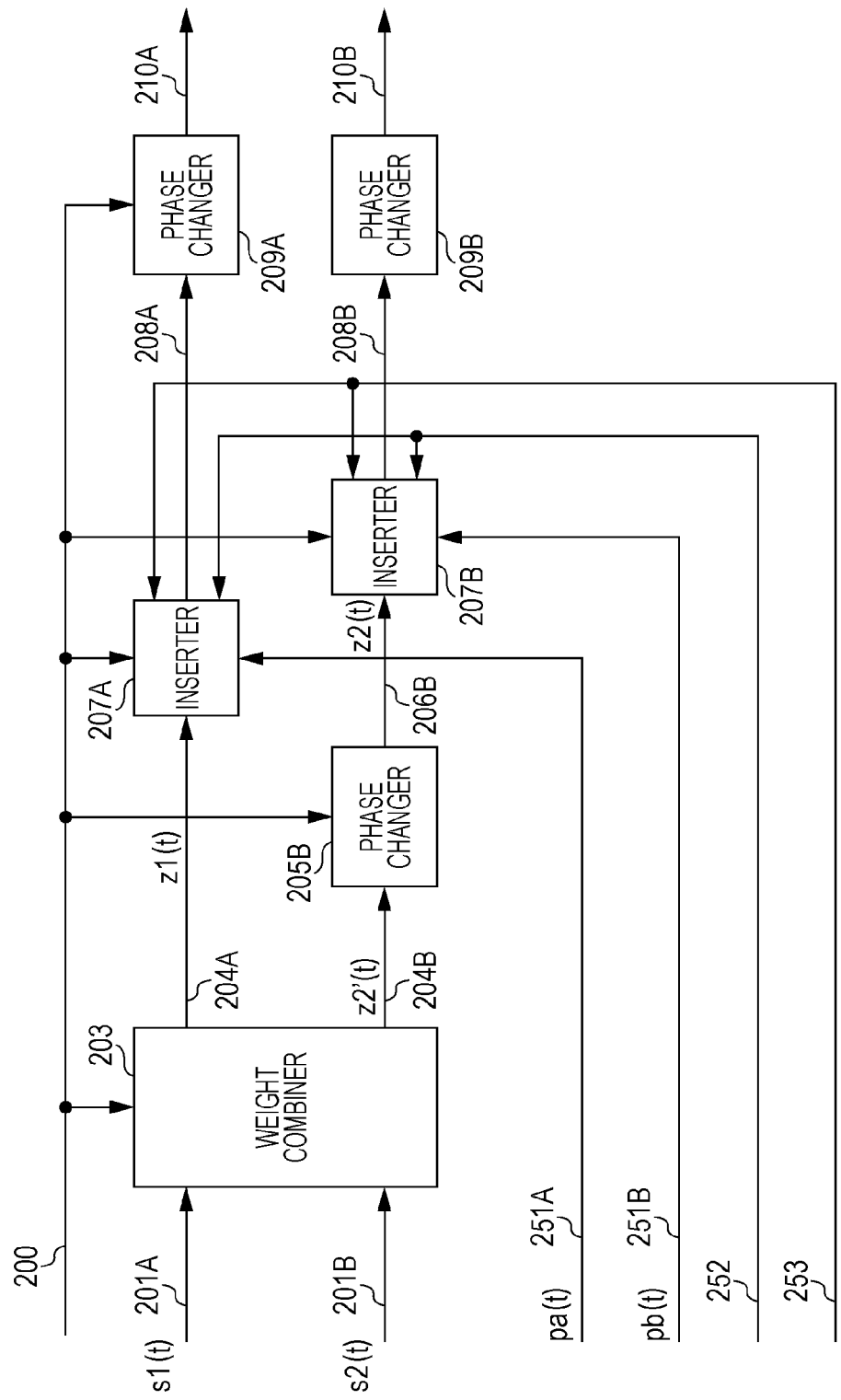
FIG. 19 is a diagram illustrating one exemplary configuration of the signal processor of FIG. 1.

FIG. 19 is a diagram illustrating one example in a configuration of signal processor 106 in FIG. 1. Weight combiner (precoder) 203 receives mapped signal 201A (corresponding to mapped signal 105_1 of FIG. 1), mapped signal 201B (corresponding to mapped signal 105_2 of FIG. 1), and control signal 200 (corresponding to control signal 100 of FIG. 1). Weight combiner (precoder) 203 performs weighting (precoding) based on control signal 200, and then outputs weighted signal 204A and weighted signal 204B. At this time, mapped signal 201A is represented as s1($t$), mapped signal 201B as s2($t$), weighted signal 204A as z1($t$), and weighted signal 204B as z2'($t$). Note that t is time as one example. It is assumed that s1($t$), s2($t$), z1($t$), and z2'($t$) are defined as complex numbers (hence may be real numbers).

Here, each signal is handled as a function of time, but each signal may be a function of "frequency (carrier number)" or a function of "time and frequency". Alternatively, each signal may be a function of "symbol number". This point also applies to the first exemplary embodiment.

Weight combiner (precoder) 203 performs calculation of formula (1).

Then, phase changer 205B receives weighted signal 204B and control signal 200. Based on control signal 200, phase changer 205B performs phase change on weighted signal 204B and then outputs phase-changed signal 206B. Note that phase-changed signal 206B is represented as $z2(t)$, and $z2(t)$ is defined as a complex number ($z2(t)$ may be a real number).

A specific operation of phase changer 205B will be described. For example, phase changer 205B performs phase change of y(i) on $z2'(i)$. Therefore, $z2(i)$ can be represented as $z2(i)=y(i)\times z2'(i)$ (i is a symbol number (i is an integer equal to or greater than 0)).

For example, a phase change value is set by formula (2). N is an integer equal to or greater than 2, and N is a phase change cycle. If N is set as an odd number equal to or greater than 3, data reception quality may improve. However, formula (2) is merely an example and the phase change value is not limited to this formula. Therefore, it is assumed that the phase change value y(i) is represented as $y(i)=e^{j\times\delta(i)}$.

At this time, $z1(i)$ and $z2(i)$ can be represented by formula (3). Note that $\delta(i)$ is a real number. $z1(i)$ and $z2(i)$ are transmitted from the transmission apparatus at the same time and at the same frequency (same frequency band). In formula (3), the phase change value is not limited to formula (2), and for example, a method for periodically or regularly changing the phase can be considered.

As described in the first exemplary embodiment, formulas (5) to (36) and the like are considered as a (precoding) matrix in formulas (1) and (3). However, the precoding matrix is not limited to these formulas. This also applies to the first exemplary embodiment.

Inserter 207A receives weighted signal 204A, pilot symbol signal (pa(t)) (t: time) (251A), preamble signal 252, control information symbol signal 253, and control signal 200. Based on information about a frame structure included in control signal 200, inserter 207A outputs baseband signal 208A based on the frame structure.

Similarly, inserter 207B receives phase-changed signal 206B, pilot symbol signal (pb(t)) (251B), preamble signal 252, control information symbol signal 253, and control signal 200. Based on the information about the frame structure included in control signal 200, inserter 207B outputs baseband signal 208B based on the frame structure.

Phase changer 209A receives baseband signal 208A and control signal 200, performs phase change on baseband signal 208A based on control signal 200, and then outputs phase-changed signal 210A. Baseband signal 208A is a function of symbol number i (i is an integer equal to or greater than 0) and is represented as x'(i). Then, phase-changed signal 210A (x(i)) can be represented as $x(i)=e^{j\times\varepsilon(i)}\times x'(i)$ (j is an imaginary unit).

Note that as described in the first exemplary embodiment, an operation of phase changer 209A may be cyclic delay diversity (CDD) (cyclic shift diversity (CSD)) described in NPTL 2 and NPTL 3. Phase changer 209A is characterized by performing phase change on symbols in a frequency axis direction. For example, phase change is performed on symbols such as data symbols, pilot symbols, and control information symbols.

Phase changer 209B receives baseband signal 208B and control signal 200, performs phase change on baseband signal 208B based on control signal 200, and then outputs phase-changed signal 210B. Baseband signal 208B is a function of symbol number i (i is an integer equal to or greater than 0) and is represented as y'(i). Then, phase-changed signal 210B (y(i)) can be represented as $y(i)=e^{j\times x^1}\times y'(i)$ (j is an imaginary unit).

Note that as described in the first exemplary embodiment, an operation of phase changer 209B may be cyclic delay diversity (CDD) (cyclic shift diversity (CSD)) described in NPTL 2 and NPTL 3. Phase changer 209B is characterized by performing phase change on symbols in a frequency axis direction. For example, phase change is performed on symbols such as data symbols, pilot symbols, and control information symbols.

A characteristic point here is that the phase change method using E(i) is different from the phase change method using t(i). Alternatively, the characteristic point here is that a value of the cyclic delay amount of cyclic delay diversity (CDD) (cyclic shift diversity (CSD)) set by phase changer 209A is different from a value of the cyclic delay amount of cyclic delay diversity (CDD) (cyclic shift diversity (CSD)) set by phase changer 209B.

FIG. 3 is a diagram illustrating one exemplary configuration of wireless units 107_A and 107_B of FIG. 1. Details have been described in the first exemplary embodiment, and thus description thereof will be omitted.

FIG. 4 is a diagram illustrating the frame structure of transmission signal 108_A of FIG. 1. Details have been described in the first exemplary embodiment, and thus description thereof will be omitted.

FIG. 5 is a diagram illustrating the frame structure of transmission signal 108_B of FIG. 1. Details have been described in the first exemplary embodiment, and thus description thereof will be omitted.

When a symbol is present at carrier A and time $B of FIG. 4 and when a symbol is present at carrier A and time $B of FIG. 5, the symbol at carrier A and time $B of FIG. 4 and the symbol at carrier A and time $B of FIG. 5 are transmitted at the same time and the same frequency. Note that the frame structure is not limited to the frame structures in FIGS. 4 and 5, and FIGS. 4 and 5 are merely examples of the frame structure.

The other symbols in FIGS. 4 and 5 are symbols corresponding to "preamble signal 252 and control information symbol signal 253 in FIG. 2". Therefore, the other symbol 503 of FIG. 5 at the same time and the same frequency (same carrier) as the other symbol 403 of FIG. 4 transmits the same data (same control information) when the control information is transmitted.

Note that it is assumed that the reception apparatus simultaneously receives the frame of FIG. 4 and the frame of FIG. 5, but even by receiving only the frame of FIG. 4 or only the frame of FIG. 5, the reception apparatus can obtain the data transmitted by the transmission apparatus.

FIG. 6 is a diagram illustrating one exemplary configuration of a part regarding control information generation for generating control information signal 253 of FIG. 2. Details have been described in the first exemplary embodiment, and thus description thereof will be omitted.

FIG. 7 is a diagram illustrating one exemplary configuration of antenna unit #A (109_A) and antenna unit #B (109_B) of FIG. 1 (an example in which antenna unit #A (109_A) and antenna unit #B (109_B) each include a plurality of antennas). Details have been described in the first exemplary embodiment, and thus description thereof will be omitted.

FIG. 8 is a diagram illustrating one exemplary configuration of the reception apparatus that receives a modulated signal of, for example, the transmission signal of the frame structure of FIG. 4 or 5 transmitted by the transmission apparatus of FIG. 1. Details have been described in the first exemplary embodiment, and thus description thereof will be omitted.

FIG. 10 is a diagram illustrating one exemplary configuration of antenna unit #X (801X) and antenna unit #Y (801Y) of FIG. 8. (This is an example in which antenna unit #X (801X) and antenna unit #Y (801Y) each include a plurality of antennas.) Details of FIG. 10 have been described in the first exemplary embodiment, and thus description thereof will be omitted.

Next, as illustrated in FIG. 19, phase changer 205B and phase changers 209A and 209B are inserted into signal processor 106 of the transmission apparatus illustrated in FIG. 1. Features and advantageous effects thereof will be described.

As described with reference to FIGS. 4 and 5, phase changer 205B performs precoding (weighting) on mapped signal s1($i$) (201A) (i is a symbol number and is an integer equal to or greater than 0) obtained by performing mapping using the first series, and mapped signal s2($i$) (201B) obtained by performing mapping using the second series. Phase changer 205B performs phase change on one of obtained weighted signals 204A and 204B. Then, weighted signal 204A and phase-changed signal 206B are transmitted at the same frequency and at the same time. Therefore, in FIGS. 4 and 5, phase change is performed on data symbol 502 of FIG. 5. In the case of FIG. 19, phase changer 205, which performs phase change on weighted signal 204B, performs phase change on data symbol 502 of FIG. 5. When phase change is performed on weighted signal 204A, phase change is performed on data symbol 402 of FIG. 4. This point will be described later.

For example, FIG. 11 is a diagram illustrating carriers 1 to 5 and time $4 to $6 extracted from the frame of FIG. 5. Note that as in FIG. 5, reference numeral 501 represents a pilot symbol, reference numeral 502 represents a data symbol, and reference numeral 503 represents the other symbol.

As described above, in the symbols illustrated in FIG. 11, phase changer 205B performs phase change on the data symbol of (carrier 1, time $5), the data symbol of (carrier 2, time $5), the data symbol of (carrier 3, time $5), the data symbol of (carrier 4, time $5), the data symbol of (carrier 5, time $5), the data symbol of (carrier 1, time $6), the data symbol of (carrier 2, time $6), the data symbol of (carrier 4, time $6), and the data symbol of (carrier 5, time $6).

Therefore, in the symbols illustrated in FIG. 11, the phase change value of the data symbol of (carrier 1, time $5) is "$e^{j \times \delta 15(i)}$", the phase change value of the data symbol of (carrier 2, time $5) is "$e^{j \times \delta 25(i)}$", the phase change value of the data symbol of (carrier 3, time $5) is "$e^{j \times \delta 35(i)}$", the phase change value of the data symbol of (carrier 4, time $5) is "$e^{j \times \delta 45(i)}$", the phase change value of the data symbol of (carrier 5, time $5) is "$e^{j \times \delta 55(i)}$(i)", the phase change value of the data symbol of (carrier 1, time $6) is "$e^{j \times \delta 16(i)}$", the phase change value of the data symbol of (carrier 2, time $6) is "$e^{j \times \delta 26(i)}$", the phase change value of the data symbol of (carrier 4, time $6) is "$e^{j \times \delta 46(i)}$", and the phase change value of the data symbol of (carrier 5, time $6) is "$e^{j \times \delta 56(i)}$".

Meanwhile, in the symbols illustrated in FIG. 11, phase changer 205B does not perform phase change on the other symbol of (carrier 1, time $4), the other symbol of (carrier 2, time $4), the other symbol of (carrier 3, time $4), the other symbol of (carrier 4, time $4), the other symbol of (carrier 5, time $4), or the pilot symbol of (carrier 3, time $6).

This point is a characteristic point of phase changer 205B. Note that as illustrated in FIG. 4, data carriers are arranged at "the same carrier and the same time" as the symbols to be subjected to phase change in FIG. 11, including the data symbol of (carrier 1, time $5), the data symbol of (carrier 2, time $5), the data symbol of (carrier 3, time $5), the data symbol of (carrier 4, time $5), the data symbol of (carrier 5, time $5), the data symbol of (carrier 1, time $6), the data symbol of (carrier 2, time $6), the data symbol of (carrier 4, time $6), and the data symbol of (carrier 5, time $6). That is, in FIG. 4, (carrier 1, time $5) is a data symbol, (carrier 2, time $5) is a data symbol, (carrier 3, time $5) is a data symbol, (carrier 4, time $5) is a data symbol, (carrier 5, time $5) is a data symbol, (carrier 1, time $6) is a data symbol, (carrier 2, time $6) is a data symbol, (carrier 4, time $6) is a data symbol, and (carrier 5, time $6) is a data symbol. That is, phase changer 205B performs phase change on the data symbols performing MIMO transmission (transmitting multiple streams).

Note that examples of phase change to be performed on data symbols by phase changer 205B include a method for performing periodical phase change (phase change cycle N) on the data symbols by formula (2). However, the method for performing phase change on data symbols is not limited to this method.

Doing this will improve data reception quality in the data symbol reception apparatus performing MIMO transmission (transmitting multiple streams) in an environment where direct waves are dominant, particularly in the LOS environment. This point will be described.

For example, it is assumed that the modulation scheme to be used by mapper 104 of FIG. 1 is quadrature phase shift keying (QPSK). Mapped signal 201A of FIG. 19 is a QPSK signal, and mapped signal 201B is also a QPSK signal. That is, two QPSK streams are transmitted. Then, signal processor 811 of FIG. 8 obtains, for example, 16 candidate signal points by using channel estimation signals 806_1 and 806_2. QPSK allows transmission of two bits, and a total of four bits can be transmitted by two streams. Therefore, $2^4=16$ candidate signal points are present. Note that other 16 candidate signal points are obtained using channel estimation signals 808_1 and 808_2, which however will be described in a similar way; therefore, the following description will be made focusing on the 16 candidate signal points obtained using channel estimation signals 806_1 and 806_2.

FIG. 12 is a diagram illustrating one example of this state. In both FIGS. 12(A) and 12(B), a horizontal axis is in-phase I and a vertical axis is quadrature Q, and 16 candidate signal points are present on the in-phase quadrature (IQ) plane. One of the 16 candidate signal points is the signal point transmitted by the transmission apparatus. Therefore, these are called "16 candidate signal points".

In an environment where direct waves are dominant, particularly in the LOS environment,
First Case:

Consider a case where phase changer 205B of FIG. 19 is not present (that is, a case where phase changer 205B of FIG. 19 does not perform phase change).

In the "first case", since phase change is not performed, there is a possibility of falling into the state as illustrated in FIG. 12(A). When falling into the state of FIG. 12(A), since there are portions where the signal points are dense (distance between the signal points are short) such as "signal points 1201 and 1202", "signal points 1203, 1204, 1205 and 1206", and "signal points 1207 and 1208", data reception quality may deteriorate in the reception apparatus of FIG. 8.

To overcome this problem, phase changer 205B is inserted in FIG. 19. Insertion of phase changer 205B will lead to a mixture of the symbol numbers where the signal points are dense (distance between signal points is short) as illustrated in FIG. 12(A), and the symbol numbers where "distance between signal points is long" as illustrated in FIG. 12(B), depending on symbol number i. Introduction of an error correction code for this state will provide high error correction capability and allow the reception apparatus of FIG. 8 to obtain high data reception quality.

Note that in FIG. 19, phase changer 205B of FIG. 19 does not perform phase change on "pilot symbols and preambles" for performing channel estimation for demodulating (detecting) data symbols such as pilot symbols and preambles. This makes it possible to implement in data symbols "a mixture of the symbol numbers where the signal points are dense (distance between signal points is short) as illustrated in FIG. 12(A), and the symbol numbers where "distance between signal points is long" as illustrated in FIG. 12(B), depending on symbol number i".

However, even when phase changer 205B of FIG. 19 performs phase change on "pilot symbols and preambles" for performing channel estimation for demodulating (detecting) data symbols such as pilot symbols and preambles, this may "make it possible to implement in data symbols "a mixture of the symbol numbers where the signal points are dense (distance between signal points is short) as illustrated in FIG. 12(A), and the symbol numbers where "distance between signal points is long" as illustrated in FIG. 12(B), depending on symbol number i"". In this case, phase change needs to be performed through addition of some condition to the pilot symbol and preamble. For example, a method for providing a rule different from a phase change rule for data symbols and "performing phase change on pilot symbols and/or preambles" is considered. As an example, there is a method for periodically performing phase change of a cycle N on data symbols, and for periodically performing phase change of a cycle M on pilot symbols and/or preambles (N and M are each an integer equal to or greater than 2).

As described above, phase changer 209A receives baseband signal 208A and control signal 200, performs phase change on baseband signal 208A based on control signal 200, and then outputs phase-changed signal 210A. Baseband signal 208A is a function of symbol number i (i is an integer equal to or greater than 0) and is represented as x'(i). Then, phase-changed signal 210A (x(i)) can be represented as $x(i)=e^{j\times\varepsilon(i)}\times x'(i)$ (j is an imaginary unit). The operation of phase changer 209A may be cyclic delay diversity (CDD) (cyclic shift diversity (CSD)) described in NPTL 2 and NPTL 3. Phase changer 209A is characterized by performing phase change on symbols in a frequency axis direction. For example, phase change is performed on symbols such as data symbols, pilot symbols, and control information symbols. Therefore, in this case, target symbols of symbol number i are symbols such as data symbols, pilot symbols, control information symbols, and preambles (the other symbols). In FIG. 19, phase changer 209A, which performs phase change on baseband signal 208A, performs phase change on each symbol illustrated in FIG. 4.

Therefore, in the frame of FIG. 4, phase changer 209A of FIG. 19 performs phase change on all the symbols of carriers 1 to 36 and time $1 (in this case, all the symbols are the other symbol 403).

Similarly,

"phase changer 209A of FIG. 19 performs phase change on all the symbols of carriers 1 to 36 and time $2 (in this case, all the symbols are the other symbol 403)", "phase changer 209A of FIG. 19 performs phase change on all the symbols of carriers 1 to 36 and time $3 (in this case, all the symbols are the other symbol 403)", "phase changer 209A of FIG. 19 performs phase change on all the symbols of carriers 1 to 36 and time $4 (in this case, all the symbols are the other symbol 403)", "phase changer 209A of FIG. 19 performs phase change on all the symbols of carriers 1 to 36 and time $5 (in this case, all the symbols are pilot symbol 401 or data symbol 402)", "phase changer 209A of FIG. 19 performs phase change on all the symbols of carriers 1 to 36 and time $6 (in this case, all the symbols are pilot symbol 401 or data symbol 402)", "phase changer 209A of FIG. 19 performs phase change on all the symbols of carriers 1 to 36 and time $7 (in this case, all the symbols are pilot symbol 401 or data symbol 402)", "phase changer 209A of FIG. 19 performs phase change on all the symbols of carriers 1 to 36 and time $8 (in this case, all the symbols are pilot symbol 401 or data symbol 402)", "phase changer 209A of FIG. 19 performs phase change on all the symbols of carriers 1 to 36 and time $9 (in this case, all the symbols are pilot symbol 401 or data symbol 402)", "phase changer 209A of FIG. 19 performs phase change on all the symbols of carriers 1 to 36 and time $10 (in this case, all the symbols are pilot symbol 401 or data symbol 402)", and "phase changer 209A of FIG. 19 performs phase change on all the symbols of carriers 1 to 36 and time $11 (in this case, all the symbols are pilot symbol 401 or data symbol 402)".

As described earlier, phase changer 209B receives baseband signal 208B and control signal 200, performs phase change on baseband signal 208B based on control signal 200, and outputs phase-changed signal 210B. Baseband signal 208B is a function of symbol number i (i is an integer equal to or greater than 0) and is represented as y'(i). Then, phase-changed signal 210B (y(i)) can be represented as $y(i)=e^{j\times\tau(i)}\times y'(i)$ (j is an imaginary unit). The operation of phase changer 209B may be cyclic delay diversity (CDD) (cyclic shift diversity (CSD)) described in NPTL 2 and NPTL 3. Phase changer 209B is characterized by performing phase change on symbols in a frequency axis direction. For example, phase change is performed on symbols such as data symbols, pilot symbols, and control information symbols. Therefore, in this case, target symbols of symbol number i are symbols such as data symbols, pilot symbols, control information symbols, and preambles (the other symbols). In the case of FIG. 19, phase changer 209B, which performs phase change on baseband signal 208B, performs phase change on each symbol illustrated in FIG. 5.

Therefore, in the frame of FIG. 5, phase changer 209B of FIG. 19 performs phase change on all the symbols of carriers 1 to 36 and time $1 (in this case, all the symbols are the other symbol 503).

Similarly,

"phase changer 209B of FIG. 19 performs phase change on all the symbols of carriers 1 to 36 and time $2 (in this case, all the symbols are the other symbol 503)", "phase changer 209B of FIG. 19 performs phase change on all the symbols of carriers 1 to 36 and time $3 (in this case, all the symbols are the other symbol 503)", "phase changer 209B of FIG. 19 performs phase change on all the symbols of carriers 1 to 36 and time $4 (in this case, all the symbols are the other symbol 503)", "phase changer 209B of FIG. 19 performs phase change on all the symbols of carriers 1 to 36 and time $5 (in this case, all the symbols are pilot symbol 501 or data symbol 502)", "phase changer 209B of FIG. 19 performs phase change on all the symbols of carriers 1 to 36 and time $6 (in this case, all the symbols are pilot symbol 501 or data symbol 502)", "phase changer 209B of FIG. 19 performs phase change on all the symbols of carriers 1 to 36 and time $7 (in this case, all the symbols are pilot symbol 501 or data symbol 502)", "phase changer 209B of FIG. 19 performs phase change on all the symbols of carriers 1 to 36 and time $8 (in this case, all the symbols are pilot symbol 501 or data symbol 502)", "phase changer 209B of FIG. 19 performs phase change on all the symbols of carriers 1 to 36 and time $9 (in this case, all the symbols are pilot symbol 501 or data symbol 502)", "phase changer 209B of FIG. 19 performs phase change on all the symbols of carriers 1 to 36 and time $10 (in this case, all the symbols are pilot symbol 501 or data symbol 502)", and "phase changer 209B of FIG. 19 performs phase change on all the symbols of carriers 1 to 36 and time $11 (in this case, all the symbols are pilot symbol 501 or data symbol 502)".

FIG. 13 is a diagram illustrating the frame structure of transmission signal 108_A of FIG. 1 different from FIG. 4. Details have been described in the first exemplary embodiment, and thus description thereof will be omitted.

FIG. 14 is a diagram illustrating the frame structure of transmission signal 108_B of FIG. 1 different from FIG. 5. Details have been described in the first exemplary embodiment, and thus description thereof will be omitted.

When a symbol is present at carrier A and time $B of FIG. 13 and when a symbol is present at carrier A and time $B of FIG. 14, the symbol at carrier A and time $B of FIG. 13 and the symbol at carrier A and time $B of FIG. 14 are transmitted at the same time and the same frequency. Note that the frame structures of FIGS. 13 and 14 are merely examples.

The other symbols in FIGS. 13 and 14 are symbols corresponding to "preamble signal 252 and control information symbol signal 253 in FIG. 19". Therefore, the other symbol 503 of FIG. 14 at the same time and the same frequency (same carrier) as the other symbol 403 of FIG. 13 transmits the same data (same control information) when the control information is transmitted.

Note that it is assumed that the reception apparatus simultaneously receives the frame of FIG. 13 and the frame of FIG. 14, but even by receiving only the frame of FIG. 13 or only the frame of FIG. 14, the reception apparatus can obtain data transmitted by the transmission apparatus.

Phase changer 209A receives baseband signal 208A and control signal 200, performs phase change on baseband signal 208A based on control signal 200, and then outputs phase-changed signal 210A. Baseband signal 208A is a function of symbol symbol number i (i is an integer equal to or greater than 0) and is represented as x'(i). Then, phase-changed signal 210A (x(i)) can be represented as $x(i)=e^{j \times \varepsilon(i)} \times x'(i)$ (j is an imaginary unit). The operation of phase changer 209A may be cyclic delay diversity (CDD) (cyclic shift diversity (CSD)) described in NPTL 2 and NPTL 3. Phase changer 209A is characterized by performing phase change on symbols in a frequency axis direction. For example, phase change is performed on symbols such as data symbols, pilot symbols, and control information symbols. At this time, the null symbol can also be considered as a phase change target. Therefore, in this case, target symbols of symbol number i are symbols such as data symbols, pilot symbols, control information symbols, preambles (the other symbols) and null symbols. However, even if phase change is performed on the null symbol, the signal before the phase change and the signal after the phase change are the same (in-phase component I is zero (0) and quadrature component Q is zero (0)). Therefore, it can be interpreted that the null symbol is not the phase change target. In FIG. 19, phase changer 209A, which performs phase change on baseband signal 208A, performs phase change on each symbol illustrated in FIG. 13.

Therefore, in the frame of FIG. 13, phase changer 209A of FIG. 19 performs phase change on all the symbols of carriers 1 to 36 and time $1 (in this case, all the symbols are the other symbol 403). However, the handling of phase change of null symbol 1301 is as described above.

Similarly,

"phase changer 209A of FIG. 19 performs phase change on all the symbols of carriers 1 to 36 and time $2 (in this case, all the symbols are the other symbol 403). However, the handling of phase change of null symbol 1301 is as described above".

"Phase changer 209A of FIG. 19 performs phase change on all the symbols of carriers 1 to 36 and time $3 (in this case, all the symbols are the other symbol 403). However, the handling of phase change of null symbol 1301 is as described above".

"Phase changer 209A of FIG. 19 performs phase change on all the symbols of carriers 1 to 36 and time $4 (in this case, all the symbols are the other symbol 403). However, the handling of phase change of null symbol 1301 is as described above".

"Phase changer 209A of FIG. 19 performs phase change on all the symbols of carriers 1 to 36 and time $5 (in this case, all the symbols are pilot symbol 401 or data symbol 402). However, the handling of phase change of null symbol 1301 is as described above".

"Phase changer 209A of FIG. 19 performs phase change on all the symbols of carriers 1 to 36 and time $6 (in this case, all the symbols are pilot symbol 401 or data symbol 402). However, the handling of phase change of null symbol 1301 is as described above".

"Phase changer 209A of FIG. 19 performs phase change on all the symbols of carriers 1 to 36 and time $7 (in this case, all the symbols are pilot symbol 401 or data symbol 402). However, the handling of phase change of null symbol 1301 is as described above".

"Phase changer 209A of FIG. 19 performs phase change on all the symbols of carriers 1 to 36 and time $8 (in this case, all the symbols are pilot symbol 401 or data symbol 402). However, the handling of phase change of null symbol 1301 is as described above".

"Phase changer 209A of FIG. 19 performs phase change on all the symbols of carriers 1 to 36 and time $9 (in this case, all the symbols are pilot symbol 401 or data symbol 402). However, the handling of phase change of null symbol 1301 is as described above".

"Phase changer 209A of FIG. 19 performs phase change on all the symbols of carriers 1 to 36 and time $10 (in this case, all the symbols are pilot symbol 401 or data symbol 402). However, the handling of phase change of null symbol 1301 is as described above".

"Phase changer 209A of FIG. 19 performs phase change on all the symbols of carriers 1 to 36 and time $11 (in this case, all the symbols are pilot symbol 401 or data symbol 402). However, the handling of phase change of null symbol 1301 is as described above".

. . .

The phase change value in phase changer 209A is represented as Ω(i). Baseband signal 208A is x'(i), and phase-changed signal 210A is x(i). Therefore, x(i)=Ω(i)×x'(i) holds true.

For example, the phase change value is set by formula (38). Q is an integer equal to or greater than 2, and Q is a phase change cycle. j is an imaginary unit. However, formula (38) is merely an example and the phase change value is not limited to this formula.

For example, Ω(i) may be set to perform phase change so as to have the cycle Q.

Furthermore, for example, in FIGS. 4 and 13, the same phase change value may be provided to the same carrier, and the phase change value may be set for each carrier. For example, this will be as follows.

For carrier 1 in FIGS. 4 and 13, regardless of time, the phase change value is formula (39).
For carrier 2 in FIGS. 4 and 13, regardless of time, the phase change value is formula (40).
For carrier 3 in FIGS. 4 and 13, regardless of time, the phase change value is formula (41).
For carrier 4 in FIGS. 4 and 13, regardless of time, the phase change value is formula (42).
Operation examples of phase changer 209A of FIG. 19 have been described above.

Phase changer 209B receives baseband signal 208B and control signal 200, performs phase change on baseband signal 208B based on control signal 200, and then outputs phase-changed signal 210B. Baseband signal 208B is a function of symbol symbol number i (i is an integer equal to or greater than 0) and is represented as y'(i). Then, phase-changed signal 210B (y(i)) can be represented as y(i)=$e^{j\times\tau_{(i)}}$×y'(i) (j is an imaginary unit). The operation of phase changer 209B may be cyclic delay diversity (CDD) (cyclic shift diversity (CSD)) described in NPTL 2 and NPTL 3. Phase changer 209B is characterized by performing phase change on symbols in a frequency axis direction. For example, phase change is performed on symbols such as data symbols, pilot symbols, and control information symbols. At this time, the null symbol can also be considered as a phase change target. Therefore, in this case, target symbols of symbol number i are symbols such as data symbols, pilot symbols, control information symbols, preambles (the other symbols) and null symbols. However, even if phase change is performed on the null symbol, the signal before the phase change and the signal after the phase change are the same (in-phase component I is zero (0) and quadrature component Q is zero (0)). Therefore, it can be interpreted that the null symbol is not the phase change target. In the case of FIG. 19, phase changer 209B, which performs phase change on baseband signal 208B, performs phase change on each symbol illustrated in FIG. 14.

Therefore, in the frame of FIG. 14, phase changer 209B of FIG. 19 performs phase change on all the symbols of carriers 1 to 36 and time $1 (in this case, all the symbols are the other symbol 503). However, the handling of phase change of null symbol 1301 is as described above.

Similarly,

"phase changer 209B of FIG. 19 performs phase change on all the symbols of carriers 1 to 36 and time $2 (in this case, all the symbols are the other symbol 503). However, the handling of phase change of null symbol 1301 is as described above".

"Phase changer 209B of FIG. 19 performs phase change on all the symbols of carriers 1 to 36 and time $3 (in this case, all the symbols are the other symbol 503). However, the handling of phase change of null symbol 1301 is as described above".

"Phase changer 209B of FIG. 19 performs phase change on all the symbols of carriers 1 to 36 and time $4 (in this case, all the symbols are the other symbol 503). However, the handling of phase change of null symbol 1301 is as described above".

"Phase changer 209B of FIG. 19 performs phase change on all the symbols of carriers 1 to 36 and time $5 (in this case, all the symbols are pilot symbol 501 or data symbol 502). However, the handling of phase change of null symbol 1301 is as described above".

"Phase changer 209B of FIG. 19 performs phase change on all the symbols of carriers 1 to 36 and time $6 (in this case, all the symbols are pilot symbol 501 or data symbol 502). However, the handling of phase change of null symbol 1301 is as described above".

"Phase changer 209B of FIG. 19 performs phase change on all the symbols of carriers 1 to 36 and time $7 (in this case, all the symbols are pilot symbol 501 or data symbol 502). However, the handling of phase change of null symbol 1301 is as described above".

"Phase changer 209B of FIG. 19 performs phase change on all the symbols of carriers 1 to 36 and time $8 (in this case, all the symbols are pilot symbol 501 or data symbol 502). However, the handling of phase change of null symbol 1301 is as described above".

"Phase changer 209B of FIG. 19 performs phase change on all the symbols of carriers 1 to 36 and time $9 (in this case, all the symbols are pilot symbol 501 or data symbol 502). However, the handling of phase change of null symbol 1301 is as described above".

"Phase changer 209B of FIG. 19 performs phase change on all the symbols of carriers 1 to 36 and time $10 (in this case, all the symbols are pilot symbol 501 or data symbol 502). However, the handling of phase change of null symbol 1301 is as described above".

"Phase changer 209B of FIG. 19 performs phase change on all the symbols of carriers 1 to 36 and time $11 (in this case, all the symbols are pilot symbol 501 or data symbol 502). However, the handling of phase change of null symbol 1301 is as described above".

The phase change value in phase changer 209B is represented as Ω(i). Baseband signal 208B is y'(i), and phase-changed signal 210B is y(i). Therefore, y(i)=Δ(i)×y'(i) holds true.

For example, the phase change value is set as follows. β is an integer equal to or greater than 2, and β is a phase change cycle. Note that the values of Q and β in formula (38) are preferably different from each other.

[Formula 49]

$$\Delta(i) = e^{j\frac{2\times\pi\times i}{R}}$$ Formula (49)

j is an imaginary unit. However, formula (49) is merely an example and the phase change value is not limited to this formula.

For example, Δ(i) may be set to perform phase change so as to have the cycle R.

Note that the phase change method differs between phase changer 209A and phase changer 209B. For example, the cycle may be the same or different.

Furthermore, for example, in FIGS. 5 and 14, the same phase change value may be provided to the same carrier, and the phase change value may be set for each carrier. For example, this will be as follows.

For carrier 1 in FIGS. 5 and 14, regardless of time, the phase change value is formula (39).

For carrier 2 in FIGS. 5 and 14, regardless of time, the phase change value is formula (40).

For carrier 3 in FIGS. 5 and 14, regardless of time, the phase change value is formula (41).

For carrier 4 in FIGS. 5 and 14, regardless of time, the phase change value is formula (42).

. . .

Although the phase change values are described as formulas (39), (40), (41) and (42), the phase change method differs between phase changer 209A and phase changer 209B.

Operation examples of phase changer 209B of FIG. 19 have been described above.

Advantageous effects that can be obtained by phase changers 209A and 209B of FIG. 19 will be described.

It is assumed that the control information symbol is included in the other symbols 403 and 503 of "the frames of FIGS. 4 and 5" or "the frames of FIGS. 13 and 14". As described earlier, when transmitting the control information, the other symbol 503 of FIG. at the same time and the same frequency (same carrier) as the other symbol 403 transmits the same data (same control information).

Here, consider the following cases.

Case 2:

The control information symbol is transmitted using one of antenna unit #A (109_A) and antenna unit #B (109_B) of FIG. 1.

When transmission is performed as in "case 2", since the number of antennas that transmit the control information symbol is 1, a gain of space diversity is smaller than in a case of "transmitting the control information symbol using both antenna unit #A (109_A) and antenna unit #B (109_B)", and thus data reception quality deteriorates even if the reception apparatus of FIG. 8 performs reception in "case 2". Therefore, in terms of improvement in data reception quality, it is preferable "to transmit the control information symbol using both "antenna unit #A (109_A) and antenna unit #B (109_B)".

Case 3:

The control information symbol is transmitted using both of antenna unit #A (109_A) and antenna unit #B (109_B) of FIG. 1. However, phase changers 209A and 209B in FIG. 19 do not perform phase change.

When transmission is performed as in "case 3", since the modulated signal transmitted from antenna unit #A 109_A is the same as the modulated signal transmitted from antenna unit #B 109_B (or there is a specified phase shift), depending on a radio wave propagation environment, the reception apparatus of FIG. 8 may have a very poor reception signal and both of the modulated signals may be affected by the same multipath. This will cause a problem that data reception quality deteriorates in the reception apparatus of FIG. 8.

To mitigate this problem, phase changers 209A and 209B are provided in FIG. 19. This enables phase change in a time or frequency direction, allowing the reception apparatus of FIG. 8 to reduce the possibility of a poor reception signal. Also, it is likely that there is a difference between an influence of the multipath received by the modulated signal transmitted from antenna unit #A 109_A and an influence of the multipath received by the modulated signal transmitted from antenna unit #B 109_B. Therefore, it is likely that a diversity gain is obtained, whereby data reception quality improves in the reception apparatus of FIG. 8.

For the above reason, phase changers 209A and 209B are provided in FIG. 19 to perform phase change.

The other symbol 403 and the other symbol 503 include, other than the control information symbol, for example, a symbol for signal detection, a symbol for performing frequency synchronization and time synchronization, and a symbol for channel estimation (symbol for estimating propagation path fluctuation) for demodulating and decoding the control information symbol. In addition, "the frames of FIGS. 4 and 5" or "the frames of FIGS. 13 and 14" include pilot symbols 401 and 501. Using these symbols will make it possible to demodulate and decode the control information symbol more accurately.

In "the frames of FIGS. 4 and 5" or "the frames of FIGS. 13 and 14", data symbol 402 and data symbol 502 transmit multiple streams (perform MIMO transmission) by using the same frequency (band) and the same time. Demodulating these data symbols requires to use the symbol for signal detection, the symbol for frequency synchronization and time synchronization, and the symbol for channel estimation (symbol for estimating propagation path fluctuation) included in the other symbol 403 and the other symbol 503.

At this time, as described above, phase changers 209A and 209B perform phase change on "the symbol for signal detection, the symbol for frequency synchronization and time synchronization, and the symbol for channel estimation (symbol for estimating propagation path fluctuation) included in the other symbol 403 and the other symbol 503".

Under such circumstances, if this process is not reflected in data symbol 402 and data symbol 502, when the reception apparatus demodulates and decodes data symbol 402 and data symbol 502, it is necessary to perform demodulation and decoding reflecting the process for the phase change performed by phase changers 209A and 209B, and the process is likely to be complicated. This is because phase changers 209A and 209B perform phase change on "the symbol for signal detection, the symbol for frequency synchronization and time synchronization, and the symbol for channel estimation (symbol for estimating propagation path fluctuation) included in the other symbol 403 and the other symbol 503".

However, as illustrated in FIG. 19, when phase changers 209A and 209B perform phase change on data symbol 402 and data symbol 502, there is an advantage that the reception apparatus can (easily) demodulate and decode data symbol 402 and data symbol 502 by using the channel estimation signal (propagation path fluctuation estimation signal) estimated using "the symbol for signal detection, the symbol for frequency synchronization and time synchronization, and the symbol for channel estimation (symbol for estimating propagation path fluctuation) included in the other symbol 403 and the other symbol 503".

In addition, as illustrated in FIG. 19, when phase changer 209A and 209B perform phase change on data symbol 402 and data symbol 502, it is possible to reduce an influence of a sharp drop in electric field intensity in a frequency axis in the multipath. This may improve data reception quality of data symbol 402 and data symbol 502.

Thus, a characteristic point is that "the target symbol on which phase changer 205B performs phase change" is different from "the target symbol on which phase changers 209A and 209B perform phase change".

As described above, phase changer 205B of FIG. 19 performing phase change can improve data reception quality of data symbol 402 and data symbol 502 in the reception apparatus, particularly in the LOS environment. Furthermore, phase changers 209A and 209B of FIG. 19 performing phase change will improve, for example, reception quality of the control information symbol included in "the frames of FIGS. 4 and 5" or "the frames of FIGS. 13 and 14" in the reception apparatus. Phase changers 209A and 209B of FIG. 19 performing phase change will also simplify demodulation and decoding operations of data symbol 402 and data symbol 502.

Note that phase changer 205B of FIG. 19 performing phase change can improve data reception quality of data symbol 402 and data symbol 502 in the reception apparatus, particularly in the LOS environment. Furthermore, phase changers 209A and 209B of FIG. 19 performing phase change on data symbol 402 and data symbol 502 improves reception quality of data symbol 402 and data symbol 502.

Note that Q in formula (38) may be an integer equal to or less than −2, and at this time, the phase change cycle is the absolute value of Q. This point can also be applied to the first exemplary embodiment.

R in formula (49) may be an integer equal to or less than −2, and at this time, the phase change cycle is the absolute value of R.

Also, when the information described in supplementary 1 is considered, the cyclic delay amount set by phase changer 209A and the cyclic delay amount set by phase changer 209B preferably have different values.

Fourth Exemplary Embodiment

The present exemplary embodiment will describe a method for implementing a configuration different from the configuration of FIG. 2 in the first exemplary embodiment.

FIG. 1 is a diagram illustrating one exemplary configuration of a transmission apparatus such as, for example, a base station, an access point, and a broadcasting station according to the present exemplary embodiment. Details have been described in the first exemplary embodiment, and thus description thereof will be omitted.

Signal processor 106 receives mapped signals 105_1 and 105_2, signal group 110, and control signal 100, performs signal processing based on control signal 100, and then outputs signal-processed signals 106_A and 106_B. At this time, signal-processed signal 106_A is represented as $u1(i)$, and signal-processed signal 106_B is represented as $u2(i)$ ($i$ is a symbol number, and for example, $i$ is an integer equal to or greater than 0). Note that details of the signal processing will be described with reference to FIG. 20.

Figure 20:
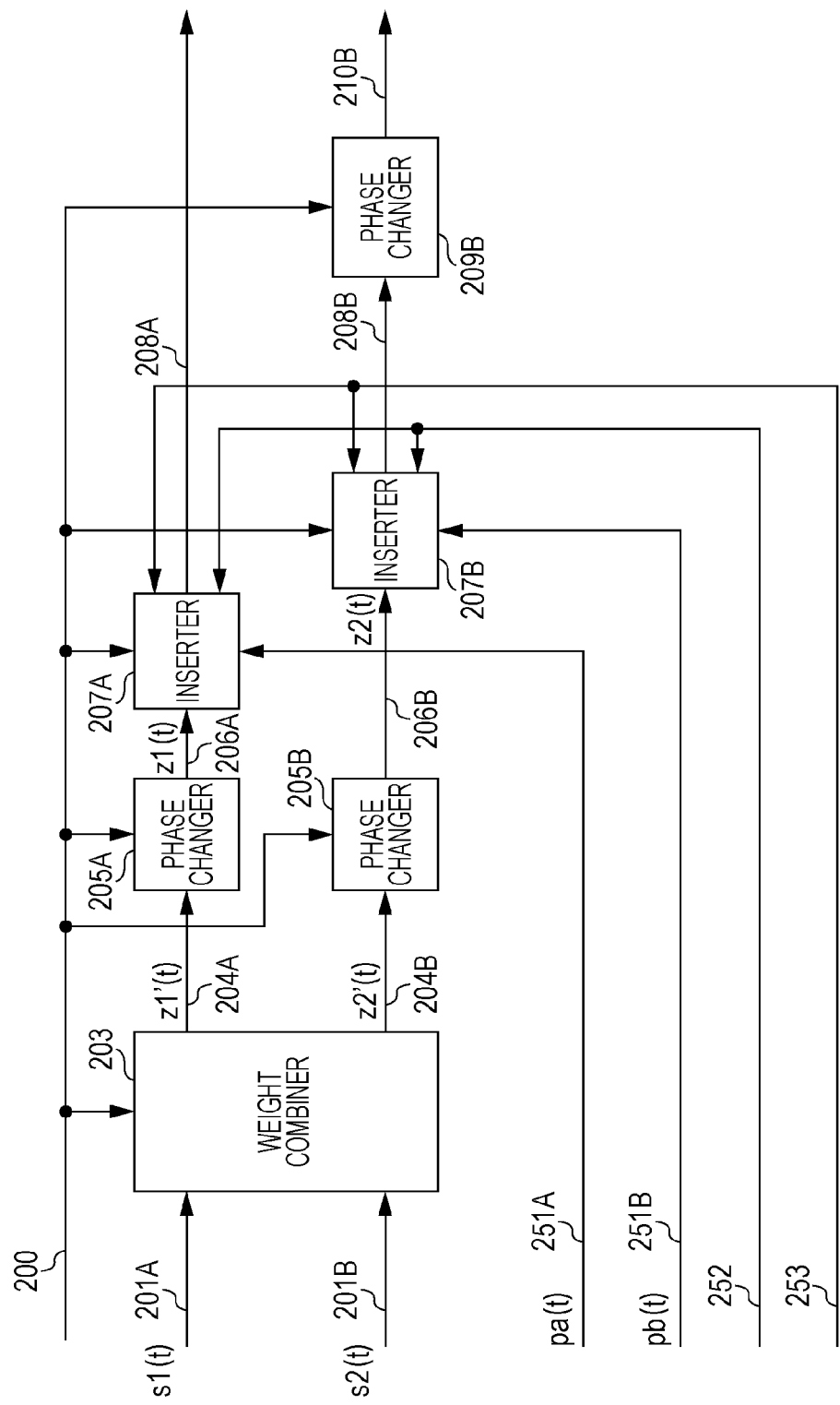
FIG. 20 is a diagram illustrating one exemplary configuration of the signal processor of FIG. 1.

FIG. 20 is a diagram illustrating one example in a configuration of signal processor 106 in FIG. 1. Weight combiner (precoder) 203 receives mapped signal 201A (corresponding to mapped signal 105_1 of FIG. 1), mapped signal 201B (corresponding to mapped signal 105_2 of FIG. 1), and control signal 200 (corresponding to control signal 100 of FIG. 1). Weight combiner (precoder) 203 performs weighting (precoding) based on control signal 200, and then outputs weighted signal 204A and weighted signal 204B. At this time, mapped signal 201A is represented as $s1(t)$, mapped signal 201B as $s2(t)$, weighted signal 204A as $z1'(t)$, and weighted signal 204B as $z2'(t)$. Note that t is time as one example. It is assumed that $s1(t)$, $s2(t)$, $z1'(t)$, and $z2'(t)$ are defined as complex numbers (hence may be real numbers).

Here, each signal is handled as a function of time, but each signal may be a function of "frequency (carrier number)" or a function of "time and frequency". Alternatively, each signal may be a function of "symbol number". This point also applies to the first exemplary embodiment.

Weight combiner (precoder) 203 performs the following calculation.

[Formula 50]

$$\begin{pmatrix} z1'(i) \\ z2'(i) \end{pmatrix} = \begin{pmatrix} a & b \\ c & b \end{pmatrix} \begin{pmatrix} s1(i) \\ s2(i) \end{pmatrix} \qquad \text{Formula (50)}$$

Then, phase changer 205A receives weighted signal 204A and control signal 200. Based on control signal 200, phase changer 205A performs phase change on weighted signal 204A and then outputs phase-changed signal 206A. Note that phase-changed signal 206A is represented as $z1(t)$, and $z1(t)$ is defined as a complex number ($z1(t)$ may be a real number).

A specific operation of phase changer 205A will be described. For example, phase changer 205A performs phase change of $w(i)$ on $z1'(i)$. Therefore, $z1(i)$ can be represented as $z1(i) = w(i) \times z1'(i)$ ($i$ is a symbol number ($i$ is an integer equal to or greater than 0)).

For example, the phase change value is set as follows.

[Formula 51]

$$w(i) = e^{j\frac{2 \times \pi \times i}{M}} \qquad \text{Formula (51)}$$

M is an integer equal to or greater than 2, and M is a phase change cycle. If M is set as an odd number equal to or greater than 3, data reception quality may improve. However, formula (51) is merely an example and the phase change value is not limited to this formula. Therefore, it is assumed that the phase change value $w(i)$ is represented as $w(i) = e^{j \times \delta(i)}$.

Then, phase changer 205B receives weighted signal 204B and control signal 200. Based on control signal 200, phase changer 205B performs phase change on weighted signal 204B and then outputs phase-changed signal 206B. Note that phase-changed signal 206B is represented as $z2(t)$, and $z2(t)$ is defined as a complex number ($z2(t)$ may be a real number).

A specific operation of phase changer 205B will be described. For example, phase changer 205B performs phase change of $y(i)$ on $z2'(i)$. Therefore, $z2(i)$ can be represented as $z2(i) = y(i) \times z2'(i)$ ($i$ is a symbol number ($i$ is an integer equal to or greater than 0)).

For example, a phase change value is set by formula (2). N is an integer equal to or greater than 2, and N is a phase change cycle. N≠M. If N is set as an odd number equal to or greater than 3, data reception quality may improve. However, formula (2) is merely an example and the phase change value is not limited to this formula. Therefore, it is assumed that the phase change value $y(i)$ is represented as $y(i) = e^{j \times \delta(i)}$.

At this time, z1(i) and z2(i) can be represented by the following formula.

[Formula 52]

$$\begin{pmatrix} z1(i) \\ z2(i) \end{pmatrix} = \begin{pmatrix} w(i) & 0 \\ 0 & y(i) \end{pmatrix}\begin{pmatrix} a & b \\ c & d \end{pmatrix}\begin{pmatrix} s1(i) \\ s2(i) \end{pmatrix} = \begin{pmatrix} e^{j\times\lambda(i)} & 0 \\ 0 & e^{j\times\delta(i)} \end{pmatrix}\begin{pmatrix} a & b \\ c & d \end{pmatrix}\begin{pmatrix} s1(i) \\ s2(i) \end{pmatrix}$$

Formula (52)

Note that δ(i) and λ(i) are real numbers. z1(i) and z2(i) are transmitted from the transmission apparatus at the same time and at the same frequency (same frequency band). In formula (52), the phase change value is not limited to formula (2) and formula (52), and for example, a method for periodically or regularly changing the phase can be considered.

As described in the first exemplary embodiment, formulas (5) to (36) and the like are considered as a (precoding) matrix in formulas (50) and (52). However, the precoding matrix is not limited to these formulas. This also applies to the first exemplary embodiment.

Inserter 207A receives weighted signal 204A, pilot symbol signal (pa(t)) (t: time) (251A), preamble signal 252, control information symbol signal 253, and control signal 200. Based on information about a frame structure included in control signal 200, inserter 207A outputs baseband signal 208A based on the frame structure.

Similarly, inserter 207B receives phase-changed signal 206B, pilot symbol signal (pb(t)) (251B), preamble signal 252, control information symbol signal 253, and control signal 200. Based on the information about the frame structure included in control signal 200, inserter 207B outputs baseband signal 208B based on the frame structure.

Phase changer 209B receives baseband signal 208B and control signal 200, performs phase change on baseband signal 208B based on control signal 200, and then outputs phase-changed signal 210B. Baseband signal 208B is a function of symbol number i (i is an integer equal to or greater than 0) and is represented as x'(i). Then, phase-changed signal 210B (x(i)) can be represented as x(i)=eix× x'(i) (j is an imaginary unit).

Note that as described in the first exemplary embodiment, an operation of phase changer 209B may be cyclic delay diversity (CDD) (cyclic shift diversity (CSD)) described in NPTL 2 and NPTL 3. Phase changer 209B is characterized by performing phase change on symbols in a frequency axis direction. For example, phase change is performed on symbols such as data symbols, pilot symbols, and control information symbols.

FIG. 3 is a diagram illustrating one exemplary configuration of wireless units 107_A and 107_B of FIG. 1. Details have been described in the first exemplary embodiment, and thus description thereof will be omitted.

FIG. 4 is a diagram illustrating the frame structure of transmission signal 108_A of FIG. 1. Details have been described in the first exemplary embodiment, and thus description thereof will be omitted.

FIG. 5 is a diagram illustrating the frame structure of transmission signal 108_B of FIG. 1. Details have been described in the first exemplary embodiment, and thus description thereof will be omitted.

When a symbol is present at carrier A and time $B of FIG. 4 and when a symbol is present at carrier A and time $B of FIG. 5, the symbol at carrier A and time $B of FIG. 4 and the symbol at carrier A and time $B of FIG. 5 are transmitted at the same time and the same frequency. Note that the frame structure is not limited to the frame structures in FIGS. 4 and 5, and FIGS. 4 and 5 are merely examples of the frame structure.

The other symbols in FIGS. 4 and 5 are symbols corresponding to "preamble signal 252 and control information symbol signal 253 in FIG. 2". Therefore, the other symbol 503 of FIG. 5 at the same time and the same frequency (same carrier) as the other symbol 403 of FIG. 4 transmits the same data (same control information) when the control information is transmitted.

Note that it is assumed that the reception apparatus simultaneously receives the frame of FIG. 4 and the frame of FIG. 5, but even by receiving only the frame of FIG. 4 or only the frame of FIG. 5, the reception apparatus can obtain the data transmitted by the transmission apparatus.

FIG. 6 is a diagram illustrating one exemplary configuration of a part regarding control information generation for generating control information signal 253 of FIG. 2. Details have been described in the first exemplary embodiment, and thus description thereof will be omitted.

FIG. 7 is a diagram illustrating one exemplary configuration of antenna unit #A (109_A) and antenna unit #B (109_B) of FIG. 1 (an example in which antenna unit #A (109_A) and antenna unit #B (109_B) each include a plurality of antennas). Details have been described in the first exemplary embodiment, and thus description thereof will be omitted.

FIG. 8 is a diagram illustrating one exemplary configuration of the reception apparatus that receives a modulated signal of, for example, the transmission signal of the frame structure of FIG. 4 or 5 transmitted by the transmission apparatus of FIG. 1. Details have been described in the first exemplary embodiment, and thus description thereof will be omitted.

FIG. 10 is a diagram illustrating one exemplary configuration of antenna unit #X (801X) and antenna unit #Y (801Y) of FIG. 8. This is an example in which antenna unit #X (801X) and antenna unit #Y (801Y) each include a plurality of antennas. Details of FIG. 10 have been described in the first exemplary embodiment, and thus description thereof will be omitted.

Next, as illustrated in FIG. 20, phase changers 205A and 205B and phase changer 209A are inserted into signal processor 106 of the transmission apparatus illustrated in FIG. 1. Features and advantageous effects thereof will be described.

As described with reference to FIGS. 4 and 5, phase changers 205A and 205B perform precoding (weighting) on mapped signal s1(i) (201A) (i is a symbol number and is an integer equal to or greater than 0) obtained by performing mapping using the first series, and mapped signal s2(i) (201B) obtained by performing mapping using the second series. Phase changers 205A and 205B perform phase change on obtained weighted signals 204A and 204B. Then, phase-changed signal 206A and phase-changed signal 206B are transmitted at the same frequency and the same time. Therefore, in FIGS. 4 and 5, phase change is performed on data symbol 402 of FIG. 4 and data symbol 502 of FIG. 5.

For example, FIG. 11 is a diagram illustrating carriers 1 to 5 and time $4 to $6 extracted from the frame of FIG. 4. Note that as in FIG. 4, reference numeral 401 represents a pilot symbol, reference numeral 402 represents a data symbol, and reference numeral 403 represents the other symbol.

As described above, in the symbols illustrated in FIG. 11, phase changer 205A performs phase change on the data symbol of (carrier 1, time $5), the data symbol of (carrier 2, time $5), the data symbol of (carrier 3, time $5), the data symbol of (carrier 4, time $5), the data symbol of (carrier 5, time $5), the data symbol of (carrier 1, time $6), the data symbol of (carrier 2, time $6), the data symbol of (carrier 4, time $6), and the data symbol of (carrier 5, time $6).

Therefore, in the symbols illustrated in FIG. 11, the phase change value of the data symbol of (carrier 1, time $5) is "$e^{j\times\lambda 15(i)}$", the phase change value of the data symbol of (carrier 2, time $5) is "$e^{j\times\lambda 25(i)}$", the phase change value of the data symbol of (carrier 3, time $5) is "$e^{j\times\lambda 35(i)}$", the phase change value of the data symbol of (carrier 4, time $5) is "$e^{j\times\lambda 45(i)}$", the phase change value of the data symbol of (carrier 5, time $5) is "$e^{j\times\lambda 55(i)}$", the phase change value of the data symbol of (carrier 1, time $6) is "$e^{j\times\lambda 16(i)}$", the phase change value of the data symbol of (carrier 2, time $6) is "$e^{j\times\lambda 26(i)}$", the phase change value of the data symbol of (carrier 4, time $6) is "$e^{j\times\lambda 46(i)}$", and the phase change value of the data symbol of (carrier 5, time $6) is "$e^{j\times\lambda 56(i)}$".

Meanwhile, in the symbols illustrated in FIG. 11, phase changer 205A does not perform phase change on the other symbol of (carrier 1, time $4), the other symbol of (carrier 2, time $4), the other symbol of (carrier 3, time $4), the other symbol of (carrier 4, time $4), the other symbol of (carrier 5, time $4), or the pilot symbol of (carrier 3, time $6).

This point is a characteristic point of phase changer 205A. Note that as illustrated in FIG. 4, data carriers are arranged at "the same carrier and the same time" as the symbols to be subjected to phase change in FIG. 11, including the data symbol of (carrier 1, time $5), the data symbol of (carrier 2, time $5), the data symbol of (carrier 3, time $5), the data symbol of (carrier 4, time $5), the data symbol of (carrier 5, time $5), the data symbol of (carrier 1, time $6), the data symbol of (carrier 2, time $6), the data symbol of (carrier 4, time $6), and the data symbol of (carrier 5, time $6). That is, in FIG. 4, (carrier 1, time $5) is a data symbol, (carrier 2, time $5) is a data symbol, (carrier 3, time $5) is a data symbol, (carrier 4, time $5) is a data symbol, (carrier 5, time $5) is a data symbol, (carrier 1, time $6) is a data symbol, (carrier 2, time $6) is a data symbol, (carrier 4, time $6) is a data symbol, and (carrier 5, time $6) is a data symbol. That is, phase changer 205A performs phase change on the data symbols performing MIMO transmission (transmitting multiple streams).

Note that examples of phase change to be performed on data symbols by phase changer 205A include a method for performing periodical phase change (phase change cycle N) on the data symbols by formula (50). However, the method for performing phase change on data symbols is not limited to this method.

For example, FIG. 11 is a diagram illustrating carriers 1 to 5 and time $4 to $6 extracted from the frame of FIG. 5. Note that as in FIG. 5, reference numeral 501 represents a pilot symbol, reference numeral 502 represents a data symbol, and reference numeral 503 represents the other symbol.

As described above, in the symbols illustrated in FIG. 11, phase changer 205B performs phase change on the data symbol of (carrier 1, time $5), the data symbol of (carrier 2, time $5), the data symbol of (carrier 3, time $5), the data symbol of (carrier 4, time $5), the data symbol of (carrier 5, time $5), the data symbol of (carrier 1, time $6), the data symbol of (carrier 2, time $6), the data symbol of (carrier 4, time $6), and the data symbol of (carrier 5, time $6).

Therefore, in the symbols illustrated in FIG. 11, the phase change value of the data symbol of (carrier 1, time $5) is "$e^{j\times\delta 15(i)}$", the phase change value of the data symbol of (carrier 2, time $5) is "$e^{j\times\delta 25(i)}$", the phase change value of the data symbol of (carrier 3, time $5) is "$e^{j\times\delta 35(i)}$", the phase change value of the data symbol of (carrier 4, time $5) is "$e^{j\times\delta 45(i)}$", the phase change value of the data symbol of (carrier 5, time $5) is "$e^{j\times\delta 55(i)}$", the phase change value of the data symbol of (carrier 1, time $6) is "$e^{j\times\delta 16(i)}$", the phase change value of the data symbol of (carrier 2, time $6) is "$e^{j\times\delta 26(i)}$", the phase change value of the data symbol of (carrier 4, time $6) is "$e^{j\times\delta 46(i)}$", and the phase change value of the data symbol of (carrier 5, time $6) is "$e^{j\times\delta 46(i)}$".

Meanwhile, in the symbols illustrated in FIG. 11, phase changer 205B does not perform phase change on the other symbol of (carrier 1, time $4), the other symbol of (carrier 2, time $4), the other symbol of (carrier 3, time $4), the other symbol of (carrier 4, time $4), the other symbol of (carrier 5, time $4), or the pilot symbol of (carrier 3, time $6).

This point is a characteristic point of phase changer 205B. Note that as illustrated in FIG. 4, data carriers are arranged at "the same carrier and the same time" as the symbols to be subjected to phase change in FIG. 11, including the data symbol of (carrier 1, time $5), the data symbol of (carrier 2, time $5), the data symbol of (carrier 3, time $5), the data symbol of (carrier 4, time $5), the data symbol of (carrier 5, time $5), the data symbol of (carrier 1, time $6), the data symbol of (carrier 2, time $6), the data symbol of (carrier 4, time $6), and the data symbol of (carrier 5, time $6). That is, in FIG. 4, (carrier 1, time $5) is a data symbol, (carrier 2, time $5) is a data symbol, (carrier 3, time $5) is a data symbol, (carrier 4, time $5) is a data symbol, (carrier 5, time $5) is a data symbol, (carrier 1, time $6) is a data symbol, (carrier 2, time $6) is a data symbol, (carrier 4, time $6) is a data symbol, and (carrier 5, time $6) is a data symbol. That is, phase changer 205B performs phase change on the data symbols performing MIMO transmission (transmitting multiple streams).

Note that examples of phase change to be performed on data symbols by phase changer 205B include a method for performing periodical phase change (phase change cycle N) on the data symbols by formula (2). However, the method for performing phase change on data symbols is not limited to this method.

Doing this will improve reception quality in the data symbol reception apparatus performing MIMO transmission (transmitting multiple streams) in an environment where direct waves are dominant, particularly in the LOS environment. This point will be described.

For example, it is assumed that the modulation scheme to be used by mapper 104 of FIG. 1 is quadrature phase shift keying (QPSK). Mapped signal 201A of FIG. 18 is a QPSK signal, and mapped signal 201B is also a QPSK signal. That is, two QPSK streams are transmitted. Then, signal processor 811 of FIG. 8 obtains, for example, 16 candidate signal points by using channel estimation signals 806_1 and 806_2. QPSK allows transmission of two bits, and a total of four bits can be transmitted by two streams. Therefore, 24=16 candidate signal points are present. Note that other 16 candidate signal points are obtained using channel estimation signals 808_1 and 8082, which however will be described in a similar way; therefore, the following description will be made focusing on the 16 candidate signal points obtained using channel estimation signals 806_1 and 806_2.

FIG. 12 is a diagram illustrating one example of this state. In both FIGS. 12(A) and 12(B), a horizontal axis is in-phase I and a vertical axis is quadrature Q, and 16 candidate signal points are present on the in-phase quadrature (IQ) plane. One of the 16 candidate signal points is the signal point transmitted by the transmission apparatus. Therefore, these are called "16 candidate signal points".

In an environment where direct waves are dominant, particularly in the LOS environment, First Case:

Consider a case where phase changers 205A and 205B of FIG. 20 are not present (that is, a case where phase change by phase changers 205A and 205B of FIG. is not performed).

In the "first case", since phase change is not performed, there is a possibility of falling into the state as illustrated in FIG. 12(A). When falling into the state of FIG. 12(A), since there are portions where the signal points are dense (distance between the signal points are short) such as "signal points 1201 and 1202", "signal points 1203, 1204, 1205 and 1206", and "signal points 1207 and 1208", data reception quality may deteriorate in the reception apparatus of FIG. 8.

To overcome this problem, phase changers 205A and 205B are inserted in FIG. 20. Insertion of phase changers 205A and 205B will lead to a mixture of the symbol numbers where the signal points are dense (distance between the signal points is short) as illustrated in FIG. 12(A), and the symbol numbers where "distance between the signal points is long" as illustrated in FIG. 12(B), depending on symbol number i. Introduction of an error correction code for this state will provide high error correction capability and allow the reception apparatus of FIG. 8 to obtain high data reception quality.

Note that in FIG. 20, phase changers 205A and 205B of FIG. 20 do not perform phase change on "pilot symbols and preambles" for performing channel estimation for demodulating (detecting) data symbols such as pilot symbols and preambles. This makes it possible to implement in data symbols "a mixture of the symbol numbers where the signal points are dense (distance between signal points is short) as illustrated in FIG. 12(A), and the symbol numbers where "distance between signal points is long" as illustrated in FIG. 12(B), depending on symbol number i".

However, even when phase changers 205A and 205B of FIG. 20 perform phase change on "pilot symbols and preambles" for performing channel estimation for demodulating (detecting) data symbols such as pilot symbols and preambles, this may "make it possible to implement in data symbols "a mixture of the symbol numbers where the signal points are dense (distance between signal points is short) as illustrated in FIG. 12(A), and the symbol numbers where "distance between signal points is long" as illustrated in FIG. 12(B), depending on symbol number i"". In this case, phase change needs to be performed through addition of some condition to the pilot symbol and preamble. For example, a method for providing a rule different from a phase change rule for data symbols and "performing phase change on pilot symbols and/or preambles" is considered. As an example, there is a method for periodically performing phase change of a cycle N on data symbols, and for periodically performing phase change of a cycle M on pilot symbols and/or preambles (N and M are each an integer equal to or greater than 2).

As described earlier, phase changer 209B receives baseband signal 208B and control signal 200, performs phase change on baseband signal 208B based on control signal 200, and outputs phase-changed signal 210B. Baseband signal 208B is a function of symbol number i (i is an integer equal to or greater than 0) and is represented as x'(i). Then, phase-changed signal 210B (x(i)) can be represented as $x(i)=e^{j\times\varepsilon(i)}\times x'(i)$ (j is an imaginary unit). The operation of phase changer 209B may be cyclic delay diversity (CDD) (cyclic shift diversity (CSD)) described in NPTL 2 and NPTL 3. Phase changer 209B is characterized by performing phase change on symbols in a frequency axis direction. For example, phase change is performed on symbols such as data symbols, pilot symbols, and control information symbols. Therefore, in this case, target symbols of symbol number i are symbols such as data symbols, pilot symbols, control information symbols, and preambles (the other symbols). In the case of FIG. 20, phase changer 209B, which performs phase change on baseband signal 208B, performs phase change on each symbol illustrated in FIG. 5.

Therefore, in the frame of FIG. 5, phase changer 209B of FIG. 20 performs phase change on all the symbols of carriers 1 to 36 and time $1 (in this case, all the symbols are the other symbol 503).

Similarly,

"phase changer 209B of FIG. 20 performs phase change on all the symbols of carriers 1 to 36 and time $2 (in this case, all the symbols are the other symbol 503)", "phase changer 209B of FIG. 20 performs phase change on all the symbols of carriers 1 to 36 and time $3 (in this case, all the symbols are the other symbol 503)", "phase changer 209B of FIG. 20 performs phase change on all the symbols of carriers 1 to 36 and time $4 (in this case, all the symbols are the other symbol 503)", "phase changer 209B of FIG. 20 performs phase change on all the symbols of carriers 1 to 36 and time $5 (in this case, all the symbols are pilot symbol 501 or data symbol 502)", "phase changer 209B of FIG. 20 performs phase change on all the symbols of carriers 1 to 36 and time $6 (in this case, all the symbols are pilot symbol 501 or data symbol 502)", "phase changer 209B of FIG. 20 performs phase change on all the symbols of carriers 1 to 36 and time $7 (in this case, all the symbols are pilot symbol 501 or data symbol 502)", "phase changer 209B of FIG. 20 performs phase change on all the symbols of carriers 1 to 36 and time $8 (in this case, all the symbols are pilot symbol 501 or data symbol 502)", "phase changer 209B of FIG. 20 performs phase change on all the symbols of carriers 1 to 36 and time $9 (in this case, all the symbols are pilot symbol 501 or data symbol 502)", "phase changer 209B of FIG. 20 performs phase change on all the symbols of carriers 1 to 36 and time $10 (in this case, all the symbols are pilot symbol 501 or data symbol 502)", and "phase changer 209B of FIG. 20 performs phase change on all the symbols of carriers 1 to 36 and time $11 (in this case, all the symbols are pilot symbol 501 or data symbol 502)".

FIG. 13 is a diagram illustrating the frame structure of transmission signal 108_A of FIG. 1 different from FIG. 4. Details have been described in the first exemplary embodiment, and thus description thereof will be omitted.

FIG. 14 is a diagram illustrating the frame structure of transmission signal 108_B of FIG. 1 different from FIG. 5. Details have been described in the first exemplary embodiment, and thus description thereof will be omitted.

When a symbol is present at carrier A and time $B of FIG. 13 and when a symbol is present at carrier A and time $B of FIG. 14, the symbol at carrier A and time $B of FIG. 13 and the symbol at carrier A and time $B of FIG. 14 are transmitted at the same time and the same frequency. Note that the frame structures of FIGS. 13 and 14 are merely examples.

The other symbols in FIGS. 13 and 14 are symbols corresponding to "preamble signal 252 and control information symbol signal 253 in FIG. 20". Therefore, the other symbol 503 of FIG. 14 at the same time and the same frequency (same carrier) as the other symbol 403 of FIG. 13 transmits the same data (same control information) when the control information is transmitted.

Note that it is assumed that the reception apparatus simultaneously receives the frame of FIG. 13 and the frame of FIG. 14, but even by receiving only the frame of FIG. 13 or only the frame of FIG. 14, the reception apparatus can obtain data transmitted by the transmission apparatus.

Phase changer 209B receives baseband signal 208B and control signal 200, performs phase change on baseband signal 208B based on control signal 200, and then outputs phase-changed signal 210B. Baseband signal 208B is a function of symbol symbol number i (i is an integer equal to or greater than 0) and is represented as x'(i). Then, phase-changed signal 210B (x(i)) can be represented as $x(i)=e^{j\times\varepsilon(i)}\times x'(i)$ (j is an imaginary unit). The operation of phase changer 209B may be cyclic delay diversity (CDD) (cyclic shift diversity (CSD)) described in NPTL 2 and NPTL 3. Phase changer 209B is characterized by performing phase change on symbols in a frequency axis direction. For example, phase change is performed on symbols such as data symbols, pilot symbols, and control information symbols. At this time, the null symbol can also be considered as a phase change target. Therefore, in this case, target symbols of symbol number i are symbols such as data symbols, pilot symbols, control information symbols, preambles (the other symbols) and null symbols. However, even if phase change is performed on the null symbol, the signal before the phase change and the signal after the phase change are the same (in-phase component I is zero (0) and quadrature component Q is zero (0)). Therefore, it can be interpreted that the null symbol is not the phase change target. In the case of FIG. 20, phase changer 209B, which performs phase change on baseband signal 208B, performs phase change on each symbol illustrated in FIG. 14.

Therefore, in the frame of FIG. 14, phase changer 209B of FIG. 20 performs phase change on all the symbols of carriers 1 to 36 and time $1 (in this case, all the symbols are the other symbol 503). However, the handling of phase change of null symbol 1301 is as described above.

Similarly,

"phase changer 209B of FIG. 20 performs phase change on all the symbols of carriers 1 to 36 and time $2 (in this case, all the symbols are the other symbol 503). However, the handling of phase change of null symbol 1301 is as described above".

"Phase changer 209B of FIG. 20 performs phase change on all the symbols of carriers 1 to 36 and time $3 (in this case, all the symbols are the other symbol 503). However, the handling of phase change of null symbol 1301 is as described above".

"Phase changer 209B of FIG. 20 performs phase change on all the symbols of carriers 1 to 36 and time $4 (in this case, all the symbols are the other symbol 503). However, the handling of phase change of null symbol 1301 is as described above".

"Phase changer 209B of FIG. 20 performs phase change on all the symbols of carriers 1 to 36 and time $5 (in this case, all the symbols are pilot symbol 501 or data symbol 502). However, the handling of phase change of null symbol 1301 is as described above".

"Phase changer 209B of FIG. 20 performs phase change on all the symbols of carriers 1 to 36 and time $6 (in this case, all the symbols are pilot symbol 501 or data symbol 502). However, the handling of phase change of null symbol 1301 is as described above".

"Phase changer 209B of FIG. 20 performs phase change on all the symbols of carriers 1 to 36 and time $7 (in this case, all the symbols are pilot symbol 501 or data symbol 502). However, the handling of phase change of null symbol 1301 is as described above".

"Phase changer 209B of FIG. 20 performs phase change on all the symbols of carriers 1 to 36 and time $8 (in this case, all the symbols are pilot symbol 501 or data symbol 502). However, the handling of phase change of null symbol 1301 is as described above".

"Phase changer 209B of FIG. 20 performs phase change on all the symbols of carriers 1 to 36 and time $9 (in this case, all the symbols are pilot symbol 501 or data symbol 502). However, the handling of phase change of null symbol 1301 is as described above".

"Phase changer 209B of FIG. 20 performs phase change on all the symbols of carriers 1 to 36 and time $10 (in this case, all the symbols are pilot symbol 501 or data symbol 502). However, the handling of phase change of null symbol 1301 is as described above".

"Phase changer 209B of FIG. 20 performs phase change on all the symbols of carriers 1 to 36 and time $11 (in this case, all the symbols are pilot symbol 501 or data symbol 502). However, the handling of phase change of null symbol 1301 is as described above".

. . .

The phase change value in phase changer 209B is represented as $\Omega(i)$. Baseband signal 208B is x'(i), and phase-changed signal 210B is x(i). Therefore, $x(i)=\Omega(i)\times x'(i)$ holds true. For example, the phase change value is set by formula (38). Q is an integer equal to or greater than 2, and Q is a phase change cycle. j is an imaginary unit. However, formula (38) is merely an example and the phase change value is not limited to this formula.

For example, $\Omega(i)$ may be set to perform phase change so as to have the cycle Q.

Furthermore, for example, in FIGS. 5 and 14, the same phase change value may be provided to the same carrier, and the phase change value may be set for each carrier. For example, this will be as follows.

For carrier 1 in FIGS. 5 and 14, regardless of time, the phase change value is formula (39).

For carrier 2 in FIGS. 5 and 14, regardless of time, the phase change value is formula (40).

For carrier 3 in FIGS. 5 and 14, regardless of time, the phase change value is formula (41).

For carrier 4 in FIGS. 5 and 14, regardless of time, the phase change value is formula (42).

Operation examples of phase changer 209B of FIG. 20 have been described above.

Advantageous effects that can be obtained by phase changer 209B in FIG. 20 will be described.

It is assumed that the control information symbol is included in the other symbols 403 and 503 of "the frames of FIGS. 4 and 5" or "the frames of FIGS. 13 and 14". As described earlier, when transmitting the control information, the other symbol 503 of FIG. at the same time and the same frequency (same carrier) as the other symbol 403 transmits the same data (same control information).

Here, consider the following cases.

Case 2:

The control information symbol is transmitted using one of antenna unit #A (109_A) and antenna unit #B (109_B) of FIG. 1.

When transmission is performed as in "case 2", since the number of antennas that transmit the control information symbol is 1, a gain of space diversity is smaller than in a case of "transmitting the control information symbol using both antenna unit #A (109_A) and antenna unit #B (109_B)", and thus data reception quality deteriorates even if the reception apparatus of FIG. 8 performs reception in "case 2". Therefore, in terms of improvement in data reception quality, it is preferable "to transmit the control information symbol using both "antenna unit #A (109_A) and antenna unit #B (109_B)".

Case 3:

The control information symbol is transmitted using both of antenna unit #A (109_A) and antenna unit #B (109_B) of FIG. 1. However, phase changer 209B in FIG. does not perform phase change.

When transmission is performed as in "case 3", since the modulated signal transmitted from antenna unit #A 109_A is the same as the modulated signal transmitted from antenna unit #B 109_B (or there is a specified phase shift), depending on a radio wave propagation environment, the reception apparatus of FIG. 8 may have a very poor reception signal and both of the modulated signals may be affected by the same multipath. This will cause a problem that data reception quality deteriorates in the reception apparatus of FIG. 8.

To alleviate this problem, phase changer 209B is provided in FIG. 20. This enables phase change in a time or frequency direction, allowing the reception apparatus of FIG. 8 to reduce the possibility of a poor reception signal. Also, it is likely that there is a difference between an influence of the multipath received by the modulated signal transmitted from antenna unit #A 109_A and an influence of the multipath received by the modulated signal transmitted from antenna unit #B 109_B. Therefore, it is likely that a diversity gain is obtained, whereby data reception quality improves in the reception apparatus of FIG. 8.

For the above reason, phase changer 209B is provided in FIG. 20 to perform phase change.

The other symbol 403 and the other symbol 503 include, other than the control information symbol, for example, a symbol for signal detection, a symbol for performing frequency synchronization and time synchronization, and a symbol for channel estimation (symbol for estimating propagation path fluctuation) for demodulating and decoding the control information symbol. In addition, "the frames of FIGS. 4 and 5" or "the frames of FIGS. 13 and 14" include pilot symbols 401 and 501. Using these symbols will make it possible to demodulate and decode the control information symbol more accurately.

In "the frames of FIGS. 4 and 5" or "the frames of FIGS. 13 and 14", data symbol 402 and data symbol 502 transmit multiple streams (perform MIMO transmission) by using the same frequency (band) and the same time. Demodulating these data symbols requires to use the symbol for signal detection, the symbol for frequency synchronization and time synchronization, and the symbol for channel estimation (symbol for estimating propagation path fluctuation) included in the other symbol 403 and the other symbol 503.

At this time, as described above, phase changer 209B performs phase change on "the symbol for signal detection, the symbol for frequency synchronization and time synchronization, and the symbol for channel estimation (symbol for estimating propagation path fluctuation) included in the other symbol 403 and the other symbol 503".

Under such circumstances, if this process is not reflected in data symbol 402 and data symbol 502 (in data symbol 502 for the case described above), when the reception apparatus demodulates and decodes data symbol 402 and data symbol 502, it is necessary to perform demodulation and decoding reflecting the process for the phase change performed by phase changer 209B, and the process is likely to be complicated. This is because phase changer 209B performs phase change on "the symbol for signal detection, the symbol for frequency synchronization and time synchronization, and the symbol for channel estimation (symbol for estimating propagation path fluctuation) included in the other symbol 403 and the other symbol 503".

However, as illustrated in FIG. 20, when phase changer 209B performs phase change on data symbol 402 and data symbol 502 (on data symbol 502 for the case described above), there is an advantage that the reception apparatus can (easily) demodulate and decode data symbol 402 and data symbol 502 by using the channel estimation signal (propagation path fluctuation estimation signal) estimated using "the symbol for signal detection, the symbol for frequency synchronization and time synchronization, and the symbol for channel estimation (symbol for estimating propagation path fluctuation) included in the other symbol 403 and the other symbol 503".

In addition, as illustrated in FIG. 20, when phase changer 209B performs phase change on data symbol 402 and data symbol 502 (on data symbol 502 for the case described above), it is possible to reduce an influence of a sharp drop in electric field intensity in a frequency axis in the multipath. This may improve data reception quality of data symbol 402 and data symbol 502.

Thus, a characteristic point is that "the target symbol on which phase changers 205A and 205B perform phase change" is different from "the target symbol on which phase changer 209B performs phase change".

As described above, phase changers 205A and 205B of FIG. 20 performing phase change will improve data reception quality of data symbol 402 and data symbol 502 in the reception apparatus, particularly in the LOS environment. Furthermore, phase changer 209B of FIG. 20 performing phase change will improve, for example, reception quality of the control information symbol included in "the frames of FIGS. 4 and 5" or "the frames of FIGS. 13 and 14" in the reception apparatus. Phase changer 209B of FIG. 20 performing phase change will also simplify demodulation and decoding operations of data symbol 402 and data symbol 502.

Note that phase changers 205A and 205B of FIG. 20 performing phase change can improve data reception quality of data symbol 402 and data symbol 502 in the reception apparatus, particularly in the LOS environment. Furthermore, phase changer 209B of FIG. 20 performing phase change on data symbol 402 and data symbol 502 improves reception quality of data symbol 402 and data symbol 502.

Note that Q in formula (38) may be an integer equal to or less than −2, and at this time, the phase change cycle is the absolute value of Q. This point can also be applied to the first exemplary embodiment.

Fifth Exemplary Embodiment

The present exemplary embodiment will describe a method for implementing a configuration different from the configuration of FIG. 2 in the first exemplary embodiment.

FIG. 1 is a diagram illustrating one exemplary configuration of a transmission apparatus such as, for example, a base station, an access point, and a broadcasting station according to the present exemplary embodiment. Details have been described in the first exemplary embodiment, and thus description thereof will be omitted.

Signal processor 106 receives mapped signals 105_1 and 105_2, signal group 110, and control signal 100, performs signal processing based on control signal 100, and then outputs signal-processed signals 106_A and 106_B. At this time, signal-processed signal 106_A is represented as u1($i$), and signal-processed signal 106_B is represented as u2($i$) ($i$ is a symbol number, for example, i is an integer equal to or greater than 0). Note that details of the signal processing will be described with reference to FIG. 21.

Figure 21:
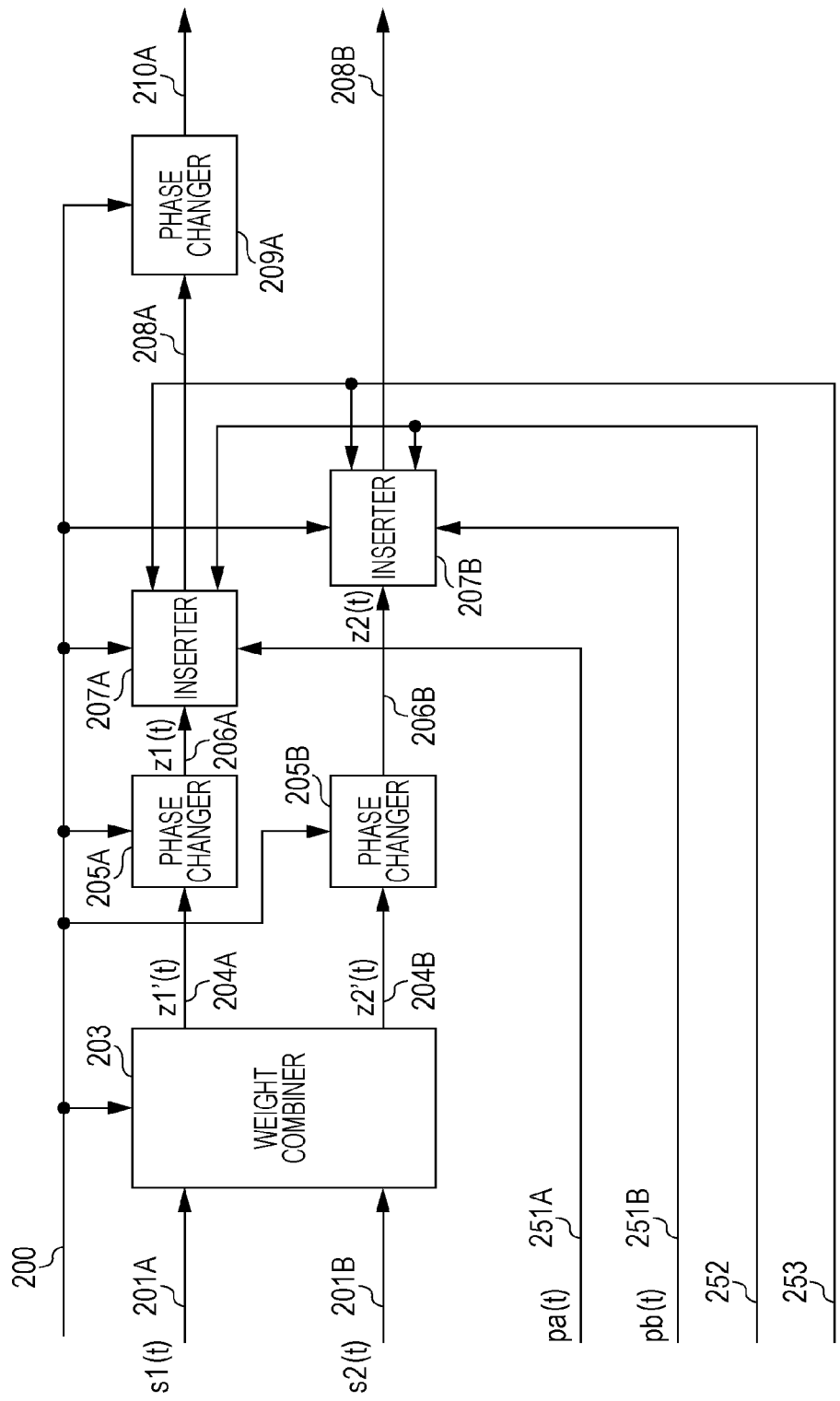
FIG. 21 is a diagram illustrating one exemplary configuration of the signal processor of FIG. 1.

FIG. 21 is a diagram illustrating one example in a configuration of signal processor 106 in FIG. 1. Weight combiner (precoder) 203 receives mapped signal 201A (corresponding to mapped signal 105_1 of FIG. 1), mapped signal 201B (corresponding to mapped signal 105_2 of FIG. 1), and control signal 200 (corresponding to control signal 100 of FIG. 1). Weight combiner (precoder) 203 performs weighting (precoding) based on control signal 200, and then outputs weighted signal 204A and weighted signal 204B. At this time, mapped signal 201A is represented as s1($t$), mapped signal 201B as s2($t$), weighted signal 204A as z1'($t$), and weighted signal 204B as z2'($t$). Note that t is time as one example. It is assumed that s1 ($t$), s2($t$), z1'($t$), and z2'($t$) are defined as complex numbers (hence may be real numbers).

Here, each signal is handled as a function of time, but each signal may be a function of "frequency (carrier number)" or a function of "time and frequency". Alternatively, each signal may be a function of "symbol number". This point also applies to the first exemplary embodiment.

Weight combiner (precoder) 203 performs calculation of formula (49).

Then, phase changer 205A receives weighted signal 204A and control signal 200. Based on control signal 200, phase changer 205A performs phase change on weighted signal 204A and then outputs phase-changed signal 206A. Note that phase-changed signal 206A is represented as z1 ($t$), and z1 ($t$) is defined as a complex number (z1 ($t$) may be a real number).

A specific operation of phase changer 205A will be described. For example, phase changer 205A performs phase change of w(i) on z1'($i$). Therefore, z1($i$) can be represented as z1($i$)=w(i)×z1'($i$) (i is a symbol number (i is an integer equal to or greater than 0)).

For example, a phase change value is set by formula (50). M is an integer equal to or greater than 2, and M is a phase change cycle. If M is set as an odd number equal to or greater than 3, data reception quality may improve. However, formula (50) is merely an example and the phase change value is not limited to this formula. Therefore, it is assumed that the phase change value w(i) is represented as w(i)= $e^{j\times\lambda(i)}$.

Then, phase changer 205B receives weighted signal 204B and control signal 200. Based on control signal 200, phase changer 205B performs phase change on weighted signal 204B and then outputs phase-changed signal 206B. Note that phase-changed signal 206B is represented as z2($t$), and z2($t$) is defined as a complex number (z2($t$) may be a real number).

A specific operation of phase changer 205B will be described. For example, phase changer 205B performs phase change of y(i) on z2'($i$). Therefore, z2($i$) can be represented as z2($i$)=y(i)×z2'($i$) (i is a symbol number (i is an integer equal to or greater than 0)).

For example, a phase change value is set by formula (2). N is an integer equal to or greater than 2, and N is a phase change cycle. N≠M. If N is set as an odd number equal to or greater than 3, data reception quality may improve. However, formula (2) is merely an example and the phase change value is not limited to this formula. Therefore, it is assumed that the phase change value y(i) is represented as y(i)=$e^{j\times\delta(i)}$.

At this time, z1($i$) and z2($i$) can be represented by formula (51).

Note that δ(i) and λ(i) are real numbers. z1($i$) and z2($i$) are transmitted from the transmission apparatus at the same time and at the same frequency (same frequency band). In formula (51), the phase change value is not limited to formula (2) and formula (51), and for example, a method for periodically or regularly changing the phase can be considered.

As described in the first exemplary embodiment, formulas (5) to (36) and the like are considered as a (precoding) matrix in formulas (49) and (51). However, the precoding matrix is not limited to these formulas. This also applies to the first exemplary embodiment.

Inserter 207A receives weighted signal 204A, pilot symbol signal (pa(t)) (t: time) (251A), preamble signal 252, control information symbol signal 253, and control signal 200. Based on information about a frame structure included in control signal 200, inserter 207A outputs baseband signal 208A based on the frame structure.

Similarly, inserter 207B receives phase-changed signal 206B, pilot symbol signal (pb(t)) (251B), preamble signal 252, control information symbol signal 253, and control signal 200. Based on the information about the frame structure included in control signal 200, inserter 207B outputs baseband signal 208B based on the frame structure.

Phase changer 209B receives baseband signal 208B and control signal 200, performs phase change on baseband signal 208B based on control signal 200, and then outputs phase-changed signal 210B. Baseband signal 208B is a function of symbol number i (i is an integer equal to or greater than 0) and is represented as x'(i). Then, phase-changed signal 210B (x(i)) can be represented as x(i)=eix× x'(i) (j is an imaginary unit).

Note that as described in the first exemplary embodiment, an operation of phase changer 209B may be cyclic delay diversity (CDD) (cyclic shift diversity (CSD)) described in NPTL 2 and NPTL 3. Phase changer 209B is characterized by performing phase change on symbols in a frequency axis direction. For example, phase change is performed on symbols such as data symbols, pilot symbols, and control information symbols.

FIG. 3 is a diagram illustrating one exemplary configuration of wireless units 107_A and 107_B of FIG. 1. Details have been described in the first exemplary embodiment, and thus description thereof will be omitted.

FIG. 4 is a diagram illustrating the frame structure of transmission signal 108_A of FIG. 1. Details have been described in the first exemplary embodiment, and thus description thereof will be omitted.

FIG. 5 is a diagram illustrating the frame structure of transmission signal 108_B of FIG. 1. Details have been described in the first exemplary embodiment, and thus description thereof will be omitted.

When a symbol is present at carrier A and time $B of FIG. 4 and when a symbol is present at carrier A and time $B of FIG. 5, the symbol at carrier A and time $B of FIG. 4 and the symbol at carrier A and time $B of FIG. 5 are transmitted at the same time and the same frequency. Note that the frame structure is not limited to the frame structures in FIGS. 4 and 5, and FIGS. 4 and 5 are merely examples of the frame structure.

The other symbols in FIGS. 4 and 5 are symbols corresponding to "preamble signal 252 and control information symbol signal 253 in FIG. 2". Therefore, the other symbol 503 of FIG. 5 at the same time and the same frequency (same carrier) as the other symbol 403 of FIG. 4 transmits the same data (same control information) when the control information is transmitted.

Note that it is assumed that the reception apparatus simultaneously receives the frame of FIG. 4 and the frame of FIG. 5, but even by receiving only the frame of FIG. 4 or only the frame of FIG. 5, the reception apparatus can obtain the data transmitted by the transmission apparatus.

FIG. 6 is a diagram illustrating one exemplary configuration of a part regarding control information generation for generating control information signal 253 of FIG. 2. Details have been described in the first exemplary embodiment, and thus description thereof will be omitted.

FIG. 7 is a diagram illustrating one exemplary configuration of antenna unit #A (109_A) and antenna unit #B (109_B) of FIG. 1. This is an example in which antenna unit #A (109_A) and antenna unit #B (109_B) each include a plurality of antennas. Details of FIG. 7 have been described in the first exemplary embodiment, and thus description thereof will be omitted.

FIG. 8 is a diagram illustrating one exemplary configuration of the reception apparatus that receives a modulated signal of, for example, the transmission signal of the frame structure of FIG. 4 or 5 transmitted by the transmission apparatus of FIG. 1. Details have been described in the first exemplary embodiment, and thus description thereof will be omitted.

FIG. 10 is a diagram illustrating one exemplary configuration of antenna unit #X (801X) and antenna unit #Y (801Y) of FIG. 8. This is an example in which antenna unit #X (801X) and antenna unit #Y (801Y) each include a plurality of antennas. Details of FIG. 10 have been described in the first exemplary embodiment, and thus description thereof will be omitted.

Next, as illustrated in FIG. 21, phase changers 205A and 205B and phase changer 209B are inserted into signal processor 106 of the transmission apparatus illustrated in FIG. 1. Features and advantageous effects thereof will be described.

As described with reference to FIGS. 4 and 5, phase changers 205A and 205B perform precoding (weighting) on mapped signal s1($i$) (201A) ($i$ is a symbol number and is an integer equal to or greater than 0) obtained by performing mapping using the first series, and mapped signal s2($i$) (201B) obtained by performing mapping using the second series. Phase changers 205A and 205B perform phase change on obtained weighted signals 204A and 204B. Then, phase-changed signal 206A and phase-changed signal 206B are transmitted at the same frequency and the same time. Therefore, in FIGS. 4 and 5, phase change is performed on data symbol 402 of FIG. 4 and data symbol 502 of FIG. 5.

For example, FIG. 11 is a diagram illustrating carriers 1 to 5 and time $4 to $6 extracted from the frame of FIG. 4. Note that as in FIG. 4, reference numeral 401 represents a pilot symbol, reference numeral 402 represents a data symbol, and reference numeral 403 represents the other symbol.

As described above, in the symbols illustrated in FIG. 11, phase changer 205A performs phase change on the data symbol of (carrier 1, time $5), the data symbol of (carrier 2, time $5), the data symbol of (carrier 3, time $5), the data symbol of (carrier 4, time $5), the data symbol of (carrier 5, time $5), the data symbol of (carrier 1, time $6), the data symbol of (carrier 2, time $6), the data symbol of (carrier 4, time $6), and the data symbol of (carrier 5, time $6).

Therefore, in the symbols illustrated in FIG. 11, the phase change value of the data symbol of (carrier 1, time $5) is "$e^{j \times \lambda 15(i)}$", the phase change value of the data symbol of (carrier 2, time $5) is "$e^{j \times \lambda 25(i)}$", the phase change value of the data symbol of (carrier 3, time $5) is "$e^{j \times \lambda 35(i)}$", the phase change value of the data symbol of (carrier 4, time $5) is "$e^{j \times \lambda 45(i)}$", the phase change value of the data symbol of (carrier 5, time $5) is "$e^{j \times \lambda 55(i)}$", the phase change value of the data symbol of (carrier 1, time $6) is "$e^{j \times \lambda 16(i)}$", the phase change value of the data symbol of (carrier 2, time $6) is "$e^{j \times \lambda 26(i)}$", the phase change value of the data symbol of (carrier 4, time $6) is "$e^{j \times \lambda 46(i)}$", and the phase change value of the data symbol of (carrier 5, time $6) is "$e^{j \times \lambda 56(i)}$".

Meanwhile, in the symbols illustrated in FIG. 11, phase changer 205A does not perform phase change on the other symbol of (carrier 1, time $4), the other symbol of (carrier 2, time $4), the other symbol of (carrier 3, time $4), the other symbol of (carrier 4, time $4), the other symbol of (carrier 5, time $4), or the pilot symbol of (carrier 3, time $6).

This point is a characteristic point of phase changer 205A. Note that as illustrated in FIG. 4, data carriers are arranged at "the same carrier and the same time" as the symbols to be subjected to phase change in FIG. 11, including the data symbol of (carrier 1, time $5), the data symbol of (carrier 2, time $5), the data symbol of (carrier 3, time $5), the data symbol of (carrier 4, time $5), the data symbol of (carrier 5, time $5), the data symbol of (carrier 1, time $6), the data symbol of (carrier 2, time $6), the data symbol of (carrier 4, time $6), and the data symbol of (carrier 5, time $6). That is, in FIG. 4, (carrier 1, time $5) is a data symbol, (carrier 2, time $5) is a data symbol, (carrier 3, time $5) is a data symbol, (carrier 4, time $5) is a data symbol, (carrier 5, time $5) is a data symbol, (carrier 1, time $6) is a data symbol, (carrier 2, time $6) is a data symbol, (carrier 4, time $6) is a data symbol, and (carrier 5, time $6) is a data symbol. That is, phase changer 205A performs phase change on the data symbols performing MIMO transmission (transmitting multiple streams).

Note that examples of phase change to be performed on data symbols by phase changer 205A include a method for performing periodical phase change (phase change cycle N) on the data symbols by formula (50). However, the method for performing phase change on data symbols is not limited to this method.

For example, FIG. 11 is a diagram illustrating carriers 1 to 5 and time $4 to $6 extracted from the frame of FIG. 5. Note that as in FIG. 5, reference numeral 501 represents a pilot symbol, reference numeral 502 represents a data symbol, and reference numeral 503 represents the other symbol.

As described above, in the symbols illustrated in FIG. 11, phase changer 205B performs phase change on the data symbol of (carrier 1, time $5), the data symbol of (carrier 2, time $5), the data symbol of (carrier 3, time $5), the data symbol of (carrier 4, time $5), the data symbol of (carrier 5, time $5), the data symbol of (carrier 1, time $6), the data symbol of (carrier 2, time $6), the data symbol of (carrier 4, time $6), and the data symbol of (carrier 5, time $6).

Therefore, in the symbols illustrated in FIG. 11, the phase change value of the data symbol of (carrier 1, time $5) is "$e^{j \times \lambda 15(i)}$", the phase change value of the data symbol of (carrier 2, time $5) is "$e^{j \times \lambda 25(i)}$", the phase change value of the data symbol of (carrier 3, time $5) is "$e^{j \times \lambda 35(i)}$", the phase change value of the data symbol of (carrier 4, time $5) is "$e^{j \times \lambda 45(i)}$", the phase change value of the data symbol of (carrier 5, time $5) is "$e^{j \times \lambda 55(i)}$", the phase change value of the data symbol of (carrier 1, time $6) is "$e^{j\times\lambda 16(i)}$", the phase change value of the data symbol of (carrier 2, time $6) is "$e^{j\times\lambda 26(i)}$", the phase change value of the data symbol of (carrier 4, time $6) is "$e^{j\times\lambda 46(i)}$", and the phase change value of the data symbol of (carrier 5, time $6) is "$e^{j\times\lambda 56(i)}$".

Meanwhile, in the symbols illustrated in FIG. 11, phase changer 205B does not perform phase change on the other symbol of (carrier 1, time $4), the other symbol of (carrier 2, time $4), the other symbol of (carrier 3, time $4), the other symbol of (carrier 4, time $4), the other symbol of (carrier 5, time $4), or the pilot symbol of (carrier 3, time $6).

This point is a characteristic point of phase changer 205B. Note that as illustrated in FIG. 4, data carriers are arranged at "the same carrier and the same time" as the symbols to be subjected to phase change in FIG. 11, including the data symbol of (carrier 1, time $5), the data symbol of (carrier 2, time $5), the data symbol of (carrier 3, time $5), the data symbol of (carrier 4, time $5), the data symbol of (carrier 5, time $5), the data symbol of (carrier 1, time $6), the data symbol of (carrier 2, time $6), the data symbol of (carrier 4, time $6), and the data symbol of (carrier 5, time $6). That is, in FIG. 4, (carrier 1, time $5) is a data symbol, (carrier 2, time $5) is a data symbol, (carrier 3, time $5) is a data symbol, (carrier 4, time $5) is a data symbol, (carrier 5, time $5) is a data symbol, (carrier 1, time $6) is a data symbol, (carrier 2, time $6) is a data symbol, (carrier 4, time $6) is a data symbol, and (carrier 5, time $6) is a data symbol. That is, phase changer 205B performs phase change on the data symbols performing MIMO transmission (transmitting multiple streams).

Note that examples of phase change to be performed on data symbols by phase changer 205B include a method for performing periodical phase change (phase change cycle N) on the data symbols by formula (2). However, the method for performing phase change on data symbols is not limited to this method.

Doing this will improve data reception quality in the data symbol reception apparatus performing MIMO transmission (transmitting multiple streams) in an environment where direct waves are dominant, particularly in the LOS environment. This point will be described.

For example, it is assumed that the modulation scheme to be used by mapper 104 of FIG. 1 is quadrature phase shift keying (QPSK). Mapped signal 201A of FIG. 18 is a QPSK signal, and mapped signal 201B is also a QPSK signal. That is, two QPSK streams are transmitted. Then, signal processor 811 of FIG. 8 obtains, for example, 16 candidate signal points by using channel estimation signals 806_1 and 806_2. QPSK allows transmission of two bits, and a total of four bits can be transmitted by two streams. Therefore, $2^4=16$ candidate signal points are present. Note that other 16 candidate signal points are obtained using channel estimation signals 808_1 and 808_2, which however will be described in a similar way; therefore, the following description will be made focusing on the 16 candidate signal points obtained using channel estimation signals 806_1 and 806_2.

FIG. 12 is a diagram illustrating one example of this state. In both FIGS. 12(A) and 12(B), a horizontal axis is in-phase I and a vertical axis is quadrature Q, and 16 candidate signal points are present on the in-phase quadrature (IQ) plane. One of the 16 candidate signal points is the signal point transmitted by the transmission apparatus. Therefore, these are called "16 candidate signal points".

In an environment where direct waves are dominant, particularly in the LOS environment, First Case:

Consider a case where phase changers 205A and 205B of FIG. 21 are not present (that is, a case where phase change by phase changers 205A and 205B of FIG. 21 is not performed).

In the "first case", since phase change is not performed, there is a possibility of falling into the state as illustrated in FIG. 12(A). When falling into the state of FIG. 12(A), since there are portions where the signal points are dense (distance between the signal points are short) such as "signal points 1201 and 1202", "signal points 1203, 1204, 1205 and 1206", and "signal points 1207 and 1208", data reception quality may deteriorate in the reception apparatus of FIG. 8.

To overcome this problem, phase changers 205A and 205B are inserted in FIG. 21. Insertion of phase changers 205A and 205B will lead to a mixture of the symbol numbers where the signal points are dense (distance between the signal points is short) as illustrated in FIG. 12(A), and the symbol numbers where "distance between the signal points is long" as illustrated in FIG. 12(B), depending on symbol number i. Introduction of an error correction code for this state will provide high error correction capability and allow the reception apparatus of FIG. 8 to obtain high data reception quality.

Note that in FIG. 21, phase changers 205A and 205B of FIG. 21 do not perform phase change on "pilot symbols and preambles" for performing channel estimation for demodulating (detecting) data symbols such as pilot symbols and preambles. This makes it possible to implement in data symbols "a mixture of the symbol numbers where the signal points are dense (distance between signal points is short) as illustrated in FIG. 12(A), and the symbol numbers where "distance between signal points is long" as illustrated in FIG. 12(B), depending on symbol number i".

However, even when phase changers 205A and 205B of FIG. 21 perform phase change on "pilot symbols and preambles" for performing channel estimation for demodulating (detecting) data symbols such as pilot symbols and preambles, this may "make it possible to implement in data symbols "a mixture of the symbol numbers where the signal points are dense (distance between signal points is short) as illustrated in FIG. 12(A), and the symbol numbers where "distance between signal points is long" as illustrated in FIG. 12(B), depending on symbol number i"". In this case, phase change needs to be performed through addition of some condition to the pilot symbol and preamble. For example, a method for providing a rule different from a phase change rule for data symbols and "performing phase change on pilot symbols and/or preambles" is considered. As an example, there is a method for periodically performing phase change of a cycle N on data symbols, and for periodically performing phase change of a cycle M on pilot symbols and/or preambles (N and M are each an integer equal to or greater than 2).

As described above, phase changer 209A receives baseband signal 208A and control signal 200, performs phase change on baseband signal 208A based on control signal 200, and then outputs phase-changed signal 210A. Baseband signal 208A is a function of symbol number i (i is an integer equal to or greater than 0) and is represented as x'(i). Then, phase-changed signal 210A (x(i)) can be represented as $x(i)=e^{j\times\varepsilon(i)}\times x'(i)$ (j is an imaginary unit). The operation of phase changer 209A may be cyclic delay diversity (CDD) (cyclic shift diversity (CSD)) described in NPTL 2 and NPTL 3. Phase changer 209A is characterized by performing phase change on symbols in a frequency axis direction. For example, phase change is performed on symbols such as data symbols, pilot symbols, and control information symbols. Therefore, in this case, target symbols of symbol number i are symbols such as data symbols, pilot symbols, control information symbols, and preambles (the other symbols). In the case of FIG. 21, phase changer 209A, which performs phase change on baseband signal 208A, performs phase change on each symbol illustrated in FIG. 4.

Therefore, in the frame of FIG. 4, phase changer 209A of FIG. 21 performs phase change on all the symbols of carriers 1 to 36 and time $1 (in this case, all the symbols are the other symbol 403).

Similarly,

"phase changer 209A of FIG. 21 performs phase change on all the symbols of carriers 1 to 36 and time $2 (in this case, all the symbols are the other symbol 403)", "phase changer 209A of FIG. 21 performs phase change on all the symbols of carriers 1 to 36 and time $3 (in this case, all the symbols are the other symbol 403)", "phase changer 209A of FIG. 21 performs phase change on all the symbols of carriers 1 to 36 and time $4 (in this case, all the symbols are the other symbol 403)", "phase changer 209A of FIG. 21 performs phase change on all the symbols of carriers 1 to 36 and time $5 (in this case, all the symbols are pilot symbol 401 or data symbol 402)", "phase changer 209A of FIG. 21 performs phase change on all the symbols of carriers 1 to 36 and time $6 (in this case, all the symbols are pilot symbol 401 or data symbol 402)", "phase changer 209A of FIG. 21 performs phase change on all the symbols of carriers 1 to 36 and time $7 (in this case, all the symbols are pilot symbol 401 or data symbol 402)", "phase changer 209A of FIG. 21 performs phase change on all the symbols of carriers 1 to 36 and time $8 (in this case, all the symbols are pilot symbol 401 or data symbol 402)", "phase changer 209A of FIG. 21 performs phase change on all the symbols of carriers 1 to 36 and time $9 (in this case, all the symbols are pilot symbol 401 or data symbol 402)", "phase changer 209A of FIG. 21 performs phase change on all the symbols of carriers 1 to 36 and time $10 (in this case, all the symbols are pilot symbol 401 or data symbol 402)", and "phase changer 209A of FIG. 21 performs phase change on all the symbols of carriers 1 to 36 and time $11 (in this case, all the symbols are pilot symbol 401 or data symbol 402)".

FIG. 13 is a diagram illustrating the frame structure of transmission signal 108_A of FIG. 1 different from FIG. 4. Details have been described in the first exemplary embodiment, and thus description thereof will be omitted.

FIG. 14 is a diagram illustrating the frame structure of transmission signal 108_B of FIG. 1 different from FIG. 5. Details have been described in the first exemplary embodiment, and thus description thereof will be omitted.

When a symbol is present at carrier A and time $B of FIG. 13 and when a symbol is present at carrier A and time $B of FIG. 14, the symbol at carrier A and time $B of FIG. 13 and the symbol at carrier A and time $B of FIG. 14 are transmitted at the same time and the same frequency. Note that the frame structures of FIGS. 13 and 14 are merely examples.

The other symbols in FIGS. 13 and 14 are symbols corresponding to "preamble signal 252 and control information symbol signal 253 in FIG. 21". Therefore, the other symbol 503 of FIG. 14 at the same time and the same frequency (same carrier) as the other symbol 403 of FIG. 13 transmits the same data (same control information) when the control information is transmitted.

Note that it is assumed that the reception apparatus simultaneously receives the frame of FIG. 13 and the frame of FIG. 14, but even by receiving only the frame of FIG. 13 or only the frame of FIG. 14, the reception apparatus can obtain data transmitted by the transmission apparatus.

Phase changer 209A receives baseband signal 208A and control signal 200, performs phase change on baseband signal 208A based on control signal 200, and then outputs phase-changed signal 210A. Baseband signal 208A is a function of symbol symbol number i (i is an integer equal to or greater than 0) and is represented as x'(i). Then, phase-changed signal 210A (x(i)) can be represented as $x(i)=e^{j\times\varepsilon(i)}\times x'(i)$ (j is an imaginary unit). The operation of phase changer 209A may be cyclic delay diversity (CDD) (cyclic shift diversity (CSD)) described in NPTL 2 and NPTL 3. Phase changer 209A is characterized by performing phase change on symbols in a frequency axis direction. For example, phase change is performed on symbols such as data symbols, pilot symbols, and control information symbols. At this time, the null symbol can also be considered as a phase change target. Therefore, in this case, target symbols of symbol number i are symbols such as data symbols, pilot symbols, control information symbols, preambles (the other symbols) and null symbols. However, even if phase change is performed on the null symbol, the signal before the phase change and the signal after the phase change are the same (in-phase component I is zero (0) and quadrature component Q is zero (0)). Therefore, it can be interpreted that the null symbol is not the phase change target. In the case of FIG. 21, phase changer 209A, which performs phase change on baseband signal 208A, performs phase change on each symbol illustrated in FIG. 13.

Therefore, in the frame of FIG. 13, phase changer 209A of FIG. 21 performs phase change on all the symbols of carriers 1 to 36 and time $1 (in this case, all the symbols are the other symbol 403). However, the handling of phase change of null symbol 1301 is as described above.

Similarly,

"phase changer 209A of FIG. 21 performs phase change on all the symbols of carriers 1 to 36 and time $2 (in this case, all the symbols are the other symbol 403). However, the handling of phase change of null symbol 1301 is as described above".

"Phase changer 209A of FIG. 21 performs phase change on all the symbols of carriers 1 to 36 and time $3 (in this case, all the symbols are the other symbol 403). However, the handling of phase change of null symbol 1301 is as described above".

"Phase changer 209A of FIG. 21 performs phase change on all the symbols of carriers 1 to 36 and time $4 (in this case, all the symbols are the other symbol 403). However, the handling of phase change of null symbol 1301 is as described above".

"Phase changer 209A of FIG. 21 performs phase change on all the symbols of carriers 1 to 36 and time $5 (in this case, all the symbols are pilot symbol 401 or data symbol 402). However, the handling of phase change of null symbol 1301 is as described above".

"Phase changer 209A of FIG. 21 performs phase change on all the symbols of carriers 1 to 36 and time $6 (in this case, all the symbols are pilot symbol 401 or data symbol 402). However, the handling of phase change of null symbol 1301 is as described above".

"Phase changer 209A of FIG. 21 performs phase change on all the symbols of carriers 1 to 36 and time $7 (in this case, all the symbols are pilot symbol 401 or data symbol 402). However, the handling of phase change of null symbol 1301 is as described above".

"Phase changer 209A of FIG. 21 performs phase change on all the symbols of carriers 1 to 36 and time $8 (in this case, all the symbols are pilot symbol 401 or data symbol 402). However, the handling of phase change of null symbol 1301 is as described above".

"Phase changer 209A of FIG. 21 performs phase change on all the symbols of carriers 1 to 36 and time $9 (in this case, all the symbols are pilot symbol 401 or data symbol 402). However, the handling of phase change of null symbol 1301 is as described above".

"Phase changer 209A of FIG. 21 performs phase change on all the symbols of carriers 1 to 36 and time $10 (in this case, all the symbols are pilot symbol 401 or data symbol 402). However, the handling of phase change of null symbol 1301 is as described above".

"Phase changer 209A of FIG. 21 performs phase change on all the symbols of carriers 1 to 36 and time $11 (in this case, all the symbols are pilot symbol 401 or data symbol 402). However, the handling of phase change of null symbol 1301 is as described above".

The phase change value in phase changer 209A is represented as $\Omega(i)$. Baseband signal 208A is $x'(i)$, and phase-changed signal 210A is $x(i)$. Therefore, $x(i)=\Omega(i) \times x'(i)$ holds true.

For example, the phase change value is set by formula (38). Q is an integer equal to or greater than 2, and Q is a phase change cycle. j is an imaginary unit. However, formula (38) is merely an example and the phase change value is not limited to this formula.

For example, $\Omega(i)$ may be set to perform phase change so as to have the cycle Q.

Furthermore, for example, in FIGS. 4 and 13, the same phase change value may be provided to the same carrier, and the phase change value may be set for each carrier. For example, this will be as follows.

For carrier 1 in FIGS. 4 and 13, regardless of time, the phase change value is formula (39).

For carrier 2 in FIGS. 4 and 13, regardless of time, the phase change value is formula (40).

For carrier 3 in FIGS. 4 and 13, regardless of time, the phase change value is formula (41).

For carrier 4 in FIGS. 4 and 13, regardless of time, the phase change value is formula (42).

Operation examples of phase changer 209A of FIG. 21 have been described above.

Advantageous effects that can be obtained by phase changer 209A of FIG. 21 will be described.

It is assumed that the control information symbol is included in the other symbols 403 and 503 of "the frames of FIGS. 4 and 5" or "the frames of FIGS. 13 and 14". As described earlier, when transmitting the control information, the other symbol 503 of FIG. at the same time and the same frequency (same carrier) as the other symbol 403 transmits the same data (same control information).

Here, consider the following cases.

Case 2:

The control information symbol is transmitted using one of antenna unit #A (109_A) and antenna unit #B (109_B) of FIG. 1.

When transmission is performed as in "case 2", since the number of antennas that transmit the control information symbol is 1, a gain of space diversity is smaller than in a case of "transmitting the control information symbol using both antenna unit #A (109_A) and antenna unit #B (109_B)", and thus data reception quality deteriorates even if the reception apparatus of FIG. 8 performs reception in "case 2". Therefore, in terms of improvement in data reception quality, it is preferable "to transmit the control information symbol using both "antenna unit #A (109_A) and antenna unit #B (109_B)".

Case 3:

The control information symbol is transmitted using both of antenna unit #A (109_A) and antenna unit #B (109_B) of FIG. 1. However, phase changer 209A in FIG. 21 does not perform phase change.

When transmission is performed as in "case 3", since the modulated signal transmitted from antenna unit #A 109_A is the same as the modulated signal transmitted from antenna unit #B 109_B (or there is a specified phase shift), depending on a radio wave propagation environment, the reception apparatus of FIG. 8 may have a very poor reception signal and both of the modulated signals may be affected by the same multipath. This will cause a problem that data reception quality deteriorates in the reception apparatus of FIG. 8.

To alleviate this problem, phase changer 209A is provided in FIG. 21. This enables phase change in a time or frequency direction, allowing the reception apparatus of FIG. 8 to reduce the possibility of a poor reception signal. Also, it is likely that there is a difference between an influence of the multipath received by the modulated signal transmitted from antenna unit #A 109_A and an influence of the multipath received by the modulated signal transmitted from antenna unit #B 109_B. Therefore, it is likely that a diversity gain is obtained, whereby data reception quality improves in the reception apparatus of FIG. 8.

For the above reason, phase changer 209A is provided in FIG. 21 to perform phase change.

The other symbol 403 and the other symbol 503 include, other than the control information symbol, for example, a symbol for signal detection, a symbol for performing frequency synchronization and time synchronization, and a symbol for channel estimation (symbol for estimating propagation path fluctuation) for demodulating and decoding the control information symbol. In addition, "the frames of FIGS. 4 and 5" or "the frames of FIGS. 13 and 14" include pilot symbols 401 and 501. Using these symbols will make it possible to demodulate and decode the control information symbol more accurately.

In "the frames of FIGS. 4 and 5" or "the frames of FIGS. 13 and 14", data symbol 402 and data symbol 502 transmit multiple streams (perform MIMO transmission) by using the same frequency (band) and the same time. Demodulating these data symbols requires to use the symbol for signal detection, the symbol for frequency synchronization and time synchronization, and the symbol for channel estimation (symbol for estimating propagation path fluctuation) included in the other symbol 403 and the other symbol 503.

At this time, as described above, phase changer 209A performs phase change on "the symbol for signal detection, the symbol for frequency synchronization and time synchronization, and the symbol for channel estimation (symbol for estimating propagation path fluctuation) included in the other symbol 403 and the other symbol 503".

Under such circumstances, if this process is not reflected in data symbol 402 and data symbol 502 (in data symbol 402 for the case described above), when the reception apparatus demodulates and decodes data symbol 402 and data symbol 502, it is necessary to perform demodulation and decoding reflecting the process for the phase change performed by phase changer 209A, and the process is likely to be complicated. This is because phase changer 209A performs phase change on "the symbol for signal detection, the symbol for frequency synchronization and time synchronization, and the symbol for channel estimation (symbol for estimating propagation path fluctuation) included in the other symbol 403 and the other symbol 503".

However, as illustrated in FIG. 21, when phase changer 209A performs phase change on data symbol 402 and data symbol 502 (on data symbol 402 for the case described above), there is an advantage that the reception apparatus can (easily) demodulate and decode data symbol 402 and data symbol 502 by using the channel estimation signal (propagation path fluctuation estimation signal) estimated using "the symbol for signal detection, the symbol for frequency synchronization and time synchronization, and the symbol for channel estimation (symbol for estimating propagation path fluctuation) included in the other symbol 403 and the other symbol 503".

In addition, as illustrated in FIG. 21, when phase changer 209A performs phase change on data symbol 402 and data symbol 502 (on data symbol 402 for the case described above), it is possible to reduce an influence of a sharp drop in electric field intensity in a frequency axis in the multipath. This may improve data reception quality of data symbol 402 and data symbol 502.

Thus, a characteristic point is that "the target symbol on which phase changers 205A and 205B perform phase change" is different from "the target symbol on which phase changer 209A performs phase change".

As described above, phase changers 205A and 205B of FIG. 21 performing phase change can improve data reception quality of data symbol 402 and data symbol 502 in the reception apparatus, particularly in the LOS environment. Furthermore, phase changer 209A of FIG. 21 performing phase change will improve, for example, reception quality of the control information symbol included in "the frames of FIGS. 4 and 5" or "the frames of FIGS. 13 and 14" in the reception apparatus. Phase changer 209A of FIG. 21 performing phase change will also simplify demodulation and decoding operations of data symbol 402 and data symbol 502.

Note that phase changers 205A and 205B of FIG. 21 performing phase change can improve data reception quality of data symbol 402 and data symbol 502 in the reception apparatus, particularly in the LOS environment. Furthermore, phase changer 209A of FIG. 21 performing phase change on data symbol 402 and data symbol 502 will improve reception quality of data symbol 402 and data symbol 502.

Note that Q in formula (38) may be an integer equal to or less than −2, and at this time, the phase change cycle is the absolute value of Q. This point can also be applied to the first exemplary embodiment.

Sixth Exemplary Embodiment

The present exemplary embodiment will describe a method for implementing a configuration different from the configuration of FIG. 2 in the first exemplary embodiment.

FIG. 1 is a diagram illustrating one exemplary configuration of a transmission apparatus such as, for example, a base station, an access point, and a broadcasting station according to the present exemplary embodiment. Details have been described in the first exemplary embodiment, and thus description thereof will be omitted.

Signal processor 106 receives mapped signals 105_1 and 105_2, signal group 110, and control signal 100, performs signal processing based on control signal 100, and then outputs signal-processed signals 106_A and 106_B. At this time, signal-processed signal 106_A is represented as u1($i$), and signal-processed signal 106_B is represented as u2($i$) ($i$ is a symbol number, and for example, i is an integer equal to or greater than 0). Note that details of the signal processing will be described with reference to FIG. 22.

Figure 22:
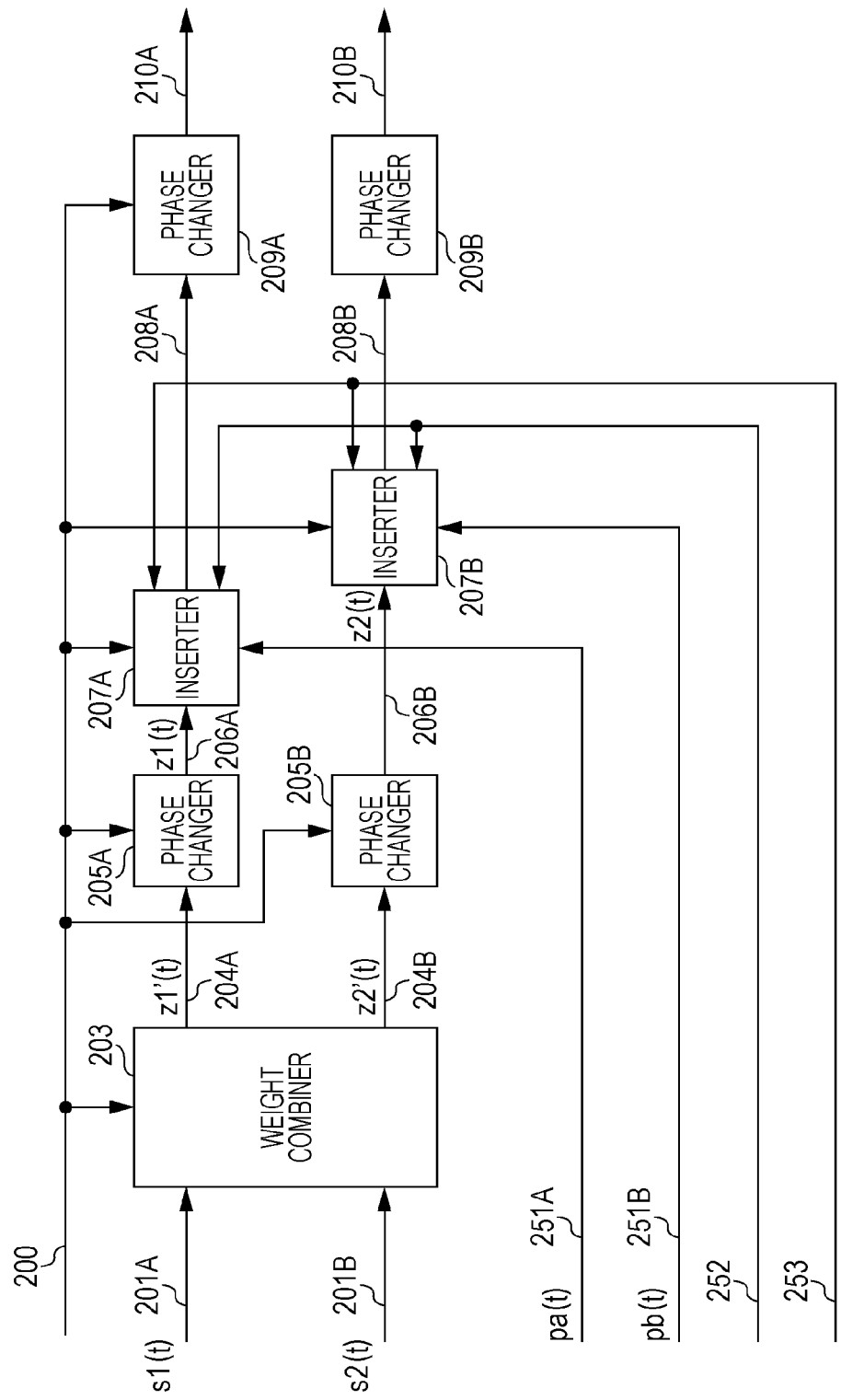
FIG. 22 is a diagram illustrating one exemplary configuration of the signal processor of FIG. 1.

FIG. 22 is a diagram illustrating one example in a configuration of signal processor 106 in FIG. 1. Weight combiner (precoder) 203 receives mapped signal 201A (corresponding to mapped signal 105_1 of FIG. 1), mapped signal 201B (corresponding to mapped signal 105_2 of FIG. 1), and control signal 200 (corresponding to control signal 100 of FIG. 1). Weight combiner (precoder) 203 performs weighting (precoding) based on control signal 200, and then outputs weighted signal 204A and weighted signal 204B. At this time, mapped signal 201A is represented as s1 ($t$), mapped signal 201B as s2($t$), weighted signal 204A as z1'($t$), and weighted signal 204B as z2'($t$). Note that t is time as one example. It is assumed that s1 ($t$), s2($t$), z1'($t$), and z2'($t$) are defined as complex numbers (hence may be real numbers).

Here, each signal is handled as a function of time, but each signal may be a function of "frequency (carrier number)" or a function of "time and frequency". Alternatively, each signal may be a function of "symbol number". This point also applies to the first exemplary embodiment.

Weight combiner (precoder) 203 performs calculation of formula (49).

Then, phase changer 205A receives weighted signal 204A and control signal 200. Based on control signal 200, phase changer 205A performs phase change on weighted signal 204A and then outputs phase-changed signal 206A. Note that phase-changed signal 206A is represented as z1 ($t$), and z1 ($t$) is defined as a complex number (z1 ($t$) may be a real number).

A specific operation of phase changer 205A will be described. For example, phase changer 205A performs phase change of w(i) on z1'($i$). Therefore, z1($i$) can be represented as z1($i$)=w(i)×z1'($i$) (i is a symbol number (i is an integer equal to or greater than 0)).

For example, a phase change value is set by formula (50).

M is an integer equal to or greater than 2, and M is a phase change cycle. If M is set as an odd number equal to or greater than 3, data reception quality may improve. However, formula (50) is merely an example and the phase change value is not limited to this formula. Therefore, it is assumed that the phase change value w(i) is represented as w(i)= $e^{j\times\lambda(i)}$.

Then, phase changer 205B receives weighted signal 204B and control signal 200. Based on control signal 200, phase changer 205B performs phase change on weighted signal 204B and then outputs phase-changed signal 206B. Note that phase-changed signal 206B is represented as z2($t$), and z2($t$) is defined as a complex number (z2($t$) may be a real number).

A specific operation of phase changer 205B will be described. For example, phase changer 205B performs phase change of y(i) on z2'($i$). Therefore, z2($i$) can be represented as z2($i$)=y(i)×z2'($i$) (i is a symbol number (i is an integer equal to or greater than 0)).

For example, a phase change value is set by formula (2). N is an integer equal to or greater than 2, and N is a phase change cycle. N≠M. If N is set as an odd number equal to or greater than 3, data reception quality may improve. However, formula (2) is merely an example and the phase change value is not limited to this formula. Therefore, it is assumed that the phase change value y(i) is represented as $y(i)=e^{j\times\delta(i)}$.

At this time, z1(i) and z2(i) can be represented by formula (51).

Note that δ(i) and λ(i) are real numbers. z1(i) and z2(i) are transmitted from the transmission apparatus at the same time and at the same frequency (same frequency band). In formula (51), the phase change value is not limited to formula (2) and formula (51), and for example, a method for periodically or regularly changing the phase can be considered.

As described in the first exemplary embodiment, formulas (5) to (36) and the like are considered as a (precoding) matrix in formulas (49) and (51). However, the precoding matrix is not limited to these formulas. This also applies to the first exemplary embodiment.

Inserter 207A receives weighted signal 204A, pilot symbol signal (pa(t)) (t: time) (251A), preamble signal 252, control information symbol signal 253, and control signal 200. Based on information about a frame structure included in control signal 200, inserter 207A outputs baseband signal 208A based on the frame structure.

Similarly, inserter 207B receives phase-changed signal 206B, pilot symbol signal (pb(t)) (251B), preamble signal 252, control information symbol signal 253, and control signal 200. Based on the information about the frame structure included in control signal 200, inserter 207B outputs baseband signal 208B based on the frame structure.

Phase changer 209B receives baseband signal 208B and control signal 200, performs phase change on baseband signal 208B based on control signal 200, and then outputs phase-changed signal 210B. Baseband signal 208B is a function of symbol number i (i is an integer equal to or greater than 0) and is represented as x'(i). Then, phase-changed signal 210B (x(i)) can be represented as $x(i)=e^{j\times\varepsilon15(i)}\times x'(i)$ (j is an imaginary unit).

Note that as described in the first exemplary embodiment, an operation of phase changer 209B may be cyclic delay diversity (CDD) (cyclic shift diversity (CSD)) described in NPTL 2 and NPTL 3. Phase changer 209B is characterized by performing phase change on symbols in a frequency axis direction. For example, phase change is performed on symbols such as data symbols, pilot symbols, and control information symbols.

FIG. 3 is a diagram illustrating one exemplary configuration of wireless units 107_A and 107_B of FIG. 1. Details have been described in the first exemplary embodiment, and thus description thereof will be omitted.

FIG. 4 is a diagram illustrating the frame structure of transmission signal 108_A of FIG. 1. Details have been described in the first exemplary embodiment, and thus description thereof will be omitted.

FIG. 5 is a diagram illustrating the frame structure of transmission signal 108_B of FIG. 1. Details have been described in the first exemplary embodiment, and thus description thereof will be omitted.

When a symbol is present at carrier A and time $B of FIG. 4 and when a symbol is present at carrier A and time $B of FIG. 5, the symbol at carrier A and time $B of FIG. 4 and the symbol at carrier A and time $B of FIG. 5 are transmitted at the same time and the same frequency. Note that the frame structure is not limited to the frame structures in FIGS. 4 and 5, and FIGS. 4 and 5 are merely examples of the frame structure.

The other symbols in FIGS. 4 and 5 are symbols corresponding to "preamble signal 252 and control information symbol signal 253 in FIG. 2". Therefore, the other symbol 503 of FIG. 5 at the same time and the same frequency (same carrier) as the other symbol 403 of FIG. 4 transmits the same data (same control information) when the control information is transmitted.

Note that it is assumed that the reception apparatus simultaneously receives the frame of FIG. 4 and the frame of FIG. 5, but even by receiving only the frame of FIG. 4 or only the frame of FIG. 5, the reception apparatus can obtain the data transmitted by the transmission apparatus.

FIG. 6 is a diagram illustrating one exemplary configuration of a part regarding control information generation for generating control information signal 253 of FIG. 2. Details have been described in the first exemplary embodiment, and thus description thereof will be omitted.

FIG. 7 is a diagram illustrating one exemplary configuration of antenna unit #A (109_A) and antenna unit #B (109_B) of FIG. 1 (an example in which antenna unit #A (109_A) and antenna unit #B (109_B) each include a plurality of antennas). Details have been described in the first exemplary embodiment, and thus description thereof will be omitted.

FIG. 8 is a diagram illustrating one exemplary configuration of the reception apparatus that receives a modulated signal of, for example, the transmission signal of the frame structure of FIG. 4 or 5 transmitted by the transmission apparatus of FIG. 1. Details have been described in the first exemplary embodiment, and thus description thereof will be omitted.

FIG. 10 is a diagram illustrating one exemplary configuration of antenna unit #X (801X) and antenna unit #Y (801Y) of FIG. 8. This is an example in which antenna unit #X (801X) and antenna unit #Y (801Y) each include a plurality of antennas. Details of FIG. 10 have been described in the first exemplary embodiment, and thus description thereof will be omitted.

Next, as illustrated in FIG. 22, phase changers 205A and 205B and phase changer 209B are inserted into signal processor 106 of the transmission apparatus illustrated in FIG. 1. Features and advantageous effects thereof will be described.

As described with reference to FIGS. 4 and 5, phase changers 205A and 205B perform precoding (weighting) on mapped signal s1(i) (201A) (i is a symbol number and is an integer equal to or greater than 0) obtained by performing mapping using the first series, and mapped signal s2(i) (201B) obtained by performing mapping using the second series. Phase changers 205A and 205B perform phase change on obtained weighted signals 204A and 204B. Then, phase-changed signal 206A and phase-changed signal 206B are transmitted at the same frequency and the same time. Therefore, in FIGS. 4 and 5, phase change is performed on data symbol 402 of FIG. 4 and data symbol 502 of FIG. 5.

For example, FIG. 11 is a diagram illustrating carriers 1 to 5 and time $4 to $6 extracted from the frame of FIG. 4. Note that as in FIG. 4, reference numeral 401 represents a pilot symbol, reference numeral 402 represents a data symbol, and reference numeral 403 represents the other symbol.

As described above, in the symbols illustrated in FIG. 11, phase changer 205A performs phase change on the data symbol of (carrier 1, time $5), the data symbol of (carrier 2, time $5), the data symbol of (carrier 3, time $5), the data symbol of (carrier 4, time $5), the data symbol of (carrier 5, time $5), the data symbol of (carrier 1, time $6), the data symbol of (carrier 2, time $6), the data symbol of (carrier 4, time $6), and the data symbol of (carrier 5, time $6).

Therefore, in the symbols illustrated in FIG. 11, the phase change value of the data symbol of (carrier 1, time $5) is "$e^{j \times \lambda 15(i)}$", the phase change value of the data symbol of (carrier 2, time $5) is "$e^{j \times \lambda 25(i)}$", the phase change value of the data symbol of (carrier 3, time $5) is "$e^{j \times \lambda 35(i)}$", the phase change value of the data symbol of (carrier 4, time $5) is "$e^{j \times \lambda 45(i)}$", the phase change value of the data symbol of (carrier 5, time $5) is "$e^{j \times \lambda 55(i)}$", the phase change value of the data symbol of (carrier 1, time $6) is "$e^{j \times \lambda 16(i)}$", the phase change value of the data symbol of (carrier 2, time $6) is "$e^{j \times \lambda 26(i)}$", the phase change value of the data symbol of (carrier 4, time $6) is "$e^{j \times \lambda 46(i)}$", and the phase change value of the data symbol of (carrier 5, time $6) is "$e^{j \times \lambda 56(i)}$".

Meanwhile, in the symbols illustrated in FIG. 11, phase changer 205A does not perform phase change on the other symbol of (carrier 1, time $4), the other symbol of (carrier 2, time $4), the other symbol of (carrier 3, time $4), the other symbol of (carrier 4, time $4), the other symbol of (carrier 5, time $4), or the pilot symbol of (carrier 3, time $6).

This point is a characteristic point of phase changer 205A. Note that as illustrated in FIG. 4, data carriers are arranged at "the same carrier and the same time" as the symbols to be subjected to phase change in FIG. 11, including the data symbol of (carrier 1, time $5), the data symbol of (carrier 2, time $5), the data symbol of (carrier 3, time $5), the data symbol of (carrier 4, time $5), the data symbol of (carrier 5, time $5), the data symbol of (carrier 1, time $6), the data symbol of (carrier 2, time $6), the data symbol of (carrier 4, time $6), and the data symbol of (carrier 5, time $6). That is, in FIG. 4, (carrier 1, time $5) is a data symbol, (carrier 2, time $5) is a data symbol, (carrier 3, time $5) is a data symbol, (carrier 4, time $5) is a data symbol, (carrier 5, time $5) is a data symbol, (carrier 1, time $6) is a data symbol, (carrier 2, time $6) is a data symbol, (carrier 4, time $6) is a data symbol, and (carrier 5, time $6) is a data symbol. That is, phase changer 205A performs phase change on the data symbols performing MIMO transmission (transmitting multiple streams).

Note that examples of phase change to be performed on data symbols by phase changer 205A include a method for performing periodical phase change (phase change cycle N) on the data symbols by formula (50). However, the method for performing phase change on data symbols is not limited to this method.

For example, FIG. 11 is a diagram illustrating carriers 1 to 5 and time $4 to $6 extracted from the frame of FIG. 5. Note that as in FIG. 5, reference numeral 501 represents a pilot symbol, reference numeral 502 represents a data symbol, and reference numeral 503 represents the other symbol.

As described above, in the symbols illustrated in FIG. 11, phase changer 205B performs phase change on the data symbol of (carrier 1, time $5), the data symbol of (carrier 2, time $5), the data symbol of (carrier 3, time $5), the data symbol of (carrier 4, time $5), the data symbol of (carrier 5, time $5), the data symbol of (carrier 1, time $6), the data symbol of (carrier 2, time $6), the data symbol of (carrier 4, time $6), and the data symbol of (carrier 5, time $6).

Therefore, in the symbols illustrated in FIG. 11, the phase change value of the data symbol of (carrier 1, time $5) is "$e^{j \times \lambda 15(i)}$", the phase change value of the data symbol of (carrier 2, time $5) is "$e^{j \times \lambda 25(i)}$", the phase change value of the data symbol of (carrier 3, time $5) is "$e^{j \times \lambda 35(i)}$", the phase change value of the data symbol of (carrier 4, time $5) is "$e^{j \times \lambda 45(i)}$", the phase change value of the data symbol of (carrier 5, time $5) is "$e^{j \times \lambda 55(i)}$", the phase change value of the data symbol of (carrier 1, time $6) is "$e^{j \times \lambda 16(i)}$", the phase change value of the data symbol of (carrier 2, time $6) is "$e^{j \times \lambda 26(i)}$", the phase change value of the data symbol of (carrier 4, time $6) is "$e^{j \times \lambda 46(i)}$", and the phase change value of the data symbol of (carrier 5, time $6) is "$e^{j \times \lambda 56(i)}$".

Meanwhile, in the symbols illustrated in FIG. 11, phase changer 205B does not perform phase change on the other symbol of (carrier 1, time $4), the other symbol of (carrier 2, time $4), the other symbol of (carrier 3, time $4), the other symbol of (carrier 4, time $4), the other symbol of (carrier 5, time $4), or the pilot symbol of (carrier 3, time $6).

This point is a characteristic point of phase changer 205B. Note that as illustrated in FIG. 4, data carriers are arranged at "the same carrier and the same time" as the symbols to be subjected to phase change in FIG. 11, including the data symbol of (carrier 1, time $5), the data symbol of (carrier 2, time $5), the data symbol of (carrier 3, time $5), the data symbol of (carrier 4, time $5), the data symbol of (carrier 5, time $5), the data symbol of (carrier 1, time $6), the data symbol of (carrier 2, time $6), the data symbol of (carrier 4, time $6), and the data symbol of (carrier 5, time $6). That is, in FIG. 4, (carrier 1, time $5) is a data symbol, (carrier 2, time $5) is a data symbol, (carrier 3, time $5) is a data symbol, (carrier 4, time $5) is a data symbol, (carrier 5, time $5) is a data symbol, (carrier 1, time $6) is a data symbol, (carrier 2, time $6) is a data symbol, (carrier 4, time $6) is a data symbol, and (carrier 5, time $6) is a data symbol. That is, phase changer 205B performs phase change on the data symbols performing MIMO transmission (transmitting multiple streams).

Note that examples of phase change to be performed on data symbols by phase changer 205B include a method for performing periodical phase change (phase change cycle N) on the data symbols by formula (2). However, the method for performing phase change on data symbols is not limited to this method.

Doing this will improve data reception quality in the data symbol reception apparatus performing MIMO transmission (transmitting multiple streams) in an environment where direct waves are dominant, particularly in the LOS environment. This point will be described.

For example, it is assumed that the modulation scheme to be used by mapper 104 of FIG. 1 is quadrature phase shift keying (QPSK). Mapped signal 201A of FIG. 18 is a QPSK signal, and mapped signal 201B is also a QPSK signal. That is, the transmission apparatus transmits two QPSK streams. Then, signal processor 811 of FIG. 8 obtains, for example, 16 candidate signal points by using channel estimation signals 806_1 and 806_2. QPSK allows transmission of two bits, and a total of four bits can be transmitted by two streams. Therefore, $2^4$=16 candidate signal points are present. Note that other 16 candidate signal points are obtained using channel estimation signals 808_1 and 8082, which however will be described in a similar way; therefore, the following description will be made focusing on the 16 candidate signal points obtained using channel estimation signals 806_1 and 806_2.

FIG. 12 is a diagram illustrating one example of this state. In both FIGS. 12(A) and 12(B), a horizontal axis is in-phase I and a vertical axis is quadrature Q, and 16 candidate signal points are present on the in-phase quadrature (IQ) plane. One of the 16 candidate signal points is the signal point transmitted by the transmission apparatus. Therefore, these are called "16 candidate signal points".

In an environment where direct waves are dominant, particularly in the LOS environment, First Case:

Consider a case where phase changers 205A and 205B of FIG. 22 are not present (that is, a case where phase change by phase changers 205A and 205B of FIG. 22 is not performed).

In the "first case", since phase change is not performed, there is a possibility of falling into the state as illustrated in FIG. 12(A). When falling into the state of FIG. 12(A), since there are portions where the signal points are dense (distance between the signal points are short) such as "signal points 1201 and 1202", "signal points 1203, 1204, 1205 and 1206", and "signal points 1207 and 1208", data reception quality may deteriorate in the reception apparatus of FIG. 8.

To overcome this problem, phase changers 205A and 205B are inserted in FIG. 22. Insertion of phase changers 205A and 205B will lead to a mixture of the symbol numbers where the signal points are dense (distance between the signal points is short) as illustrated in FIG. 12(A), and the symbol numbers where "distance between the signal points is long" as illustrated in FIG. 12(B), depending on symbol number i. Introduction of an error correction code for this state will provide high error correction capability and allow the reception apparatus of FIG. 8 to obtain high data reception quality.

Note that in FIG. 22, phase changers 205A and 205B of FIG. 22 do not perform phase change on "pilot symbols and preambles" for performing channel estimation for demodulating (detecting) data symbols such as pilot symbols and preambles. This makes it possible to implement in data symbols "a mixture of the symbol numbers where the signal points are dense (distance between signal points is short) as illustrated in FIG. 12(A), and the symbol numbers where "distance between signal points is long" as illustrated in FIG. 12(B), depending on symbol number i".

However, even when phase changers 205A and 205B of FIG. 22 perform phase change on "pilot symbols and preambles" for performing channel estimation for demodulating (detecting) data symbols such as pilot symbols and preambles, this may "make it possible to implement in data symbols "a mixture of the symbol numbers where the signal points are dense (distance between signal points is short) as illustrated in FIG. 12(A), and the symbol numbers where "distance between signal points is long" as illustrated in FIG. 12(B), depending on symbol number i"". In this case, phase change needs to be performed through addition of some condition to the pilot symbol and preamble. For example, a method for providing a rule different from a phase change rule for data symbols and "performing phase change on pilot symbols and/or preambles" is considered. As an example, there is a method for periodically performing phase change of a cycle N on data symbols, and for periodically performing phase change of a cycle M on pilot symbols and/or preambles (N and M are each an integer equal to or greater than 2).

As described above, phase changer 209A receives baseband signal 208A and control signal 200, performs phase change on baseband signal 208A based on control signal 200, and then outputs phase-changed signal 210A. Baseband signal 208A is a function of symbol number i (i is an integer equal to or greater than 0) and is represented as x'(i). Then, phase-changed signal 210A (x(i)) can be represented as $x(i)=e^{j \times \varepsilon(i)} \times x'(i)$ (j is an imaginary unit). The operation of phase changer 209A may be cyclic delay diversity (CDD) (cyclic shift diversity (CSD)) described in NPTL 2 and NPTL 3. Phase changer 209A is characterized by performing phase change on symbols in a frequency axis direction. For example, phase change is performed on symbols such as data symbols, pilot symbols, and control information symbols. Therefore, in this case, target symbols of symbol number i are symbols such as data symbols, pilot symbols, control information symbols, and preambles (the other symbols). In the case of FIG. 22, phase changer 209A, which performs phase change on baseband signal 208A, performs phase change on each symbol illustrated in FIG. 4.

Therefore, in the frame of FIG. 4, phase changer 209A of FIG. 22 performs phase change on all the symbols of carriers 1 to 36 and time $1 (in this case, all the symbols are the other symbol 403).

Similarly,

"phase changer 209A of FIG. 22 performs phase change on all the symbols of carriers 1 to 36 and time $2 (in this case, all the symbols are the other symbol 403)", "phase changer 209A of FIG. 22 performs phase change on all the symbols of carriers 1 to 36 and time $3 (in this case, all the symbols are the other symbol 403)", "phase changer 209A of FIG. 22 performs phase change on all the symbols of carriers 1 to 36 and time $4 (in this case, all the symbols are the other symbol 403)", "phase changer 209A of FIG. 22 performs phase change on all the symbols of carriers 1 to 36 and time $5 (in this case, all the symbols are pilot symbol 401 or data symbol 402)", "phase changer 209A of FIG. 22 performs phase change on all the symbols of carriers 1 to 36 and time $6 (in this case, all the symbols are pilot symbol 401 or data symbol 402)", "phase changer 209A of FIG. 22 performs phase change on all the symbols of carriers 1 to 36 and time $7 (in this case, all the symbols are pilot symbol 401 or data symbol 402)", "phase changer 209A of FIG. 22 performs phase change on all the symbols of carriers 1 to 36 and time $8 (in this case, all the symbols are pilot symbol 401 or data symbol 402)", "phase changer 209A of FIG. 22 performs phase change on all the symbols of carriers 1 to 36 and time $9 (in this case, all the symbols are pilot symbol 401 or data symbol 402)", "phase changer 209A of FIG. 22 performs phase change on all the symbols of carriers 1 to 36 and time $10 (in this case, all the symbols are pilot symbol 401 or data symbol 402)", and "phase changer 209A of FIG. 22 performs phase change on all the symbols of carriers 1 to 36 and time $11 (in this case, all the symbols are pilot symbol 401 or data symbol 402)".

As described earlier, phase changer 209B receives baseband signal 208B and control signal 200, performs phase change on baseband signal 208B based on control signal 200, and outputs phase-changed signal 210B. Baseband signal 208B is a function of symbol number i (i is an integer equal to or greater than 0) and is represented as y'(i). Then, phase-changed signal 210B (y(i)) can be represented as $y(i)=e^{j \times n(i)} \times y'(i)$ (j is an imaginary unit). The operation of phase changer 209B may be cyclic delay diversity (CDD) (cyclic shift diversity (CSD)) described in NPTL 2 and NPTL 3. Phase changer 209B is characterized by performing phase change on symbols in a frequency axis direction. For example, phase change is performed on symbols such as data symbols, pilot symbols, and control information symbols. Therefore, in this case, target symbols of symbol number i are symbols such as data symbols, pilot symbols, control information symbols, and preambles (the other symbols). In FIG. 22, phase changer 209B, which performs phase change on baseband signal 208B, performs phase change on each symbol illustrated in FIG. 5.

Therefore, in the frame of FIG. 5, phase changer 209B of FIG. 22 performs phase change on all the symbols of carriers 1 to 36 and time $1 (in this case, all the symbols are the other symbol 503).

Similarly,

"phase changer 209B of FIG. 22 performs phase change on all the symbols of carriers 1 to 36 and time $2 (in this case, all the symbols are the other symbol 503)", "phase changer 209B of FIG. 22 performs phase change on all the symbols of carriers 1 to 36 and time $3 (in this case, all the symbols are the other symbol 503)", "phase changer 209B of FIG. 22 performs phase change on all the symbols of carriers 1 to 36 and time $4 (in this case, all the symbols are the other symbol 503)", "phase changer 209B of FIG. 22 performs phase change on all the symbols of carriers 1 to 36 and time $5 (in this case, all the symbols are pilot symbol 501 or data symbol 502)", "phase changer 209B of FIG. 22 performs phase change on all the symbols of carriers 1 to 36 and time $6 (in this case, all the symbols are pilot symbol 501 or data symbol 502)", "phase changer 209B of FIG. 22 performs phase change on all the symbols of carriers 1 to 36 and time $7 (in this case, all the symbols are pilot symbol 501 or data symbol 502)", "phase changer 209B of FIG. 22 performs phase change on all the symbols of carriers 1 to 36 and time $8 (in this case, all the symbols are pilot symbol 501 or data symbol 502)", "phase changer 209B of FIG. 22 performs phase change on all the symbols of carriers 1 to 36 and time $9 (in this case, all the symbols are pilot symbol 501 or data symbol 502)", "phase changer 209B of FIG. 22 performs phase change on all the symbols of carriers 1 to 36 and time $10 (in this case, all the symbols are pilot symbol 501 or data symbol 502)", and "phase changer 209B of FIG. 22 performs phase change on all the symbols of carriers 1 to 36 and time $11 (in this case, all the symbols are pilot symbol 501 or data symbol 502)".

FIG. 13 is a diagram illustrating the frame structure of transmission signal 108_A of FIG. 1 different from FIG. 4. Details have been described in the first exemplary embodiment, and thus description thereof will be omitted.

FIG. 14 is a diagram illustrating the frame structure of transmission signal 108_B of FIG. 1 different from FIG. 5. Details have been described in the first exemplary embodiment, and thus description thereof will be omitted.

When a symbol is present at carrier A and time $B of FIG. 13 and when a symbol is present at carrier A and time $B of FIG. 14, the symbol at carrier A and time $B of FIG. 13 and the symbol at carrier A and time $B of FIG. 14 are transmitted at the same time and the same frequency. Note that the frame structures of FIGS. 13 and 14 are merely examples.

The other symbols in FIGS. 13 and 14 are symbols corresponding to "preamble signal 252 and control information symbol signal 253 in FIG. 22". Therefore, the other symbol 503 of FIG. 14 at the same time and the same frequency (same carrier) as the other symbol 403 of FIG. 13 transmits the same data (same control information) when the control information is transmitted.

Note that it is assumed that the reception apparatus simultaneously receives the frame of FIG. 13 and the frame of FIG. 14, but even by receiving only the frame of FIG. 13 or only the frame of FIG. 14, the reception apparatus can obtain data transmitted by the transmission apparatus.

Phase changer 209A receives baseband signal 208A and control signal 200, performs phase change on baseband signal 208A based on control signal 200, and then outputs phase-changed signal 210A. Baseband signal 208A is a function of symbol symbol number i (i is an integer equal to or greater than 0) and is represented as x'(i). Then, phase-changed signal 210A (x(i)) can be represented as $x(i)=e^{j\times\varepsilon(i)}\times x'(i)$ (j is an imaginary unit). The operation of phase changer 209A may be cyclic delay diversity (CDD) (cyclic shift diversity (CSD)) described in NPTL 2 and NPTL 3. Phase changer 209A is characterized by performing phase change on symbols in a frequency axis direction. For example, phase change is performed on symbols such as data symbols, pilot symbols, and control information symbols. At this time, the null symbol can also be considered as a phase change target. Therefore, in this case, target symbols of symbol number i are symbols such as data symbols, pilot symbols, control information symbols, preambles (the other symbols) and null symbols. However, even if phase change is performed on the null symbol, the signal before the phase change and the signal after the phase change are the same (in-phase component I is zero (0) and quadrature component Q is zero (0)). Therefore, it can be interpreted that the null symbol is not the phase change target. In FIG. 22, phase changer 209A, which performs phase change on baseband signal 208A, performs phase change on each symbol illustrated in FIG. 13.

Therefore, in the frame of FIG. 13, phase changer 209A of FIG. 22 performs phase change on all the symbols of carriers 1 to 36 and time $1 (in this case, all the symbols are the other symbol 403). However, the handling of phase change of null symbol 1301 is as described above.

Similarly,

"phase changer 209A of FIG. 22 performs phase change on all the symbols of carriers 1 to 36 and time $2 (in this case, all the symbols are the other symbol 403). However, the handling of phase change of null symbol 1301 is as described above".

"Phase changer 209A of FIG. 22 performs phase change on all the symbols of carriers 1 to 36 and time $3 (in this case, all the symbols are the other symbol 403). However, the handling of phase change of null symbol 1301 is as described above".

"Phase changer 209A of FIG. 22 performs phase change on all the symbols of carriers 1 to 36 and time $4 (in this case, all the symbols are the other symbol 403). However, the handling of phase change of null symbol 1301 is as described above".

"Phase changer 209A of FIG. 22 performs phase change on all the symbols of carriers 1 to 36 and time $5 (in this case, all the symbols are pilot symbol 401 or data symbol 402). However, the handling of phase change of null symbol 1301 is as described above".

"Phase changer 209A of FIG. 22 performs phase change on all the symbols of carriers 1 to 36 and time $6 (in this case, all the symbols are pilot symbol 401 or data symbol 402). However, the handling of phase change of null symbol 1301 is as described above".

"Phase changer 209A of FIG. 22 performs phase change on all the symbols of carriers 1 to 36 and time $7 (in this case, all the symbols are pilot symbol 401 or data symbol 402). However, the handling of phase change of null symbol 1301 is as described above".

"Phase changer 209A of FIG. 22 performs phase change on all the symbols of carriers 1 to 36 and time $8 (in this case, all the symbols are pilot symbol 401 or data symbol 402). However, the handling of phase change of null symbol 1301 is as described above".

"Phase changer 209A of FIG. 22 performs phase change on all the symbols of carriers 1 to 36 and time $9 (in this case, all the symbols are pilot symbol 401 or data symbol 402). However, the handling of phase change of null symbol 1301 is as described above".

"Phase changer 209A of FIG. 22 performs phase change on all the symbols of carriers 1 to 36 and time $10 (in this case, all the symbols are pilot symbol 401 or data symbol 402). However, the handling of phase change of null symbol 1301 is as described above".

"Phase changer 209A of FIG. 22 performs phase change on all the symbols of carriers 1 to 36 and time $11 (in this case, all the symbols are pilot symbol 401 or data symbol 402). However, the handling of phase change of null symbol 1301 is as described above".

. . .

The phase change value in phase changer 209A is represented as $\Omega(i)$. Baseband signal 208A is x'(i), and phase-changed signal 210A is x(i). Therefore, $x(i)=\Omega(i) \times x'(i)$ holds true.

For example, the phase change value is set by formula (38). Q is an integer equal to or greater than 2, and Q is a phase change cycle. j is an imaginary unit. However, formula (38) is merely an example and the phase change value is not limited to this formula.

For example, $\Omega(i)$ may be set to perform phase change so as to have the cycle Q.

Furthermore, for example, in FIGS. 4 and 13, the same phase change value may be provided to the same carrier, and the phase change value may be set for each carrier. For example, this will be as follows.

For carrier 1 in FIGS. 4 and 13, regardless of time, the phase change value is formula (39).

For carrier 2 in FIGS. 4 and 13, regardless of time, the phase change value is formula (40).

For carrier 3 in FIGS. 4 and 13, regardless of time, the phase change value is formula (41).

For carrier 4 in FIGS. 4 and 13, regardless of time, the phase change value is formula (42).

. . .

Operation examples of phase changer 209A of FIG. 22 have been described above.

Phase changer 209B receives baseband signal 208B and control signal 200, performs phase change on baseband signal 208B based on control signal 200, and then outputs phase-changed signal 210B. Baseband signal 208B is a function of symbol symbol number i (i is an integer equal to or greater than 0) and is represented as y'(i). Then, phase-changed signal 210B (x(i)) can be represented as $y(i)=e^{j \times n(i)} \times y'(i)$ (j is an imaginary unit). The operation of phase changer 209B may be cyclic delay diversity (CDD) (cyclic shift diversity (CSD)) described in NPTL 2 and NPTL 3. Phase changer 209B is characterized by performing phase change on symbols in a frequency axis direction. For example, phase change is performed on symbols such as data symbols, pilot symbols, and control information symbols. At this time, the null symbol can also be considered as a phase change target. Therefore, in this case, target symbols of symbol number i are symbols such as data symbols, pilot symbols, control information symbols, preambles (the other symbols) and null symbols. However, even if phase change is performed on the null symbol, the signal before the phase change and the signal after the phase change are the same (in-phase component I is zero (0) and quadrature component Q is zero (0)). Therefore, it can be interpreted that the null symbol is not the phase change target. In the case of FIG. 22, phase changer 209B, which performs phase change on baseband signal 208B, performs phase change on each symbol illustrated in FIG. 14.

Therefore, in the frame of FIG. 14, phase changer 209B of FIG. 22 performs phase change on all the symbols of carriers 1 to 36 and time $1 (in this case, all the symbols are the other symbol 503). However, the handling of phase change of null symbol 1301 is as described above.

Similarly,

"phase changer 209B of FIG. 22 performs phase change on all the symbols of carriers 1 to 36 and time $2 (in this case, all the symbols are the other symbol 503). However, the handling of phase change of null symbol 1301 is as described above".

"Phase changer 209B of FIG. 22 performs phase change on all the symbols of carriers 1 to 36 and time $3 (in this case, all the symbols are the other symbol 503). However, the handling of phase change of null symbol 1301 is as described above".

"Phase changer 209B of FIG. 22 performs phase change on all the symbols of carriers 1 to 36 and time $4 (in this case, all the symbols are the other symbol 503). However, the handling of phase change of null symbol 1301 is as described above".

"Phase changer 209B of FIG. 22 performs phase change on all the symbols of carriers 1 to 36 and time $5 (in this case, all the symbols are pilot symbol 501 or data symbol 502). However, the handling of phase change of null symbol 1301 is as described above".

"Phase changer 209B of FIG. 22 performs phase change on all the symbols of carriers 1 to 36 and time $6 (in this case, all the symbols are pilot symbol 501 or data symbol 502). However, the handling of phase change of null symbol 1301 is as described above".

"Phase changer 209B of FIG. 22 performs phase change on all the symbols of carriers 1 to 36 and time $7 (in this case, all the symbols are pilot symbol 501 or data symbol 502). However, the handling of phase change of null symbol 1301 is as described above".

"Phase changer 209B of FIG. 22 performs phase change on all the symbols of carriers 1 to 36 and time $8 (in this case, all the symbols are pilot symbol 501 or data symbol 502). However, the handling of phase change of null symbol 1301 is as described above".

"Phase changer 209B of FIG. 22 performs phase change on all the symbols of carriers 1 to 36 and time $9 (in this case, all the symbols are pilot symbol 501 or data symbol 502). However, the handling of phase change of null symbol 1301 is as described above".

"Phase changer 209B of FIG. 22 performs phase change on all the symbols of carriers 1 to 36 and time $10 (in this case, all the symbols are pilot symbol 501 or data symbol 502). However, the handling of phase change of null symbol 1301 is as described above".

"Phase changer 209B of FIG. 22 performs phase change on all the symbols of carriers 1 to 36 and time $11 (in this case, all the symbols are pilot symbol 501 or data symbol 502). However, the handling of phase change of null symbol 1301 is as described above".

The phase change value in phase changer 209B is represented as Δ(i). Baseband signal 208B is y'(i), and phase-changed signal 210B is y(i). Therefore, y(i)=Δ(i)×y'(i) holds true.

For example, the phase change value is set by formula (49). β is an integer equal to or greater than 2, and β is a phase change cycle. Note that the values of Q and R in formula (38) are preferably different from each other.

For example, Δ(i) may be set to perform phase change so as to have the cycle R.

Furthermore, for example, in FIGS. 5 and 14, the same phase change value may be provided to the same carrier, and the phase change value may be set for each carrier. For example, this will be as follows.

For carrier 1 in FIGS. 5 and 14, regardless of time, the phase change value is formula (39).
For carrier 2 in FIGS. 5 and 14, regardless of time, the phase change value is formula (40).
For carrier 3 in FIGS. 5 and 14, regardless of time, the phase change value is formula (41).
For carrier 4 in FIGS. 5 and 14, regardless of time, the phase change value is formula (42).

...

Operation examples of phase changer 209B of FIG. 20 have been described above.

Advantageous effects that can be obtained by phase changers 209A and 209B of FIG. 22 will be described.

It is assumed that the control information symbol is included in the other symbols 403 and 503 of "the frames of FIGS. 4 and 5" or "the frames of FIGS. 13 and 14". As described earlier, when transmitting the control information, the other symbol 503 of FIG. at the same time and the same frequency (same carrier) as the other symbol 403 transmits the same data (same control information).

Here, consider the following cases.
Case 2:

The control information symbol is transmitted using one of antenna unit #A (109_A) and antenna unit #B (109_B) of FIG. 1.

When transmission is performed as in "case 2", since the number of antennas that transmit the control information symbol is 1, a gain of space diversity is smaller than in a case of "transmitting the control information symbol using both antenna unit #A (109_A) and antenna unit #B (109_B)", and thus data reception quality deteriorates even if the reception apparatus of FIG. 8 performs reception in "case 2". Therefore, in terms of improvement in data reception quality, it is preferable "to transmit the control information symbol using both "antenna unit #A (109_A) and antenna unit #B (109_B)".

Case 3:

The control information symbol is transmitted using both of antenna unit #A (109_A) and antenna unit #B (109_B) of FIG. 1. However, phase changers 209A and 209B in FIG. 22 do not perform phase change.

When transmission is performed as in "case 3", since the modulated signal transmitted from antenna unit #A 109_A is the same as the modulated signal transmitted from antenna unit #B 109_B (or there is a specified phase shift), depending on a radio wave propagation environment, the reception apparatus of FIG. 8 may have a very poor reception signal and both of the modulated signals may be affected by the same multipath. This will cause a problem that data reception quality deteriorates in the reception apparatus of FIG. 8.

To alleviate this problem, phase changers 209A and 209B are provided in FIG. 22. This enables phase change in a time or frequency direction, allowing the reception apparatus of FIG. 8 to reduce the possibility of a poor reception signal. Also, it is likely that there is a difference between an influence of the multipath received by the modulated signal transmitted from antenna unit #A 109_A and an influence of the multipath received by the modulated signal transmitted from antenna unit #B 109_B. Therefore, it is likely that a diversity gain is obtained, whereby data reception quality improves in the reception apparatus of FIG. 8.

For the above reason, phase changers 209A and 209B are provided in FIG. 22 to perform phase change.

The other symbol 403 and the other symbol 503 include, other than the control information symbol, for example, a symbol for signal detection, a symbol for performing frequency synchronization and time synchronization, and a symbol for channel estimation (symbol for estimating propagation path fluctuation) for demodulating and decoding the control information symbol. In addition, "the frames of FIGS. 4 and 5" or "the frames of FIGS. 13 and 14" include pilot symbols 401 and 501. Using these symbols will make it possible to demodulate and decode the control information symbol more accurately.

In "the frames of FIGS. 4 and 5" or "the frames of FIGS. 13 and 14", data symbol 402 and data symbol 502 transmit multiple streams (perform MIMO transmission) by using the same frequency (band) and the same time. Demodulating these data symbols requires to use the symbol for signal detection, the symbol for frequency synchronization and time synchronization, and the symbol for channel estimation (symbol for estimating propagation path fluctuation) included in the other symbol 403 and the other symbol 503.

At this time, as described above, phase changers 209A and 209B perform phase change on "the symbol for signal detection, the symbol for frequency synchronization and time synchronization, and the symbol for channel estimation (symbol for estimating propagation path fluctuation) included in the other symbol 403 and the other symbol 503".

Under such circumstances, if this process is not reflected in data symbol 402 and data symbol 502 (in data symbol 402 for the case described above), when the reception apparatus demodulates and decodes data symbol 402 and data symbol 502, it is necessary to perform demodulation and decoding reflecting the process for the phase change performed by phase changer 209A, and the process is likely to be complicated. This is because phase changers 209A and 209B perform phase change on "the symbol for signal detection, the symbol for frequency synchronization and time synchronization, and the symbol for channel estimation (symbol for estimating propagation path fluctuation) included in the other symbol 403 and the other symbol 503".

However, as illustrated in FIG. 22, when phase changers 209A and 209B perform phase change on data symbol 402 and data symbol 502, there is an advantage that the reception apparatus can easily demodulate and decode data symbol 402 and data symbol 502 by using the channel estimation signal (propagation path fluctuation estimation signal) estimated using "the symbol for signal detection, the symbol for frequency synchronization and time synchronization, and the symbol for channel estimation (symbol for estimating propagation path fluctuation) included in the other symbol 403 and the other symbol 503".

In addition, as illustrated in FIG. 22, when phase changer 209A and 209B perform phase change on data symbol 402 and data symbol 502, it is possible to reduce an influence of a sharp drop in electric field intensity in a frequency axis in the multipath. This may improve data reception quality of data symbol 402 and data symbol 502.

Thus, a characteristic point is that "the target symbol on which phase changers 205A and 205B perform phase change" is different from "the target symbol on which phase changers 209A and 209B perform phase change".

As described above, phase changer 205B of FIG. 22 performing phase change will improve data reception quality of data symbol 402 and data symbol 502 in the reception apparatus, particularly in the LOS environment. Furthermore, phase changers 209A and 209B of FIG. 22 performing phase change will improve, for example, reception quality of the control information symbol included in "the frames of FIGS. 4 and 5" or "the frames of FIGS. 13 and 14" in the reception apparatus. Phase changers 209A and 209B of FIG. 22 performing phase change will also simplify demodulation and decoding operations of data symbol 402 and data symbol 502.

Note that phase changers 205A and 205B of FIG. 22 performing phase change will improve data reception quality of data symbol 402 and data symbol 502 in the reception apparatus, particularly in the LOS environment. Furthermore, phase changers 209A and 209B of FIG. 22 performing phase change on data symbol 402 and data symbol 502 will improve reception quality of data symbol 402 and data symbol 502.

Note that Q in formula (38) may be an integer equal to or less than −2, and at this time, the phase change cycle is the absolute value of Q. This point can also be applied to the first exemplary embodiment.

R in formula (49) may be an integer equal to or less than −2, and at this time, the phase change cycle is the absolute value of R.

Also, when the information described in supplementary 1 is considered, the cyclic delay amount set by phase changer 209A and the cyclic delay amount set by phase changer 209B preferably have different values.

Seventh Exemplary Embodiment

The present exemplary embodiment will describe an example of a communication system using a transmission method and a reception method described in the first to sixth exemplary embodiments.

Figure 23:
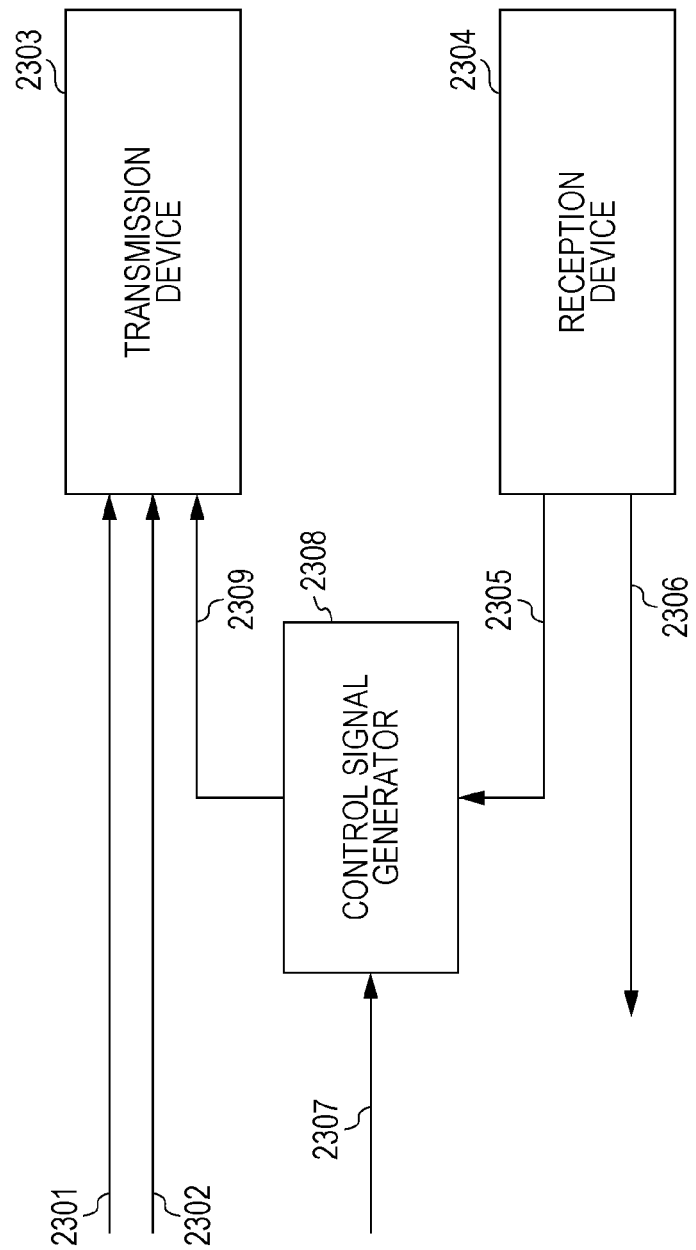
FIG. 23 is a diagram illustrating one exemplary configuration of a base station.

FIG. 23 is a diagram illustrating one exemplary configuration of a base station (or an access point or the like) according to the present exemplary embodiment.

Transmission apparatus 2303 receives data 2301, signal group 2302, and control signal 2309, generates a modulated signal according to data 2301 and signal group 2302, and then transmits the modulated signal from an antenna.

At this time, one example of the configuration of transmission apparatus 2303 is, for example, as illustrated in FIG. 1. Data 2301 corresponds to 101 of FIG. 1. Signal group 2302 corresponds to 110 of FIG. 1. Control signal 2309 corresponds to 110 of FIG. 1.

Reception apparatus 2304 receives a modulated signal transmitted from a communication partner, for example, a terminal, performs signal processing, demodulation, and decoding on this modulated signal, and then outputs control information signal 2305 from the communication partner and reception data 2306.

At this time, one example of the configuration of reception apparatus 2304 is, for example, as illustrated in FIG. 8. Reception data 2306 corresponds to 812 of FIG. 8. Control information signal 2305 from the communication partner corresponds to 810 of FIG. 8.

Control signal generator 2308 receives control information signal 2305 from the communication partner and setting signal 2307. Based on these signals, control signal generator 2308 generates and outputs control signal 2309.

Figure 24:
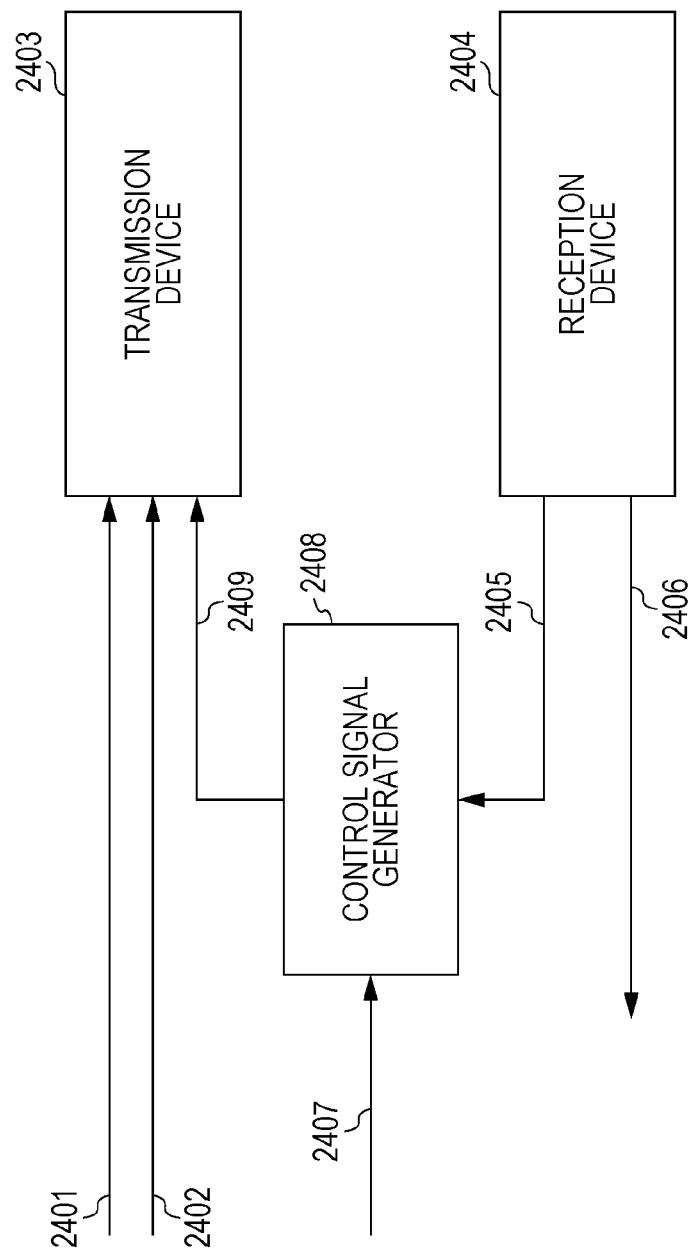
FIG. 24 is a diagram illustrating one exemplary configuration of a terminal.

FIG. 24 is a diagram illustrating one exemplary configuration of a terminal that is a communication partner of the base station of FIG. 23.

Transmission apparatus 2403 receives data 2401, signal group 2402, and control signal 2409, generates a modulated signal according to data 2401 and signal group 2402, and then transmits the modulated signal from an antenna.

At this time, one example of the configuration of transmission apparatus 2403 is, for example, as illustrated in FIG. 1. Data 2401 corresponds to 101 of FIG. 1. Signal group 2402 corresponds to 110 of FIG. 1. Control signal 2409 corresponds to 110 of FIG. 1.

Reception apparatus 2404 receives the modulated signal transmitted from the communication partner, for example, the base station, performs signal processing, demodulation, and decoding on this modulated signal, and then outputs control information signal 2405 from the communication partner and reception data 2406.

At this time, one example of the configuration of reception apparatus 2404 is, for example, as illustrated in FIG. 8. Reception data 2406 corresponds to 812 of FIG. 8. Control information signal 2405 from the communication partner corresponds to 810 of FIG. 8.

Control signal generator 2408 receives control information signal 2305 from the communication partner and setting signal 2407. Based on these information items, control signal generator 2408 generates and outputs control signal 2409.

Figure 25:
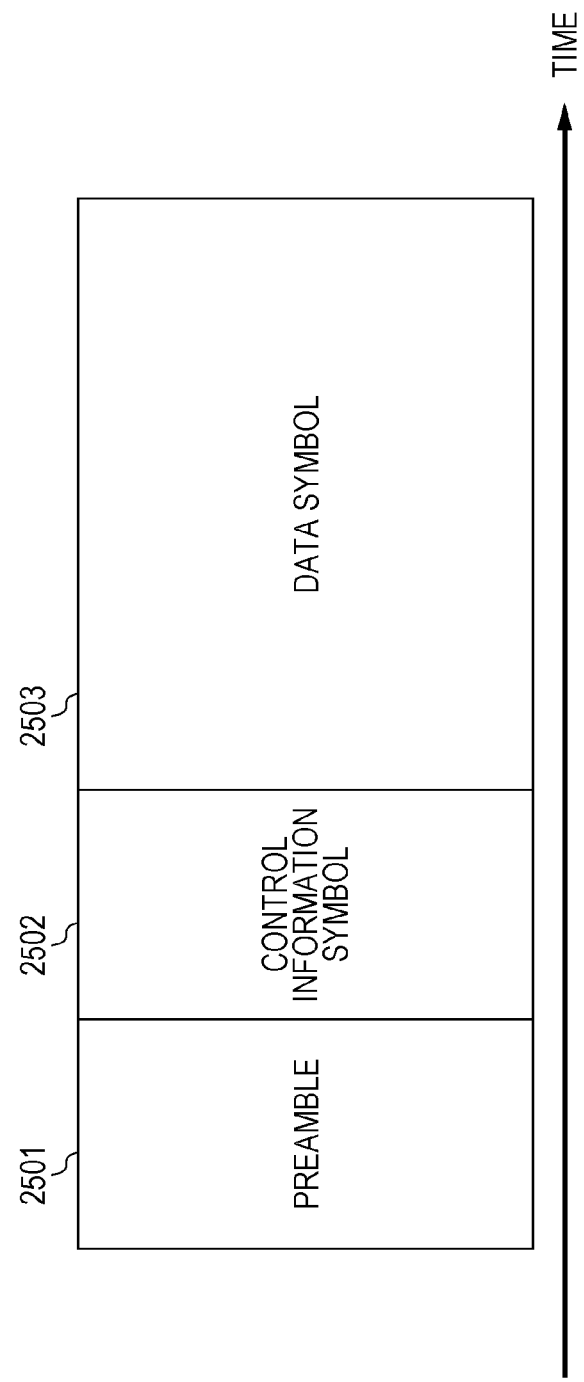
FIG. 25 is a diagram illustrating an exemplary frame structure of a modulated signal.

FIG. 25 is a diagram illustrating one exemplary frame structure of the modulated signal to be transmitted from the terminal of FIG. 24. A horizontal axis is time. Reference numeral 2501 is a preamble, a symbol for the communication partner (for example, base station) to perform signal detection, frequency synchronization, time synchronization, frequency offset estimation, and channel estimation. For example, reference number 2501 is a symbol of phase shift keying (PSK). In addition, reference numeral 2501 may include a training symbol for directivity control. Note that reference numeral 2501 is named a preamble, but may be named otherwise.

Reference numeral 2502 is a control information symbol, and reference numeral 2503 is a data symbol including data to be transmitted to the communication partner.

It is assumed that control information symbol 2502 includes, for example, information about a method for an error correction code used to generate data symbol 2503 (code length (block length), coding rate), information about a modulation scheme, control information for notifying the communication partner, and the like.

Note that FIG. 25 is merely one example of the frame structure. The frame structure is not limited to this frame structure. The symbols illustrated in FIG. 25 may include other symbols, for example, a pilot symbol and a reference symbol. In FIG. 25, a vertical axis may be added to indicate a frequency, and symbols may be present in the frequency axis direction (carrier direction).

One example of the frame structure to be transmitted by the base station of FIG. 23 is, for example, as described with reference to FIGS. 4, 5, 13, and 14. Descriptions of details will be omitted here. Note that the other symbols 403 and 503 may include a training symbol for directivity control. Therefore, the present exemplary embodiment includes a case where the base station transmits a plurality of modulated signals by using a plurality of antennas.

In the communication system as described above, operations of the base station will be described in detail below.

Transmission apparatus 2303 of the base station of FIG. 23 has the configuration of FIG. 1. Signal processor 106 of FIG. 1 has the configuration of any one of FIGS. 2, 18 to 22, and 28 to 33. Note that FIGS. 28 to 33 will be described later. At this time, operations of phase changers 205A and 205B may be switched according to a communication environment and setting conditions. The base station transmits the control information about the operations of phase changers 205A and 205B as part of the control information to be transmitted by the control information symbol of the other symbols 403 and 503 in the frame structure FIGS. 4, 5, 13, and 14.

At this time, the control information about the operations of phase changers 205A and 205B is assumed to be u0 and u1. Table 1 illustrates a relationship between [u0 u1]and phase changers 205A and 205B. Note that u0 and u1 are transmitted, for example, by the base station, as part of the control information symbols of the other symbols 403 and 503. Then, the terminal obtains [u0 u1] included in the control information symbols of the other symbols 403 and 503, is notified of the operations of phase changers 205A and 205B from [u0 u1], and demodulates and decodes the data symbol.

TABLE 1

| u0 u1 | Operation of phase changer |
|---|---|
| 00 | Not perform phase change |
| 01 | Change phase change value for each symbol (periodically/regularly) |
| 10 | Perform phase change with specified phase change value (set) |
| 11 | Reserve |

Table 1 is interpreted as follows.

When the base station sets that "phase changers 205A and 205B do not perform phase change", "u0=0, u1=0" is set. Therefore, phase changer 205A outputs signal (206A) without performing phase change on input signal (204A). Similarly, phase changer 205B outputs signal (206B) without performing phase change on input signal (204B).

When the base station sets that "phase changers 205A and 205B periodically/regularly perform phase change for each symbol", "u0=0, u1=1" is set. Note that details of the method by which phase changers 205A and 205B periodically/regularly change phase change for each symbol are as described in the first to sixth exemplary embodiments, and thus descriptions of details will be omitted. In a case where signal processor 106 of FIG. 1 has any of the configurations of FIGS. 20 to 22, "u0=0, u1=1"is set also for a case where" phase changer 205A performs phase change periodically/regularly for each symbol, and phase changer 205B does not perform phase change periodically/regularly for each symbol"and a case where" phase changer 205A does not perform phase change periodically/regularly for each symbol, and phase changer 205B performs phase change periodically/regularly for each symbol".

When the base station sets that "phase changers 205A and 205B perform phase change with a specified phase change value", "u0=1, u1=0" is set. Here, "performing phase change with a specified phase change value" will be described.

It is assumed that, for example, phase changer 205A performs phase change with a specified phase change value.

At this time, input signal (204A) is z1($i$) (i is a symbol number). Then, when "phase change is performed with a specified phase change value", output signal (206A) is represented as $e^{j\alpha} \times z1(i)$ ((a is a real number and a specified phase change value). At this time, amplitude may be changed, and in this case, output signal (206A) is represented as $A \times e^{j\alpha} \times z1(i)$ (A is a real number).

Similarly, it is assumed that phase changer 206A performs phase change with a specified phase change value. At this time, input signal (204B) is z2($i$) (i is a symbol number). Then, when "phase change is performed with a specified phase change value", output signal (206B) is represented as $e^{j\beta} \times z2(i)$ (α is a real number and a specified phase change value). At this time, amplitude may be changed, and in this case, output signal (206B) is represented as $B \times e^{j\beta} \times z2(i)$ (B is a real number).

Note that in a case where signal processor 106 of FIG. 1 has any of the configurations of FIGS. 20 to 22 and FIGS. 31 to 33, "u0=1, u1=0" is set also for a case where "phase changer 205A performs phase change with a specified phase change value and phase changer 205B does not perform phase change with a specified phase change value" and a case where "phase changer 205A does not perform phase change with a specified phase change value and phase changer 205B performs phase change with a specified phase change value".

Next, an example of a method for setting "a specified phase change value" will be described. A first method and a second method will be described below.

First Method:

The base station transmits the training symbol. Then, the terminal serving as a communication partner transmits information about "the specified phase change value (set)" to the base station by using the training symbol. The base station performs phase change based on the information about "the specified phase change value (set)" obtained from the terminal.

Alternatively, the base station transmits the training symbol. Then, the terminal serving as a communication partner transmits information about a reception result of the training symbol (for example, information about a channel estimation value) to the base station. The base station obtains a preferred value of "the specified phase change value (set)" from "the information about the reception result of the training symbol" obtained from the terminal to perform phase change.

Note that the base station needs to notify the terminal of the information about the value of the set "specified phase change value (set)". In this case, the base station transmits the information about the value of "the specified phase change value (set)" set by the base station with the control information symbol in the other symbols 403 and 503 in FIGS. 4, 5, 13, and 14.

An example of the first method will be described with reference to FIG. 26. FIG. 26(A) is a diagram illustrating the symbols transmitted by the base station on the time axis. A horizontal axis is time. FIG. 26(B) is a diagram illustrating the symbols transmitted by the terminal on the time axis. A horizontal axis is time.

Figure 26:
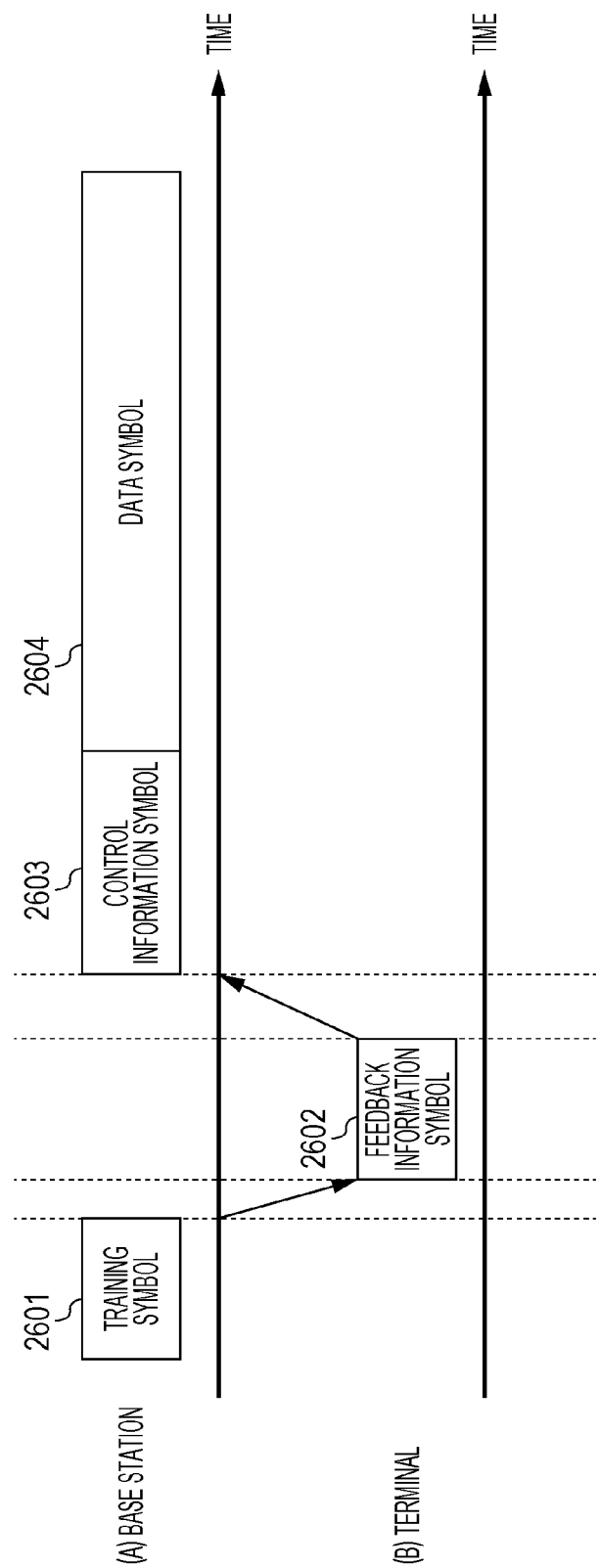
FIG. 26 is a diagram illustrating one exemplary communication between the base station and the terminal.

FIG. 26 will be specifically described below. First, it is assumed that the terminal requests the base station to perform communication.

Then, the base station transmits at least training symbol 2601 for "estimating 'the specified phase change value (set)' to be used by the base station to transmit data symbol 2604". Note that the terminal may perform other estimation using training symbol 2601. For training symbol 2601, for example, PSK modulation may be used. As in the case of the pilot symbol described in the first to sixth exemplary embodiments, the training symbol is transmitted from a plurality of antennas.

The terminal receives training symbol 2601 transmitted from the base station, calculates the preferred "specified phase change value (set)" to be performed by phase changer 205A and/or phase changer 205B included in the base station by using training symbol 2601. The terminal transmits feedback information symbol 2602 including the calculated value.

The base station receives feedback information symbol 2602 transmitted from the terminal, demodulates and decodes this symbol, and obtains information about the preferred "specified phase change value (set)". Based on this information, the phase change value (set) of the phase change to be performed by phase changer 205A and/or phase changer 205B of the base station is set.

Then, the base station transmits control information symbol 2603 and data symbol 2604, and at least data symbol 2604 undergoes phase change with the set phase change value (set).

Note that in data symbol 2604, as described in the first to sixth exemplary embodiments, the base station transmits a plurality of modulated signals from a plurality of antennas. However, unlike the first to sixth exemplary embodiments, phase changer 205A and/or phase changer 205B performs phase change with "the specified phase change value (set)" described above.

The frame structure of the base station and the terminal of FIG. 26 is merely one example, and may include other symbols. Each symbol of training symbol 2601, feedback information symbol 2602, control information symbol 2603, and data symbol 2604 may include other symbols such as, for example, the pilot symbol. Control information symbol 2603 includes information about the value of "the specified phase change value (set)" used when data symbol 2604 is transmitted. Obtaining this information enables the terminal to demodulate and decode data symbol 2604.

As described in the first to sixth exemplary embodiments, for example, when the base station transmits the modulated signal in the frame structure as illustrated in FIGS. 4, 5, 13, and 14, the phase change by phase changer 205A and/or phase changer 205B described above with "the specified phase change value (set)" is performed on data symbols (402 and 502). The symbols to undergo phase change by phase changer 209A and/or phase changer 209B are "pilot symbols 401 and 501" and "the other symbols 403 and 503", as described in the first to sixth exemplary embodiments.

However, even if phase changer 205A and/or phase changer 205B also performs phase change on "pilot symbols 401 and 501" and "the other symbols 403 and 503", demodulation and decoding are possible.

The phrase "the specified phase change value (set)" has been used. In the case of FIGS. 2, 18, 19, 31, 32, and 33, phase changer 205A is not present, whereas phase changer 205B is present. Therefore, in this case, it is necessary to prepare the specified phase change value to be used by phase changer 205B. Meanwhile, in the case of FIGS. 20, 21, 22, 31, 32, and 33, phase changer 205A and phase changer 205B are present. In this case, it is necessary to prepare specified phase change value #A to be used by phase changer 205A and specified phase change value #B to be used by phase changer 205B. Accordingly, the phrase "the specified phase change value (set)" has been used.

Second Method:

The base station starts transmission of a frame to the terminal. At that time, the base station sets the value of "the specified phase change value (set)", for example, based on a value of random number, performs phase change with the specified phase change value, and transmits the modulated signal.

Subsequently, the terminal transmits information indicating failure to obtain the frame (or packet) to the base station, and the base station receives this information.

Then, for example, based on the value of random number, the base station sets (a set of) the value of "the specified phase change value (set)" and transmits the modulated signal. At this time, at least the data symbol including data of the frame (packet) that the terminal has failed to obtain is transmitted by the modulated signal that has undergone phase change based on the reset "specified phase change value (set)". That is, when the base station transmits data of a first frame (packet) twice (or twice or more) by retransmission or the like, "the specified phase change value (set)" used for first transmission and "the specified phase change value (set)" used for second transmission are preferably different from each other. For retransmission, this makes it more likely that the terminal obtains the frame (or packet) by second transmission.

After that, when the base station obtains "information about failure to obtain the frame (or packet)" from the terminal, for example, based on the value of random number, the base station sets the value of "the specific change value (set)".

Note that the base station needs to notify the terminal of the information about the value of the set "specified phase change value (set)". In this case, the base station transmits the information about the value of "the specified phase change value (set)" set by the base station with the control information symbol in the other symbols 403 and 503 in FIGS. 4, 5, 13, and 14.

Note that, although the second method has described that "the base station sets the value of 'the specified phase change value (set)', for example, based on the value of random number," the setting of "the specified phase change value (set)" is not limited to this method. As long as "the specified phase change value (set)" is newly set when "the specified phase change value (set)" is set, "the specified phase change value (set)" may be set by any method.

For example:

"The specified phase change value (set)" is set based on a certain rule.

"The specified phase change value (set)" is set randomly.

"The specified phase change value (set)" is set based on information obtained from the communication partner.

"The specified phase change value (set)" may be set by any of these methods.

However, the method for setting "the specified phase change value (set)" is not limited to these methods.

An example of the second method will be described with reference to FIG. 27. FIG. 27(A) is a diagram illustrating the symbols transmitted by the base station on the time axis. A horizontal axis is time. FIG. 27(B) is a diagram illustrating the symbols transmitted by the terminal on the time axis. A horizontal axis is time.

Figure 27:
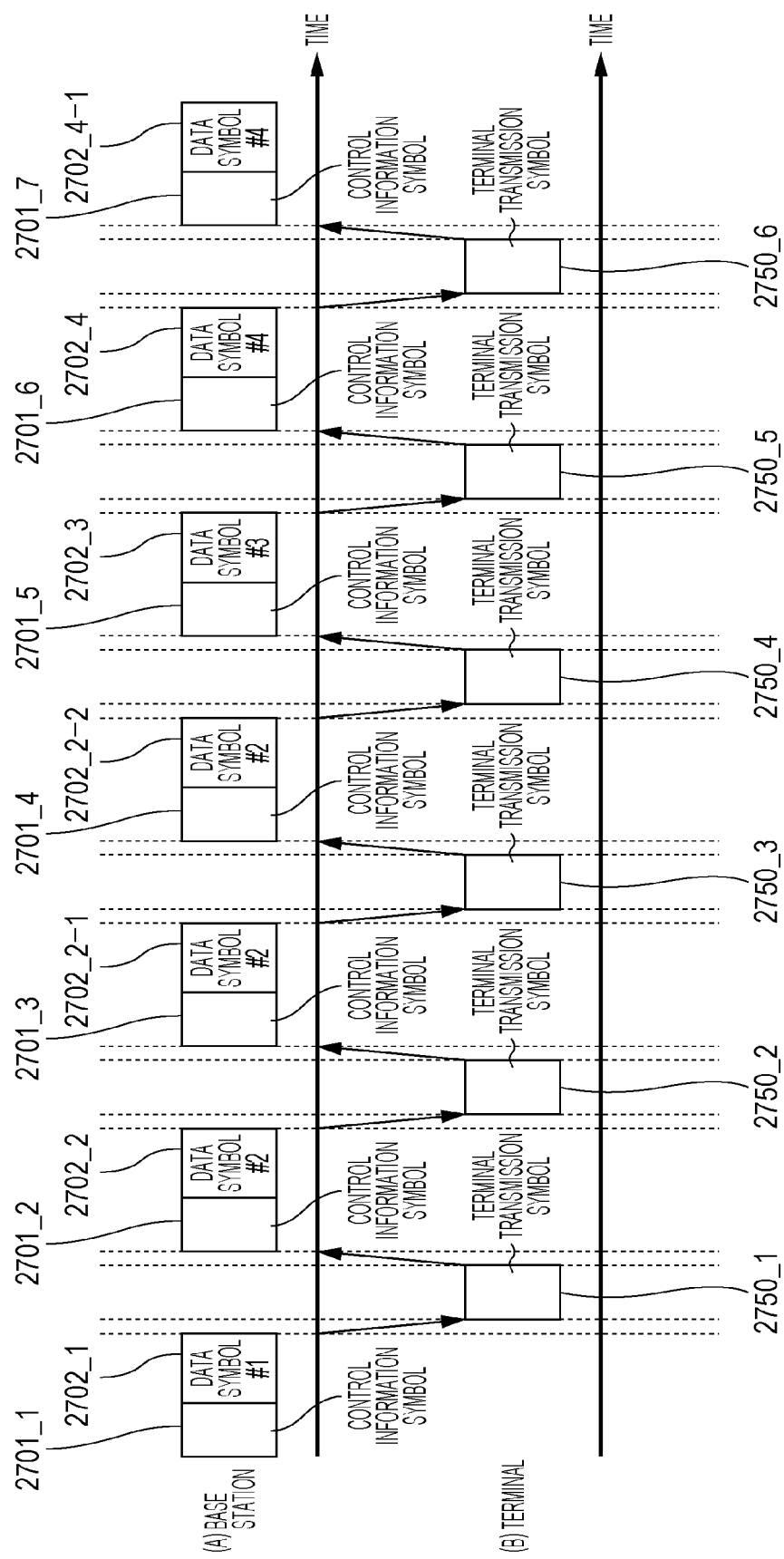
FIG. 27 is a diagram illustrating one exemplary communication between the base station and the terminal.

FIG. 27 will be specifically described below.

First, for describing FIG. 27, FIGS. 28 to 33 will be described.

As one example of the configuration of signal processor 106 in FIG. 1, the configurations of FIGS. 2 and 18 to 22 have been illustrated. Configurations of modifications thereof are illustrated in FIGS. 28 to 33.

Figure 28:
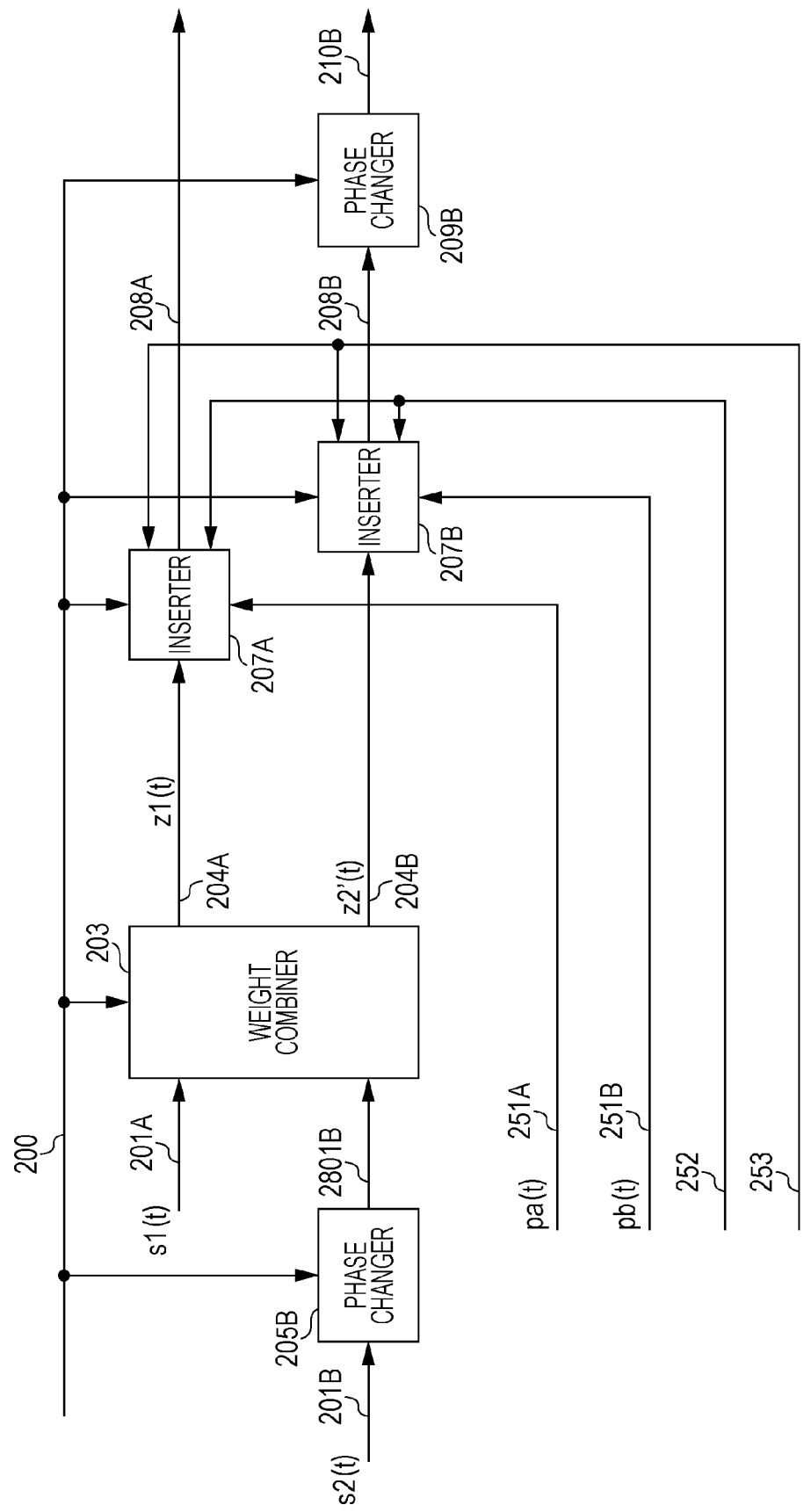
FIG. 28 is a diagram illustrating one exemplary configuration of the signal processor of FIG. 1.

FIG. 28 is an example in which phase changer 205B is inserted before weight combiner 203 in the configuration of FIG. 2. Next, only a portion of the operation of FIG. 28 different from FIG. 2 will be described.

Phase changer 205B receives mapped signal 201B (s2(*t*)) and control signal 200. Based on control signal 200, phase changer 205B performs phase change on mapped signal 201B and then outputs phase-changed signal 2801B.

For example, phase changer 205B performs phase change of y(i) on s2(*i*). Therefore, when phase-changed signal 2801B is s2'(*i*), this can be represented as s2'(*i*)=y(i)×s2(*i*) (i is a symbol number (i is an integer equal to or greater than 0)). Note that a method for giving y(i) is as described in the first exemplary embodiment.

Weight combiner 203 receives mapped signal 201A (s1 (*i*)), phase-changed signal 2801B (s2'(*i*)), and control signal 200. Based on control signal 200, weight combiner 203 performs weighting (precoding) and outputs weighted signal 204A and weighted signal 204B. Specifically, weight combiner 203 multiplies a vector including mapped signal 201A (s1(*i*)) and phase-changed signal 2801B (s2'(*i*)) by a precoding matrix to obtain weighted signal 204A and weighted signal 204B. Note that a structure example of the precoding matrix is as described in the first exemplary embodiment. Subsequent description will be similar to the description in FIG. 2, and thus the description thereof will be omitted.

Figure 29:
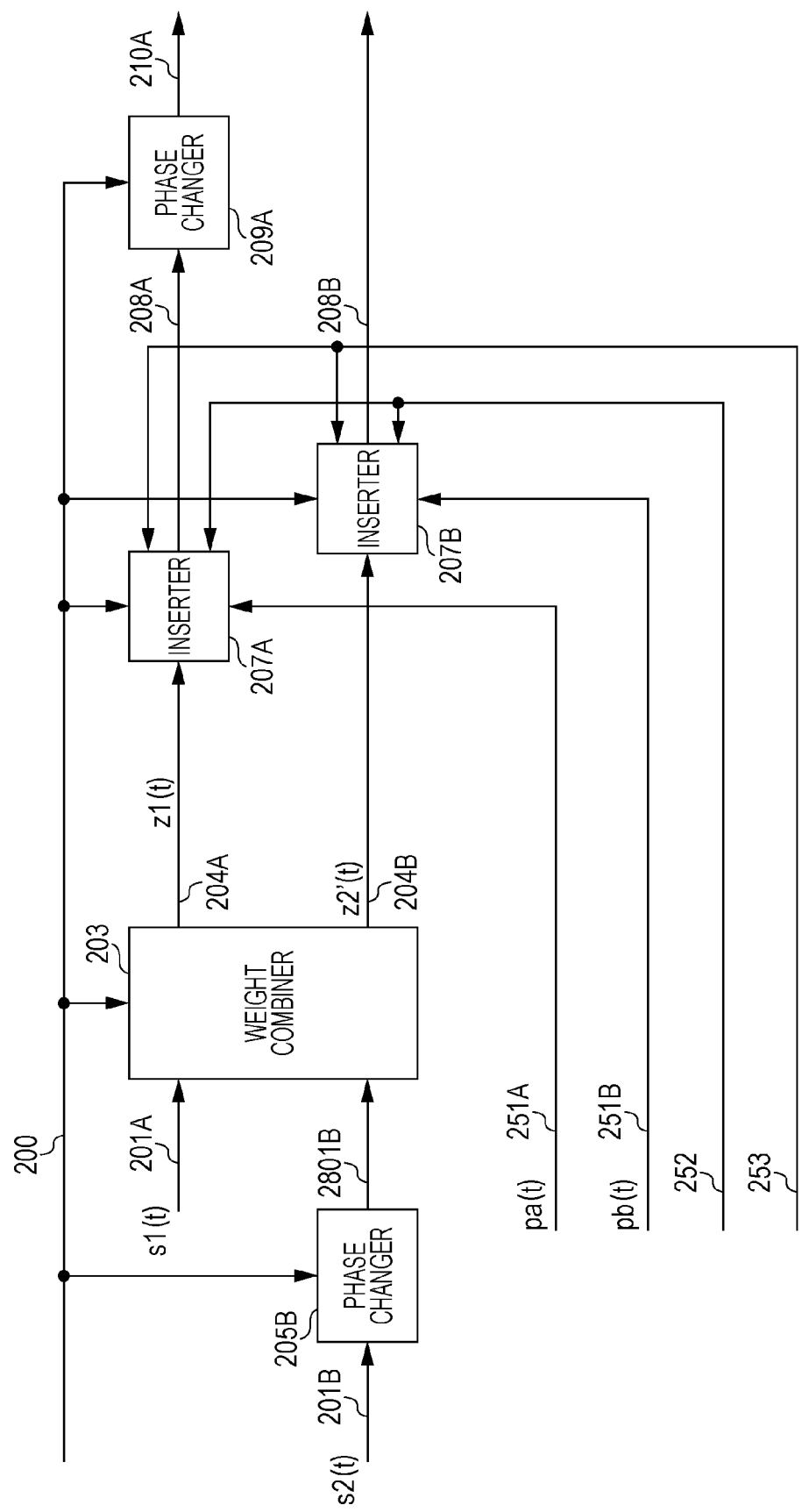
FIG. 29 is a diagram illustrating one exemplary configuration of the signal processor of FIG. 1.

FIG. 29 is an example in which phase changer 205B is inserted before weight combiner 203 in the configuration of FIG. 18. At this time, the operation of phase changer 205B and the operation of weight combiner 203 have been described in the description of FIG. 28, and thus the description thereof will be omitted. Also, the operation after weight combiner 203 will be similar to the description in FIG. 18, and thus the description thereof will be omitted.

Figure 30:
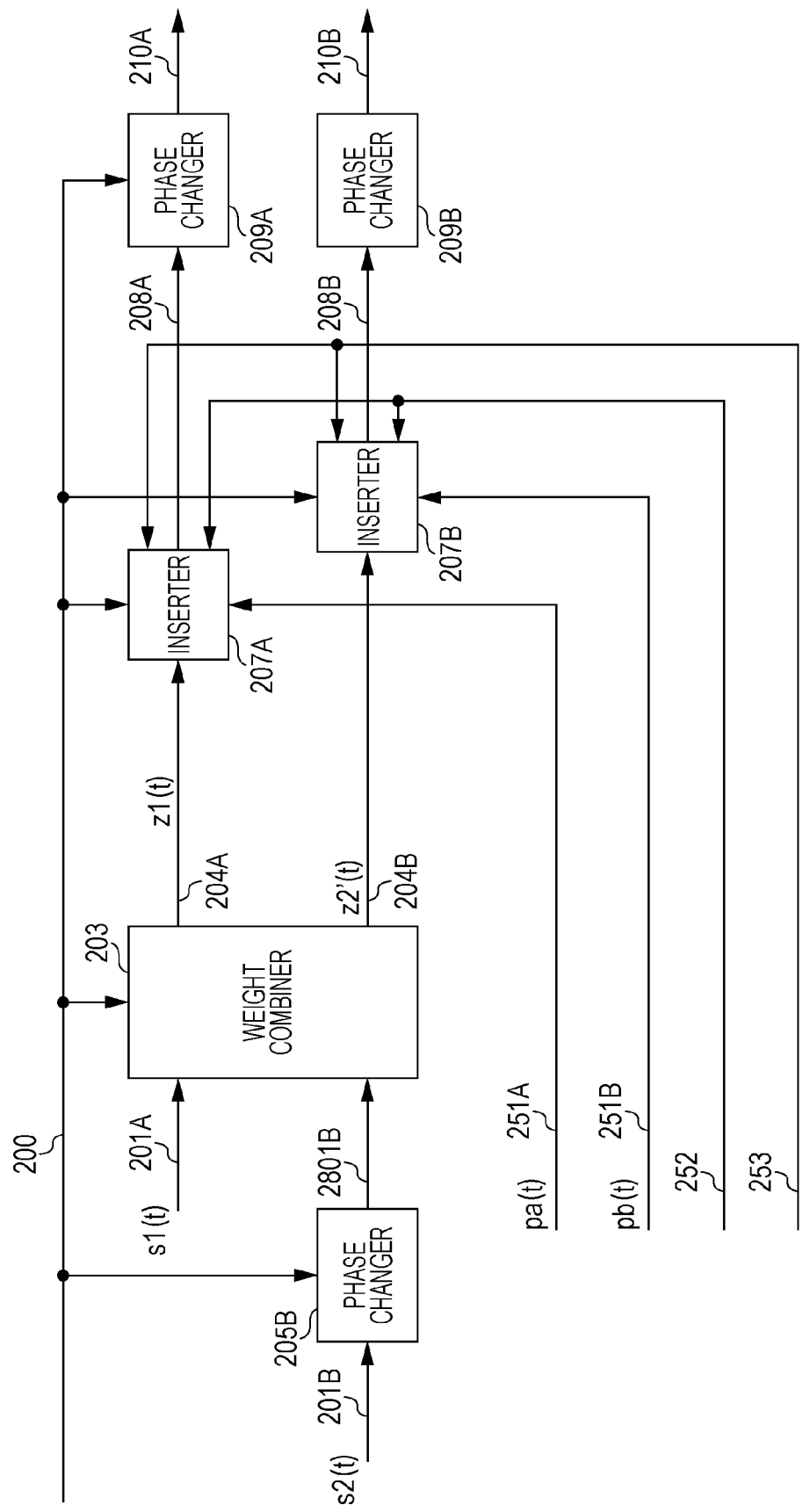
FIG. 30 is a diagram illustrating one exemplary configuration of the signal processor of FIG. 1.

FIG. 30 is an example in which phase changer 205B is inserted before weight combiner 203 in the configuration of FIG. 19. At this time, the operation of phase changer 205B and the operation of weight combiner 203 have been described in the description of FIG. 28, and thus the description thereof will be omitted. Also, the operation after weight combiner 203 will be similar to the description in FIG. 19, and thus the description thereof will be omitted.

Figure 31:
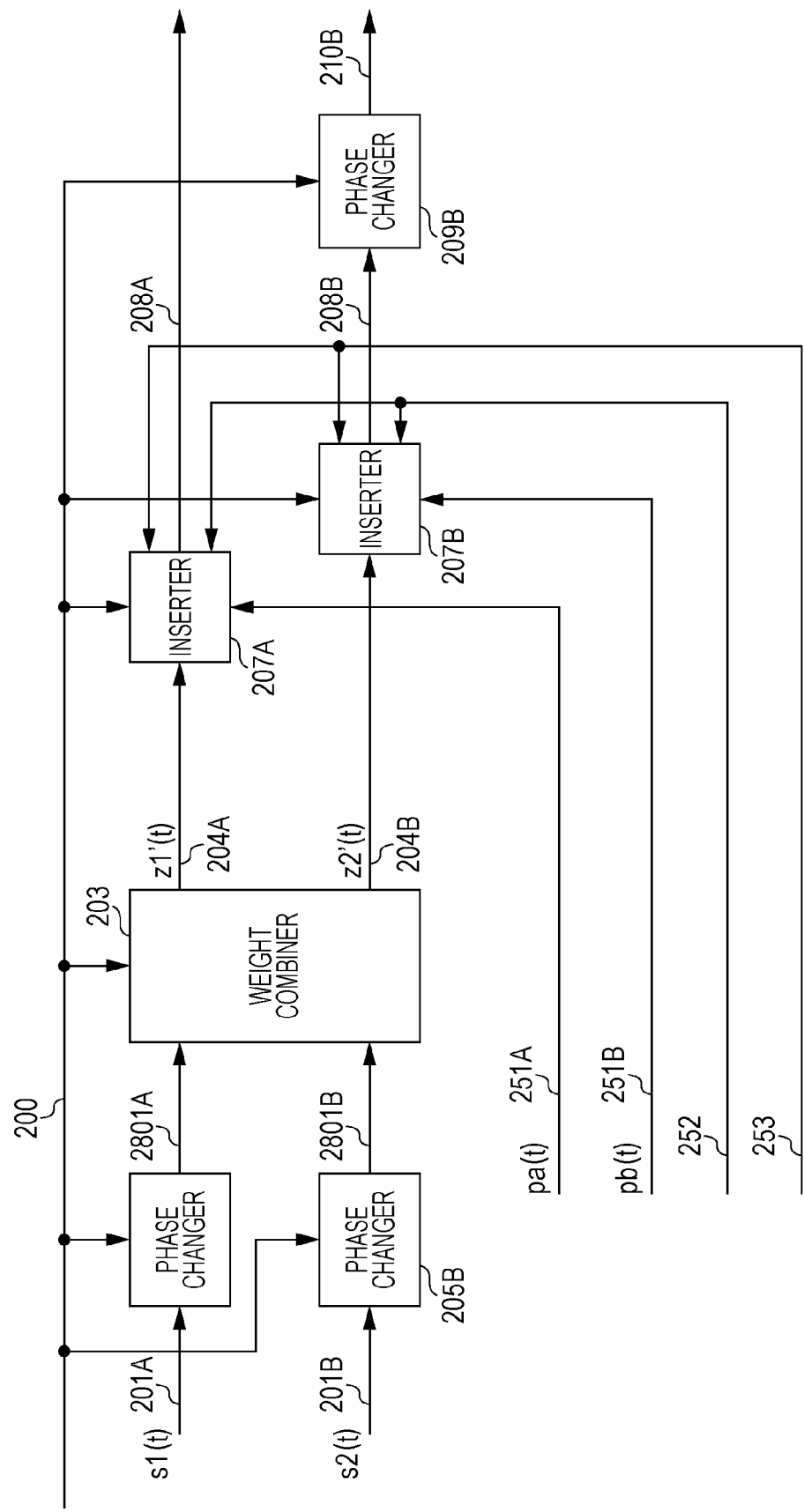
FIG. 31 is a diagram illustrating one exemplary configuration of the signal processor of FIG. 1.

FIG. 31 is an example in which phase changer 205A is inserted before weight combiner 203 and phase changer 205B is inserted before weight combiner 203 in the configuration of FIG. 20.

Phase changer 205A receives mapped signal 201A (s1 (*t*)) and control signal 200. Based on control signal 200, phase changer 205A performs phase change on mapped signal 201A and then outputs phase-changed signal 2801A.

For example, phase changer 205A performs phase change of w(i) on s1(*i*). Therefore, when phase-changed signal 2901A is s1'(*i*), this can be represented as s1'(*i*)=w(i)×s1(*i*) (i is a symbol number (i is an integer equal to or greater than 0)). Note that a method for giving w(i) is as described in the first exemplary embodiment.

For example, phase changer 205B performs phase change of y(i) on s2(*i*). Therefore, when phase-changed signal 2801B is s2'(*i*), this can be represented as s2'(*i*)=y(i)×s2(*i*) (i is a symbol number (i is an integer equal to or greater than 0)). Note that a method for giving y(i) is as described in the first exemplary embodiment.

Weight combiner 203 receives phase-changed signal 2801A (s1'(*i*)), phase-changed signal 2801B (s2'(*i*)), and control signal 200. Based on control signal 200, weight combiner 203 performs weighting (precoding) and outputs weighted signal 204A and weighted signal 204B. Specifically, weight combiner 203 multiplies a vector including phase-changed signal 2801A (s1'(*i*)) and phase-changed signal 2801B (s2'(*i*)) by a precoding matrix to obtain weighted signal 204A and weighted signal 204B. Note that a structure example of the precoding matrix is as described in the first exemplary embodiment. Subsequent description will be similar to the description in FIG. 20, and thus the description thereof will be omitted.

Figure 32:
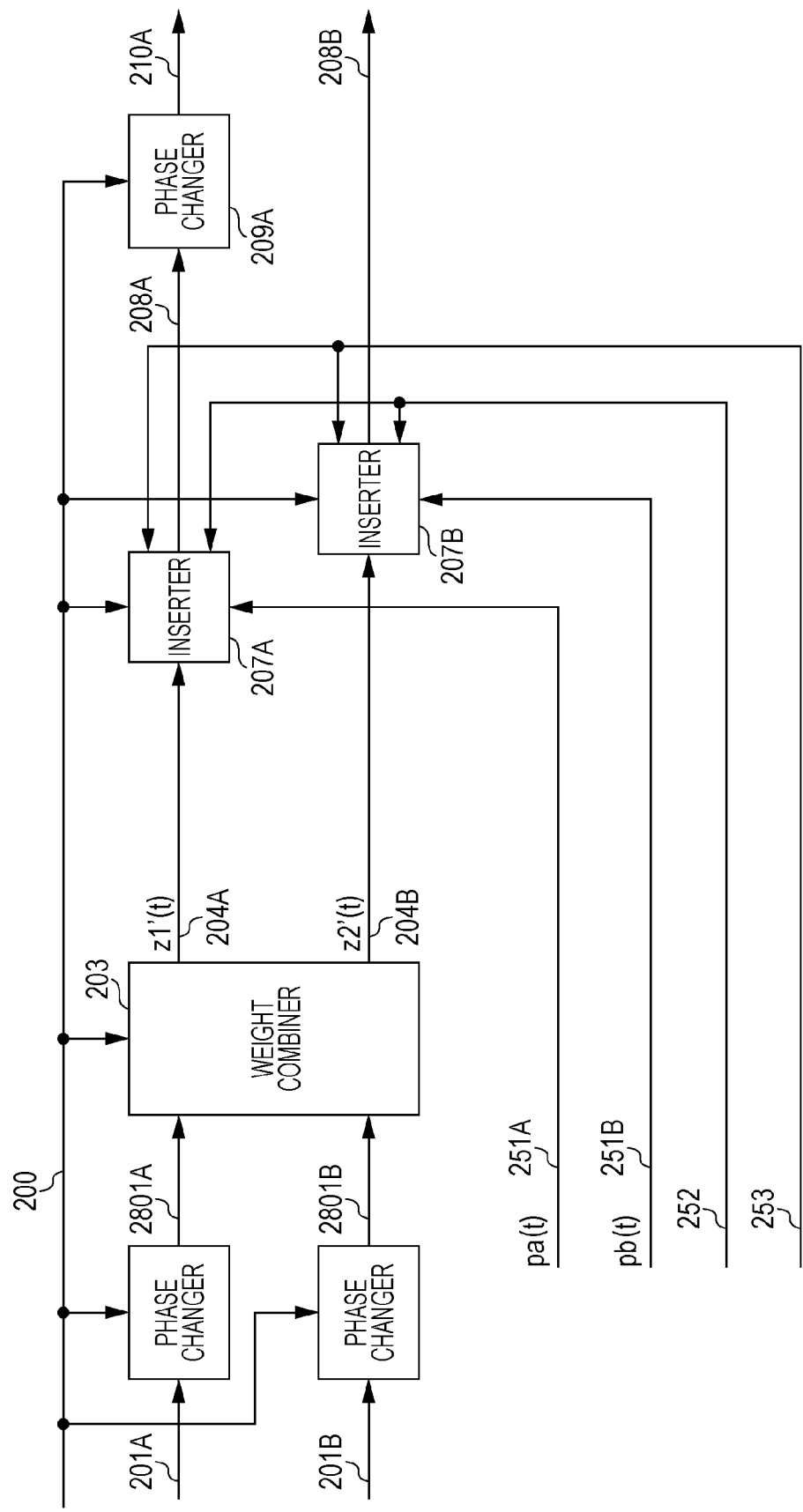
FIG. 32 is a diagram illustrating one exemplary configuration of the signal processor of FIG. 1.

FIG. 32 is an example in which phase changer 205A is inserted before weight combiner 203 and phase changer 205B is inserted before weight combiner 203 in the configuration of FIG. 21. At this time, the operation of phase changer 205A, the operation of phase changer 205B, and the operation of weight combiner 203 have been described in the description of FIG. 31, and thus the description thereof will be omitted. Also, the operation after weight combiner 203 will be similar to the description in FIG. 21, and thus the description thereof will be omitted.

Figure 33:
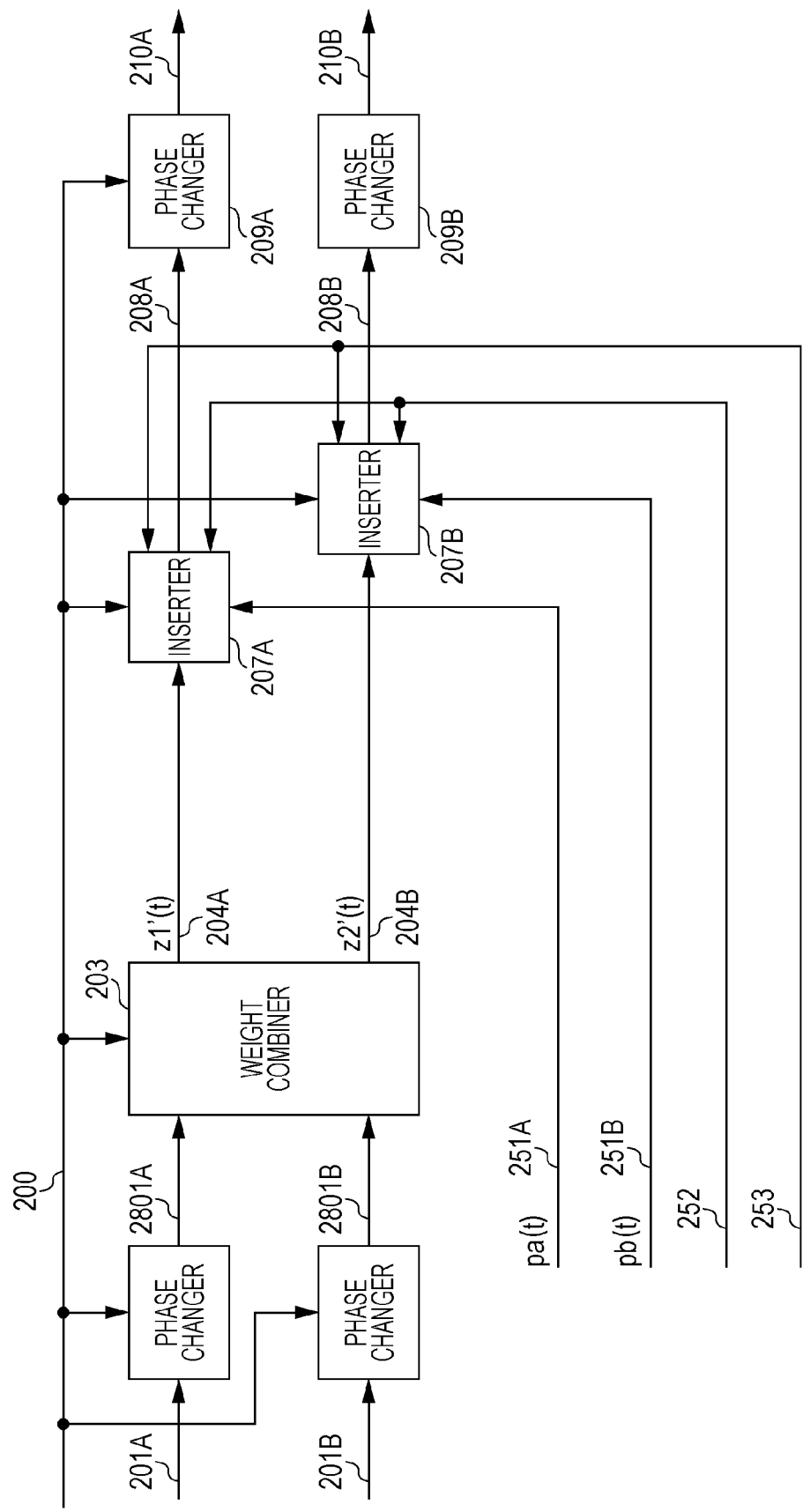
FIG. 33 is a diagram illustrating one exemplary configuration of the signal processor of FIG. 1.

FIG. 33 is an example in which phase changer 205A is inserted before weight combiner 203 and phase changer 205B is inserted before weighting 203 in the configuration of FIG. 22. At this time, the operation of phase changer 205A, the operation of phase changer 205B, and the operation of weight combiner 203 have been described in the description of FIG. 31, and thus the description thereof will be omitted. Also, the operation after weight combiner 203 will be similar to the description in FIG. 22, and thus the description thereof will be omitted.

It is assumed that in FIG. 27, the terminal requests the base station to perform communication.

Then, the base station determines the value of phase change to be performed by phase changer 205A and/or phase changer 205B as "a first specified phase change value (set)", for example, by using a random number. Then, based on the determined "first specified phase change value (set)", the base station performs phase change by phase changer 205A and/or phase changer 205B. At this time, it is assumed that information about "the first specified phase change value (set)" is included in control information symbol 2701_1.

The phrase "the first specified phase change value (set)" has been used. In the case of FIGS. 2, 18, 19, 28, 29, and 30, phase changer 205A is not present, and phase changer 205B is present. Therefore, in this case, it is necessary to prepare the first specified phase change value to be used by phase changer 205B. Meanwhile, in the case of FIGS. 20, 21, 22, 31, 32, and 33, phase changer 205A and phase changer 205B are present. In this case, it is necessary to prepare first specified phase change value #A to be used by phase changer 205A and first specified phase change value #B to be used by phase changer 205B. Accordingly, the phrase "the first specified phase change value (set)" has been used.

The base station transmits control information symbol 2701_1 and data symbol #1 (2702_1), and at least data symbol #1 (2702_1) undergoes phase change with the determined "first specified phase change value (set)".

The terminal receives control information symbol 2701_1 and data symbol #1 (2702_1) transmitted from the base station. Based on at least the information about "the first specified phase change value (set)" included in control information symbol 2701_1, the terminal demodulates and decodes data symbol #1 (2702_1). It is assumed that, as a result, the terminal determines that "data included in data symbol #1 (2702_1) has been obtained without errors". Then, the terminal transmits, to the base station, terminal transmission symbol 2750_1 including at least information that "the data included in data symbol #1 (2702_1) has been obtained without errors".

The base station receives terminal transmission symbol 2750_1 transmitted from the terminal. Based on at least the information that "the data included in data symbol #1 (2702_1) has been obtained without errors" included in terminal transmission symbol 2750_1, the base station determines that phase change (set) to be performed by phase changer 205A and/or phase changer 205B is "the first specified phase change value (set)", as in a case of transmitting data symbol #1 (2702_1). Since "the data included in data symbol #1 (2702_1) has been obtained without errors", the base station can determine that the terminal is likely to obtain the data without errors also when the base station transmits the next data symbol by using "the first specified phase change value (set)". This is likely to allow the terminal to obtain high data reception quality. Then, based on the determined "first specified phase change value (set)", the base station performs phase change by phase changer 205A and/or phase changer 205B. At this time, it is assumed that control information symbol 2701_2 includes the information about "the first specified phase change value (set)".

The base station transmits control information symbol 2701_2 and data symbol #2 (2702_2), and at least data symbol #2 (2702_2) undergoes phase change with the determined "first specified phase change value (set)".

The terminal receives control information symbol 2701_2 and data symbol #2 (2702_2) transmitted from the base station. Based on at least the information about "the first specified phase change value (set)" included in control information symbol 2701_2, the terminal demodulates and decodes data symbol #2 (2702_2). It is assumed that, as a result, the terminal determines that "data included in data symbol #2 (2702_2) has not been obtained correctly". Then, the terminal transmits, to the base station, terminal transmission symbol 2750_2 including at least information that "the data included in data symbol #2 (2702_2) has not been obtained correctly".

The base station receives terminal transmission symbol 2750_2 transmitted from the terminal. Based on at least the information that "the data included in data symbol #2 (2702_2) has not been obtained correctly" included in terminal transmission symbol 27502, the base station determines to change the phase change to be performed by phase changer 205A and/or phase changer 205B from "the first specified phase change value (set)". Since "the data included in data symbol #2 (2702_2) has not been obtained correctly", the base station can determine that the terminal is likely to obtain the data without errors if the phase change value is changed from "the first specified phase change value (set)" when the base station transmits the next data symbol. This is likely to allow the terminal to obtain high data reception quality. Therefore, for example, the base station determines to change the phase change value (set) to be performed by phase changer 205A and/or phase changer 205B from "the first specified phase change value (set)" to "a second specified phase change value (set)" by using a random number. Then, based on the determined "second specified phase change value (set)", the base station performs phase change by phase changer 205A and/or phase changer 205B. At this time, it is assumed that control information symbol 2701_3 includes information about "the second specified phase change value (set)".

The phrase "the second specified phase change value (set)" has been used. In the case of FIGS. 2, 18, 19, 28, 29, and 30, phase changer 205A is not present, and phase changer 205B is present. Therefore, in this case, it is necessary to prepare the second specified phase change value to be used by phase changer 205B. Meanwhile, in the case of FIGS. 20, 21, 22, 31, 32, and 33, phase changer 205A and phase changer 205B are present. In this case, it is necessary to prepare second specified phase change value #A to be used by phase changer 205A and second specified phase change value #B to be used by phase changer 205B. Accordingly, the phrase "the second specified phase change value (set)" has been used.

The base station transmits control information symbol 2701_3 and data symbol #2 (2702_2-1), and at least data symbol #2 (2702_2-1) undergoes phase change with the determined "second specified phase change value (set)".

Note that in "data symbol #2 (2702_2) immediately after control information symbol 2701_2" and "data symbol #2 (2702_2-1) immediately after control information symbol 2701_3", a modulation scheme of "data symbol #2 (2702_2) immediately after control information symbol 2701_2" may be the same as or different from a modulation scheme of "data symbol #2 (2702_2-1) immediately after control information symbol 2701_3".

Also, "data symbol #2 (2702_2-1) immediately after control information symbol 2701_3" includes all or part of data included in "data symbol #2 (2702_2) immediately after control information symbol 2701_2". This is because "data symbol #2 (2702_2-1) immediately after control information symbol 2701_3" is a symbol for retransmission.

The terminal receives control information symbol 2701-3 and data symbol #2 (2702_2) transmitted from the base station. Based on at least the information about "the second specified phase change value (set)" included in control information symbol 27013, the terminal demodulates and decodes data symbol #2 (2702_2-1). It is assumed that, as a result, the terminal determines that "the data included in data symbol #2 (2702_2-1) has not been obtained correctly". Then, the terminal transmits, to the base station, terminal transmission symbol 2750_3 including at least information that "the data included in data symbol #2 (2702_2-1) has not been obtained correctly".

The base station receives terminal transmission symbol 2750_3 transmitted from the terminal. Based on at least the information that "the data included in data symbol #2 (2702_2-1) has not been obtained correctly" included in terminal transmission symbol 27503, the base station determines to change the phase change to be performed by phase changer A and phase changer B from "the second specified phase change value (set)". Since "the data included in data symbol #2 (2702_2-1) has not been obtained correctly", the base station can determine that the terminal is likely to obtain the data without errors if the phase change value is changed from "the second specified phase change value (set)" when the base station transmits the next data symbol. This is likely to allow the terminal to obtain high data reception quality. Therefore, for example, the base station changes the phase change value (set) to be performed by phase changer 205A and/or phase changer 205B from "the second specified phase change value (set)" to "a third specified phase change value (set)" by using a random number, and phase changer 205A and/or phase changer 205B performs phase change. At this time, it is assumed that control information symbol 2701_4 includes information about "the third specified phase change value (set)".

The phrase "the third specified phase change value (set)" has been used. In the case of FIGS. 2, 18, 19, 28, 29, and 30, phase changer 205A is not present, and phase changer 205B is present. Therefore, in this case, it is necessary to prepare the third specified phase change value to be used by phase changer 205B. Meanwhile, in the case of FIGS. 20, 21, 22, 31, 32, and 33, phase changer 205A and phase changer 205B are present. In this case, it is necessary to prepare third specified phase change value #A to be used by phase changer 205A and third specified phase change value #B to be used by phase changer 205B. Accordingly, the phrase "the third specified phase change value (set)" has been used.

The base station transmits control information symbol 2701_4 and data symbol #2 (2702_2-2), and at least data symbol #2 (2702_2-2) undergoes phase change with the determined "third specified phase change value (set)".

Note that in "data symbol #2 (2702_2-1) immediately after control information symbol 2701_3" and "data symbol #2 (2702_2-2) immediately after control information symbol 2701_4", a modulation scheme of "data symbol #2 (2702_2-1) immediately after control information symbol 2701_3" may be the same as or different from a modulation scheme of "data symbol #2 (2702_2-2) immediately after control information symbol 2701_4".

Also, "data symbol #2 (2702_2-2) immediately after control information symbol 2701_4" includes all or part of data included in "data symbol #2 (2702_2-1) immediately after control information symbol 2701_3". This is because "data symbol #2 (2702_2-2) immediately after control information symbol 2701_4" is a symbol for retransmission.

The terminal receives control information symbol 2701-4 and data symbol #2 (2702_2-2) transmitted from the base station. Based on at least the information about "the third specified phase change value (set)" included in control information symbol 27014, the terminal demodulates and decodes data symbol #2 (2702_2-2). It is assumed that, as a result, the terminal determines that "the data included in data symbol #2 (2702_2-2) has been obtained without errors". Then, the terminal transmits, to the base station, terminal transmission symbol 2750_4 including at least information that "data included in data symbol #2 (2702_2-2) has been obtained without errors".

The base station receives terminal transmission symbol 2750_4 transmitted from the terminal. Based on at least the information that "the data included in data symbol #2 (2702-2) has been obtained without errors" included in terminal transmission symbol 27504, the base station determines that phase change (set) to be performed by phase changer 205A and/or phase changer 205B is "the third specified phase change value (set)", as in a case of transmitting data symbol #2 (2702_2-2). Since "the data included in data symbol #2 (2702_2-2) has been obtained without errors", the base station can determine that the terminal is likely to obtain the data without errors also when the base station transmits the next data symbol by using "the third specified phase change value (set)". This is likely to allow the terminal to obtain high data reception quality. Then, based on the determined "third specified phase change value (set)", the base station performs phase change by phase changer 205A and/or phase changer 205B. At this time, it is assumed that control information symbol 2701_5 includes information about "the third specified phase change value (set)".

The base station transmits control information symbol 2701_5 and data symbol #3 (2702_3), and at least data symbol #3 (2702_3) undergoes phase change with the determined "third specified phase change value (set)".

The terminal receives control information symbol 2701_5 and data symbol #3 (2702_3) transmitted from the base station. Based on at least the information about "the third specified phase change value (set)" included in control information symbol 2701_5, the terminal demodulates and decodes data symbol #3 (2702_3). It is assumed that, as a result, the terminal determines that "the data included in data symbol #3 (2702_3) has been obtained without errors". Then, the terminal transmits, to the base station, terminal transmission symbol 2750_5 including at least information that "data included in data symbol #3 (2702_3) has been obtained without errors".

The base station receives terminal transmission symbol 2750_5 transmitted from the terminal. Based on at least the information that "the data included in data symbol #3 (2702_3) has been obtained without errors" included in terminal transmission symbol 2750_5, the base station determines that phase change (set) to be performed by phase changer 205A" and/or phase changer 205B is "the third specified phase change value (set)", as in a case of transmitting data symbol #3 (2702_3). Since "the data included in data symbol #3 (2702_3) has been obtained without errors", the base station can determine that the terminal is likely to obtain the data without errors also when the base station transmits the next data symbol by using "the third specified phase change value (set)". This is likely to allow the terminal to obtain high data reception quality. Then, based on the determined "third specified phase change value (set)", the base station performs phase change by phase changer 205A and/or phase changer 205B. At this time, it is assumed that control information symbol 2701_6 includes information about "the third specified phase change value (set)".

The base station transmits control information symbol 2701_6 and data symbol #4 (2702_4), and at least data symbol #4 (2702_4) undergoes phase change with the determined "third specified phase change value (set)".

The terminal receives control information symbol 2701_6 and data symbol #4 (2702_4) transmitted from the base station. Based on at least the information about "the third specified phase change value (set)" included in control information symbol 2701_6, the terminal demodulates and decodes data symbol #4 (2702_4). It is assumed that, as a result, the terminal determines that "the data included in data symbol #4 (2702_4) has not been obtained correctly". Then, the terminal transmits, to the base station, terminal transmission symbol 2750_6 including at least information that "the data included in data symbol #4 (2702_4) has not been received correctly".

The base station receives terminal transmission symbol 2750_6 transmitted from the terminal. Based on at least the information that "the data included in data symbol #4 (2702_4) has not been obtained correctly" included in terminal transmission symbol 27506, the base station determines to change the phase change to be performed by phase changer 205A and/or phase changer 205B from "the third specified phase change value (set)". Since "the data included in data symbol #4 (2702_4) has not been obtained correctly", the base station can determine that the terminal is likely to obtain the data without errors if the phase change value is changed from "the third specified phase change value (set)" when the base station transmits the next data symbol. This is likely to allow the terminal to obtain high data reception quality. Therefore, for example, the base station determines to change the phase change value (set) to be performed by phase changer 205A and/or phase changer 205B from "the third specified phase change value (set)" to "a fourth specified phase change value (set)" by using a random number. Then, based on the determined "fourth specified phase change value (set)", the base station performs phase change by phase changer 205A and/or phase changer 205B. At this time, it is assumed that control information symbol 2701_7 includes information about "the fourth specified phase change value (set)".

The phrase "the fourth specified phase change value (set)" has been used. In the case of FIGS. 2, 18, 19, 28, 29, and 30, phase changer 205A is not present, and phase changer 205B is present. Therefore, in this case, it is necessary to prepare the fourth specified phase change value to be used by phase changer 205B. Meanwhile, in the case of FIGS. 20, 21, 22, 31, 32, and 33, phase changer 205A and phase changer 205B are present. In this case, it is necessary to prepare fourth specified phase change value #A to be used by phase changer 205A and fourth specified phase change value #B to be used by phase changer 205B. Accordingly, the phrase "the fourth specified phase change value (set)" has been used.

Note that in "data symbol #4 (2702_4) immediately after control information symbol 2701_6" and "data symbol #4 (2702_4-1) immediately after control information symbol 2701_7", a modulation scheme of "data symbol #4 (2702_4) immediately after control information symbol 2701_6" may be the same as or different from a modulation scheme of "data symbol #4 (2702_4-1) immediately after control information symbol 2701_7".

Also, "data symbol #4 (2702_4-1) immediately after control information symbol 2701_7" includes all or part of data included in "data symbol #4 (2702_4) immediately after control information symbol 2701_6". This is because "data symbol #4 (2702_4-1) immediately after control information symbol 2701_7" is a symbol for retransmission.

The terminal receives control information symbol 2701_7 and data symbol #4 (2702_4-1) transmitted from the base station. Based on at least the information about "the fourth specified phase change value (set)" included in control information symbol 27017, the terminal demodulates and decodes data symbol #4 (2702_4-1).

Note that in data symbol #1 (2702_1), data symbol #2 (2702_2), data symbol #3 (2702_3), and data symbol #4 (2702_4), as described in the first to sixth exemplary embodiments, the base station transmits a plurality of modulated signals from a plurality of antennas. However, unlike the first to sixth exemplary embodiments, phase changer 205A and/or phase changer 205B performs phase change with "the specified phase change value" described above.

The frame structure of the base station and the terminal of FIG. 27 is merely one example, and may include other symbols. Each symbol of control information symbols 2701_1, 2701_2, 2701_3, 27014, 2701_5, 27016, data symbol #1 (2702_1), data symbol #2 (2702_2), data symbol #3 (2702_3), and data symbol #4 (2702_4) may include other symbols such as, for example, the pilot symbol. Control information symbols 2701_1, 27012, 2701_3, 27014, 2701_5, and 2701_6 include information about the value of "the specified phase change value" used when data symbol #1 (2702_1), data symbol #2 (2702_2), data symbol #3 (2702_3), and data symbol #4 (2702_4) are transmitted. By acquiring this information, the terminal can demodulate and decode data symbol #1 (2702_1), data symbol #2 (2702_2), data symbol #3 (2702_3), and data symbol #4 (2702_4).

Note that in the above description, the base station determines (a set of) the value of "the specified phase change value (set)" by using "a random number". However, determination of the value of "the specified phase change value (set)" is not limited to this method. The base station may regularly change (the set of) the value of "the specified phase change value (set)". The value of "the specified phase change value (set)" may be determined by any method. When it is necessary to change "the specified phase change value (set)", it is required at least that (the set of) the value of "the specified phase change value (set)" is different between before and after the change.

As described in the first to sixth exemplary embodiments, for example, when the base station transmits the modulated signal in the frame structure as illustrated in FIGS. 4, 5, 13, and 14, the phase change by phase changer 205A and/or phase changer 205B with "the specified phase change value" described above is performed on data symbols (402 and 502). The symbols to undergo phase change by phase changer 209A and/or phase changer 209B are "pilot symbols 401 and 501" and "the other symbols 403 and 503", as described in the first to sixth exemplary embodiments.

However, even if phase changer 205A and/or phase changer 205B also performs phase change on "pilot symbols 401 and 501" and "the other symbols 403 and 503", demodulation and decoding are possible.

Even if this transmission method is performed alone, the method for "performing phase change with the specified phase change value" as described above allows the terminal to obtain high data reception quality.

Furthermore, as the configuration of signal processor 106 of FIG. 1 in the transmission apparatus of the base station, the configurations of FIGS. 2, 18 to 23, and 28 to 33 have been illustrated. However, phase change by phase changers 209A and 209B may be omitted, that is, phase changers 209A and 209B may be eliminated in FIGS. 2, 18 to 23, and 28 to 33. At this time, signal 208A corresponds to signal 106_A of FIG. 1, and signal 208B corresponds to signal 106_B of FIG. 1.

When [u0 u1] described above to control the operation of phase changers 205A and 205B included in the base station is set as [u0 u1]=[01] (u0=0, u1=1), that is, when phase changers 205A and 205B periodically/regularly perform phase change for each symbol, control information for setting the phase change to be specifically performed is assumed to be u2 and u3. Table 2 illustrates a relationship between [u2 u3] and the phase change to be specifically performed by phase changers 205A and 205B. (Note that u2 and u3 are transmitted by the base station, for example, as part of the control information symbols of the other symbols 403 and 503. Then, the terminal obtains [u2 u3] included in the control information symbols of the other symbols 403 and 503, is notified of the operations of phase changers 205A and 205B from [u2 u3], and demodulates and decodes the data symbols. The control information for "the specific phase change" is 2 bits, but a number of bits may be other than 2 bits.)

TABLE 2

| u2 u3 | Phase change method when [u0 u1] = [01] |
|---|---|
| 00 | Method 01_1 |
| 01 | Method 01_2 |
| 10 | Method 01_3 |
| 11 | Method 01_4 |

A first example of interpretation of Table 2 is as follows. When [u0 u1]=[01](u0=0, u1=1), [u2 u3]=[00](u2=0, u3=0), in the base station, "phase changers 205A and 205B periodically/regularly perform phase change by method 01_1 for each symbol".

Method 01_1:

It is assumed that a coefficient to be used for multiplication by phase changer 205A performing phase change is y1(i) (i indicates a symbol number and is an integer equal to or greater than 0). At this time, y1(i) is represented as follows.

[Formula 53]

$$y1(i) = e^{j\frac{2\times\pi\times i}{9}} \quad \text{Formula (53)}$$

It is assumed that phase changer 205B does not perform phase change.

When [u0 u1]=[01](u0=0, u1=1), [u2 u3]=[01](u2=0, u3=1), in the base station, "phase changers 205A and 205B periodically/regularly perform phase change by method 01_2 for each symbol".

Method 01_2:

It is assumed that phase changer 205A does not perform phase change.

It is assumed that a coefficient to be used for multiplication by phase changer 205B performing phase change is y2(i) (i indicates a symbol number and is an integer equal to or greater than 0). At this time, y2(i) is represented as follows.

[Formula 54]

$$y2(i) = e^{j\frac{2\times\pi\times i}{9}} \quad \text{Formula (54)}$$

When [u0 u1]=[01](u0=0, u1=1), [u2 u3]=[10](u2=1, u3=0), in the base station, "phase changers 205A and 205B periodically/regularly perform phase change by method 01_3 for each symbol".

Method 01_3:

It is assumed that a coefficient to be used for multiplication by phase changer 205A performing phase change is y1(i) (i indicates a symbol number and is an integer equal to or greater than 0). At this time, y1(i) is represented as follows.

[Formula 55]

$$y1(i) = e^{j\frac{2\times\pi\times i}{9}} \quad \text{Formula (55)}$$

It is assumed that a coefficient to be used for multiplication by phase changer 205B performing phase change is y2(i) (i indicates a symbol number and is an integer equal to or greater than 0). At this time, y2(i) is represented as follows.

[Formula 56]

$$y2(i) = e^{-j\frac{2\times\pi\times i}{7}} \quad \text{Formula (56)}$$

When [u0 u1]=[01](u0=0, u1=1), [u2 u3]=[11](u2=1, u3=1), in the base station, "phase changers 205A and 205B periodically/regularly perform phase change by method 01_4 for each symbol".

Method 01_4:

It is assumed that a coefficient to be used for multiplication by phase changer 205A performing phase change is y1(i) (i indicates a symbol number and is an integer equal to or greater than 0). At this time, y1(i) is represented as follows.

[Formula 57]

$$y1(i) = e^{-j\frac{2\times\pi\times i}{7}} \quad \text{Formula (57)}$$

It is assumed that a coefficient to be used for multiplication by phase changer 205B performing phase change is y2(i) (i indicates a symbol number and is an integer equal to or greater than 0). At this time, y2(i) is represented as follows.

[Formula 58]

$$y2(i) = e^{j\frac{2\times\pi\times i}{9}} \quad \text{Formula (58)}$$

A second example of interpretation of Table 2 is as follows.

When [u0 u1]=[01](u0=0, u1=1), [u2 u3]=[00](u2=0, u3=0), in the base station, "phase changers 205A and 205B periodically/regularly perform phase change by method 01_1 for each symbol".

Method 01_1:

It is assumed that a coefficient to be used for multiplication by phase changer 205A performing phase change is y1(i) (i indicates a symbol number and is an integer equal to or greater than 0). At this time, y1(i) is represented as follows.

[Formula 59]

$$y1(i) = e^{j\frac{2\times\pi\times i}{3}} \quad \text{Formula (59)}$$

It is assumed that phase changer 205B does not perform phase change.

When [u0 u1]=[01](u0=0, u1=1), [u2 u3]=[01](u2=0, u3=1), in the base station, "phase changers 205A and 205B periodically/regularly perform phase change by method 01_2 for each symbol".

Method 01_2:

It is assumed that a coefficient to be used for multiplication by phase changer 205A performing phase change is y1(i) (i indicates a symbol number and is an integer equal to or greater than 0). At this time, y1(i) is represented as follows.

[Formula 60]

$$y1(i) = e^{j\frac{2\times\pi\times i}{5}} \quad \text{Formula (60)}$$

It is assumed that phase changer 205B does not perform phase change.

When [u0 u1]=[01](u0=0, u1=1), [u2 u3]=[10](u2=1, u3=0), in the base station, "phase changers 205A and 205B periodically/regularly perform phase change by method 01_3 for each symbol".

Method 01_3:

It is assumed that a coefficient to be used for multiplication by phase changer 205A performing phase change is y1(i) (i indicates a symbol number and is an integer equal to or greater than 0). At this time, y1(i) is represented as follows.

[Formula 61]

$$y1(i) = e^{j\frac{2\times\pi\times i}{7}}$$ Formula (61)

It is assumed that phase changer 205B does not perform phase change.

When [u0 u1]=[01](u0=0, u1=1), [u2 u3]=[11](u2=1, u3=1), in the base station, "phase changers 205A and 205B periodically/regularly perform phase change by method 01_4 for each symbol".

Method 01_4:

It is assumed that a coefficient to be used for multiplication by phase changer 205A performing phase change is y1(i) (i indicates a symbol number and is an integer equal to or greater than 0). At this time, y1(i) is represented as follows.

[Formula 62]

$$y1(i) = e^{j\frac{2\times\pi\times i}{9}}$$ Formula (62)

It is assumed that phase changer 205B does not perform phase change.

A third example of interpretation of Table 2 is as follows.

When [u0 u1]=[01](u0=0, u1=1), [u2 u3]=[00](u2=0, u3=0), in the base station, "phase changers 205A and 205B periodically/regularly perform phase change by method 01_1 for each symbol".

Method 01_1:

It is assumed that phase changer 205A does not perform phase change.

It is assumed that a coefficient to be used for multiplication by phase changer 205B performing phase change is y2(i) (i indicates a symbol number and is an integer equal to or greater than 0). At this time, y2(i) is represented as follows.

[Formula 63]

$$y2(i) = e^{j\frac{2\times\pi\times i}{3}}$$ Formula (63)

When [u0 u1]=[01](u0=0, u1=1), [u2 u3]=[01](u2=0, u3=1), in the base station, "phase changers 205A and 205B periodically/regularly perform phase change by method 01_2 for each symbol".

Method 01_2:

It is assumed that phase changer 205A does not perform phase change.

It is assumed that a coefficient to be used for multiplication by phase changer 205B performing phase change is y2(i) (i indicates a symbol number and is an integer equal to or greater than 0). At this time, y2(i) is represented as follows.

[Formula 64]

$$y2(i) = e^{j\frac{2\times\pi\times i}{5}}$$ Formula (64)

When [u0 u1]=[01](u0=0, u1=1), [u2 u3]=[10](u2=1, u3=0), in the base station, "phase changers 205A and 205B periodically/regularly perform phase change by method 01_3 for each symbol".

Method 01_3:

It is assumed that phase changer 205A does not perform phase change.

It is assumed that a coefficient to be used for multiplication by phase changer 205B performing phase change is y2(i) (i indicates a symbol number and is an integer equal to or greater than 0). At this time, y2(i) is represented as follows.

[Formula 65]

$$y2(i) = e^{j\frac{2\times\pi\times i}{7}}$$ Formula (65)

When [u0 u1]=[01](u0=0, u1=1), [u2 u3]=[11](u2=1, u3=1), in the base station, "phase changers 205A and 205B periodically/regularly perform phase change by method 01_4 for each symbol".

Method 01_4:

It is assumed that phase changer 205A does not perform phase change.

It is assumed that a coefficient to be used for multiplication by phase changer 205B performing phase change is y2(i) (i indicates a symbol number and is an integer equal to or greater than 0). At this time, y2(i) is represented as follows.

[Formula 66]

$$y2(i) = e^{j\frac{2\times\pi\times i}{9}}$$ Formula (66)

A fourth example of interpretation of Table 2 is as follows.

When [u0 u1]=[01](u0=0, u1=1), [u2 u3]=[00](u2=0, u3=0), in the base station, "phase changers 205A and 205B periodically/regularly perform phase change by method 01_1 for each symbol".

Method 01_1:

It is assumed that a coefficient to be used for multiplication by phase changer 205A performing phase change is y1(i) (i indicates a symbol number and is an integer equal to or greater than 0). At this time, y1(i) is represented as follows.

[Formula 67]

$$y1(i) = e^{j\frac{2\times\pi\times i}{5}}$$ Formula (67)

It is assumed that a coefficient to be used for multiplication by phase changer 205B performing phase change is y2(i) (i indicates a symbol number and is an integer equal to or greater than 0). At this time, y2(i) is represented as follows.

[Formula 68]

$$y2(i) = e^{-j\frac{2\times\pi\times i}{3}}$$ Formula (68)

When [u0 u1]=[01](u0=0, u1=1), [u2 u3]=[01](u2=0, u3=1), in the base station, "phase changers 205A and 205B periodically/regularly perform phase change by method 01_2 for each symbol".

Method 01_2:

It is assumed that a coefficient to be used for multiplication by phase changer 205A performing phase change is y1(i) (i indicates a symbol number and is an integer equal to or greater than 0). At this time, y1(i) is represented as follows.

[Formula 69]

$$y1(i) = e^{j\frac{2\times\pi\times i}{7}}$$  Formula (69)

It is assumed that a coefficient to be used for multiplication by phase changer 205B performing phase change is y2(i) (i indicates a symbol number and is an integer equal to or greater than 0). At this time, y2(i) is represented as follows.

[Formula 70]

$$y2(i) = e^{-j\frac{2\times\pi\times i}{3}}$$  Formula (70)

When [u0 u1]=[01](u0=0, u1=1), [u2 u3]=[10](u2=1, u3=0), in the base station, "phase changers 205A and 205B periodically/regularly perform phase change by method 01_3 for each symbol".

Method 01_3:

It is assumed that a coefficient to be used for multiplication by phase changer 205A performing phase change is y1(i) (i indicates a symbol number and is an integer equal to or greater than 0). At this time, y1(i) is represented as follows.

[Formula 71]

$$y1(i) = e^{j\frac{2\times\pi\times i}{7}}$$  Formula (71)

It is assumed that a coefficient to be used for multiplication by phase changer 205B performing phase change is y2(i) (i indicates a symbol number and is an integer equal to or greater than 0). At this time, y2(i) is represented as follows.

[Formula 72]

$$y2(i) = e^{-j\frac{2\times\pi\times i}{5}}$$  Formula (72)

When [u0 u1]=[01](u0=0, u1=1), [u2 u3]=[11](u2=1, u3=1), in the base station, "phase changers 205A and 205B periodically/regularly perform phase change by method 01_4 for each symbol".

Method 01_4:

It is assumed that a coefficient to be used for multiplication by phase changer 205A performing phase change is y1(i) (i indicates a symbol number and is an integer equal to or greater than 0). At this time, y1(i) is represented as follows.

[Formula 73]

$$y1(i) = e^{j\frac{2\times\pi\times i}{9}}$$  Formula (73)

It is assumed that a coefficient to be used for multiplication by phase changer 205B performing phase change is y2(i) (i indicates a symbol number and is an integer equal to or greater than 0). At this time, y2(i) is represented as follows.

[Formula 74]

$$y2(i) = e^{-j\frac{2\times\pi\times i}{5}}$$  Formula (74)

As described above, the first to fourth examples have been described, but the specific phase change method of phase changers 205A and 205B is not limited to these examples.

<1> Phase changer 205A periodically/regularly performs phase change for each symbol.
<2> Phase changer 205B periodically/regularly performs phase change for each symbol.
<3> Phase changers 205A and 205B periodically/regularly perform phase change for each symbol.

If any one or more methods of <1>, <2>, and <3> are specifically set with [u2 u3], the above description can be performed similarly.

When [u0 u1] described above to control the operation of phase changers 205A and 205B included in the base station is set as [u0 u1]=[10] (u0=1, u1=0), that is, when phase changers 205A and 205B perform phase change with the specified phase change value (set), control information for setting the phase change to be specifically performed is assumed to be u4 and u5. Table 3 illustrates a relationship between [u4 u5] and the phase change to be specifically performed by phase changers 205A and 205B. Note that u4 and u5 are, for example, transmitted by the base station as part of the control information symbols of the other symbols 403 and 503. Then, the terminal obtains [u4 u5] included in the control information symbols of the other symbols 403 and 503, is notified of the operations of phase changers 205A and 205B from [u4 u5], and demodulates and decodes the data symbols. The control information for "specific phase change" is 2 bits, but the number of bits may be other than 2 bits.

TABLE 3

| u4 u5 | Phase change method when [u0 u1] = [10] |
|---|---|
| 00 | Method 10_1 |
| 01 | Method 10_2 |
| 10 | Method 10_3 |
| 11 | Method 10_4 |

A first example of interpretation of Table 3 is as follows.

When [u0 u1]=[10](u0=1, u1=0), [u4 u5]=[00](u4=0, u5=0), in the base station, "phase changers 205A and 205B perform phase change with the specified phase change value (set) of the method 10_1".

Method 10_1:

It is assumed that a coefficient to be used for multiplication by phase changer 205A performing phase change is y1(i) (i indicates a symbol number and is an integer equal to or greater than 0). At this time, y1(i) is represented as follows (this is a fixed phase value regardless of the symbol number).

[Formula 75]

$$y1(i) = e^{j\frac{\pi}{4}} \qquad \text{Formula (75)}$$

It is assumed that phase changer 205B does not perform phase change.

When [u0 u1]=[10](u0=1, u1=0), [u4 u5]=[01](u4=0, u5=1), in the base station, "phase changers 205A and 205B perform phase change with the specified phase change value (set) of the method 10_2".

Method 10_2:

It is assumed that phase changer 205A does not perform phase change.

It is assumed that a coefficient to be used for multiplication by phase changer 205B performing phase change is y2(i) (i indicates a symbol number and is an integer equal to or greater than 0). At this time, y2(i) is represented as follows (this is a fixed phase value regardless of the symbol number).

[Formula 76]

$$y2(i) = e^{j\frac{\pi}{3}} \qquad \text{Formula (76)}$$

When [u0 u1]=[10](u0=1, u1=0), [u4 u5]=[10](u4=1, u5=0), in the base station, "phase changers 205A and 205B perform phase change with the specified phase change value (set) of the method 10_3".

Method 10_3:

It is assumed that a coefficient to be used for multiplication by phase changer 205A performing phase change is y1(i) (i indicates a symbol number and is an integer equal to or greater than 0). At this time, y1(i) is represented as follows (this is a fixed phase value regardless of the symbol number).

[Formula 77]

$$y1(i) = e^{j\frac{\pi}{4}} \qquad \text{Formula (77)}$$

It is assumed that a coefficient to be used for multiplication by phase changer 205B performing phase change is y2(i) (i indicates a symbol number and is an integer equal to or greater than 0). At this time, y2(i) is represented as follows (this is a fixed phase value regardless of the symbol number).

[Formula 78]

$$y2(i) = e^{-j\frac{\pi}{8}} \qquad \text{Formula (78)}$$

When [u0 u1]=[10](u0=1, u1=0), [u4 u5]=[11](u4=1, u5=1), in the base station, "phase changers 205A and 205B perform phase change with the specified phase change value (set) of the method 10_4".

Method 10_4:

It is assumed that a coefficient to be used for multiplication by phase changer 205A performing phase change is y1(i) (i indicates a symbol number and is an integer equal to or greater than 0). At this time, y1(i) is represented as follows (this is a fixed phase value regardless of the symbol number).

[Formula 79]

$$y1(i) = e^{-j\frac{2\times\pi}{7}} \qquad \text{Formula (79)}$$

It is assumed that a coefficient to be used for multiplication by phase changer 205B performing phase change is y2(i) (i indicates a symbol number and is an integer equal to or greater than 0). At this time, y2(i) is represented as follows (this is a fixed phase value regardless of the symbol number).

[Formula 80]

$$y2(i) = e^{j\frac{2\times\pi}{9}} \qquad \text{Formula (80)}$$

A second example of interpretation of Table 3 is as follows.

When [u0 u1]=[10](u0=1, u1=0), [u4 u5]=[00](u4=0, u5=0), in the base station, "phase changers 205A and 205B perform phase change with the specified phase change value (set) of the method 10_1".

Method 10_1:

It is assumed that a coefficient to be used for multiplication by phase changer 205A performing phase change is y1(i) (i indicates a symbol number and is an integer equal to or greater than 0). At this time, y1(i) is represented as follows (this is a fixed phase value regardless of the symbol number).

[Formula 81]

$$y1(i) = e^{j0} \qquad \text{Formula (81)}$$

For formula (81), phase changer 205A does not perform phase. It is assumed that phase changer 205B does not perform phase change.

When [u0 u1]=[10](u0=1, u1=0), [u4 u5]=[01](u4=0, u5=1), in the base station, "phase changers 205A and 205B perform phase change with the specified phase change value (set) of the method 10_2".

Method 10_2:

It is assumed that a coefficient to be used for multiplication by phase changer 205A performing phase change is y1(i) (i indicates a symbol number and is an integer equal to or greater than 0). At this time, y1(i) is represented as follows (this is a fixed phase value regardless of the symbol number).

[Formula 82]

$$y1(i) = e^{j\frac{\pi}{8}} \qquad \text{Formula (82)}$$

It is assumed that phase changer 205B does not perform phase change.

When [u0 u1]=[10](u0=1, u1=0), [u4 u5]=[10](u4=1, u5=0), in the base station, "phase changers 205A and 205B perform phase change with the specified phase change value (set) of the method 10_3".

Method 10_3:

It is assumed that a coefficient to be used for multiplication by phase changer 205A performing phase change is y1(i) (i indicates a symbol number and is an integer equal to or greater than 0). At this time, y1(i) is represented as follows (this is a fixed phase value regardless of the symbol number).

[Formula 83]

$$y1(i) = e^{j\frac{\pi}{4}}  \qquad \text{Formula (83)}$$

It is assumed that phase changer 205B does not perform phase change.

When [u0 u1]=[10](u0=1, u1=0), [u4 u5]=[11](u4=1, u5=1), in the base station, "phase changers 205A and 205B perform phase change with the specified phase change value (set) of the method 10_4".

Method 10_4:

It is assumed that a coefficient to be used for multiplication by phase changer 205A performing phase change is y1(i) (i indicates a symbol number and is an integer equal to or greater than 0). At this time, y1(i) is represented as follows (this is a fixed phase value regardless of the symbol number).

[Formula 84]

$$y1(i) = e^{j\frac{3\times\pi}{8}}  \qquad \text{Formula (84)}$$

It is assumed that phase changer 205B does not perform phase change.

A third example of interpretation of Table 3 is as follows.

When [u0 u1]=[10](u0=1, u1=0), [u4 u5]=[00](u4=0, u5=0), in the base station, "phase changers 205A and 205B perform phase change with the specified phase change value (set) of the method 10_1".

Method 10_1:

It is assumed that a coefficient to be used for multiplication by phase changer 205B performing phase change is y2(i) (i indicates a symbol number and is an integer equal to or greater than 0). At this time, y2(i) is represented as follows (this is a fixed phase value regardless of the symbol number).

[Formula 85]

$$y2(i) = e^{j0}  \qquad \text{Formula (85)}$$

For formula (85), phase changer 205B does not perform phase. It is assumed that phase changer 205A does not perform phase change.

When [u0 u1]=[10](u0=1, u1=0), [u4 u5]=[01](u4=0, u5=1), in the base station, "phase changers 205A and 205B perform phase change with the specified phase change value (set) of the method 10_2".

Method 10_2:

It is assumed that a coefficient to be used for multiplication by phase changer 205B performing phase change is y2(i) (i indicates a symbol number and is an integer equal to or greater than 0). At this time, y2(i) is represented as follows (this is a fixed phase value regardless of the symbol number).

[Formula 86]

$$y2(i) = e^{j\frac{\pi}{8}}  \qquad \text{Formula (86)}$$

It is assumed that phase changer 205A does not perform phase change.

When [u0 u1]=[10](u0=1, u1=0), [u4 u5]=[10](u4=1, u5=0), in the base station, "phase changers 205A and 205B perform phase change with the specified phase change value (set) of the method 10_3".

Method 10_3:

It is assumed that a coefficient to be used for multiplication by phase changer 205B performing phase change is y2(i) (i indicates a symbol number and is an integer equal to or greater than 0). At this time, y2(i) is represented as follows (this is a fixed phase value regardless of the symbol number).

[Formula 87]

$$y2(i) = e^{j\frac{\pi}{4}}  \qquad \text{Formula (87)}$$

It is assumed that phase changer 205A does not perform phase change.

When [u0 u1]=[10](u0=1, u1=0), [u4 u5]=[11](u4=1, u5=1), in the base station, "phase changers 205A and 205B perform phase change with the specified phase change value (set) of the method 10_4".

Method 10_4:

It is assumed that a coefficient to be used for multiplication by phase changer 205B performing phase change is y2(i) (i indicates a symbol number and is an integer equal to or greater than 0). At this time, y2(i) is represented as follows (this is a fixed phase value regardless of the symbol number).

[Formula 88]

$$y2(i) = e^{j\frac{3\times\pi}{8}}  \qquad \text{Formula (88)}$$

It is assumed that phase changer 205A does not perform phase change.

A fourth example of interpretation of Table 3 is as follows.

When [u0 u1]=[10](u0=1, u1=0), [u4 u5]=[00](u4=0, u5=0), in the base station, "phase changers 205A and 205B perform phase change with the specified phase change value (set) of the method 10_1".

Method 10_1:

It is assumed that a coefficient to be used for multiplication by phase changer 205A performing phase change is y1(i) (i indicates a symbol number and is an integer equal to or greater than 0). At this time, y1(i) is represented as follows (this is a fixed phase value regardless of the symbol number).

[Formula 89]

$$y1(i) = e^{j\frac{\pi}{8}}  \qquad \text{Formula (89)}$$

It is assumed that a coefficient to be used for multiplication by phase changer 205B performing phase change is y2(i) (i indicates a symbol number and is an integer equal to or greater than 0). At this time, y2(i) is represented as follows (this is a fixed phase value regardless of the symbol number).

[Formula 90]

$$y2(i)=e^{j0} \qquad \text{Formula (90)}$$

For formula (90), phase changer 205B does not perform phase.

When [u0 u1]=[10](u0=1, u1=0), [u4 u5]=[01](u4=0, u5=1), in the base station, "phase changers 205A and 205B perform phase change with the specified phase change value (set) of the method 10_2".

Method 10_2:

It is assumed that a coefficient to be used for multiplication by phase changer 205A performing phase change is y1(i) (i indicates a symbol number and is an integer equal to or greater than 0). At this time, y1(i) is represented as follows (this is a fixed phase value regardless of the symbol number).

[Formula 91]

$$y1(i) = e^{j\frac{\pi}{8}} \qquad \text{Formula (91)}$$

It is assumed that a coefficient to be used for multiplication by phase changer 205B performing phase change is y2(i) (i indicates a symbol number and is an integer equal to or greater than 0). At this time, y2(i) is represented as follows (this is a fixed phase value regardless of the symbol number).

[Formula 92]

$$y2(i) = e^{-j\frac{\pi}{8}} \qquad \text{Formula (92)}$$

When [u0 u1]=[10](u0=1, u1=0), [u4 u5]=[10](u4=1, u5=0), in the base station, "phase changers 205A and 205B perform phase change with the specified phase change value (set) of the method 10_3".

Method 10_3:

It is assumed that a coefficient to be used for multiplication by phase changer 205A performing phase change is y1(i) (i indicates a symbol number and is an integer equal to or greater than 0). At this time, y1(i) is represented as follows (this is a fixed phase value regardless of the symbol number).

[Formula 93]

$$y1(i) = e^{j\frac{\pi}{4}} \qquad \text{Formula (93)}$$

It is assumed that a coefficient to be used for multiplication by phase changer 205B performing phase change is y2(i) (i indicates a symbol number and is an integer equal to or greater than 0). At this time, y2(i) is represented as follows (this is a fixed phase value regardless of the symbol number).

[Formula 94]

$$y2(i) = e^{-j\frac{\pi}{8}} \qquad \text{Formula (94)}$$

When [u0 u1]=[10](u0=1, u1=0), [u4 u5]=[11](u4=1, u5=1), in the base station, "phase changers 205A and 205B perform phase change with the specified phase change value (set) of the method 10_4".

Method 10_4:

It is assumed that a coefficient to be used for multiplication by phase changer 205A performing phase change is y1(i) (i indicates a symbol number and is an integer equal to or greater than 0). At this time, y1(i) is represented as follows (this is a fixed phase value regardless of the symbol number).

[Formula 95]

$$y1(i)=e^{j0} \qquad \text{Formula (95)}$$

For formula (95), phase changer 205A does not perform phase. It is assumed that a coefficient to be used for multiplication by phase changer 205B performing phase change is y2(i) (i indicates a symbol number and is an integer equal to or greater than 0). At this time, y2(i) is represented as follows (this is a fixed phase value regardless of the symbol number).

[Formula 96]

$$y2(i) = e^{-j\frac{\pi}{4}} \qquad \text{Formula (96)}$$

As described above, the first to fourth examples have been described, but the specific phase change method of phase changers 205A and 205B is not limited to these examples.

<4> Phase changer 205A performs phase change with a specified phase change value (set).
<5> Phase changer 205B performs phase change with a specified phase change value (set).
<6> Phase changers 205A and 205B perform phase change with a specified phase change value (set).

If any one or more methods of <4>, <5>, and <6> are specifically set with [u4 u5], the above description can be performed similarly.

Also, it is possible to combine a method for periodically/regularly performing phase change for each symbol and a method for performing phase change with a specified phase change value, by phase changers 205A and 205B included in the base station. A mode of combining the method for periodically/regularly performing phase change for each symbol and the method for performing phase change with a specified phase change value by phase changers 205A and 205B is assigned to "Reserve" in Table 1, that is, [u0 u1]=[11] (u0=1, u1=1).

When [u0 u1] to control the operation of phase changers 205A and 205B included in the base station is set as [u0 u1]=[11] (u0=1, u1=1), that is, when the method by which phase changers 205A and 205B periodically/regularly perform phase change for each symbol and the method by which phase changers 205A and 205B perform phase change with a specified phase change value are mixed, control information for setting the phase change to be specifically performed is assumed to be u6 and u7. Table 4 illustrates a relationship between [u6 u7] and the phase change to be specifically performed by phase changers 205A and 205B. Note that u6 and u7 are transmitted by the base station, for example, as part of the control information symbols of the other symbols 403 and 503. Then, the terminal obtains [u6 u7] included in the control information symbols of the other symbols 403 and 503, is notified of the operations of phase changers 205A and 205B from [u6 u7], and demodulates and decodes the data symbols. The control information for "specific phase change" is 2 bits, but the number of bits may be other than 2 bits.

TABLE 4

| u6 u7 | Phase change method when [u0 u1] = [10] |
|---|---|
| 00 | Method 11_1 |
| 01 | Method 11_2 |
| 10 | Method 11_3 |
| 11 | Method 11_4 |

A first example of interpretation of Table 4 is as follows. When [u0 u1]=[11](u0=1, u1=1), [u6 u7]=[00](u6=0, u7=0), in the base station, "phase changers 205A and 205B perform phase change combining the method for periodically/regularly performing phase change for each symbol and the method for performing phase change with a specified phase change value of method 11_1".

Method 11_1:

It is assumed that a coefficient to be used for multiplication by phase changer 205A performing phase change is y1(i) (i indicates a symbol number and is an integer equal to or greater than 0). At this time, y1(i) is represented as follows.

[Formula 97]

$$y1(i) = e^{j\frac{2\times \pi \times i}{9}} \qquad \text{Formula (97)}$$

It is assumed that a coefficient to be used for multiplication by phase changer 205B performing phase change is y2(i) (i indicates a symbol number and is an integer equal to or greater than 0). At this time, y2(i) is represented as follows.

[Formula 98]

$$y2(i) = e^{j0} \qquad \text{Formula (98)}$$

When [u0 u1]=[11](u0=1, u1=1), [u6 u7]=[01](u6=0, u7=1), in the base station, "phase changers 205A and 205B perform phase change combining the method for periodically/regularly performing phase change for each symbol and the method for performing phase change with a specified phase change value of method 11_2".

Method 11_2:

It is assumed that a coefficient to be used for multiplication by phase changer 205A performing phase change is y1(i) (i indicates a symbol number and is an integer equal to or greater than 0). At this time, y1(i) is represented as follows.

[Formula 99]

$$y1(i) = e^{j\frac{2\times \pi \times i}{9}} \qquad \text{Formula (99)}$$

It is assumed that a coefficient to be used for multiplication by phase changer 205B performing phase change is y2(i) (i indicates a symbol number and is an integer equal to or greater than 0). At this time, y2(i) is represented as follows.

[Formula 100]

$$y2(i) = e^{j\frac{\pi}{4}} \qquad \text{Formula (100)}$$

When [u0 u1]=[11](u0=1, u1=1), [u6 u7]=[10](u6=1, u7=0), in the base station, "phase changers 205A and 205B perform phase change combining the method for periodically/regularly performing phase change for each symbol and the method for performing phase change with a specified phase change value of method 11_3".

Method 11_3:

It is assumed that a coefficient to be used for multiplication by phase changer 205A performing phase change is y1(i) (i indicates a symbol number and is an integer equal to or greater than 0). At this time, y1(i) is represented as follows.

[Formula 101]

$$y1(i) = e^{j0} \qquad \text{Formula (101)}$$

It is assumed that a coefficient to be used for multiplication by phase changer 205B performing phase change is y2(i) (i indicates a symbol number and is an integer equal to or greater than 0). At this time, y2(i) is represented as follows.

[Formula 102]

$$y2(i) = e^{j\frac{2\times \pi \times i}{9}} \qquad \text{Formula (102)}$$

When [u0 u1]=[11](u0=1, u1=1), [u6 u7]=[11](u6=1, u7=1), in the base station, "phase changers 205A and 205B perform phase change combining the method for periodically/regularly performing phase change for each symbol and the method for performing phase change with a specified phase change value of method 11_4".

Method 11_4:

It is assumed that a coefficient to be used for multiplication by phase changer 205A performing phase change is y1(i) (i indicates a symbol number and is an integer equal to or greater than 0). At this time, y1(i) is represented as follows.

[Formula 103]

$$y1(i) = e^{j\frac{\pi}{4}} \qquad \text{Formula (103)}$$

It is assumed that a coefficient to be used for multiplication by phase changer 205B performing phase change is y2(i) (i indicates a symbol number and is an integer equal to or greater than 0). At this time, y2(i) is represented as follows.

[Formula 104]

$$y2(i) = e^{j\frac{2\times\pi\times i}{9}}$$ Formula (104)

A second example of interpretation of Table 4 is as follows.

When [u0 u1]=[11](u0=1, u1=1), [u6 u7]=[00](u6=0, u7=0), in the base station, "phase changers 205A and 205B perform phase change combining the method for periodically/regularly performing phase change for each symbol and the method for performing phase change with a specified phase change value of method 11_1".

Method 11_1:

It is assumed that a coefficient to be used for multiplication by phase changer 205A performing phase change is y1(i) (i indicates a symbol number and is an integer equal to or greater than 0). At this time, y1(i) is represented as follows.

[Formula 105]

$$y1(i) = e^{j\frac{2\times\pi\times i}{9}}$$ Formula (105)

It is assumed that a coefficient to be used for multiplication by phase changer 205B performing phase change is y2(i) (i indicates a symbol number and is an integer equal to or greater than 0). At this time, y2(i) is represented as follows.

[Formula 106]

$$y2(i) = e^{j0}$$ Formula (106)

When [u0 u1]=[11](u0=1, u1=1), [u6 u7]=[01](u6=0, u7=1), in the base station, "phase changers 205A and 205B perform phase change combining the method for periodically/regularly performing phase change for each symbol and the method for performing phase change with a specified phase change value of method 11_2".

Method 11_2:

It is assumed that a coefficient to be used for multiplication by phase changer 205A performing phase change is y1(i) (i indicates a symbol number and is an integer equal to or greater than 0). At this time, y1(i) is represented as follows.

[Formula 107]

$$y1(i) = e^{j\frac{2\times\pi\times i}{9}}$$ Formula (107)

It is assumed that a coefficient to be used for multiplication by phase changer 205B performing phase change is y2(i) (i indicates a symbol number and is an integer equal to or greater than 0). At this time, y2(i) is represented as follows.

[Formula 108]

$$y2(i) = e^{j\frac{\pi}{8}}$$ Formula (108)

When [u0 u1]=[11](u0=1, u1=1), [u6 u7]=[10](u6=1, u7=0), in the base station, "phase changers 205A and 205B perform phase change combining the method for periodically/regularly performing phase change for each symbol and the method for performing phase change with a specified phase change value of method 11_3".

Method 11_3:

It is assumed that a coefficient to be used for multiplication by phase changer 205A performing phase change is y1(i) (i indicates a symbol number and is an integer equal to or greater than 0). At this time, y1(i) is represented as follows.

[Formula 109]

$$y1(i) = e^{j\frac{2\times\pi\times i}{9}}$$ Formula (109)

It is assumed that a coefficient to be used for multiplication by phase changer 205B performing phase change is y2(i) (i indicates a symbol number and is an integer equal to or greater than 0). At this time, y2(i) is represented as follows.

[Formula 110]

$$y2(i) = e^{j\frac{\pi}{4}}$$ Formula (110)

When [u0 u1]=[11](u0=1, u1=1), [u6 u7]=[11](u6=1, u7=1), in the base station, "phase changers 205A and 205B perform phase change combining the method for periodically/regularly performing phase change for each symbol and the method for performing phase change with a specified phase change value of method 11_4".

Method 11_4:

It is assumed that a coefficient to be used for multiplication by phase changer 205A performing phase change is y1(i) (i indicates a symbol number and is an integer equal to or greater than 0). At this time, y1(i) is represented as follows.

[Formula 111]

$$y1(i) = e^{j\frac{2\times\pi\times i}{9}}$$ Formula (111)

It is assumed that a coefficient to be used for multiplication by phase changer 205B performing phase change is y2(i) (i indicates a symbol number and is an integer equal to or greater than 0). At this time, y2(i) is represented as follows.

[Formula 112]

$$y2(i) = e^{j\frac{3\times\pi}{8}}$$ Formula (112)

A third example of interpretation of Table 4 is as follows.

When [u0 u1]=[11](u0=1, u1=1), [u6 u7]=[00](u6=0, u7=0), in the base station, "phase changers 205A and 205B perform phase change combining the method for periodically/regularly performing phase change for each symbol and the method for performing phase change with a specified phase change value of method 11_1".

Method 11_1:

It is assumed that a coefficient to be used for multiplication by phase changer 205A performing phase change is y1(i) (i indicates a symbol number and is an integer equal to or greater than 0). At this time, y1(i) is represented as follows.

[Formula 113]

$$y1(i) = e^{j\frac{2\times\pi\times i}{3}}$$ Formula (113)

It is assumed that a coefficient to be used for multiplication by phase changer 205B performing phase change is y2(i) (i indicates a symbol number and is an integer equal to or greater than 0). At this time, y2(i) is represented as follows.

[Formula 114]

$$y2(i) = e^{j\frac{\pi}{4}}$$ Formula (114)

When [u0 u1]=[11](u0=1, u1=1), [u6 u7]=[01](u6=0, u7=1), in the base station, "phase changers 205A and 205B perform phase change combining the method for periodically/regularly performing phase change for each symbol and the method for performing phase change with a specified phase change value of method 11_2".

Method 11_2:

It is assumed that a coefficient to be used for multiplication by phase changer 205A performing phase change is y1(i) (i indicates a symbol number and is an integer equal to or greater than 0). At this time, y1(i) is represented as follows.

[Formula 115]

$$y1(i) = e^{j\frac{2\times\pi\times i}{5}}$$ Formula (115)

It is assumed that a coefficient to be used for multiplication by phase changer 205B performing phase change is y2(i) (i indicates a symbol number and is an integer equal to or greater than 0). At this time, y2(i) is represented as follows.

[Formula 116]

$$y2(i) = e^{j\frac{\pi}{4}}$$ Formula (116)

When [u0 u1]=[11](u0=1, u1=1), [u6 u7]=[10](u6=1, u7=0), in the base station, "phase changers 205A and 205B perform phase change combining the method for periodically/regularly performing phase change for each symbol and the method for performing phase change with a specified phase change value of method 11_3".

Method 11_3:

It is assumed that a coefficient to be used for multiplication by phase changer 205A performing phase change is y1(i) (i indicates a symbol number and is an integer equal to or greater than 0). At this time, y1(i) is represented as follows.

[Formula 117]

$$y1(i) = e^{j\frac{2\times\pi\times i}{7}}$$ Formula (117)

It is assumed that a coefficient to be used for multiplication by phase changer 205B performing phase change is y2(i) (i indicates a symbol number and is an integer equal to or greater than 0). At this time, y2(i) is represented as follows.

[Formula 118]

$$y2(i) = e^{j\frac{\pi}{4}}$$ Formula (118)

When [u0 u1]=[11](u0=1, u1=1), [u6 u7]=[11](u6=1, u7=1), in the base station, "phase changers 205A and 205B perform phase change combining the method for periodically/regularly performing phase change for each symbol and the method for performing phase change with a specified phase change value of method 11_4".

Method 11_4:

It is assumed that a coefficient to be used for multiplication by phase changer 205A performing phase change is y1(i) (i indicates a symbol number and is an integer equal to or greater than 0). At this time, y1(i) is represented as follows.

[Formula 119]

$$y1(i) = e^{j\frac{2\times\pi\times i}{9}}$$ Formula (119)

It is assumed that a coefficient to be used for multiplication by phase changer 205B performing phase change is y2(i) (i indicates a symbol number and is an integer equal to or greater than 0). At this time, y2(i) is represented as follows.

[Formula 120]

$$y2(i) = e^{j\frac{\pi}{4}}$$ Formula (120)

A fourth example of interpretation of Table 4 is as follows.

When [u0 u1]=[11](u0=1, u1=1), [u6 u7]=[00](u6=0, u7=0), in the base station, "phase changers 205A and 205B perform phase change combining the method for periodically/regularly performing phase change for each symbol and the method for performing phase change with a specified phase change value of method 11_1".

Method 11_1:

It is assumed that a coefficient to be used for multiplication by phase changer 205A performing phase change is y1(i) (i indicates a symbol number and is an integer equal to or greater than 0). At this time, y1(i) is represented as follows.

[Formula 121]

$$y1(i) = e^{j0} \quad \text{Formula (121)}$$

It is assumed that a coefficient to be used for multiplication by phase changer 205B performing phase change is y2(i) (i indicates a symbol number and is an integer equal to or greater than 0). At this time, y2(i) is represented as follows.

[Formula 122]

$$y2(i) = e^{j\frac{2\times\pi\times i}{9}} \quad \text{Formula (122)}$$

When [u0 u1]=[11](u0=1, u1=1), [u6 u7]=[01](u6=0, u7=1), in the base station, "phase changers 205A and 205B perform phase change combining the method for periodically/regularly performing phase change for each symbol and the method for performing phase change with a specified phase change value of method 11_2".

Method 11_2:

It is assumed that a coefficient to be used for multiplication by phase changer 205A performing phase change is y1(i) (i indicates a symbol number and is an integer equal to or greater than 0). At this time, y1(i) is represented as follows.

[Formula 123]

$$y1(i) = e^{j\frac{\pi}{8}} \quad \text{Formula (123)}$$

It is assumed that a coefficient to be used for multiplication by phase changer 205B performing phase change is y2(i) (i indicates a symbol number and is an integer equal to or greater than 0). At this time, y2(i) is represented as follows.

[Formula 124]

$$y2(i) = e^{j\frac{2\times\pi\times i}{9}} \quad \text{Formula (124)}$$

When [u0 u1]=[11](u0=1, u1=1), [u6 u7]=[10](u6=1, u7=0), in the base station, "phase changers 205A and 205B perform phase change combining the method for periodically/regularly performing phase change for each symbol and the method for performing phase change with a specified phase change value of method 11_3".

Method 11_3:

It is assumed that a coefficient to be used for multiplication by phase changer 205A performing phase change is y1(i) (i indicates a symbol number and is an integer equal to or greater than 0). At this time, y1(i) is represented as follows.

[Formula 125]

$$y1(i) = e^{j\frac{\pi}{4}} \quad \text{Formula (125)}$$

It is assumed that a coefficient to be used for multiplication by phase changer 205B performing phase change is y2(i) (i indicates a symbol number and is an integer equal to or greater than 0). At this time, y2(i) is represented as follows.

[Formula 126]

$$y2(i) = e^{j\frac{2\times\pi\times i}{9}} \quad \text{Formula (126)}$$

When [u0 u1]=[11](u0=1, u1=1), [u6 u7]=[11](u6=1, u7=1), in the base station, "phase changers 205A and 205B perform phase change combining the method for periodically/regularly performing phase change for each symbol and the method for performing phase change with a specified phase change value of method 11_4".

Method 11_4:

It is assumed that a coefficient to be used for multiplication by phase changer 205A performing phase change is y1(i) (i indicates a symbol number and is an integer equal to or greater than 0). At this time, y1(i) is represented as follows.

[Formula 127]

$$y1(i) = e^{j\frac{3\times\pi}{8}} \quad \text{Formula (127)}$$

It is assumed that a coefficient to be used for multiplication by phase changer 205B performing phase change is y2(i) (i indicates a symbol number and is an integer equal to or greater than 0). At this time, y2(i) is represented as follows.

[Formula 128]

$$y2(i) = e^{j\frac{2\times\pi\times i}{9}} \quad \text{(Formula 128)}$$

A fifth example of interpretation of Table 4 is as follows.

When [u0 u1]=[11](u0=1, u1=1), [u6 u7]=[00](u6=0, u7=0), in the base station, "phase changers 205A and 205B perform phase change combining the method for periodically/regularly performing phase change for each symbol and the method for performing phase change with a specified phase change value of method 11_1".

Method 11_1:

It is assumed that a coefficient to be used for multiplication by phase changer 205A performing phase change is y1(i) (i indicates a symbol number and is an integer equal to or greater than 0). At this time, y1(i) is represented as follows.

[Formula 129]

$$y1(i) = e^{j\frac{\pi}{4}} \quad \text{(Formula 129)}$$

It is assumed that a coefficient to be used for multiplication by phase changer 205B performing phase change is y2(i) (i indicates a symbol number and is an integer equal to or greater than 0). At this time, y2(i) is represented as follows.

[Formula 130]

$$y2(i) = e^{j\frac{2\times\pi\times i}{3}} \quad \text{Formula (130)}$$

When [u0 u1]=[11](u0=1, u1=1), [u6 u7]=[01](u6=0, u7=1), in the base station, "phase changers 205A and 205B perform phase change combining the method for periodically/regularly performing phase change for each symbol and the method for performing phase change with a specified phase change value of method 11_2".

Method 11_2:

It is assumed that a coefficient to be used for multiplication by phase changer 205A performing phase change is y1(i) (i indicates a symbol number and is an integer equal to or greater than 0). At this time, y1(i) is represented as follows.

[Formula 131]

$$y1(i) = e^{j\frac{\pi}{4}} \quad \text{Formula (131)}$$

It is assumed that a coefficient to be used for multiplication by phase changer 205B performing phase change is y2(i) (i indicates a symbol number and is an integer equal to or greater than 0). At this time, y2(i) is represented as follows.

[Formula 132]

$$y2(i) = e^{j\frac{2\times\pi\times i}{5}} \quad \text{Formula (132)}$$

When [u0 u1]=[11](u0=1, u1=1), [u6 u7]=[10](u6=1, u7=0), in the base station, "phase changers 205A and 205B perform phase change combining the method for periodically/regularly performing phase change for each symbol and the method for performing phase change with a specified phase change value of method 11_3".

Method 11_3:

It is assumed that a coefficient to be used for multiplication by phase changer 205A performing phase change is y1(i) (i indicates a symbol number and is an integer equal to or greater than 0). At this time, y1(i) is represented as follows.

[Formula 133]

$$y1(i) = e^{j\frac{\pi}{4}} \quad \text{Formula (133)}$$

It is assumed that a coefficient to be used for multiplication by phase changer 205B performing phase change is y2(i) (i indicates a symbol number and is an integer equal to or greater than 0). At this time, y2(i) is represented as follows.

[Formula 134]

$$y2(i) = e^{j\frac{2\times\pi\times i}{7}} \quad \text{Formula (134)}$$

When [u0 u1]=[11](u0=1, u1=1), [u6 u7]=[11](u6=1, u7=1), in the base station, "phase changers 205A and 205B perform phase change combining the method for periodically/regularly performing phase change for each symbol and the method for performing phase change with a specified phase change value of method 11_4".

Method 11_4:

It is assumed that a coefficient to be used for multiplication by phase changer 205A performing phase change is y1(i) (i indicates a symbol number and is an integer equal to or greater than 0). At this time, y1(i) is represented as follows.

[Formula 135]

$$y1(i) = e^{j\frac{\pi}{4}} \quad \text{Formula (135)}$$

It is assumed that a coefficient to be used for multiplication by phase changer 205B performing phase change is y2(i) (i indicates a symbol number and is an integer equal to or greater than 0). At this time, y2(i) is represented as follows.

[Formula 136]

$$y2(i) = e^{j\frac{2\times\pi\times i}{9}} \quad \text{Formula (136)}$$

The first to fifth examples have been described above, but the specific phase change method of phase changers 205A and 205B is not limited to these examples.

<7> Phase changer 205A periodically/regularly performs phase change for each symbol, whereas phase changer 205B performs phase change with a specified phase change value (set).

<8> Phase changer 205B performs phase change with a specified phase change value (set), whereas phase changer 205B periodically/regularly performs phase change for each symbol.

<3> Phase changers 205A and 205B periodically/regularly perform phase change for each symbol.

If any one or more methods of <7> and <8> are specifically set with [u2 u3], the above description can be performed similarly.

Weight combiner 203 included in the base station may switch a weighting matrix. It is assumed that control information for setting the weighting matrix is u8 and u9. Table illustrates a relationship between [u8 u9] and the weighting matrix to be specifically used by weight combiner 203. Note that u8 and u9 are transmitted by the base station, for example, as part of the control information symbols of the other symbols 403 and 503. Then, the terminal obtains [u8 u9] included in the control information symbols of the other symbols 403 and 503, is notified of the operation of weight combiner 203 from [u8 u9], and demodulates and decodes the data symbol. The control information for designating "the specific weighting matrix" is 2 bits, but the number of bits may be other than 2 bits.

TABLE 5

| u8 u9 | Phase change method when [u0 u1] = [10] |
|---|---|
| 00 | Precoding using matrix 1 |
| 01 | Precoding using matrix 2 |
| 10 | Precoding using matrix 3 |
| 11 | Determine precoding method based on information from communication partner |

When [u8 u9]=[00](u8=0, u9=0), "weight combiner 203 of the base station performs precoding using matrix 1".

When [u8 u9]=[01](u8=0, u9=1), "weight combiner 203 of the base station performs precoding using matrix 2".

When [u8 u9]=[10](u8=1, u9=0), "weight combiner 203 of the base station performs precoding using matrix 3".

When [u8 u9]=[11](u8=1, u9=1), "the base station obtains, for example, feedback information from a communication partner, based on the feedback information, weight combiner 203 of the base station obtains the precoding matrix to use, and performs precoding using the obtained (precoding) matrix".

As described above, weight combiner 203 of the base station switches the precoding matrix to use. The terminal, which is a communication partner of the base station, can obtain u8 and u9 included in the control information symbol and demodulate and decode the data symbol based on u8 and u9. Doing this will allow a preferred precoding matrix to be set according to the communication condition such as the radio wave propagation environment. Therefore, the terminal can obtain high data reception quality.

Note that although a method for designation regarding phase changers 205A and 205B of the base station has been described as illustrated in Table 1, settings as illustrated in Table 6 instead of Table 1 may be made.

Transmission apparatus 2303 of the base station of FIG. 23 has the configuration of FIG. 1. Signal processor 106 of FIG. 1 has the configuration of any one of FIGS. 2, 18 to 22, and 28 to 33. At this time, operations of phase changers 205A and 205B may be switched according to a communication environment and setting conditions. The base station transmits the control information about the operations of phase changers 205A and 205B as part of the control information to be transmitted by the control information symbol of the other symbols 403 and 503 in the frame structure FIGS. 4, 5, 13, and 14.

At this time, control information about the operations of phase changers 205A and 205B is assumed to be u10. Table 6 illustrates a relationship between [u10] and phase changers 205A and 205B.

TABLE 6

| u10 | Operation of changing phase change value for each symbol (periodically/regularly) |
|---|---|
| 0 | OFF |
| 1 | ON |

Note that u10 is transmitted, for example, by the base station as part of the control information symbols of the other symbols 403 and 503. Then, the terminal obtains [u10] included in the control information symbols of the other symbols 403 and 503, is notified of the operations of phase changers 205A and 205B from [u10], and demodulates and decodes the data symbols.

Table 6 is interpreted as follows.

When the base station sets that "phase changers 205A and 205B do not perform phase change", "u10=0" is set. Therefore, phase changer 205A outputs signal (206A) without performing phase change on input signal (204A). Similarly, phase changer 205B outputs signal (206B) without performing phase change on input signal (204B).

When the base station sets that "phase changers 205A and 205B periodically/regularly perform phase change for each symbol", "u10=1" is set. Note that details of the method by which phase changers 205A and 205B periodically/regularly change phase change for each symbol are as described in the first to sixth exemplary embodiments, and thus descriptions of details will be omitted. In a case where signal processor 106 of FIG. 1 has any of the configurations of FIGS. 20 to 22, "u10=1" is set also for a case where "phase changer 205A performs phase change periodically/regularly for each symbol, and phase changer 205B does not perform phase change periodically/regularly for each symbol" and a case where "phase changer 205A does not perform phase change periodically/regularly for each symbol, and phase changer 205B performs phase change periodically/regularly for each symbol".

As described above, the terminal can obtain high data reception quality by turning ON/OFF the phase change operation of phase changers 205A and 205B according to the communication condition such as the radio wave propagation environment.

Transmission apparatus 2303 of the base station of FIG. 23 has the configuration of FIG. 1. Signal processor 106 of FIG. 1 has the configuration of any one of FIGS. 2, 18 to 22, and 28 to 33. At this time, the operations of phase changers 209A and 209B may be switched according to the communication environment and setting conditions. The base station transmits the control information about the operations of phase changers 209A and 209B as part of the control information to be transmitted by the control information symbols of the other symbols 403 and 503 in the frame structure of FIGS. 4, 5, 13, and 14.

At this time, the control information about the operations of phase changers 209A and 209B is assumed to be u11. Table 7 illustrates a relationship between [u11] and phase changers 209A and 209B.

TABLE 7

| u11 | Phase change (or cyclic delay diversity) |
|---|---|
| 0 | OFF |
| 1 | ON |

Note that u11 is transmitted, for example, by the base station as part of the control information symbols of the other symbols 403 and 503. Then, the terminal obtains [u11] included in the control information symbols of the other symbols 403 and 503, is notified of the operations of phase changers 209A and 209B from [u11], and demodulates and decodes the data symbols.

Table 7 is interpreted as follows.

When the base station sets that "phase changers 209A and 209B do not perform phase change", "u11=0" is set. Therefore, phase changer 209A outputs signal (210A) without performing phase change on input signal (208A). Similarly, phase changer 209B outputs signal (2101B) without performing phase change on input signal (208B).

When the base station sets that "phase changers 209A and 209B periodically/regularly perform phase change for each symbol (or, apply cyclic delay diversity)", "u11=1" is set. Note that details of a method by which phase changers 209A and 209B periodically/regularly change phase change for each symbol are as described in the first to sixth exemplary embodiments, and thus descriptions of details will be omitted. In a case where signal processor 106 of FIG. 1 has any of the configurations of FIGS. 19 and 22, "u11=1" is set also for a case where "phase changer 209A performs phase change periodically/regularly for each symbol, and phase changer 209B does not perform phase change periodically/regularly for each symbol" and a case where "phase changer 209A does not perform phase change periodically/regularly for each symbol, and phase changer 209B performs phase change periodically/regularly for each symbol".

As described above, the terminal can obtain high data reception quality by turning ON/OFF the phase change operation of phase changers 209A and 209B according to the communication condition such as the radio wave propagation environment.

Next, one example of switching the operations of phase changers 205A and 205B as illustrated in Table 1 will be described.

For example, it is assumed that the base station and the terminal perform communication as illustrated in FIG. 27. Note that the communication based on FIG. 27 has been described above, and thus part of the description will be omitted.

First, it is assumed that the terminal requests the base station to perform communication.

Then, the base station selects "perform phase change with a specified phase change value (set)" in Table 1. Phase changer 205A and/or phase changer 205B performs signal processing corresponding to "perform phase change with a specified phase change value (set)" and transmits data symbol #1 (2702_1).

The terminal receives control information symbol 2701_1 and data symbol #1 (2702_1) transmitted from the base station. Based on the transmission method included in control information symbol 2701_1, the terminal demodulates and decodes data symbol #1 (2702_1). It is assumed that, as a result, the terminal determines that "data included in data symbol #1 (2702_1) has been obtained without errors". Then, the terminal transmits, to the base station, terminal transmission symbol 2750_1 including at least information that "the data included in data symbol #1 (2702_1) has been obtained without errors".

The base station receives terminal transmission symbol 2750_1 transmitted from the terminal. Based on at least the information that "data included in data symbol #1 (2702_1) has been obtained without errors" included in terminal transmission symbol 2750_1, the base station determines that phase change (set) to be performed by phase changer 205A and/or phase changer 205B is "perform phase change with a specified phase change value (set)", as in a case of transmitting data symbol #1 (2702_1). Since "the data included in data symbol #1 (2702_1) has been obtained without errors", the base station can determine that the terminal is likely to obtain the data without errors also when the base station transmits the next data symbol by using "perform phase change with a specified phase change value (set)". This is likely to allow the terminal to obtain high data reception quality. Then, based on the determined "perform phase change with a specified phase change value (set)", the base station performs phase change by phase changer 205A and/or phase changer 205B.

The base station transmits control information symbol 2701_2 and data symbol #2 (2702_2), and at least data symbol #2 (2702_2) undergoes phase change with the determined "performing phase change with a specified phase change value (set)".

The terminal receives control information symbol 2701_2 and data symbol #2 (2702_2) transmitted from the base station. Based on information about the transmission method included in control information symbol 2701_2, the terminal demodulates and decodes data symbol #2 (2702_2). It is assumed that, as a result, the terminal determines that "data included in data symbol #2 (2702_2) has not been obtained correctly". Then, the terminal transmits, to the base station, terminal transmission symbol 2750_2 including at least information that "the data included in data symbol #2 (2702_2) has not been obtained correctly".

The base station receives terminal transmission symbol 2750_2 transmitted from the terminal. Based on at least the information that "the data included in data symbol #2 (2702_2) has not been obtained correctly" included in terminal transmission symbol 27502, the base station determines to change the phase change to be performed by phase changer 205A and/or phase changer 205B to "change the phase change value for each symbol (periodically/regularly)". Since "the data included in data symbol #2 (2702_2) has not been obtained correctly", the base station can determine that the data is likely to be obtained without errors if the phase change method is changed to "changing the phase change value for each symbol (periodically/regularly)" when the base station transmits the next data symbol. This is likely to allow the terminal to obtain high data reception quality. Therefore, based on "change the phase change value for each symbol (periodically/regularly)", the base station performs phase change by phase changer 205A and/or phase changer 205B. At this time, the base station transmits control information symbol 2701_3 and "data symbol #2 (2702_2-1)", and performs phase change at least on "data symbol #2 (2702_2-1)" based on "change the phase change value for each symbol (periodically/regularly)".

The terminal receives control information symbol 2701_3 and data symbol #2 (2702_2) transmitted from the base station. Based on information about the transmission method included in control information symbol 2701_3, the terminal demodulates and decodes data symbol #2 (2702_2-1). It is assumed that, as a result, the terminal determines that "the data included in data symbol #2 (2702_2-1) has not been obtained correctly". Then, the terminal transmits, to the base station, terminal transmission symbol 2750_3 including at least information that "the data included in data symbol #2 (2702_2-1) has not been obtained correctly".

The base station receives terminal transmission symbol 2750_3 transmitted from the terminal. Based on at least the information that "the data included in data symbol #2 (2702_2-1) has not been obtained correctly" included in terminal transmission symbol 27503, the base station determines to set again the phase change to be performed by phase changers A and B to "change the phase change value for each symbol (periodically/regularly)". Therefore, based on "change the phase change value for each symbol (periodically/regularly)", the base station performs phase change by phase changer 205A and/or phase changer 205B. At this time, the base station transmits control information symbol 2701_4 and "data symbol #2 (2702_2-2)", and performs phase change at least on "data symbol #2 (2702_2-2)" based on "change the phase change value for each symbol (periodically/regularly)".

The terminal receives control information symbol 2701_4 and data symbol #2 (2702_2-2) transmitted from the base station. Based on information about the transmission method included in control information symbol 27014, the terminal demodulates and decodes data symbol #2 (2702_2-2). It is assumed that, as a result, the terminal determines that "the data included in data symbol #2 (2702_2-2) has been obtained without errors". Then, the terminal transmits, to the base station, terminal transmission symbol 2750_4 including at least information that "data included in data symbol #2 (2702_2-2) has been obtained without errors".

The base station receives terminal transmission symbol 2750_4 transmitted from the terminal. Based on at least the information that "data included in data symbol #2 (2702-2) has been obtained without errors" included in terminal transmission symbol 27504, the base station determines that phase change (set) to be performed by phase changer 205A and/or phase changer 205B is "perform phase change with a specified phase change value (set)". Then, based on "perform phase change with a specified phase change value (set)", the base station performs phase change by phase changer 205A and/or phase changer 205B.

The base station transmits control information symbol 2701_5 and data symbol #3 (2702_3), and at least data symbol #3 (2702_3) undergoes phase change based on "perform phase change with a specified phase change value (set)".

The terminal receives control information symbol 2701_5 and data symbol #3 (2702_3) transmitted from the base station. Based on information about the transmission method included in control information symbol 2701_5, the terminal demodulates and decodes data symbol #3 (2702_3). It is assumed that, as a result, the terminal determines that "the data included in data symbol #3 (2702_3) has been obtained without errors". Then, the terminal transmits, to the base station, terminal transmission symbol 2750_5 including at least information that "data included in data symbol #3 (2702_3) has been obtained without errors".

The base station receives terminal transmission symbol 2750_5 transmitted from the terminal. Based on at least the information that "the data included in data symbol #3 (2702_3) has been obtained without errors" included in terminal transmission symbol 2750_5, the base station determines the method to be performed by phase changer 205A" and/or phase changer 205B to be the method for "performing phase change with a specified phase change value (set)". Then, the base station transmits data symbol #4 (2702_4) based on "perform phase change with a specified phase change value (set)".

The terminal receives control information symbol 2701_6 and data symbol #4 (2702_4) transmitted from the base station. Based on information about the transmission method included in control information symbol 2701_6, the terminal demodulates and decodes data symbol #4 (2702_4). It is assumed that, as a result, the terminal determines that "the data included in data symbol #4 (2702_4) has not been obtained correctly". Then, the terminal transmits, to the base station, terminal transmission symbol 2750_6 including at least information that "the data included in data symbol #4 (2702_4) has not been received correctly".

The base station receives terminal transmission symbol 2750_6 transmitted from the terminal. Based on at least the information that "the data included in data symbol #4 (2702_4) has not been obtained correctly" included in terminal transmission symbol 27506, the base station determines to change the phase change to be performed by phase changer 205A and/or phase changer 205B to "change the phase change value for each symbol (periodically/regularly)". Therefore, based on "change the phase change value for each symbol (periodically/regularly)", the base station performs phase change by phase changer 205A and/or phase changer 205B. At this time, the base station transmits control information symbol 2701_7 and "data symbol #4 (2702_4-1)", and performs phase change at least on "data symbol #4 (2702_4-1)" based on "change the phase change value for each symbol (periodically/regularly)".

The terminal receives control information symbol 2701_7 and data symbol #4 (2702_4-1) transmitted from the base station. Based on information about the transmission method included in control information symbol 2701_7, the terminal demodulates and decodes data symbol #4 (2702_4-1).

Note that in data symbol #1 (2702_1), data symbol #2 (2702_2), data symbol #3 (2702_3), and data symbol #4 (2702_4), as described in the first to sixth exemplary embodiments, the base station transmits a plurality of modulated signals from a plurality of antennas.

The frame structure of the base station and the terminal of FIG. 27 is merely one example, and may include other symbols. Each symbol of control information symbols 2701_1, 2701_2, 2701_3, 27014, 2701_5, 27016, data symbol #1 (2702_1), data symbol #2 (2702_2), data symbol #3 (2702_3), and data symbol #4 (2702_4) may include other symbols such as, for example, the pilot symbol. Control information symbols 2701_1, 27012, 2701_3, 27014, 2701_5, and 2701_6 include information about the value of "the specified phase change value" used when data symbol #1 (2702_1), data symbol #2 (2702_2), data symbol #3 (2702_3), and data symbol #4 (2702_4) are transmitted. By acquiring this information, the terminal can demodulate and decode data symbol #1 (2702_1), data symbol #2 (2702_2), data symbol #3 (2702_3), and data symbol #4 (2702_4).

Note that switching of the transmission method based on "Table 1" described in the present exemplary embodiment of the base station with reference to FIG. 27 is not limited to the above description. The above description is only one example of the transmission method switching, and the transmission method switching based on "Table 1" may be performed more flexibly.

As described above, by switching the operations more flexibly according to the communication environment or the like by switching the transmission method, switching the phase change method, and switching ON/OFF the phase change operation, the reception apparatus, a communication partner, can improve data reception quality.

Note that a scheme for switching the precoding matrix may be assigned to Reserve with u0=1 and u1=1 in Table 1 of the present exemplary embodiment according to information from a communication partner or the like. That is, when an MIMO transmission scheme is selected, the base station may be able to select a scheme for selecting the precoding matrix based on the information from the communication partner.

FIGS. 28 to 33 have been described as the configuration of signal processor 106 of FIG. 1 in the present exemplary embodiment. However, it is also possible to implement the first to sixth exemplary embodiments by applying FIGS. 28 to 33 to signal processor 106 of FIG. 1.

Supplementary 3

The mapper described herein may switch the mapping method for each symbol, for example, regularly/periodically. For example, it is assumed that a modulation method having 16 signal points for 4-bit transmission is set as the modulation method on an in-phase quadrature (IQ) plane. At this time, placement of 16 signal points for transmitting 4 bits on the in-phase quadrature (IQ) plane may be switched for each symbol.

Also, in the first to sixth exemplary embodiments, a case where a multi-carrier scheme such as OFDM is applied has been described. However, it is also possible to similarly implement the first to sixth exemplary embodiments with a single carrier scheme.

Also, it is possible to similarly implement each exemplary embodiment of the present invention with a spread spectrum communication scheme.

Supplementary 4

In each exemplary embodiment disclosed herein, the configuration of the transmission apparatus has been described taking FIG. 1 as an example, and the configuration of signal processor 106 of FIG. 1 has been described taking FIGS. 2, 18 to 22, and 28 to 33 as examples. However, the configuration of the transmission apparatus is not limited to the configuration described in FIG. 1, and the configuration of signal processor 106 is not limited to the configurations described in FIGS. 2, 18 to 22, and 28 to 33. That is, if the transmission apparatus can generate the same signal as any one of signal-processed signals 106_A and 106_B described in each exemplary embodiment disclosed herein and can transmit the generated signal by using a plurality of antenna units, the transmission apparatus and signal processor 106 of the transmission apparatus may have any configurations.

Different configuration examples of the transmission apparatus and signal processor 106 of the transmission apparatus that satisfy such conditions will be described below.

As one example of the different configuration examples, mapper 104 of FIG. 1 generates signals corresponding to weighted signals 204A and 204B in any one of FIGS. 2, 18, 19, 20, 21, and 22 based on encoded data 103 and control signal 100 as mapped signals 105_1 and 105_2. Signal processor 106 has a configuration with weight combiner 203 eliminated from any one of FIGS. 2, 18, 19, 20, 21, and 22. Mapped signal 105_1 is input into phase changer 205A or inserter 207A. Mapped signal 1052 is input into phase changer 205B or inserter 207B.

As another example of the different configuration examples, when the weighting (precoding) process is represented by a (precoding) matrix F represented by formula (33) or (34), weight combiner 203 in FIG. 2 outputs mapped signal 201A as weighted signal 204A, and outputs mapped signal 201B as weighted signal 204B, without performing signal processing for weighting on mapped signals 201A and 201B. In this case, based on control signal 200, weight combiner 203 controls to switch between the process of (i) and the process of (ii): (i) perform signal processing for weighting to generate weighted signals 204A and 204B, (ii) output mapped signal 201A as weighted signal 204A, and output mapped signal 201B as weighted signal 204B, without performing signal processing for weighting. When only the process represented by the (precoding) matrix F of formula (33) or formula (34) is implemented as the weighting (precoding) process, weight combiner 203 may be omitted.

Thus, even with the different specific configurations of the transmission apparatus, if the same signal as any one of signal-processed signals 106_A and 106_B described in each exemplary embodiment disclosed herein is generated and transmitted using a plurality of antenna units, in the reception apparatus, in an environment where direct waves are dominant, particularly in the LOS environment, data reception quality of the data symbol performing MIMO transmission (transmitting multiple streams) improves in the reception apparatus.

Note that in signal processor 106 of FIG. 1, phase changers may be provided both before and after weight combiner 203. Specifically, in a preceding stage of weight combiner 203, signal processor 106 includes one or both of phase changer 205A_1 for performing phase change on mapped signal 201A to generate phase-changed signal 2801A, and phase changer 205B_1 for performing phase change on mapped signal 201B to generate phase-changed signal 2801B. Furthermore, in a preceding stage of inserters 207A and 207B, signal processor 106 includes one or both of phase changer 205A_2 for performing phase change on weighted signal 204A to generate phase-changed signal 206A, and phase changer 205B_2 for performing phase change on weighted signal 204B to generate phase-changed signal 206B.

Here, when signal processor 106 includes phase changer 205A_1, one input to weight combiner 203 is phase-changed signal 2801A. When signal processor 106 does not include phase changer 205A_1, one input to weight combiner 203 is mapped signal 201A. When signal processor 106 includes phase changer 205B_1, the other input to weight combiner 203 is phase-changed signal 2801B. When signal processor 106 does not include phase changer 205B_1, the other input to weight combiner 203 is mapped signal 201B. When signal processor 106 includes phase changer 205A_2, input to inserter 207A is phase-changed signal 206A. When signal processor 106 does not include phase changer 205A_2, input to inserter 207A is weighted signal 204A. When signal processor 106 includes phase changer 205B_2, input to inserter 207B is phase-changed signal 206B. When signal processor 106 does not include phase changer 205B_2, input to inserter 207B is weighted signal 204B.

Furthermore, the transmission apparatus of FIG. 1 may include a second signal processor that performs another type of signal processing on signal-processed signals 106_A and 106_B, which are outputs from signal processor 106. At this time, when two signals output from the second signal processor are second signal-processed signal A and second signal-processed signal B, wireless unit 107_A receives second signal-processed signal A and performs a predetermined process, whereas wireless unit 107_B receives second signal-processed signal B and performs a predetermined process.

Eighth Exemplary Embodiment

The present exemplary embodiment will describe one example of a phase changing method for regularly performing phase change in a communication system that performs transmission using a single carrier scheme.

Figure 17:
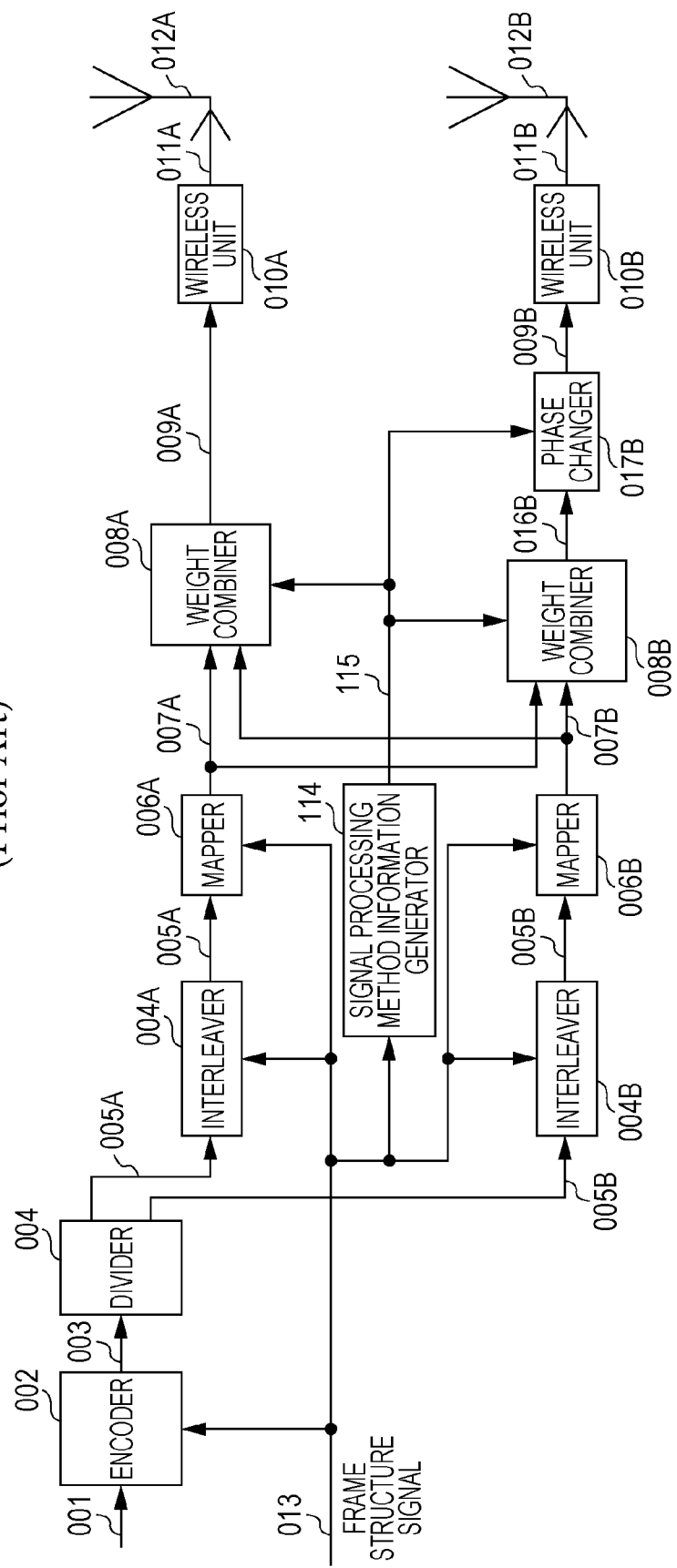
FIG. 17 is a diagram illustrating one exemplary configuration of the transmission apparatus based on the DVB-NGH standard.

A transmission apparatus according to the present exemplary embodiment has configurations of, for example, FIGS. 1 and 17.

Figure 34:
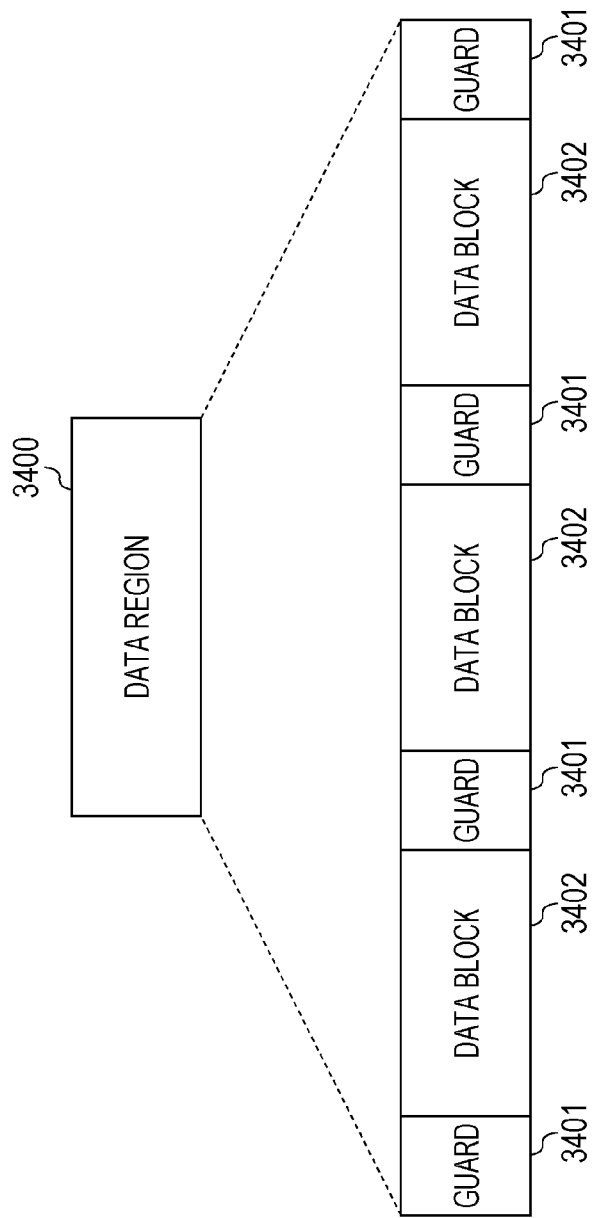
FIG. 34 is a diagram illustrating one exemplary structure of a region in which a data symbol of FIG. 25 is transmitted.

According to the present exemplary embodiment, the transmission apparatus transmits, for example, a signal having a frame structure as illustrated in FIG. 25. FIG. 34 is a diagram illustrating one example of a detailed structure of region 2503 in which a data symbol of FIG. 25 is transmitted. Data region 3400 of FIG. 34 corresponds to region 2503 of FIG. 25 where the data symbol is transmitted. Data region 3400 includes a plurality of data blocks 3402 each having a length of 448 symbols, guard periods 3401 each having 64 symbols and placed before the respective data blocks, and a guard period placed following the last data block.

Here, in the guard period, for example, a 64-symbol signal generated using a complementary code sequence such as a 64-bit Golay sequence is transmitted. Note that using the Golay sequence for generating the guard period signal is merely one example. The transmission apparatus may generate the guard period signal by using any other sequence such as other complementary codes or orthogonal code sequences. Also, a number of bits is not limited to 64 bits.

FIG. 34 illustrates the structure of data region 3400 where a number of data blocks is three. However, the number of data blocks may be any number as long as the number is an integer equal to or greater than 1. A number of guard blocks varies with the number of data blocks. For example, the number of guard blocks is a number obtained by adding 1 to the number of data blocks.

Figure 35:
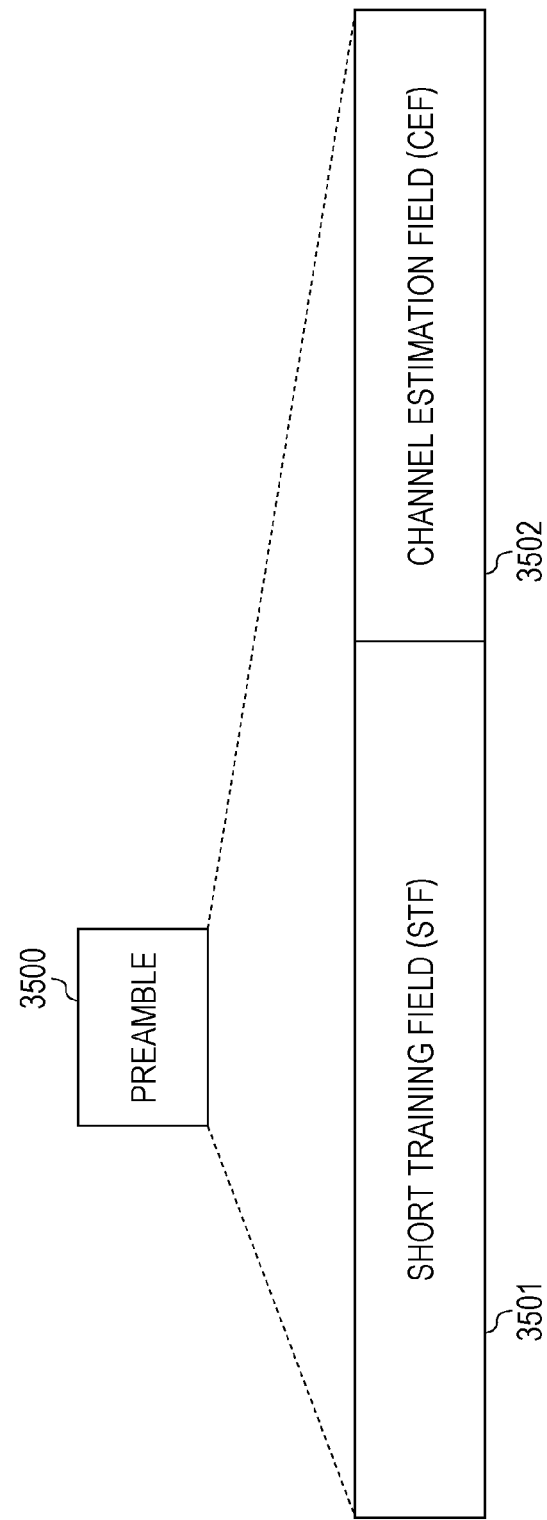
FIG. 35 is a diagram illustrating one exemplary structure of a preamble of FIG. 25.

FIG. 35 is a diagram illustrating one example of a detailed structure of preamble 2501 of FIG. 25. In FIG. 35, prinble 3500 corresponds to preamble 2501 of FIG. 25. Prinble 3500 includes short training field (STF) 3501 a reception apparatus can use for signal detection, frequency synchronization, time synchronization, and the like, and channel estimation field (CEF) 3502 that can be used for channel estimation.

In STF 3501, the transmission apparatus repeatedly transmits, for example, a 128-symbol signal generated using the complementary code sequence such as a 128-bit Golay sequence by a predetermined number of times. After that, the transmission apparatus transmits a 128-symbol signal generated using a complementary code sequence such as a 128-bit Golay sequence obtained by inverting signs of + and −.

In CEF 3502, the transmission apparatus transmits, for example, in a predetermined order, a plurality of 128-symbol signals generated using complementary code sequences such as a plurality of Golay sequences each having 128 bits and different from each other, and a complementary code sequence obtained by inverting the signs of + and − of the complementary code sequence.

Note that using the Golay sequence for generating the signals to be transmitted in STF 3501 and CEF 3502 is merely one example. The transmission apparatus may generate the signals by using any sequence such as other complementary codes or orthogonal code sequences. Also, the number of bits is not limited to the value described above.

Next, a phase change process to be performed by the transmission apparatus will be described. Here, first, description will be made of the phase change process to be performed by phase changer 205B when the transmission apparatus has the configuration of FIG. 1 and signal processor 106 of FIG. 1 has any of the configurations of FIGS. 2, 18, and 19.

However, in FIG. 2, phase changer 209B may perform phase change as described in the other exemplary embodiments or may omit phase change. Therefore, phase changer 209B may be eliminated, and baseband signal 208B based on the frame structure may correspond to 210B. Similarly, in FIG. 18, phase changer 209A may perform phase change as described in the other exemplary embodiments or may omit phase change. Therefore, phase changer 209A may be eliminated, and baseband signal 208A based on the frame structure may correspond to 210A. Also, in FIG. 19, phase changers 209A and 209B may perform phase change as described in the other exemplary embodiments or may omit phase change. Therefore, phase changer 209B may be eliminated, and baseband signal 208B based on the frame structure may correspond to 210B. Also, phase changer 209A may be eliminated, and baseband signal 208A based on the frame structure may correspond to 210A.

The phase change process to be described below may be performed by phase changer 205B when signal processor 106 has the configuration of FIG. 20, 21, or 22, or when the transmission apparatus has the configuration of FIG. 17. The phase change process may be performed by phase changer 2801B when signal processor 106 has the configuration of FIG. 31, 32, or 33.

According to the present exemplary embodiment, phase changer 205B performs the phase change process of a cycle N using N types of phase change values periodically in predetermined order. Here, as the cycle N of the phase change process, phase changer 205B uses a value equal to or greater than 3 out of divisors of a number of data block symbols. According to the present exemplary embodiment, since the number of data block symbols is 448, phase changer 205B performs the phase change process of any one of cycles 4, 7, 8, 14, 16, 28, 32, 56, 64, 112, 224, and 448.

Here, it is assumed that N types of phase change values and the switching order thereof in the phase change process to be performed by phase changer 205B are represented by formula (2). In that case, in a first symbol, the value of phase change to be performed by phase changer 205B is 0, and in second and subsequent symbols, the phase change value is a value obtained by adding 2π/N to the phase change value used in the previous symbol. However, the N types of phase change values and the switching order to be used by phase changer 205B are not limited to this example.

This configuration allows the reception apparatus that receives a modulated signal transmitted from the above-described transmission apparatus to avoid a situation where reception conditions are stationary, in particular in the LOS environment, thereby improving data reception quality.

Note that phase changer 205B may also perform the phase change process on the signal in the guard period. In this case, since a number of symbols in the guard period is 64, phase changer 205 uses any one of 4, 8, 16, and 32, which are values equal to or greater than 3 among divisors of 64, as the phase change cycle. Even if the transmission apparatus performs the phase change process without distinguishing the guard period and the data block, using this phase changing method allows the transmission apparatus to equate the magnitude of phase change to perform among the head symbol of each guard period and the head symbol of each data block. Therefore, without using information about the number of guard periods or data blocks transmitted before, the reception apparatus can determine the phase change value used on a transmission side, by using only information about the number of symbols from the heads of the guard period and the data block. As a result, the demodulation process of the reception apparatus can be facilitated.

In the above description, the transmission apparatus generates signal-processed signal 106_A without performing the phase change process, and performs the phase change process of the cycle N with the phase change value represented by formula (2) to generate signal-processed signal 106_B. Here, a case will be described in which the transmission apparatus uses a value of the divisor of the number of symbols in the guard period (equal to or greater than 2) as the value of the cycle N in the phase change process of phase changer 205B. At this time, to generate signals in the guard period of each of signal-processed signals 106_A and 106_B, even if the transmission apparatus uses the same sequence (e.g., Golay sequence), the transmission apparatus can make the symbol string corresponding to the guard period of signal-processed signal 106_A output from signal processor 106 orthogonal to the symbol string corresponding to the guard period of signal-processed signal 106_B. Since this configuration allows the transmission apparatus to cause the signals in the guard period to be orthogonal to each other without using a plurality of orthogonal sequences or a plurality of complementary code sequences in order to generate the signals in the guard period, the reception apparatus can estimate transmission channel characteristics (channel fluctuation) for each of two transmission signals from the signals in the guard period.

Note that the method by which the transmission apparatus changes the phase change value is not limited to the method represented by formula (2). For example, the phase changer may perform the phase change process of the cycle N by periodically using N types of values different by 2n/N in a predetermined appropriate order as the phase change values. In order to generate the signals in the guard period of two signals transmitted simultaneously at the same frequency, this configuration also allows the transmission apparatus to cause the signals in the guard period to be orthogonal to each other without using a plurality of orthogonal sequences or a plurality of complementary code sequences. Therefore, the reception apparatus can estimate transmission channel characteristics (channel fluctuation) for each of the two transmission signals from the signals in the guard period.

Note that in preamble 3500, the transmission apparatus does not perform the phase change process described above, for example, on either of signal-processed signals 106_A and 106_B. The transmission apparatus generates a signal to be used for estimating a transmission channel for MIMO, for example, by using orthogonal sequences orthogonal to each other or a plurality of complementary code sequences. Also, the signal to be used for estimating the transmission channel for MIMO may be transmitted in a region different from CEF 3502 of preamble 3500. For example, after the control symbol, for example, a region may be provided in which a signal to be used for estimating the transmission channel for MIMO generated using the orthogonal sequences orthogonal to each other or the plurality of complementary code sequences is transmitted.

The above information is differently described as follows.

The transmission apparatus transmits modulated signal #X from transmission antenna #1 and modulated signal #Y from transmission antenna #2. At this time, both of modulated signal #X and modulated signal #Y are single carrier signals. Then, the data symbol of modulated signal #X is transmitted together with a guard interval (GI) (named GI #X). Similarly, the data symbol of modulated signal #Y is transmitted together with GI (named GI #Y). The Golay sequence for generating the symbol of GI #X and the Golay sequence for generating the symbol of GI #Y are assumed to be the same (common). This will allow the circuit to be common to the transmission apparatus and the reception apparatus in parts related to the Golay sequence. When the transmission is performed as described above, the reception apparatus serving as a communication partner of the transmission apparatus cannot discriminate between GI #X and GI #Y. That is, it is difficult to demodulate modulated signal #X and modulated signal #Y. Therefore, to facilitate discrimination between GI #X and GI #Y, the reception apparatus performs phase change, for example, with one of GI #X and GI #Y.

Example 1) When phase change is performed regularly with GI #X, phase change is also performed regularly in a data symbol part of modulated signal #X. This will allow the phase changer to be common.

Example 2) When phase change is performed regularly with GI #Y, phase change is also performed regularly in a data symbol part of modulated signal #Y. This will allow the phase changer to be common.

Also, there may be a rule as described below. It is assumed that the first symbol in time in GI #X is GI #X (0) and the first symbol in time in GI #Y is GI #Y (0).

As in Example 1), when "phase change is performed regularly with GI #X, phase change is also performed regularly in the data symbol part of modulated signal #X", the phase change value of GI #X (0) is a specified value, and thereafter regular phase change is performed. For example, at time 1, "GI #X and the data symbol" are transmitted, and at time 2, "GI #X and the data symbol" are transmitted. At this time, the phase change value of "GI #X (0)" of "GI #X" transmitted at time 1 is A radians, and "GI #X (0)" of "GI #X" transmitted at time 2 is also A radians.

As in Example 2), when "phase change is performed regularly with GI #Y, phase change is also performed regularly in the data symbol part of modulated signal #Y", the phase change value of GI #Y (0) is a specified value, and thereafter regular phase change is performed. For example, at time 1, "GI #Y and the data symbol" are transmitted, and at time 2, "GI #Y and the data symbol" are transmitted. At this time, the phase change value of "GI #Y (0)" of "GI #Y" transmitted at time 1 is B radians, and "GI #Y (0)" of "GI #Y" transmitted at time 2 is also B radians.

Next, description will be made of the phase change process to be performed by phase changers 205A and 205B when the transmission apparatus has the configuration of FIG. 1 and signal processor 106 of FIG. 1 has the configuration of FIG. 20, 21, or 22. However, the phase change process to be described below may be performed by phase changers 205A and 205B when the transmission apparatus has the configuration of FIG. 17. The phase change process may be performed by phase changers 2801A and 2801B when signal processor 106 has the configuration of FIG. 31, 32, or 33.

The phase change process to be performed by phase changers 205A and 205B is represented by formula (52), and w(i) in formula (52) is represented by formula (137) below.

[Formula 137]

$$w(i) = e^{-j\frac{2\chi\pi\times i}{N}}$$ Formula (137)

y(i) is represented by formula (2).

Phase changers 205A and 205B use the same value as the cycle N of the phase change process. Also, as the cycle N of the phase change process, phase changers 205A and 205B use a value equal to or greater than 3 out of divisors of the number of data block symbols. According to the present exemplary embodiment, since the number of data block symbols is 448, phase changers 205A and 205B perform the phase change process of any one of cycles 4, 7, 8, 14, 16, 28, 32, 56, 64, 112, 224, and 448.

However, the N types of phase change values and the switching order to be used by phase changers 205A and 205B are not limited to this example.

This configuration allows the reception apparatus that receives a modulated signal transmitted from the above-described transmission apparatus to avoid a situation where reception conditions are stationary, in particular in the LOS environment, thereby improving data reception quality.

Note that phase changers 205A and 205B may also perform the phase change process on the signal in the guard period. In this case, since the number of symbols in the guard period is 64, phase changers 205A and 205B use any one of 4, 8, 16, and 32, which are values equal to or greater than 3 among divisors of 64, as the phase change cycle. Even if the transmission apparatus performs the phase change process without distinguishing the guard period from the data block, using this phase changing method allows the transmission apparatus to make the value of phase change performed on a head symbol of each guard period identical to the value of phase change performed on a head symbol of each data block. Therefore, without using information about the number of guard periods or data blocks transmitted before, the reception apparatus can determine the phase change value used on a transmission side, by using only information about the number of symbols from the heads of the guard period and the data block. As a result, the demodulation process of the reception apparatus can be facilitated.

In the above description, the transmission apparatus performs the phase change process of the cycle N with the phase change value represented by formula (137) to generate signal-processed signal 106_A, and performs the phase change process of the cycle N with the phase change value represented by formula (2) to generate signal-processed signal 106_B. Here, a case will be described in which the transmission apparatus uses a value of divisor of the number of symbols in the guard period (equal to or greater than 2) as the value of the cycle N in the phase change process of phase changers 205A and 205B. At this time, to generate signals in the guard period of each of signal-processed signals 106_A and 106_B, even if the transmission apparatus uses the same sequence (e.g., Golay sequence), the transmission apparatus can make the symbol string corresponding to the guard period of signal-processed signal 106_A output from signal processor 106 orthogonal to the symbol string corresponding to the guard period of signal-processed signal 106_B. Since this configuration allows the transmission apparatus to cause the signals in the guard period to be orthogonal to each other without using a plurality of orthogonal sequences or a plurality of complementary code sequences in order to generate the signals in the guard period, the reception apparatus can estimate the transmission channel characteristics for each of the two transmission signals from the signals in the guard period.

Note that in the above description according to the present exemplary embodiment, signal processor 106 of FIG. 1 has the configurations of FIGS. 2, 18, 19, 20, 21, 22, 31, 32, and 33. However, since the present exemplary embodiment uses the single carrier scheme and only one symbol is placed in a frequency axis direction, the phase change process by phase changers 209A and 209B may be omitted. In that case, the signal processor in the present exemplary embodiment has a configuration in which phase changers 209A and 209B are eliminated from FIGS. 2, 18, 19, 20, 21, 22, 31, 32, and 33.

However, phase changers 209A and 209B may perform the phase change process different from the phase change process described in the first exemplary embodiment and the like. Also, when the transmission apparatus transmits signals by performing channel bonding using a plurality of channels, the transmission apparatus may perform phase change using phase change values different for each channel.

Note that the present exemplary embodiment has described a case where the transmission apparatus transmits the 448-symbol data block and the 64-symbol signal of the guard period in the data region. However, the number of symbols in the data block and the guard period may be different values.

As one example where different values are used as the number of symbols in the data block and the guard period, a case will be described where the sum of the number of symbols in the data block and the number of symbols in the guard period is not a multiple of the cycle N of the phase change process. At this time, when the phase change process of the cycle N is continuously applied over the entire data region or a predetermined data unit transmitted in the data region (when the phase change process is performed without performing initialization of the phase change value in the entire data region or in the predetermined data unit transmitted in the data region), the phase change value in the head symbol of the head guard period of the data region is not equal to the phase change value in the head symbol of the next guard period.

The transmission apparatus may perform any phase change process, such as, for example, (1) periodically change the phase change value over the entire data region or a predetermined data unit transmitted in the data region (not perform initialization of the phase change value in the entire data region or in the predetermined data unit transmitted in the data region), (2) initialize the phase change value at the head of the guard period such that the phase change value applied to the head symbol of the guard period is always constant.

Also, when a plurality of schemes having different phase change value initialization conditions including the schemes (1) and (2) described above are switched and used, the transmission apparatus may transmit information indicating the phase change value initialization condition to use as the control symbol. At this time, the reception apparatus demodulates the data symbol based on the information indicating the initialization condition included in the received control information. Specifically, the reception apparatus determines the magnitude of the phase change used in each data symbol and demodulates the data symbol by using the information indicating the initialization condition and other information such as information indicating the phase change pattern if necessary included in the control information.

Next, as another example of the modulation scheme to be used by mapper 104 in FIG. 1 or mappers 006A and 006B in FIG. 17, a mapping scheme involving phase rotation (or phase change) will be described by which one signal point is selected according to an input bit value from a constellation in which the phase has been changed by a predetermined phase change amount for each symbol.

As one example of the mapping scheme involving phase rotation to be performed by the mapper, π/2-BPSK will be described. When π/2-BPSK is used, the mapper generates one mapped signal (baseband signal) for each bit from the input bit string. Mapped signal (baseband signal) $s_k$ that is k-th generated when π/2-BPSK is used is represented by formula X1 below. $c_k$ is a value of the k-th bit of the input bit string and has a value of 0 or 1.

[Formula 138]

$$s'_k 2 \cdot c_k - 1 \qquad \text{Formula (138)}$$

[Formula 139]

$$s_k = s'_k \cdot e^{j\pi \cdot k/2} \quad \text{Formula (139)}$$

Note that $s'_k$ is identical to one example of the mapped signal (baseband signal) generated by BPSK without involving phase rotation (or phase change). When π/2-BPSK is used, the cycle of phase rotation (or phase change) is 4 because the phase of the constellation rotates (changes) by π/2 for each symbol.

As another example of the mapping scheme involving phase rotation to be performed by the mapper, π/2-QPSK will be described. When π/2-QPSK is used, the mapper generates one mapped signal (baseband signal) for each two bits from the input bit string. The mapped signal (baseband signal) $s_k$ that is k-th generated when π/2-QPSK is used is represented by formula X2 below. $c_k$ is a value of the k-th bit of the input bit string and has a value of 0 or 1.

[Formula 140]

$$s'_k = \frac{1}{\sqrt{2}}((2 \cdot c_{2k} - 1) + j(2 \cdot c_{2k+1} - 1))\exp\left(-j\frac{\pi}{4}\right) \quad \text{Formula (140)}$$

[Formula 141]

$$s_k = s'_k \cdot e^{j\pi \cdot k/2} \quad \text{Formula (141)}$$

Note that $s'_k$ is identical to one example of the mapped signal (baseband signal) generated by QPSK without involving phase rotation (or phase change). When π/2-QPSK is used, the cycle of phase rotation (or phase change) is 4 because the phase of the constellation rotates (changes) by π/2 for each symbol.

π/2-BPSK and π/2-QPSK have been described by way of example as the mapping scheme involving phase rotation (or phase change), but other mapping schemes may be used. For example, as the constellation to undergo phase rotation (or phase change), the mapper can use constellations such as amplitude phase shift keying (APSK) (e.g., 16APSK, 64APSK, 128APSK, 256APSK, 1024APSK, 4096APSK, and the like), pulse amplitude modulation (PAM) (e.g., 4PAM, 8PAM, 16PAM, 64PAM, 128PAM, 256PAM, 1024PAM, 4096PAM, and the like), phase shift keying (PSK) (e.g., BPSK, QPSK, 8PSK, 16PSK, 64PSK, 128PSK, 256PSK, 1024PSK, 4096PSK, and the like), and quadrature amplitude modulation (QAM) (e.g., 4QAM, 8QAM, 16QAM, 64QAM, 128QAM, 256QAM, 1024QAM, 4096QAM, and the like). Also, as each mapping scheme described above, the mapper may perform mapping using any one of a uniform mapping constellation and a non-uniform mapping constellation. Also, as the cycle of phase rotation (or phase change), the mapper may use not only 4 used for π/2-BPSK or π/2-QPSK, but also any integer equal to or greater than 2, such as 8 and 16.

Next, the configuration of the reception apparatus according to the present exemplary embodiment will be described. The reception apparatus according to the present exemplary embodiment has, for example, the configuration of FIG. 8, receives the signal of the frame structure described so far, and demodulates the data symbol based on the control information transmitted in the control information symbol.

Meanwhile, for generating a GI symbol, mapping is performed on the Golay sequence to generate the symbol. At this time, examples of preferred modulation schemes for generating the GI symbol include π/2-BPSK (π/2 shift BPSK) and BPSK described above. However, the modulation scheme is not limited to these schemes, and the above-described modulation scheme may be used.

Note that although performing phase change on GI has been described above, phase change may also be performed on short training field (STF) 3501 and channel estimation field (CEF) 3502 that can be used for channel estimation described in FIG. 35. This point will be described below.

Figure 36:
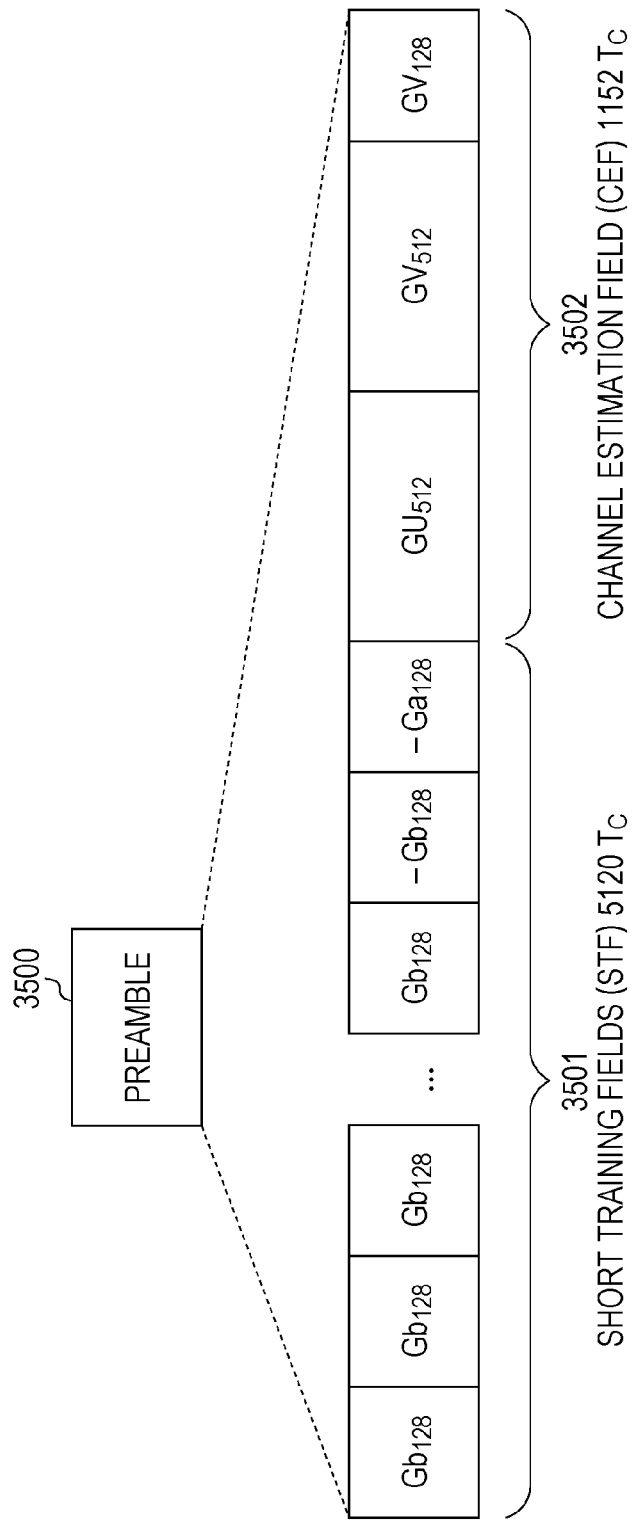
FIG. 36 is a diagram illustrating one exemplary structure of short training field (STF) and channel estimation field (CEF).

In the following case, phase change is also performed on STF 3501 and/or CEF 3502 described in FIG. 35. FIG. 36 illustrates one example of the structure of STF 3501 and CEF 3502.

STF 3501 includes 5120 bits, and includes a first Golay sequence including 128 bits (described as Ga 128 in FIG. 36), and a second Golay sequence including 128 bits (described as Gb 128 in FIG. 36). Note that, for example, π/2-BPSK (π/2 shift BPSK) is performed on the first Golay sequence (Ga 128) to generate 128 symbols, and, for example, π/2-BPSK (π/2 shift BPSK) is performed on the second Golay sequence (Gb 128) to generate 128 symbols. Note that, for example, for sequence Ga 4={1, 1, 1, 1}, —Ga 4={−1, −1, −1, −1}. Therefore, STF 3501 is a π/2-BPSK (π/2 shift BPSK) symbol of 5120 symbols.

CEF 3502 includes 1152 bits, and includes a fourth Golay sequence including 512 bits (described as GU 512 in FIG. 36), a fifth Golay sequence including 512 bits (described as GV 512 in FIG. 36), and a sixth Golay sequence including 128 bits (described as GV 128 in FIG. 36). Note that, for example, π/2-BPSK (π/2 shift BPSK) is performed on the fourth Golay sequence (GU 512) to generate 512 symbols, and for example, π/2-BPSK (π/2 shift BPSK) is performed on the fifth Golay sequence (GV 512) to generate 512 symbols, and for example, π/2-BPSK (π/2 shift BPSK) is performed on the sixth Golay sequence (GV 128) to generate 128 symbols. Note that CEF 3502 is a π/2-BPSK (π/2 shift BPSK) symbol of 1152 symbols.

Phase changer 205B may also perform the phase change process on STF 3501 and/or CEF 3502.

Since STF 3501 is formed by bundling a plurality of 128-bit Golay sequences (128 symbols), phase changer 205 (phase changer 205B) uses an integer larger than 4 out of divisors of 128, for example, one of 8, 16, 32, 64, 128 as the phase change cycle. To obtain an effect of reducing a peak-to-average power ratio (PAPR) by using π/2 shift BPSK, the cycle needs be an integer larger than 4.

Note that as described above, in order for the transmission apparatus to perform the phase change process without distinguishing among the guard period, the data block, and STF 3501, 8, 16, and 32 are preferred values as the phase change cycle. Even if the transmission apparatus performs the phase change process without distinguishing the guard period, the data block, and STF 3501, this will allow the transmission apparatus to equate the magnitude of phase change to perform among the head symbol of each guard period, the head symbol of the data block, and the head symbol of STF 3501. Therefore, without using information about the number of guard periods or data blocks transmitted before, the reception apparatus can determine the phase change value used on a transmission side, by using only information about the number of symbols from the heads of the guard period and the data block. As a result, the demodulation process of the reception apparatus can be facilitated.

Since CEF 3502 is formed by bundling the 128-bit Golay sequence (128 symbols) and 512-bit Golay sequence (512 symbols), phase changer 205 (phase changer 205B) uses an integer larger than 4 out of common divisors of 512 and 128, for example, one of 8, 16, 32, 64, 128 as the phase change cycle. However, the 512-bit Golay sequence (512 symbols) can also be formed by combining four sets of 128 symbols corresponding to the 128-bit Golay sequences. At this time, phase changer 205 (phase changer 205B) uses an integer larger than 4 out of divisors of 128, for example, one of 8, 16, 32, 64, and 128 as the phase change cycle. Note that to obtain an effect of reducing the peak-to-average power ratio (PAPR) by using $\pi/2$ shift BPSK, the cycle needs be an integer larger than 4.

Note that as described above, in order for the transmission apparatus to perform the phase change process without distinguishing among the guard period, the data block, STF 3501, and CEF 3502, 8, 16, and 32 are preferred values as the phase change cycle. Even if the transmission apparatus performs the phase change process without distinguishing the guard period, the data block, STF 3501, and CEF 3502, this will allow the transmission apparatus to equate the magnitude of phase change to perform among the head symbol of each guard period, the head symbol of the data block, and the head symbol of STF 3501. Therefore, without using information about the number of guard periods or data blocks transmitted before, the reception apparatus can determine the phase change value used on a transmission side, by using only information about the number of symbols from the heads of the guard period and the data block. As a result, the demodulation process of the reception apparatus can be facilitated.

Figure 37:
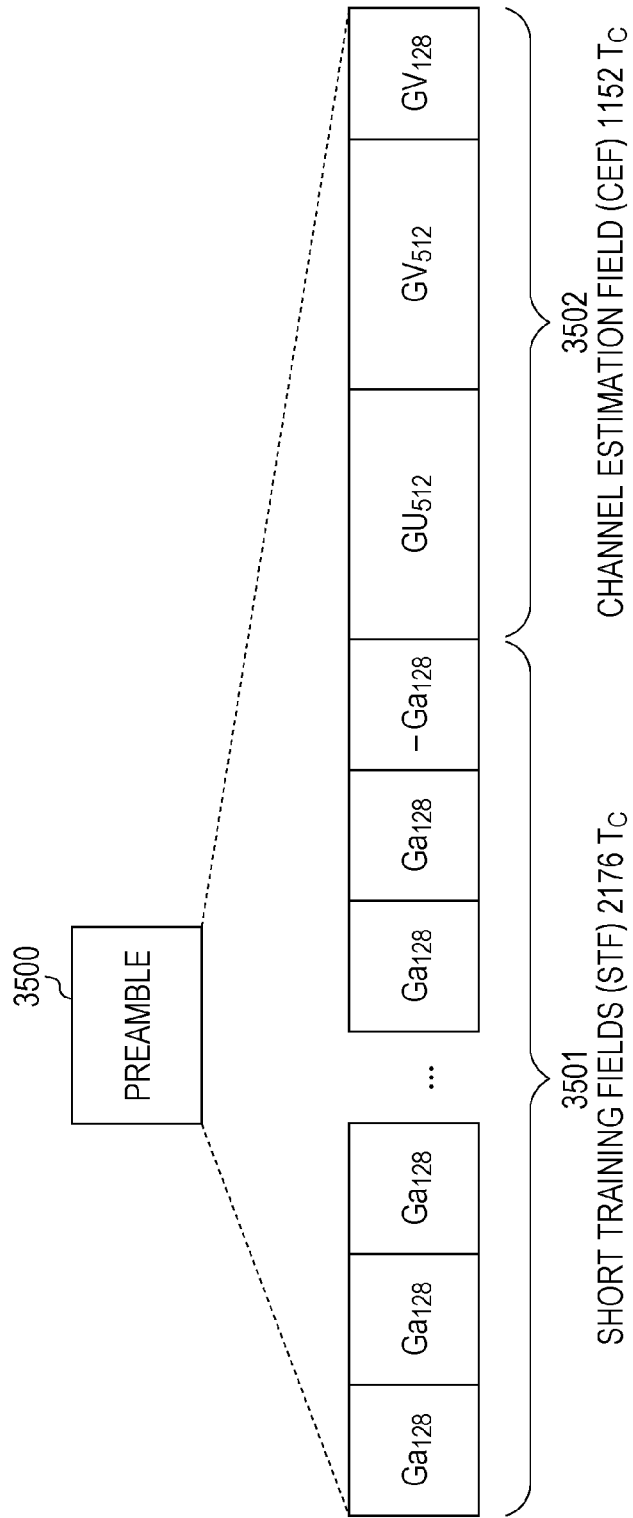
FIG. 37 is a diagram illustrating another exemplary structure of STF and CEF.

FIG. 37 illustrates an example of the structure of STF 3501 and CEF 3502 different from FIG. 36.

STF 3501 includes 2176 bits, and includes the first Golay sequence including 128 bits (described as Ga 128 in FIG. 37). Note that, for example, $\pi/2$-BPSK ($\pi/2$ shift BPSK) is performed on the first Golay sequence (Ga 128) to generate 128 symbols. Note that, for example, for sequence Ga 4={1, 1, 1, 1}, -Ga 4={-1, -1, -1, -1}. Therefore, STF 3501 is a $\pi/2$-BPSK ($\pi/2$ shift BPSK) symbol of 5120 symbols.

The structure of CEF 3502 is as described with reference to FIG. 36.

Phase changer 205B may also perform the phase change process on STF 3501 and/or CEF 3502.

Since STF 3501 is formed by bundling a plurality of 128-bit Golay sequences (128 symbols), phase changer 205 (phase changer 205B) uses an integer larger than 4 out of divisors of 128, for example, one of 8, 16, 32, 64, 128 as the phase change cycle. To obtain an effect of reducing a peak-to-average power ratio (PAPR) by using $\pi/2$ shift BPSK, the cycle needs be an integer larger than 4.

Note that as described above, in order for the transmission apparatus to perform the phase change process without distinguishing among the guard period, the data block, and STF 3501, 8, 16, and 32 are preferred values as the phase change cycle. Even if the transmission apparatus performs the phase change process without distinguishing the guard period, the data block, and STF 3501, this will allow the transmission apparatus to equate the magnitude of phase change to perform among the head symbol of each guard period, the head symbol of the data block, and the head symbol of STF 3501. Therefore, without using information about the number of guard periods or data blocks transmitted before, the reception apparatus can determine the phase change value used on a transmission side, by using only information about the number of symbols from the heads of the guard period and the data block. As a result, the demodulation process of the reception apparatus can be facilitated.

Since CEF 3502 is formed by bundling the 128-bit Golay sequence (128 symbols) and 512-bit Golay sequence (512 symbols), phase changer 205 (phase changer 205B) uses an integer larger than 4 out of common divisors of 512 and 128, for example, one of 8, 16, 32, 64, 128 as the phase change cycle. However, the 512-bit Golay sequence (512 symbols) can also be formed by combining four sets of 128 symbols corresponding to the 128-bit Golay sequences. At this time, phase changer 205 (phase changer 205B) uses an integer larger than 4 out of divisors of 128, for example, one of 8, 16, 32, 64, and 128 as the phase change cycle. Note that to obtain an effect of reducing the peak-to-average power ratio (PAPR) by using $\pi/2$ shift BPSK, the cycle needs be an integer larger than 4.

Note that as described above, in order for the transmission apparatus to perform the phase change process without distinguishing among the guard period, the data block, STF 3501, and CEF 3502, 8, 16, and 32 are preferred values as the phase change cycle. Even if the transmission apparatus performs the phase change process without distinguishing the guard period, the data block, STF 3501, and CEF 3502, this will allow the transmission apparatus to equate the magnitude of phase change to perform among the head symbol of each guard period, the head symbol of the data block, and the head symbol of STF 3501. Therefore, without using information about the number of guard periods or data blocks transmitted before, the reception apparatus can determine the phase change value used on a transmission side, by using only information about the number of symbols from the heads of the guard period and the data block. As a result, the demodulation process of the reception apparatus can be facilitated.

In the above description, the transmission apparatus generates signal-processed signal 106_A without performing the phase change process, and performs the phase change process of the cycle N with the phase change value represented by formula (2) to generate signal-processed signal 106_B. Here, a case will be described in which the transmission apparatus uses a value of divisor of 128 symbols (equal to or greater than 2) corresponding to 128-bit Golay sequence constituting STF as the value of the cycle N in the phase change process of phase changer 205B. At this time, to generate signals of STF 3501 of each of signal-processed signals 106_A and 106_B, even if the transmission apparatus uses the same sequence (e.g., Golay sequence), the transmission apparatus can make the 128-symbol symbol string corresponding to the Golay sequence of signal-processed signal 106_A output from signal processor 106 orthogonal to the 128-symbol symbol string corresponding to the Golay sequence of signal-processed signal 106_B.

Since this configuration allows the transmission apparatus to cause the signals in the Golay sequence sections to be orthogonal to each other without using a plurality of orthogonal sequences or a plurality of complementary code sequences in order to generate the signal of STF 3501, the reception apparatus can estimate transmission channel characteristics (channel fluctuation) and the like (distortion component) for each of two transmission signals from the signal of each Golay sequence section.

Note that the method by which the transmission apparatus changes the phase change value is not limited to the method represented by formula (2). For example, the phase changer may perform the phase change process of the cycle N by periodically using N types of values different by $2n/N$ in a predetermined appropriate order as the phase change values. Since this configuration also allows the transmission apparatus to cause the signals in the Golay sequence sections to be orthogonal to each other without using a plurality of orthogonal sequences or a plurality of complementary code sequences in order to generate the STF 3501 signals of two signals transmitted simultaneously at the same frequency, the reception apparatus can estimate transmission channel characteristics (channel fluctuation) and the like (distortion component) of each of the two transmission signals from the signal of each Golay sequence section.

In the above description, the transmission apparatus generates signal-processed signal 106_A without performing the phase change process, and performs the phase change process of the cycle N with the phase change value represented by formula (2) to generate signal-processed signal 106_B. Here, a case will be described in which the transmission apparatus uses a value of a common divisor of 128 and 512 (equal to or greater than 2) as the value of the cycle N in the phase change process of phase changer 205B, because CEF includes 128 symbols corresponding to 128-bit Golay sequence and 512 symbols corresponding to 512-bit Golay sequence. However, 512 symbols corresponding to the 512-bit Golay sequence can also be formed by combining four sets of 128 symbols corresponding to the 128-bit Golay sequence. At this time, a divisor of 128 (equal to or greater than 2) is used as the value of the cycle N. At this time, to generate signals of CEF 3502 of each of signal-processed signals 106_A and 106_B, even if the transmission apparatus uses the same sequence (e.g., Golay sequence), the transmission apparatus can make 512-symbol or 128-symbol symbol string corresponding to the Golay sequence of signal-processed signal 106_A output from signal processor 106 orthogonal to 512-symbol or 128-symbol symbol string corresponding to the Golay sequence of signal-processed signal 106_B.

Since this configuration allows the transmission apparatus to cause the signals in the Golay sequence sections to be orthogonal to each other without using a plurality of orthogonal sequences or a plurality of complementary code sequences in order to generate the signal of CEF 3502, the reception apparatus can estimate transmission channel characteristics (channel fluctuation) and the like (distortion component) for each of two transmission signals from the signal of each Golay sequence section.

Note that the method by which the transmission apparatus changes the phase change value is not limited to the method represented by formula (2). For example, the phase changer may perform the phase change process of the cycle N by periodically using N types of values different by 2n/N in a predetermined appropriate order as the phase change values. Since this configuration also allows the transmission apparatus to cause the signals in the Golay sequence sections to be orthogonal to each other without using a plurality of orthogonal sequences or a plurality of complementary code sequences in order to generate the signals of CEF 3502 of two signals transmitted simultaneously at the same frequency, the reception apparatus can estimate transmission channel characteristics (channel fluctuation) and the like (distortion component) of each of the two transmission signals from the signal of each Golay sequence section.

The above information is differently described as follows.

The transmission apparatus transmits modulated signal #X from transmission antenna #1 and modulated signal #Y from transmission antenna #2. At this time, both of modulated signal #X and modulated signal #Y are single carrier signals. Then, the transmission apparatus transmits STF of modulated signal #X (named STF #X). Similarly, the transmission apparatus transmits STF of modulated signal #Y (named STF #Y). The Golay sequence for generating the symbol of STF #X and the Golay sequence for generating the symbol of STF #Y are assumed to be the same (common). This will allow the circuit to be common to the transmission apparatus and the reception apparatus in parts related to the Golay sequence. When the transmission is performed as described above, the reception apparatus serving as a communication partner of the transmission apparatus cannot discriminate between STF #X and STF #Y. That is, it is difficult to demodulate modulated signal #X and modulated signal #Y. Therefore, to facilitate discrimination between STF #X and STF #Y, the reception apparatus performs phase change, for example, with one of STF #X and STF #Y.

Example 3

When phase change is performed regularly with STF #X, phase change may also be performed regularly in a data symbol part of modulated signal #X. This may allow the phase changer to be common.

Example 4

When phase change is performed regularly with STF #Y, phase change may also be performed regularly in a data symbol part of modulated signal #Y. This may allow the phase changer to be common.

Also, there may be a rule as described below. The first symbol in time in STF #X is STF #X (0) and the first symbol in time in STF #Y is STF #Y (0).

As in Example 3), in a case where "when phase change is performed regularly with STF #X, phase change may also be performed regularly in the data symbol part of modulated signal #X", the phase change value of STF #X (0) is a specified value, and thereafter regular phase change is performed. For example, at time 1, "STF #X and the data symbol" are transmitted, and at time 2, "STF #X and the data symbol" are transmitted. At this time, the phase change value of "STF #X (0)" of "STF #X" transmitted at time 1 is A radians, and "STF #X (0)" of "STF #X" transmitted at time 2 is also A radians.

As in Example 4), in a case where "when phase change is performed regularly with STF #Y, phase change may also be performed regularly in the data symbol part of modulated signal #Y", the phase change value of STF #Y (0) is a specified value, and thereafter regular phase change is performed. For example, at time 1, "STF #Y and the data symbol" are transmitted, and at time 2, "STF #Y and the data symbol" are transmitted. At this time, the phase change value of "STF #Y (0)" of "STF #Y" transmitted at time 1 is B radians, and "STF #Y (0)" of "STF #Y" transmitted at time 2 is also B radians.

The transmission apparatus transmits modulated signal #X from transmission antenna #1 and modulated signal #Y from transmission antenna #2. At this time, both of modulated signal #X and modulated signal #Y are single carrier signals. Then, the transmission apparatus transmits CEF of modulated signal #X (named CEF #X). Similarly, the transmission apparatus transmits CEF of modulated signal #Y (named CEF #Y). The Golay sequence for generating the symbol of CEF #X and the Golay sequence for generating the symbol of CEF #Y are assumed to be the same (common). This will allow the circuit to be common to the transmission apparatus and the reception apparatus in parts related to the Golay sequence.

When the transmission is performed as described above, the reception apparatus serving as a communication partner of the transmission apparatus cannot discriminate between CEF #X and CEF #Y. That is, it is difficult to demodulate modulated signal #X and modulated signal #Y. Therefore, to facilitate discrimination between CEF #X and CEF #Y, the reception apparatus performs phase change, for example, with one of CEF #X and CEF #Y.

Example 5

When phase change is performed regularly with CEF #X, phase change may also be performed regularly in a data symbol part of modulated signal #X. This may allow the phase changer to be common.

Example 6

When phase change is performed regularly with CEF #Y, phase change may also be performed regularly in a data symbol part of modulated signal #Y. This may allow the phase changer to be common.

Also, there may be a rule as described below. The first symbol in time in CEF #X is CEF #X (0) and the first symbol in time in CEF #Y is CEF #Y (0).

As in Example 5), in a case where "when phase change is performed regularly with CEF #X, phase change may also be performed regularly in the data symbol part of modulated signal #X", the phase change value of CEF #X (0) is a specified value, and thereafter regular phase change is performed. For example, at time 1, "CEF #X and the data symbol" are transmitted, and at time 2, "CEF #X and the data symbol" are transmitted. At this time, the phase change value of "CEF #X (0)" of "CEF #X" transmitted at time 1 is A radians, and "CEF #X (0)" of "CEF #X" transmitted at time 2 is also A radians.

As in Example 6), in a case where "when phase change is performed regularly with CEF #Y, phase change may also be performed regularly in the data symbol part of modulated signal #Y", the phase change value of CEF #Y (0) is a specified value, and thereafter regular phase change is performed. For example, at time 1, "CEF #Y and the data symbol" are transmitted, and at time 2, "CEF #Y and the data symbol" are transmitted. At this time, the phase change value of "CEF #Y (0)" of "CEF #Y" transmitted at time 1 is B radians, and "CEF #Y (0)" of "CEF #Y" transmitted at time 2 is also B radians.

Next, description will be made of the phase change process to be performed by phase changers 205A and 205B when the transmission apparatus has the configuration of FIG. 1 and signal processor 106 of FIG. 1 has the configuration of FIG. 20, 21, or 22. However, the phase change process to be described below may be performed by phase changers 205A and 205B when the transmission apparatus has the configuration of FIG. 17. The phase change process may be performed by phase changers 2801A and 2801B when signal processor 106 has the configuration of FIG. 31, 32, or 33.

The phase change process to be performed by phase changers 205A and 205B is represented by formula (52), w(i) in formula (52) is represented by formula (137), and y(i) is represented by formula (2).

Phase changers 205A and 205B use the same value as the cycle N of the phase change process. Also, as the cycle N of the phase change process, phase changers 205A and 205B use a value equal to or greater than 3 out of divisors of the number of data block symbols. According to the present exemplary embodiment, since the number of data block symbols is 448, phase changers 205A and 205B perform the phase change process of any one of cycles 4, 7, 8, 14, 16, 28, 32, 56, 64, 112, 224, and 448.

However, the N types of phase change values and the switching order to be used by phase changers 205A and 205B are not limited to this example.

This configuration allows the reception apparatus that receives a modulated signal transmitted from the above-described transmission apparatus to avoid a situation where reception conditions are stationary, in particular in the LOS environment, thereby improving data reception quality.

Note that phase changers 205A and 205B may perform the phase change process on the signals of STF 3501 and/or CEF 3502 of FIGS. 35 and 36. In this case, since the structure of STF 3501 and/or CEF 3502 is as described above, as the phase change cycle, the above-mentioned conditions are important. To satisfy the above conditions, to make the phase change cycle of STF 3501 and the phase change cycle of CEF 3502 common, to make the circuitry common, and to reduce the circuit scale, a divisor of 128 (however, an integer greater than 4) is preferably used. Furthermore, to make the above cycle common with the phase change cycle of the guard section, a divisor of 64 (however, an integer greater than 4) is preferably used.

As described above, when both of phase changers 205A and 205B perform phase change described above, PAPR of the modulated signal transmitted from each antenna can be made approximately the same, and in transmission and reception, the circuit scale for reducing the influence of PAPR can be reduced.

In the above description, the transmission apparatus performs the phase change process of the cycle N with the phase change value represented by formula (137) to generate signal-processed signal 106_A, and performs the phase change process of the cycle N with the phase change value represented by formula (2) to generate signal-processed signal 106_B. Here, a case will be described in which the transmission apparatus uses a value of divisor of the number of symbols in the guard period (equal to or greater than 2) as the value of the cycle N in the phase change process of phase changers 205A and 205B. At this time, to generate signals of STF and/or CEF of each of signal-processed signals 106_A and 106_B, even if the transmission apparatus uses the same sequence (e.g., Golay sequence), the transmission apparatus can make the symbol string corresponding to the Golay sequence of the same section of signal-processed signal 106_A output from signal processor 106 orthogonal to the symbol string corresponding to the Golay sequence of signal-processed signal 106_B. Since this configuration allows the transmission apparatus to cause the signals of STF and/or CEF to be orthogonal to each other without using a plurality of orthogonal sequences or a plurality of complementary code sequences in order to generate the signals of STF and/or CEF, the reception apparatus can estimate distortion such as transmission channel characteristics for each of two transmission signals from the signals of STF and/or CEF.

Note that in the above description according to the present exemplary embodiment, signal processor 106 of FIG. 1 has the configurations of FIGS. 2, 18, 19, 20, 21, 22, 31, 32, and 33. However, since the present exemplary embodiment uses the single carrier scheme and only one symbol is placed in a frequency axis direction, the phase change process by phase changers 209A and 209B may be omitted. In that case, the signal processor in the present exemplary embodiment has a configuration in which phase changers 209A and 209B are eliminated from FIGS. 2, 18, 19, 20, 21, 22, 31, 32, and 33.

However, phase changers 209A and 209B may perform the phase change process different from the phase change process described in the first exemplary embodiment and the like. Also, when the transmission apparatus transmits signals by performing channel bonding using a plurality of channels, the transmission apparatus may perform phase change using phase change values different for each channel.

For the above-described transmission of the modulated signal of the transmission apparatus, the configuration of the reception apparatus serving as a communication partner will be described. The reception apparatus according to the present exemplary embodiment has, for example, the configuration of FIG. 8, receives the signal of the frame structure described so far, and demodulates the data symbol based on the control information transmitted in the control information symbol. Then, for example, channel estimators (805_1, 805_2, 807_1, 807_2) of the reception apparatus extract, for example, STF, CEF, and GI described above from the reception signal, and estimate channel fluctuation of each transmission antenna and each reception antenna (h11(i), h12(i), h21(i), h22(i) in FIG. 9). Signal processor 811 demodulates data symbols using these channel fluctuation values.

Note that STF 3501 and CEF 3502 may be BPSK symbols. According to the present exemplary embodiment, phase change may be performed not on the data symbols but on STF 3501 and/or CEF 3502 and/or GI. In this case, effects described individually can be obtained.

The configurations of the symbols of STF 3501 and CEF 3502 are not limited to the examples of FIGS. 36 and 37. Even with other configurations, when phase change is performed on STF 3501 and CEF 3502, the above-described effect can be obtained.

Note that an example has been described in which the Golay sequence for generating STF in modulated signal #X and the Golay sequence for generating STF in modulated signal #Y are the same. However, even if both are different, it is possible to implement the present exemplary embodiment. Also, an example has been described in which the Golay sequence for generating CEF in modulated signal #X and the Golay sequence for generating CEF in modulated signal #Y are the same. However, even if both are different, it is possible to implement the present exemplary embodiment. Furthermore, an example has been described in which the Golay sequence for generating GI in modulated signal #X and the Golay sequence for generating GI in modulated signal #Y are the same. However, even if both are different, it is possible to implement the present exemplary embodiment.

Ninth Exemplary Embodiment

The present exemplary embodiment will describe one example of a phase changing method for regularly performing phase change in a communication system that performs transmission using a single carrier scheme.

A transmission apparatus according to the present exemplary embodiment has configurations of, for example, FIGS. 1 and 17.

According to the present exemplary embodiment, the transmission apparatus transmits, for example, a signal having a frame structure as illustrated in FIG. 25. FIG. 34 is a diagram illustrating one example of a detailed structure of region 2503 in which a data symbol of FIG. 25 is transmitted. Data region 3400 of FIG. 34 corresponds to region 2503 of FIG. 25 where the data symbol is transmitted. Data region 3400 includes a plurality of data blocks 3402 each having a length of 448 symbols, guard periods 3401 each having 64 symbols and placed before the respective data blocks, and a guard period placed following the last data block.

Here, in the guard period, for example, a 64-symbol signal generated using a complementary code sequence such as a 64-bit Golay sequence is transmitted. Note that using the Golay sequence for generating the guard period signal is merely one example. The transmission apparatus may generate the guard period signal by using any other sequence such as other complementary codes or orthogonal code sequences. Also, a number of bits is not limited to 64 bits.

FIG. 34 illustrates the structure of data region 3400 where a number of data blocks is three. However, the number of data blocks may be any number as long as the number is an integer equal to or greater than 1. A number of guard blocks varies with the number of data blocks. For example, the number of guard blocks is a number obtained by adding 1 to the number of data blocks.

FIG. 35 is a diagram illustrating one example of a detailed structure of preamble 2501 of FIG. 25. In FIG. 35, preamble 3500 corresponds to preamble 2501 of FIG. 25. Preamble 3500 includes short training field (STF) 3501 a reception apparatus can use for signal detection, frequency synchronization, time synchronization, and the like, and channel estimation field (CEF) 3502 that can be used for channel estimation.

In STF 3501, the transmission apparatus repeatedly transmits, for example, a 128-symbol signal generated using the complementary code sequence such as a 128-bit Golay sequence by a predetermined number of times. After that, the transmission apparatus transmits a 128-symbol signal generated using a complementary code sequence such as a 128-bit Golay sequence obtained by inverting signs of + and −.

In CEF 3502, the transmission apparatus transmits, for example, in a predetermined order, a plurality of 128-symbol signals generated using complementary code sequences such as a plurality of Golay sequences each having 128 bits and different from each other, and a complementary code sequence obtained by inverting the signs of + and − of the complementary code sequence.

Note that using the Golay sequence for generating the signals to be transmitted in STF 3501 and CEF 3502 is merely one example. The transmission apparatus may generate the signals by using any sequence such as other complementary codes or orthogonal code sequences. Also, the number of bits is not limited to the value described above.

Next, a phase change process to be performed by the transmission apparatus will be described. Here, first, description will be made of the phase change process to be performed by phase changer 205B when the transmission apparatus has the configuration of FIG. 1 and signal processor 106 of FIG. 1 has any of the configurations of FIGS. 2, 18, and 19.

However, in FIG. 2, phase changer 209B may perform phase change as described in the other exemplary embodiments or may omit phase change. Therefore, phase changer 209B may be eliminated, and baseband signal 208B based on the frame structure may correspond to 210B. Similarly, in FIG. 18, phase changer 209A may perform phase change as described in the other exemplary embodiments or may omit phase change. Therefore, phase changer 209A may be eliminated, and baseband signal 208A based on the frame structure may correspond to 210A. Also, in FIG. 19, phase changers 209A and 209B may perform phase change as described in the other exemplary embodiments or may omit phase change. Therefore, phase changer 209B may be eliminated, and baseband signal 208B based on the frame structure may correspond to 210B. Also, phase changer 209A may be eliminated, and baseband signal 208A based on the frame structure may correspond to 210A.

The phase change process to be described below may be performed by phase changer 205B when signal processor 106 has the configuration of FIG. 20, 21, or 22, or when the transmission apparatus has the configuration of FIG. 17. The phase change process may be performed by phase changer 2801B when signal processor 106 has the configuration of FIG. 31, 32, or 33.

According to the present exemplary embodiment, phase changer 205B performs the phase change process of a cycle N using N types of phase change values periodically in predetermined order. Here, as the cycle N of the phase change process, phase changer 205B uses a value equal to or greater than 3 out of divisors of a number of data block symbols. According to the present exemplary embodiment, since the number of data block symbols is 448, phase changer 205B performs the phase change process of any one of cycles 4, 7, 8, 14, 16, 28, 32, 56, 64, 112, 224, and 448.

Also, as the cycle N of the phase change process, phase changer 205B may use a divisor 2 of the number of data block symbols.

Here, it is assumed that N types of phase change values and the switching order thereof in the phase change process to be performed by phase changer 205B are represented by formula (2). In that case, in a first symbol, the value of phase change to be performed by phase changer 205B is 0, and in second and subsequent symbols, the phase change value is a value obtained by adding 2π/N to the phase change value used in the previous symbol. However, the N types of phase change values and the switching order to be used by phase changer 205B are not limited to this example.

This configuration allows the reception apparatus that receives a modulated signal transmitted from the above-described transmission apparatus to avoid a situation where reception conditions are stationary, in particular in the LOS environment, thereby improving data reception quality.

Note that phase changer 205B may also perform the phase change process on the signal in the guard period. In this case, since the number of symbols in the guard period is 64, phase changer 205B uses any one of 4, 8, 16, and 32, which are values equal to or greater than 3 among divisors of 64, as the phase change cycle. Even if the transmission apparatus performs the phase change process without distinguishing the guard period and the data block, using this phase changing method allows the transmission apparatus to equate the magnitude of phase change to perform among the head symbol of each guard period and the head symbol of each data block. Therefore, without using information about the number of guard periods or data blocks transmitted before, the reception apparatus can determine the phase change value used on a transmission side, by using only information about the number of symbols from the heads of the guard period and the data block. As a result, the demodulation process of the reception apparatus can be facilitated.

Also, when phase changer 205B also performs the phase change process on the signal in the guard period, since the number of symbols in the guard period is 64, phase changer 205B may use 2 out of divisors of 64 as the phase change cycle. Even if the transmission apparatus performs the phase change process without distinguishing the guard period and the data block, using this phase changing method allows the transmission apparatus to equate the magnitude of phase change to perform among the head symbol of each guard period and the head symbol of each data block. Therefore, without using information about the number of guard periods or data blocks transmitted before, the reception apparatus can determine the phase change value used on a transmission side, by using only information about the number of symbols from the heads of the guard period and the data block. As a result, the demodulation process of the reception apparatus can be facilitated.

In the above description, the transmission apparatus generates signal-processed signal 106_A without performing the phase change process, and performs the phase change process of the cycle N with the phase change value represented by formula (2) to generate signal-processed signal 106_B. Here, a case will be described in which the transmission apparatus uses a value of the divisor of the number of symbols in the guard period (equal to or greater than 2) as the value of the cycle N in the phase change process of phase changer 205B. At this time, to generate signals in the guard period of each of signal-processed signals 106_A and 106_B, even if the transmission apparatus uses the same sequence (e.g., Golay sequence), the transmission apparatus can make the symbol string corresponding to the guard period of signal-processed signal 106_A output from signal processor 106 orthogonal to the symbol string corresponding to the guard period of signal-processed signal 106_B. Since this configuration allows the transmission apparatus to cause the signals in the guard period to be orthogonal to each other without using a plurality of orthogonal sequences or a plurality of complementary code sequences in order to generate the signals in the guard period, the reception apparatus can estimate transmission channel characteristics (channel fluctuation) for each of two transmission signals from the signals in the guard period.

Note that the method by which the transmission apparatus changes the phase change value is not limited to the method represented by formula (2). For example, the phase changer may perform the phase change process of the cycle N by periodically using N types of values different by 2π/N in a predetermined appropriate order as the phase change values. In order to generate the signals in the guard period of two signals transmitted simultaneously at the same frequency, this configuration also allows the transmission apparatus to cause the signals in the guard period to be orthogonal to each other without using a plurality of orthogonal sequences or a plurality of complementary code sequences. Therefore, the reception apparatus can estimate transmission channel characteristics (channel fluctuation) for each of the two transmission signals from the signals in the guard period.

Note that in preamble 3500, the transmission apparatus does not perform the phase change process described above, for example, on either of signal-processed signals 106_A and 106_B. The transmission apparatus generates a signal to be used for estimating a transmission channel for MIMO, for example, by using orthogonal sequences orthogonal to each other or a plurality of complementary code sequences. Also, the signal to be used for estimating the transmission channel for MIMO may be transmitted in a region different from CEF 3502 of preamble 3500. For example, after the control symbol, for example, a region may be provided in which a signal to be used for estimating the transmission channel for MIMO generated using the orthogonal sequences orthogonal to each other or the plurality of complementary code sequences is transmitted.

The above information is differently described as follows.

The transmission apparatus transmits modulated signal #X from transmission antenna #1 and modulated signal #Y from transmission antenna #2. At this time, both of modulated signal #X and modulated signal #Y are single carrier signals. Then, the data symbol of modulated signal #X is transmitted together with a guard interval (GI) (named GI #X). Similarly, the data symbol of modulated signal #Y is transmitted together with GI (named GI #Y). The Golay sequence for generating the symbol of GI #X and the Golay sequence for generating the symbol of GI #Y are assumed to be the same (common). This will allow the circuit to be common to the transmission apparatus and the reception apparatus in parts related to the Golay sequence. When the transmission is performed as described above, the reception apparatus serving as a communication partner of the transmission apparatus cannot discriminate between GI #X and GI #Y. That is, it is difficult to demodulate modulated signal #X and modulated signal #Y. Therefore, to facilitate discrimination between GI #X and GI #Y, the reception apparatus performs phase change, for example, with one of GI #X and GI #Y.

Example 1) When phase change is performed regularly with GI #X, phase change is also performed regularly in a data symbol part of modulated signal #X. This will allow the phase changer to be common.

Example 2) When phase change is performed regularly with GI #Y, phase change is also performed regularly in a data symbol part of modulated signal #Y. This will allow the phase changer to be common.

Also, there may be a rule as described below.

It is assumed that the first symbol in time in GI #X is GI #X (0) and the first symbol in time in GI #Y is GI #Y (0).

As in Example 1), when "phase change is performed regularly with GI #X, phase change is also performed regularly in the data symbol part of modulated signal #X", the phase change value of GI #X (0) is a specified value, and thereafter regular phase change is performed. For example, at time 1, "GI #X and the data symbol" are transmitted, and at time 2, "GI #X and the data symbol" are transmitted. At this time, the phase change value of "GI #X (0)" of "GI #X" transmitted at time 1 is A radians, and "GI #X (0)" of "GI #X" transmitted at time 2 is also A radians.

As in Example 2), when "phase change is performed regularly with GI #Y, phase change is also performed regularly in the data symbol part of modulated signal #Y", the phase change value of GI #Y (0) is a specified value, and thereafter regular phase change is performed. For example, at time 1, "GI #Y and the data symbol" are transmitted, and at time 2, "GI #Y and the data symbol" are transmitted. At this time, the phase change value of "GI #Y (0)" of "GI #Y" transmitted at time 1 is B radians, and "GI #Y (0)" of "GI #Y" transmitted at time 2 is also B radians.

Next, description will be made of the phase change process to be performed by phase changers 205A and 205B when the transmission apparatus has the configuration of FIG. 1 and signal processor 106 of FIG. 1 has the configuration of FIG. 20, 21, or 22. However, the phase change process to be described below may be performed by phase changers 205A and 205B when the transmission apparatus has the configuration of FIG. 17. The phase change process may be performed by phase changers 2801A and 2801B when signal processor 106 has the configuration of FIG. 31, 32, or 33.

The phase change process to be performed by phase changers 205A and 205B is represented by formula (52), and w(i) in formula (52) is represented by formula (137) below. Note that y(i) is represented by formula (2).

Phase changers 205A and 205B use the same value as the cycle N of the phase change process. Also, as the cycle N of the phase change process, phase changers 205A and 205B use a value equal to or greater than 3 out of divisors of the number of data block symbols. According to the present exemplary embodiment, since the number of data block symbols is 448, phase changers 205A and 205B perform the phase change process of any one of cycles 4, 7, 8, 14, 16, 28, 32, 56, 64, 112, 224, and 448. Also, phase changers 205A and 205B may perform the phase change process with the cycle of 2.

However, the N types of phase change values and the switching order to be used by phase changers 205A and 205B are not limited to this example.

This configuration allows the reception apparatus that receives a modulated signal transmitted from the above-described transmission apparatus to avoid a situation where reception conditions are stationary, in particular in the LOS environment, thereby improving data reception quality.

Note that phase changers 205A and 205B may also perform the phase change process on the signal in the guard period. In this case, since the number of symbols in the guard period is 64, phase changers 205A and 205B use any one of 4, 8, 16, and 32, which are values equal to or greater than 3 among divisors of 64, as the phase change cycle. Also, since the number of symbols in the guard period is 64, phase changers 205A and 205B may use 2, which is a divisor of 64, as the phase change cycle. Even if the transmission apparatus performs the phase change process without distinguishing the guard period from the data block, using this phase changing method allows the transmission apparatus to make the value of phase change performed on a head symbol of each guard period identical to the value of phase change performed on a head symbol of each data block. Therefore, without using information about the number of guard periods or data blocks transmitted before, the reception apparatus can determine the phase change value used on a transmission side, by using only information about the number of symbols from the heads of the guard period and the data block. As a result, the demodulation process of the reception apparatus can be facilitated.

In the above description, the transmission apparatus performs the phase change process of the cycle N with the phase change value represented by formula (137) to generate signal-processed signal 106_A, and performs the phase change process of the cycle N with the phase change value represented by formula (2) to generate signal-processed signal 106_B. Here, a case will be described in which the transmission apparatus uses a value of divisor of the number of symbols in the guard period (equal to or greater than 2) as the value of the cycle N in the phase change process of phase changers 205A and 205B. At this time, to generate signals in the guard period of each of signal-processed signals 106_A and 106_B, even if the transmission apparatus uses the same sequence (e.g., Golay sequence), the transmission apparatus can make the symbol string corresponding to the guard period of signal-processed signal 106_A output from signal processor 106 orthogonal to the symbol string corresponding to the guard period of signal-processed signal 106_B. Since this configuration allows the transmission apparatus to cause the signals in the guard period to be orthogonal to each other without using a plurality of orthogonal sequences or a plurality of complementary code sequences in order to generate the signals in the guard period, the reception apparatus can estimate the transmission channel characteristics for each of the two transmission signals from the signals in the guard period.

Note that in the above description according to the present exemplary embodiment, signal processor 106 of FIG. 1 has the configurations of FIGS. 2, 18, 19, 20, 21, 22, 31, 32, and 33. However, since the present exemplary embodiment uses the single carrier scheme and only one symbol is placed in a frequency axis direction, the phase change process by phase changers 209A and 209B may be omitted. In that case, the signal processor in the present exemplary embodiment has a configuration in which phase changers 209A and 209B are eliminated from FIGS. 2, 18, 19, 20, 21, 22, 31, 32, and 33.

However, phase changers 209A and 209B may perform the phase change process different from the phase change process described in the first exemplary embodiment and the like. Also, when the transmission apparatus transmits signals by performing channel bonding using a plurality of channels, the transmission apparatus may perform phase change using phase change values different for each channel.

Note that the present exemplary embodiment has described a case where the transmission apparatus transmits the 448-symbol data block and the 64-symbol signal of the guard period in the data region. However, the number of symbols in the data block and the guard period may be different values.

As one example where different values are used as the number of symbols in the data block and the guard period, a case will be described where the sum of the number of symbols in the data block and the number of symbols in the guard period is not a multiple of the cycle N of the phase change process. At this time, when the phase change process of the cycle N is continuously applied over the entire data region or a predetermined data unit transmitted in the data region (when the phase change process is performed without performing initialization of the phase change value in the entire data region or in the predetermined data unit transmitted in the data region), the phase change value in the head symbol of the head guard period of the data region is not equal to the phase change value in the head symbol of the next guard period.

The transmission apparatus may perform any phase change process, such as, for example, (1) periodically change the phase change value over the entire data region or a predetermined data unit transmitted in the data region (not perform initialization of the phase change value in the entire data region or in the predetermined data unit transmitted in the data region), (2) initialize the phase change value at the head of the guard period such that the phase change value applied to the head symbol of the guard period is always constant.

Also, when a plurality of schemes having different phase change value initialization conditions including the schemes (1) and (2) described above are switched and used, the transmission apparatus may transmit information indicating the phase change value initialization condition to use as the control symbol. At this time, the reception apparatus demodulates the data symbol based on the information indicating the initialization condition included in the received control information. Specifically, the reception apparatus determines the magnitude of the phase change used in each data symbol and demodulates the data symbol by using the information indicating the initialization condition and other information such as information indicating the phase change pattern if necessary included in the control information.

Next, as another example of the modulation scheme to be used by mapper 104 in FIG. 1 or mappers 006A and 006B in FIG. 17, a mapping scheme involving phase rotation (or phase change) will be described by which one signal point is selected according to an input bit value from a constellation in which the phase has been changed by a predetermined phase change amount for each symbol.

As one example of the mapping scheme involving phase rotation to be performed by the mapper, π/2 (shift)-BPSK will be described. When π/2 (shift)-BPSK is used, the mapper generates one mapped signal (baseband signal) for each bit from the input bit string. Mapped signal (baseband signal) $s_k$ that is k-th generated when π/2 (shift)-BPSK is used is represented by formula X1 below. $c_k$ is a value of the k-th bit of the input bit string and has a value of 0 or 1 (refer to formulas (138) and (139)).

Note that $s'_k$ is identical to one example of the mapped signal (baseband signal) generated by BPSK without involving phase rotation (or phase change). When π/2 (shift)-BPSK is used, the cycle of phase rotation (or phase change) is 4 because the phase of the constellation rotates (changes) by π/2 for each symbol.

As another example of the mapping scheme involving phase rotation to be performed by the mapper, π/2 (shift)-QPSK will be described. When π/2 (shift)-QPSK is used, the mapper generates one mapped signal (baseband signal) for each two bits from the input bit string. Mapped signal (baseband signal) $s_k$ that is k-th generated when π/2 (shift)-QPSK is used is represented by formula X2 below. $c_k$ is a value of the k-th bit of the input bit string and has a value of 0 or 1 (refer to formulas (140) and (141)).

Note that $s'_k$ is identical to one example of the mapped signal (baseband signal) generated by QPSK without involving phase rotation (or phase change). When π/2 (shift)-QPSK is used, the cycle of phase rotation (or phase change) is 4 because the phase of the constellation rotates (changes) by π/2 for each symbol.

π/2 (shift)-BPSK and π/2 (shift)-QPSK have been described by way of example as the mapping scheme involving phase rotation (or phase change), but other mapping schemes may be used. For example, as the constellation to undergo phase rotation (or phase change), the mapper can use constellations such as amplitude phase shift keying (APSK) (e.g., 16APSK, 64APSK, 128APSK, 256APSK, 1024APSK, 4096APSK, and the like), pulse amplitude modulation (PAM) (e.g., 4PAM, 8PAM, 16PAM, 64PAM, 128PAM, 256PAM, 1024PAM, 4096PAM, and the like), phase shift keying (PSK) (e.g., BPSK, QPSK, 8PSK, 16PSK, 64PSK, 128PSK, 256PSK, 1024PSK, 4096PSK, and the like), and quadrature amplitude modulation (QAM) (e.g., 4QAM, 8QAM, 16QAM, 64QAM, 128QAM, 256QAM, 1024QAM, 4096QAM, and the like). Also, as each mapping scheme described above, the mapper may perform mapping using any one of a uniform mapping constellation and a non-uniform mapping constellation. Also, as the cycle of phase rotation (or phase change), the mapper may use not only 4 used for π/2 (shift)-BPSK or π/2 (shift)-QPSK, but also any integer equal to or greater than 2, such as 8 and 16.

Next, the configuration of the reception apparatus according to the present exemplary embodiment will be described. The reception apparatus according to the present exemplary embodiment has, for example, the configuration of FIG. 8, receives the signal of the frame structure described so far, and demodulates the data symbol based on the control information transmitted in the control information symbol.

Meanwhile, for generating a GI symbol, mapping is performed on the Golay sequence to generate the symbol. At this time, examples of preferred modulation schemes for generating the GI symbol include π/2 (shift)-BPSK (π/2 shift BPSK) and BPSK described above. However, the modulation scheme is not limited to these schemes, and the above-described modulation scheme may be used.

Note that although performing phase change on GI has been described above, phase change may also be performed on short training field (STF) 3501 and channel estimation field (CEF) 3502 that can be used for channel estimation described in FIG. 35. This point will be described below.

In the following case, phase change is also performed on STF 3501 and/or CEF 3502 described in FIG. 35. FIG. 36 illustrates one example of the structure of STF 3501 and CEF 3502.

STF 3501 includes 5120 bits, and includes a first Golay sequence including 128 bits (described as Ga 128 in FIG. 36), and a second Golay sequence including 128 bits (described as Gb 128 in FIG. 36). Note that, for example, π/2 (shift)-BPSK (π/2 shift BPSK) is performed on the first Golay sequence (Ga 128) to generate 128 symbols, and, for example, π/2 (shift)-BPSK (π/2 shift BPSK) is performed on the second Golay sequence (Gb 128) to generate 128 symbols. Note that, for example, for sequence Ga 4={1, 1, 1, 1}, −Ga 4={−1, −1, −1, −1}. Therefore, STF 3501 is a 5120-symbol π/2 (shift)-BPSK (π/2 shift BPSK) symbol.

CEF 3502 includes 1152 bits, and includes a fourth Golay sequence including 512 bits (described as GU 512 in FIG. 36), a fifth Golay sequence including 512 bits (described as GV 512 in FIG. 36), and a sixth Golay sequence including 128 bits (described as GV 128 in FIG. 36). Note that, for example, π/2 (shift)-BPSK (π/2 shift BPSK) is performed on the fourth Golay sequence (GU 512) to generate 512 symbols, for example, π/2 (shift)-BPSK (π/2 shift BPSK) is performed on the fifth Golay sequence (GV 512) to generate 512 symbols, and for example, π/2 (shift)-BPSK (π/2 shift BPSK) is performed on the sixth Golay sequence (GV 128) to generate 128 symbols. Note that CEF 3502 is a 1152-symbol π/2 (shift)-BPSK (π/2 shift BPSK) symbol.

Phase changer 205B may also perform the phase change process on STF 3501 and/or CEF 3502.

Since STF 3501 is formed by bundling a plurality of 128-bit Golay sequences (128 symbols), phase changer 205A (phase changer 205B) uses an integer larger than 4 out of divisors of 128, for example, one of 8, 16, 32, 64, 128 as the phase change cycle. (To obtain an effect of reducing peak-to-average power ratio (PAPR) by using π/2 shift BPSK, the cycle needs be an integer larger than 4.) Also, phase changer 205A (phase changer 205B) may use 2, which is a divisor of 128, as the phase change cycle.

Note that as described above, in order for the transmission apparatus to perform the phase change process without distinguishing among the guard period, the data block, and STF 3501, 8, 16, and 32 are preferred values as the phase change cycle. Also, 2 is a preferred value as the phase change cycle. Even if the transmission apparatus performs the phase change process without distinguishing the guard period, the data block, and STF 3501, this will allow the transmission apparatus to equate the magnitude of phase change to perform among the head symbol of each guard period, the head symbol of the data block, and the head symbol of STF 3501. Therefore, without using information about the number of guard periods or data blocks transmitted before, the reception apparatus can determine the phase change value used on a transmission side, by using only information about the number of symbols from the heads of the guard period and the data block. As a result, the demodulation process of the reception apparatus can be facilitated.

Since CEF 3502 is formed by bundling the 128-bit Golay sequence (128 symbols) and the 512-bit Golay sequence (512 symbols), phase changer 205A (phase changer 205B) uses an integer larger than 4 out of common divisors of 512 and 128, for example, one of 8, 16, 32, 64, and 128 as the phase change cycle. Also, 2, which is a common divisor of 512 and 128, may be used as the phase change cycle. However, 512-bit Golay sequence (512 symbols) can also be constructed by combining four sets of 128 symbols corresponding to the 128-bit Golay sequence. At this time, phase changer 205A (phase changer 205B) uses an integer larger than 4 out of divisors of 128, for example, one of 8, 16, 32, 64, and 128 as the phase change cycle. Also, phase changer 205A (phase changer 205B) may use 2, which is a divisor of 128, as the phase change cycle. Note that to obtain an effect of reducing peak-to-average power ratio (PAPR) by using π/2 shift BPSK, the cycle needs be an integer larger than 4.

Note that as described above, in order for the transmission apparatus to perform the phase change process without distinguishing among the guard period, the data block, STF 3501, and CEF 3502, 8, 16, and 32 are preferred values as the phase change cycle. Also, 2 is a preferred value as the phase change cycle. Even if the transmission apparatus performs the phase change process without distinguishing the guard period, the data block, STF 3501, and CEF 3502, this will allow the transmission apparatus to equate the magnitude of phase change to perform among the head symbol of each guard period, the head symbol of each data block, and the head symbol of STF 3501. Therefore, without using information about the number of guard periods or data blocks transmitted before, the reception apparatus can determine the phase change value used on a transmission side, by using only information about the number of symbols from the heads of the guard period and the data block. As a result, the demodulation process of the reception apparatus can be facilitated.

FIG. 37 illustrates an example of the structure of STF 3501 and CEF 3502 different from FIG. 36.

STF 3501 includes 2176 bits, and includes the first Golay sequence including 128 bits (described as Ga 128 in FIG. 37). Note that, for example, π/2 (shift)-BPSK (π/2 shift BPSK) is performed on the first Golay sequence (Ga 128) to generate 128 symbols. Note that, for example, for sequence Ga 4={1, 1, 1, 1}, −Ga 4={−1, −1, −1, −1}. Therefore, STF 3501 is a 5120-symbol π/2 (shift)-BPSK (π/2 shift BPSK) symbol.

The structure of CEF 3502 is as described with reference to FIG. 36.

Phase changer 205B may also perform the phase change process on STF 3501 and/or CEF 3502.

Since STF 3501 is formed by bundling a plurality of 128-bit Golay sequences (128 symbols), phase changer 205A (phase changer 205B) uses an integer larger than 4 out of divisors of 128, for example, one of 8, 16, 32, 64, 128 as the phase change cycle. Also, phase changer 205A (phase changer 205B) may use 2, which is a divisor of 128, as the phase change cycle. To obtain an effect of reducing a peak-to-average power ratio (PAPR) by using π/2 shift BPSK, the cycle needs be an integer larger than 4.

Note that as described above, in order for the transmission apparatus to perform the phase change process without distinguishing among the guard period, the data block, and STF 3501, 8, 16, and 32 are preferred values as the phase change cycle. In order for the transmission apparatus to perform the phase change process without distinguishing among the guard period, the data block, and STF 3501, the phase change cycle may be 2. Even if the transmission apparatus performs the phase change process without distinguishing the guard period, the data block, and STF 3501, this will allow the transmission apparatus to equate the magnitude of phase change to perform among the head symbol of each guard period, the head symbol of the data block, and the head symbol of STF 3501. Therefore, without using information about the number of guard periods or data blocks transmitted before, the reception apparatus can determine the phase change value used on a transmission side, by using only information about the number of symbols from the heads of the guard period and the data block. As a result, the demodulation process of the reception apparatus can be facilitated.

Since CEF 3502 is formed by bundling the 128-bit Golay sequence (128 symbols) and the 512-bit Golay sequence (512 symbols), phase changer 205A (phase changer 205B) uses an integer larger than 4 out of common divisors of 512 and 128, for example, one of 8, 16, 32, 64, and 128 as the phase change cycle. The phase change cycle may be 2. However, 512-bit Golay sequence (512 symbols) can also be constructed by combining four sets of 128 symbols corresponding to the 128-bit Golay sequence. At this time, phase changer 205A (phase changer 205B) uses an integer larger than 4 out of divisors of 128, for example, one of 8, 16, 32, 64, and 128 as the phase change cycle. Also, as the phase change cycle, 2, which is a divisor of 128, may be used. Note that to obtain an effect of reducing the peak-to-average power ratio (PAPR) by using π/2 shift BPSK, the cycle needs be an integer larger than 4.

Note that as described above, in order for the transmission apparatus to perform the phase change process without distinguishing among the guard period, the data block, STF 3501, and CEF 3502, 8, 16, and 32 are preferred values as the phase change cycle. Also, in order for the transmission apparatus to perform the phase change process without distinguishing among the guard period, the data block, STF 3501, and CEF 3502, 2 is also a preferred value as the phase change cycle. Even if the transmission apparatus performs the phase change process without distinguishing the guard period, the data block, STF 3501, and CEF 3502, this will allow the transmission apparatus to equate the magnitude of phase change to perform among the head symbol of each guard period, the head symbol of each data block, and the head symbol of STF 3501. Therefore, without using information about the number of guard periods or data blocks transmitted before, the reception apparatus can determine the phase change value used on a transmission side, by using only information about the number of symbols from the heads of the guard period and the data block. As a result, the demodulation process of the reception apparatus can be facilitated.

In the above description, the transmission apparatus generates signal-processed signal 106_A without performing the phase change process, and performs the phase change process of the cycle N with the phase change value represented by formula (2) to generate signal-processed signal 106_B. Here, a case will be described in which the transmission apparatus uses a value of divisor of 128 symbols (equal to or greater than 2) corresponding to 128-bit Golay sequence constituting STF as the value of the cycle N in the phase change process of phase changer 205B. At this time, to generate signals of STF 3501 of each of signal-processed signals 106_A and 106_B, even if the transmission apparatus uses the same sequence (e.g., Golay sequence), the transmission apparatus can make the 128-symbol symbol string corresponding to the Golay sequence of signal-processed signal 106_A output from signal processor 106 orthogonal to the 128-symbol symbol string corresponding to the Golay sequence of signal-processed signal 106_B.

Since this configuration allows the transmission apparatus to cause the signals in the Golay sequence sections to be orthogonal to each other without using a plurality of orthogonal sequences or a plurality of complementary code sequences in order to generate the signal of STF 3501, the reception apparatus can estimate transmission channel characteristics (channel fluctuation) and the like (distortion component) for each of two transmission signals from the signal of each Golay sequence section.

Note that the method by which the transmission apparatus changes the phase change value is not limited to the method represented by formula (2). For example, the phase changer may perform the phase change process of the cycle N by periodically using N types of values different by 2n/N in a predetermined appropriate order as the phase change values. Since this configuration also allows the transmission apparatus to cause the signals in the Golay sequence sections to be orthogonal to each other without using a plurality of orthogonal sequences or a plurality of complementary code sequences in order to generate the STF 3501 signals of two signals transmitted simultaneously at the same frequency, the reception apparatus can estimate transmission channel characteristics (channel fluctuation) and the like (distortion component) of each of the two transmission signals from the signal of each Golay sequence section.

In the above description, the transmission apparatus generates signal-processed signal 106_A without performing the phase change process, and performs the phase change process of the cycle N with the phase change value represented by formula (2) to generate signal-processed signal 106_B. Here, a case will be described in which the transmission apparatus uses a value of a common divisor of 128 and 512 (equal to or greater than 2) as the value of the cycle N in the phase change process of phase changer 205B because CEF includes 128 symbols corresponding to 128-bit Golay sequence and 512 symbols corresponding to 512-bit Golay sequence. However, 512 symbols corresponding to the 512-bit Golay sequence can also be formed by combining four sets of 128 symbols corresponding to the 128-bit Golay sequence. At this time, a divisor of 128 (equal to or greater than 2) is used as the value of the cycle N. At this time, to generate signals of CEF 3502 of each of signal-processed signals 106_A and 106_B, even if the transmission apparatus uses the same sequence (e.g., Golay sequence), the transmission apparatus can make 512-symbol or 128-symbol symbol string corresponding to the Golay sequence of signal-processed signal 106_A output from signal processor 106 orthogonal to 512-symbol or 128-symbol symbol string corresponding to the Golay sequence of signal-processed signal 106_B.

Since this configuration allows the transmission apparatus to cause the signals in the Golay sequence sections to be orthogonal to each other without using a plurality of orthogonal sequences or a plurality of complementary code sequences in order to generate the signal of CEF 3502, the reception apparatus can estimate transmission channel characteristics (channel fluctuation) and the like (distortion component) for each of two transmission signals from the signal of each Golay sequence section.

Note that the method by which the transmission apparatus changes the phase change value is not limited to the method represented by formula (2). For example, the phase changer may perform the phase change process of the cycle N by periodically using N types of values different by 2n/N in a predetermined appropriate order as the phase change values. Since this configuration also allows the transmission apparatus to cause the signals in the Golay sequence sections to be orthogonal to each other without using a plurality of orthogonal sequences or a plurality of complementary code sequences in order to generate the signals of CEF 3502 of two signals transmitted simultaneously at the same frequency, the reception apparatus can estimate transmission channel characteristics (channel fluctuation) and the like (distortion component) of each of the two transmission signals from the signal of each Golay sequence section.

The above information is differently described as follows.

The transmission apparatus transmits modulated signal #X from transmission antenna #1 and modulated signal #Y from transmission antenna #2. At this time, both of modulated signal #X and modulated signal #Y are single carrier signals. Then, the transmission apparatus transmits STF of modulated signal #X (named STF #X). Similarly, the transmission apparatus transmits STF of modulated signal #Y (named STF #Y). The Golay sequence for generating the symbol of STF #X and the Golay sequence for generating the symbol of STF #Y are assumed to be the same (common). This will allow the circuit to be common to the transmission apparatus and the reception apparatus in parts related to the Golay sequence. When the transmission is performed as described above, the reception apparatus serving as a communication partner of the transmission apparatus cannot discriminate between STF #X and STF #Y. That is, it is difficult to demodulate modulated signal #X and modulated signal #Y. Therefore, to facilitate discrimination between STF #X and STF #Y, the reception apparatus performs phase change, for example, with one of STF #X and STF #Y.

Example 3

When phase change is performed regularly with STF #X, phase change may also be performed regularly in a data symbol part of modulated signal #X. This may allow the phase changer to be common.

Example 4

When phase change is performed regularly with STF #Y, phase change may also be performed regularly in a data symbol part of modulated signal #Y. This may allow the phase changer to be common.

Also, there may be a rule as described below.

The first symbol in time in STF #X is STF #X (0) and the first symbol in time in STF #Y is STF #Y (0).

As in Example 3), in a case where "when phase change is performed regularly with STF #X, phase change may also be performed regularly in the data symbol part of modulated signal #X", the phase change value of STF #X (0) is a specified value, and thereafter regular phase change is performed. For example, at time 1, "STF #X and the data symbol" are transmitted, and at time 2, "STF #X and the data symbol" are transmitted. At this time, the phase change value of "STF #X (0)" of "STF #X" transmitted at time 1 is A radians, and "STF #X (0)" of "STF #X" transmitted at time 2 is also A radians.

As in Example 4), in a case where "when phase change is performed regularly with STF #Y, phase change may also be performed regularly in the data symbol part of modulated signal #Y", the phase change value of STF #Y (0) is a specified value, and thereafter regular phase change is performed. For example, at time 1, "STF #Y and the data symbol" are transmitted, and at time 2, "STF #Y and the data symbol" are transmitted. At this time, the phase change value of "STF #Y (0)" of "STF #Y" transmitted at time 1 is B radians, and "STF #Y (0)" of "STF #Y" transmitted at time 2 is also B radians.

The transmission apparatus transmits modulated signal #X from transmission antenna #1 and modulated signal #Y from transmission antenna #2. At this time, both of modulated signal #X and modulated signal #Y are single carrier signals. Then, the transmission apparatus transmits CEF of modulated signal #X (named CEF #X). Similarly, the transmission apparatus transmits CEF of modulated signal #Y (named CEF #Y). The Golay sequence for generating the symbol of CEF #X and the Golay sequence for generating the symbol of CEF #Y are assumed to be the same (common). This will allow the circuit to be common to the transmission apparatus and the reception apparatus in parts related to the Golay sequence.

When the transmission is performed as described above, the reception apparatus serving as a communication partner of the transmission apparatus cannot discriminate between CEF #X and CEF #Y. That is, it is difficult to demodulate modulated signal #X and modulated signal #Y. Therefore, to facilitate discrimination between CEF #X and CEF #Y, the reception apparatus performs phase change, for example, with one of CEF #X and CEF #Y.

Example 5

When phase change is performed regularly with CEF #X, phase change may also be performed regularly in a data symbol part of modulated signal #X. This may allow the phase changer to be common.

Example 6

When phase change is performed regularly with CEF #Y, phase change may also be performed regularly in a data symbol part of modulated signal #Y. This may allow the phase changer to be common.

Also, there may be a rule as described below.

The first symbol in time in CEF #X is CEF #X (0) and the first symbol in time in CEF #Y is CEF #Y (0).

As in Example 5), in a case where "when phase change is performed regularly with CEF #X, phase change may also be performed regularly in the data symbol part of modulated signal #X", the phase change value of CEF #X (0) is a specified value, and thereafter regular phase change is performed. For example, at time 1, "CEF #X and the data symbol" are transmitted, and at time 2, "CEF #X and the data symbol" are transmitted. At this time, the phase change value of "CEF #X (0)" of "CEF #X" transmitted at time 1 is A radians, and "CEF #X (0)" of "CEF #X" transmitted at time 2 is also A radians.

As in Example 6), in a case where "when phase change is performed regularly with CEF #Y, phase change may also be performed regularly in the data symbol part of modulated signal #Y", the phase change value of CEF #Y (0) is a specified value, and thereafter regular phase change is performed. For example, at time 1, "CEF #Y and the data symbol" are transmitted, and at time 2, "CEF #Y and the data symbol" are transmitted. At this time, the phase change value of "CEF #Y (0)" of "CEF #Y" transmitted at time 1 is B radians, and "CEF #Y (0)" of "CEF #Y" transmitted at time 2 is also B radians.

Next, description will be made of the phase change process to be performed by phase changers 205A and 205B when the transmission apparatus has the configuration of FIG. 1 and signal processor 106 of FIG. 1 has the configuration of FIG. 20, 21, or 22. However, the phase change process to be described below may be performed by phase changers 205A and 205B when the transmission apparatus has the configuration of FIG. 17. The phase change process may be performed by phase changers 2801A and 2801B when signal processor 106 has the configuration of FIG. 31, 32, or 33.

The phase change process to be performed by phase changers 205A and 205B is represented by formula (52), w(i) in formula (52) is represented by formula (137), and y(i) is represented by formula (2).

Phase changers 205A and 205B use the same value as the cycle N of the phase change process. Also, as the cycle N of the phase change process, phase changers 205A and 205B use a value equal to or greater than 3 out of divisors of the number of data block symbols. According to the present exemplary embodiment, since the number of data block symbols is 448, phase changers 205A and 205B perform the phase change process of any one of cycles 4, 7, 8, 14, 16, 28, 32, 56, 64, 112, 224, and 448. Also, as the cycle N of the phase change process, phase changers 205A and 205B may use 2, which is a divisor of the number of data block symbols.

However, the N types of phase change values and the switching order to be used by phase changers 205A and 205B are not limited to this example.

This configuration may allow the reception apparatus that receives the modulated signal transmitted from the above-described transmission apparatus to avoid a situation where reception conditions are stationary, in particular in the LOS environment, which may improve data reception quality.

Note that phase changers 205A and 205B may perform the phase change process on the signals of STF 3501 and/or CEF 3502 of FIGS. 35 and 36. In this case, since the structure of STF 3501 and/or CEF 3502 is as described above, as the phase change cycle, the above-mentioned conditions are important. To satisfy the above conditions, to make the phase change cycle of STF 3501 and the phase change cycle of CEF 3502 common, to make the circuitry common, and to reduce the circuit scale, a divisor of 128 (however, an integer greater than 4) (may be equal to or greater than 2) is preferably used. Furthermore, to make the above cycle common with the phase change cycle of the guard section, a divisor of 64 (however, an integer greater than 4) (may be equal to or greater than 2) is preferably used.

As described above, when both of phase changers 205A and 205B perform phase change described above, PAPR of the modulated signal transmitted from each antenna can be made approximately the same, and in transmission and reception, the circuit scale for reducing the influence of PAPR can be reduced.

In the above description, the transmission apparatus performs the phase change process of the cycle N with the phase change value represented by formula (137) to generate signal-processed signal 106_A, and performs the phase change process of the cycle N with the phase change value represented by formula (2) to generate signal-processed signal 106_B. Here, a case will be described in which the transmission apparatus uses a value of divisor of the number of symbols in the guard period (equal to or greater than 2) as the value of the cycle N in the phase change process of phase changers 205A and 205B. At this time, to generate signals of STF and/or CEF of each of signal-processed signals 106_A and 106_B, even if the transmission apparatus uses the same sequence (e.g., Golay sequence), the transmission apparatus can make the symbol string corresponding to the Golay sequence of the same section of signal-processed signal 106_A output from signal processor 106 orthogonal to the symbol string corresponding to the Golay sequence of signal-processed signal 106_B. Since this configuration allows the transmission apparatus to cause the signals of STF and/or CEF to be orthogonal to each other without using a plurality of orthogonal sequences or a plurality of complementary code sequences in order to generate the signals of STF and/or CEF, the reception apparatus can estimate distortion such as transmission channel characteristics for each of two transmission signals from the signals of STF and/or CEF.

Note that in the above description according to the present exemplary embodiment, signal processor 106 of FIG. 1 has the configurations of FIGS. 2, 18, 19, 20, 21, 22, 31, 32, and 33. However, since the present exemplary embodiment uses the single carrier scheme and only one symbol is placed in a frequency axis direction, the phase change process by phase changers 209A and 209B may be omitted. In that case, the signal processor in the present exemplary embodiment has a configuration in which phase changers 209A and 209B are eliminated from FIGS. 2, 18, 19, 20, 21, 22, 31, 32, and 33.

However, phase changers 209A and 209B may perform the phase change process different from the phase change process described in the first exemplary embodiment and the like. Also, when the transmission apparatus transmits signals by performing channel bonding using a plurality of channels, the transmission apparatus may perform phase change using phase change values different for each channel.

For the above-described transmission of the modulated signal of the transmission apparatus, the configuration of the reception apparatus serving as a communication partner will be described. The reception apparatus according to the present exemplary embodiment has, for example, the configuration of FIG. 8, receives the signal of the frame structure described so far, and demodulates the data symbol based on the control information transmitted in the control information symbol. Then, for example, channel estimators (805_1, 805_2, 807_1, 807_2) of the reception apparatus extract, for example, STF, CEF, and GI described above from the reception signal, and estimate channel fluctuation of each transmission antenna and each reception antenna (h11(i), h12(i), h21(i), h22(i) in FIG. 9). Signal processor 811 demodulates data symbols using these channel fluctuation values.

Note that STF 3501 and CEF 3502 may be BPSK symbols. According to the present exemplary embodiment, phase change may be performed not on the data symbols but on STF 3501 and/or CEF 3502 and/or GI. In this case, effects described individually can be obtained.

The configurations of the symbols of STF 3501 and CEF 3502 are not limited to the examples of FIGS. 36 and 37. Even with other configurations, when phase change is performed on STF 3501 and CEF 3502, the above-described effect can be obtained.

Note that an example has been described in which the Golay sequence for generating STF in modulated signal #X and the Golay sequence for generating STF in modulated signal #Y are the same. However, even if both are different, it is possible to implement the present exemplary embodiment. Also, an example has been described in which the Golay sequence for generating CEF in modulated signal #X and the Golay sequence for generating CEF in modulated signal #Y are the same. However, even if both are different, it is possible to implement the present exemplary embodiment. Furthermore, an example has been described in which the Golay sequence for generating GI in modulated signal

X and the Golay sequence for generating GI in modulated signal #Y are the same. However, even if both are different, it is possible to implement the present exemplary embodiment.

Next, advantages when the phase change cycle is set at 2 will be described.

As in the description of the first exemplary embodiment, it is assumed that phase changer 205B of FIGS. 2, 18, and 19 performs phase change. The phase change value in phase changer 205B of symbol number i is y(i). y(i) is represented by the following formula.

[Formula 142]

$$y(i)=e^{j\lambda(i)} \qquad \text{Formula (142)}$$

Consider a case where the phase change cycle is 2 and $\lambda(i)-\lambda(i-1)=\pi$ radians is set.

Figure 38:
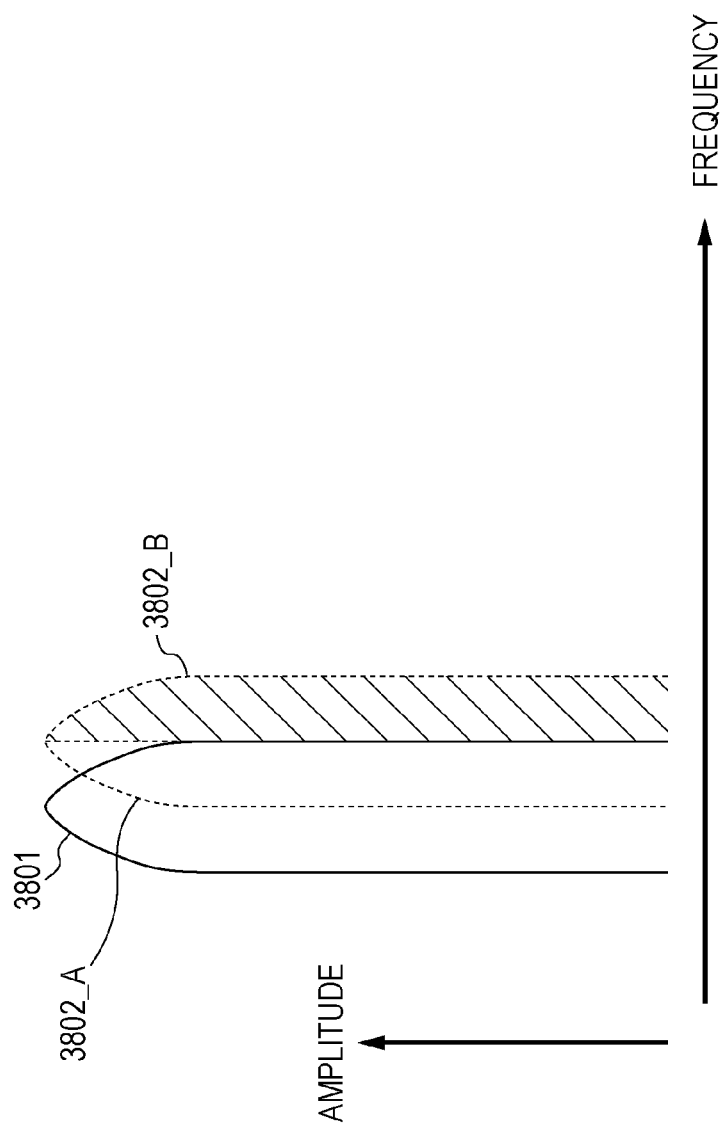
FIG. 38 is a diagram illustrating an exemplary spectrum when phase change is not performed.

FIG. 38 illustrates a spectrum with solid line 3801 of FIG. 38 when phase change is not performed. Note that in FIG. 38, a horizontal axis represents a frequency and a vertical axis represents amplitude.

Figure 39:
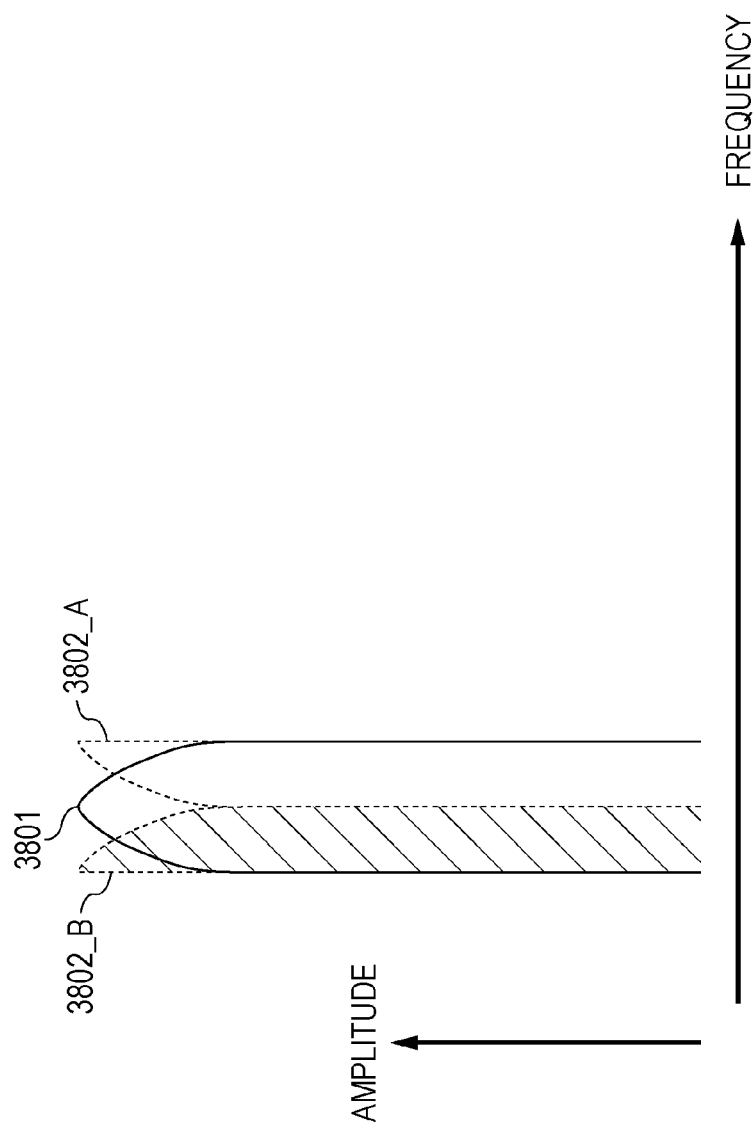
FIG. 39 is a diagram illustrating an exemplary spectrum when phase change is performed.

The spectrum when phase changer 205B of FIG. 2 sets $\lambda(i)-\lambda(i-1)=\pi$ radians and performs phase change will be described. In FIG. 38, the spectrum obtained by shifting spectrum 3801 to the right is the spectrum formed by spectra 3802_A and 3802_B. Consider a spectrum formed by spectra 3802_B and 3802_A as in FIG. 39 by shifting the spectrum of hatched 3802_B to the left. This spectrum is the spectrum when $\lambda(i)-\lambda(i-1)=\pi$ radians is set and phase changer 205B performs phase change.

When transmission is made so as to be in such a situation and the propagation environment of the base station and the terminal serving as a communication partner is a multipath environment, an influence of multipath of transmission signal 108A and an influence of multipath of transmission signal 108B are different from each other, making it more likely that a space diversity effect can be obtained. The effect of space diversity decreases as $\lambda(i)-\lambda(i-1)$ approaches 0.

Therefore, "$\lambda(i)-\lambda(i-1)$ having a value close to $\pi$" is a preferred condition for obtaining the space diversity effect.

Note that supplementary description of the ninth exemplary embodiment will be provided in a tenth exemplary embodiment.

Tenth Exemplary Embodiment

The present exemplary embodiment will describe a configuration of a transmission apparatus for implementing phase change described in the eighth and ninth exemplary embodiments.

FIG. 1 is a diagram illustrating one exemplary configuration of the transmission apparatus according to the present exemplary embodiment. Note that since operations of FIG. 1 have been described in other exemplary embodiments, description thereof will be omitted. However, in the present exemplary embodiment, the transmission apparatus of FIG. 1 transmits a single carrier modulated signal from antenna unit #A (109_A) and antenna unit #B (109_B).

Figure 40:
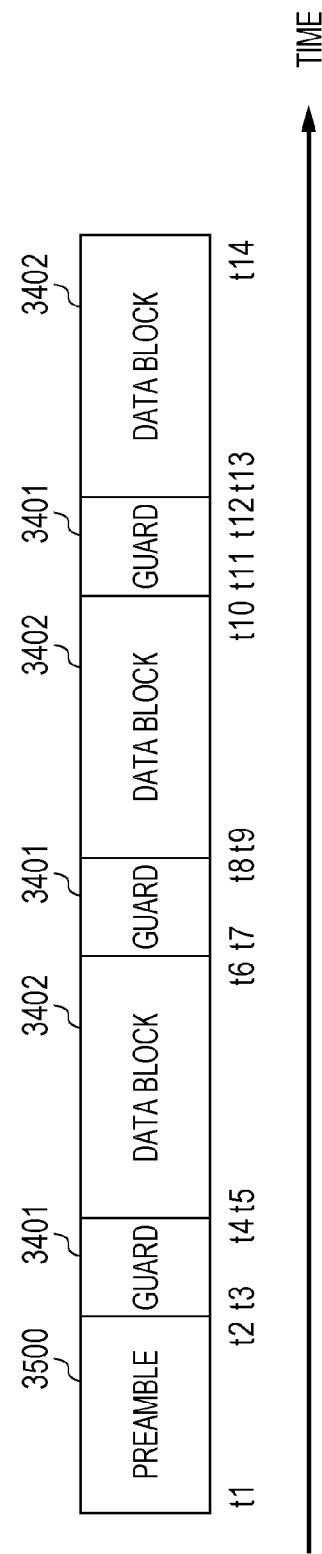
FIG. 40 is a diagram illustrating one exemplary frame structure of the modulated signal of FIG. 1.
Figure 41:
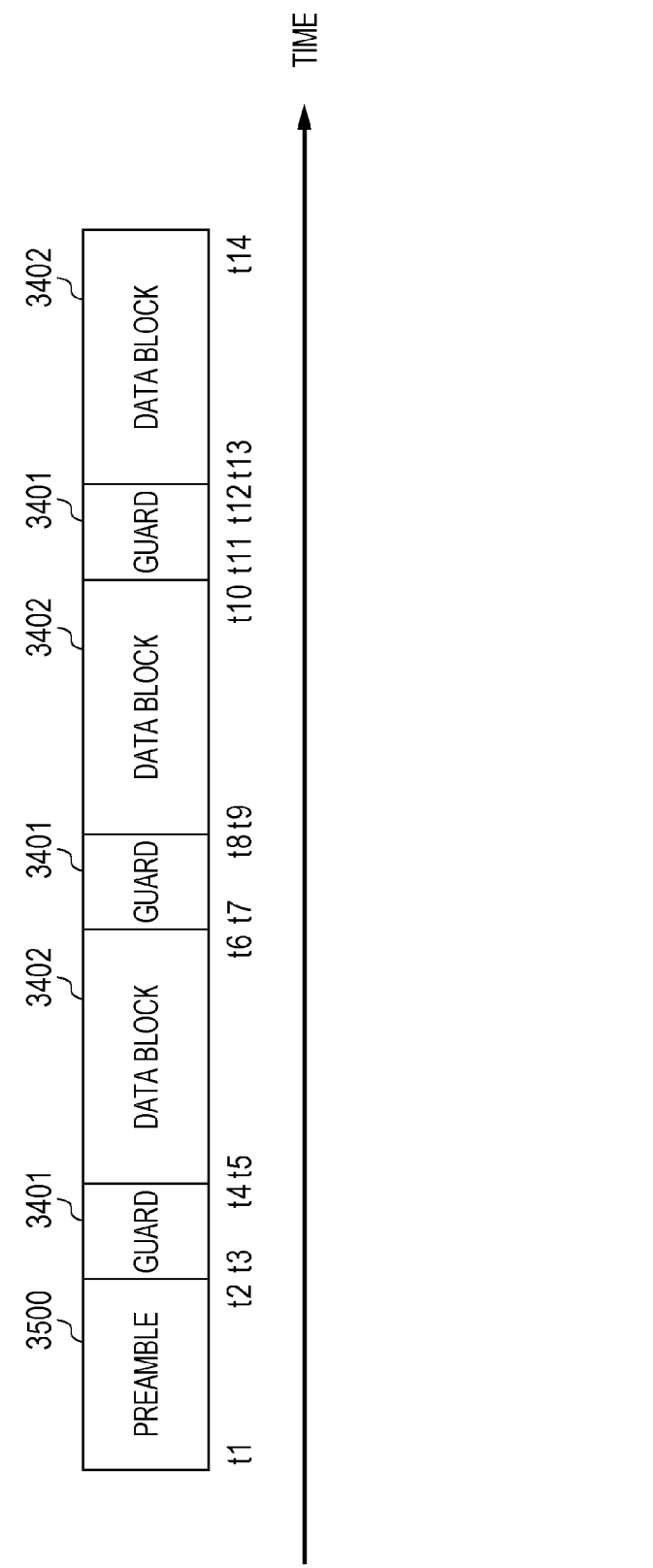
FIG. 41 is a diagram illustrating one exemplary frame structure of the modulated signal of FIG. 1.

FIG. 40 is a diagram illustrating one exemplary frame structure of modulated signal 108_A transmitted by antenna unit #A (109_A) of FIG. 1. FIG. 41 is a diagram illustrating one exemplary frame structure of modulated signal 108_B transmitted by antenna unit #B (109_B) of FIG. 1.

In FIG. 40, parts that operate as in the cases of FIGS. 34 and 35 are denoted with the same reference numerals. Details have been described in the eighth and ninth exemplary embodiments, and thus description thereof will be omitted here.

In FIG. 40, a horizontal axis is time.

From time t1 to time t2, the transmission apparatus transmits preamble 3500.

From time t3 to t4, the transmission apparatus transmits guard 3401 (guard symbol (symbol of GI)).

From time t5 to time t6, the transmission apparatus transmits data block 3402 (data symbol).

From time t7 to time t8, the transmission apparatus transmits guard 3401 (guard symbol (symbol of GI)).

From time t9 to time t10, the transmission apparatus transmits data block 3402 (data symbol).

From time t11 to time t12, the transmission apparatus transmits guard 3401 (guard symbol (symbol of GI)).

From time t13 to time t14, the transmission apparatus transmits data block 3402 (data symbol).

In FIG. 41, parts that operate as in the cases of FIGS. 34 and 35 are denoted with the same reference numerals. Details have been described in the eighth and ninth exemplary embodiments, and thus description thereof will be omitted here.

In FIG. 41, a horizontal axis is time.

From time t1 to time t2, the transmission apparatus transmits preamble 3500.

From time t3 to time t4, the transmission apparatus transmits guard 3401 (guard symbol (symbol of GI)).

From time t5 to time t6, the transmission apparatus transmits data block 3402 (data symbol).

From time t7 to time t8, the transmission apparatus transmits guard 3401 (guard symbol (symbol of GI)).

From time t9 to time t10, the transmission apparatus transmits data block 3402 (data symbol).

From time t11 to time t12, the transmission apparatus transmits guard 3401 (guard symbol (symbol of GI)).

From time t13 to time t14, the transmission apparatus transmits data block 3402 (data symbol).

Note that symbols in the same time section in FIGS. 40 and 41 are transmitted using the same frequency and a plurality of antennas.

Figure 42:
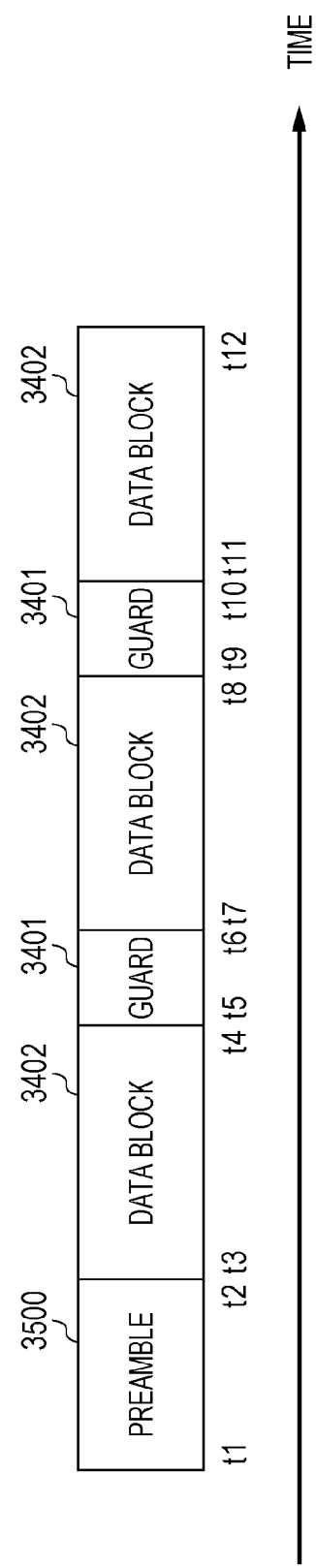
FIG. 42 is a diagram illustrating one exemplary frame structure of the modulated signal of FIG. 1.
Figure 43:
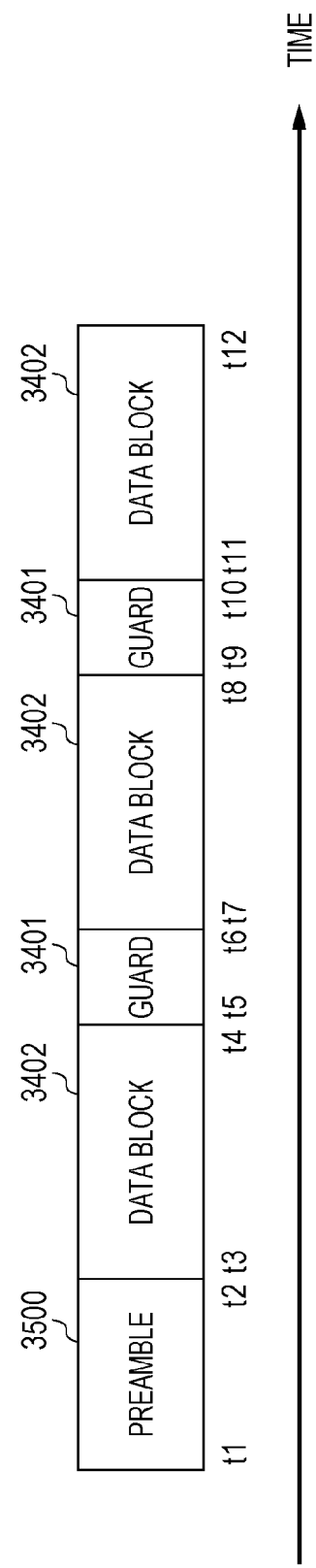
FIG. 43 is a diagram illustrating one exemplary frame structure of the modulated signal of FIG. 1.

FIG. 42 is a diagram illustrating a second example of the frame structure of modulated signal 108_A transmitted by antenna unit #A (109_A) of FIG. 1. FIG. 43 is a diagram illustrating a second example of the frame structure of modulated signal 108_B transmitted by antenna unit #B (109_B) of FIG. 1.

In FIG. 42, parts that operate as in the cases of FIGS. 34 and 35 are denoted with the same reference numerals. Details have been described in the eighth and ninth exemplary embodiments, and thus description thereof will be omitted here.

In FIG. 42, a horizontal axis is time.

From time t1 to time t2, the transmission apparatus transmits preamble 3500.

From time t3 to time t4, the transmission apparatus transmits data block 3402 (data symbol).

From time t5 to time t6, the transmission apparatus transmits guard 3401 (guard symbol (symbol of GI)).

From time t7 to time t8, the transmission apparatus transmits data block 3402 (data symbol).

From time t9 to time t10, the transmission apparatus transmits guard 3401 (guard symbol (symbol of GI)).

From time t11 to time t12, the transmission apparatus transmits data block 3402 (data symbol).

In FIG. 43, parts that operate as in the cases of FIGS. 34 and 35 are denoted with the same reference numerals. Details have been described in the eighth and ninth exemplary embodiments, and thus description thereof will be omitted here.

In FIG. 43, a horizontal axis is time.

From time t1 to time t2, the transmission apparatus transmits preamble 3500.

From time t3 to time t4, the transmission apparatus transmits data block 3402 (data symbol).

From time t5 to time t6, the transmission apparatus transmits guard 3401 (guard symbol (symbol of GI)).

From time t7 to time t8, the transmission apparatus transmits data block 3402 (data symbol).

From time t9 to time t10, the transmission apparatus transmits guard 3401 (guard symbol (symbol of GI)).

From time t11 to time t12, the transmission apparatus transmits data block 3402 (data symbol).

Note that symbols in the same time section in FIGS. 42 and 43 are transmitted using the same frequency and a plurality of antennas.

Although the above description has been made by taking FIGS. 40 to 43 as examples, the frame structure is not limited to these examples. Also, symbols other than symbols illustrated in FIGS. 40 to 43 may be present.

Figure 44:
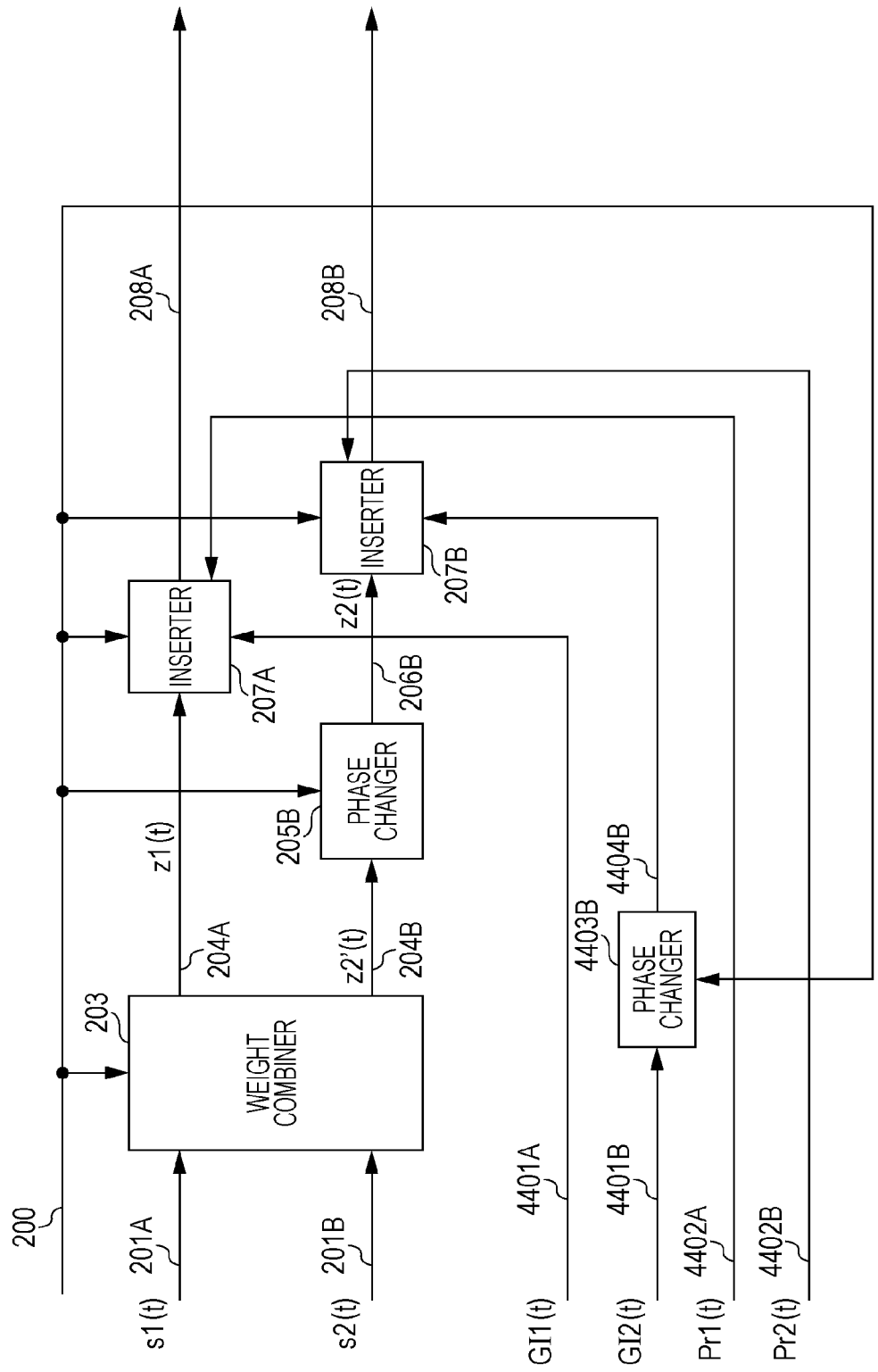
FIG. 44 is a diagram illustrating one exemplary configuration of the signal processor of FIG. 1.

FIG. 44 is a diagram illustrating the configuration of signal processor 106 of the transmission apparatus of FIG. 1. Parts that operate as in the case of FIG. 2 are denoted with the same reference numerals. Details have been described in other exemplary embodiments, and thus description thereof will be omitted. In the following description, the frame structures of FIGS. 40 and 41 are used as examples. At this time, FIG. 40 is a frame structure of baseband signal 208A based on the frame structure (signal-processed signal 106_A of FIG. 1), whereas FIG. 41 is a frame structure of baseband signal 208B based on the frame structure (signal-processed signal 106_B of FIG. 1). Note that the frame structure is not necessarily as shown in FIGS. 40 and 41 but may be as shown in FIGS. 42 and 43.

Mapped signal 201A in FIG. 44 (corresponding to mapped signal 105_1 in FIG. 1) is a signal corresponding to data block 3402 of FIG. 40, whereas mapped signal 201B (corresponding to mapped signal 105_2 in FIG. 1) is a signal corresponding to data block 3402 of FIG. 41.

Therefore, phase changer 205B is a part that performs phase change on data block 3402.

When the symbol number is i and input signal (204B) of phase changer 205B is I(i), output signal (206B) O(i) of phase changer 205B is represented by the following formula.

[Formula 143]

$$O(i) = e^{j\lambda_{D2}(i)} \times I(i) \qquad \text{Formula (143)}$$

Note that I(i) and O(i) can be defined as complex numbers (may be real numbers), whereas $\lambda_{D2}(i)$ is defined as a phase change value and is a real number. j is an imaginary unit. Note that $\lambda_{D2}(i)$ may be defined as 0 radians or more and less than $2\pi$ radians.

Guard symbol (symbol of GI) signal 4401A is a signal corresponding to guard 3401 in FIG. 40.

Guard symbol (symbol of GI) signal 4401B is a signal corresponding to guard 3401 in FIG. 41.

Therefore, phase changer 4403B is a section that performs phase change on guard 3401 in FIG. 41 (guard symbol (symbol of GI)).

Phase changer 4403B receives signal 4401B of the guard symbol (GI symbol) and control signal 200. Based on a signal related to the frame structure included in control signal 200, phase changer 4403B performs phase change on guard symbol (symbol of GI) signal 4401B, and outputs phase-changed guard symbol (symbol of GI) signal 4404B.

When the symbol number is i and input signal (4401B) of phase changer 4403B is I(i), output signal (4404B) O(i) of phase changer 4403B is represented by the following formula.

[Formula 144]

$$O(i) = e^{j\lambda_{G2}(i)} \times I(i) \qquad \text{Formula (144)}$$

Note that I(i) and O(i) can be defined as complex numbers (may be real numbers), whereas $\lambda_{G2}(i)$ is defined as a phase change value and is a real number. j is an imaginary unit. Note that $\lambda_{G2}(i)$ may be defined as 0 radians or more and less than $2\pi$ radians.

From the description of the eighth and ninth exemplary embodiments, it is one important matter that the following formula holds.

[Formula 145]

$$\lambda_{G2}(i) - \lambda_{G2}(i-1) = \lambda_{D2}(i) - \lambda_{D2}(i-1) = K \qquad \text{Formula (145)}$$

However, K is not 0 (zero).

As a result, the phase change cycle of data block 3402 of FIG. 41 and the phase change cycle of guard 3401 of FIG. 41 are the same. This point is as described in the eighth and ninth exemplary embodiments.

A relationship between the phase change cycle of data block 3402 of FIG. 41 and the phase change cycle of guard 3401 of FIG. 41 is not limited to this example, but may be as described in the eighth and ninth exemplary embodiments.

Signal 4402A is a preamble signal, which is a signal corresponding to preamble 3500 of FIG. 40. Signal 4402B is a preamble signal, which is a signal corresponding to preamble 3500 of FIG. 41.

Inserter 207A receives precoded signal 204A, guard symbol signal (symbol of GI) 4401A, preamble signal 4402A, and control signal 200. Inserter 207A outputs baseband signal 208A based on the frame structure signal in control signal 200, that is, on the frame structure of FIG. 40.

Inserter 207B receives phase-changed signal 206B, phase-changed guard symbol (symbol of GI) signal 4404B, preamble signal 4402B, and control signal 200. Inserter 207B outputs baseband signal 208B based on the frame structure in control signal 200, that is, on the frame structure of FIG. 41.

Figure 45:
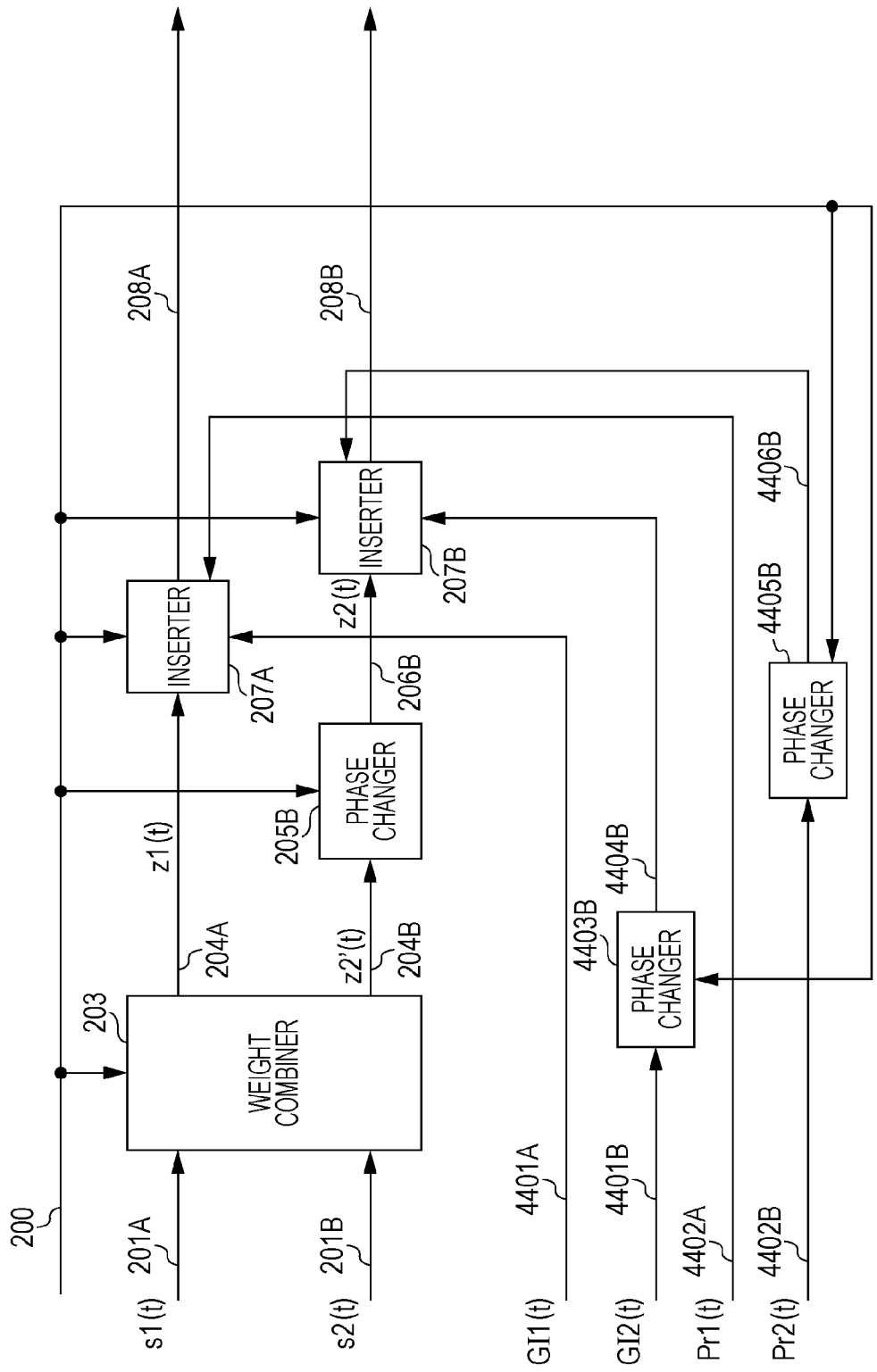
FIG. 45 is a diagram illustrating one exemplary configuration of the signal processor of FIG. 1.

FIG. 45 is a diagram illustrating the configuration of signal processor 106 of the transmission apparatus of FIG. 1, different from FIG. 44. Parts that operate as in the cases of FIGS. 2 and 44 are denoted with the same reference numerals. Detailed description thereof will be omitted.

Again, from the description of the eighth and ninth exemplary embodiments, it is important that formula (145) holds (however, K is not 0 (zero)). As a result, the phase change cycle of data block 3402 of FIG. 41 and the phase change cycle of guard 3401 of FIG. 41 are the same. This point is as described in the eighth and ninth exemplary embodiments.

A relationship between the phase change cycle of data block 3402 of FIG. 41 and the phase change cycle of guard 3401 of FIG. 41 is not limited to this example, but may be as described in the eighth and ninth exemplary embodiments.

Furthermore, in FIG. 45, phase changer 4405B is present. Phase changer 4405B is a section that performs phase change on preamble 3500 in FIG. 41.

Phase changer 4405B receives preamble signal 4402B and control signal 200. Based on the signal related to the frame structure included in control signal 200, phase changer 4405B performs phase change on preamble 4402B and outputs phase-changed preamble signal 4406B. Note that the phase change cycle in the preamble is as described in the eighth and ninth exemplary embodiments.

Inserter 207A receives precoded signal 204A, guard symbol signal (symbol of GI) 4401A, preamble signal 4402A, and control signal 200. Inserter 207A outputs baseband signal 208A based on the frame structure signal in control signal 200, that is, on the frame structure of FIG. 40.

Inserter 207B receives phase-changed signal 206B, phase-changed guard symbol (symbol of GI) signal 4404B, phase-changed preamble signal 4406B, and control signal 200. Inserter 207B outputs baseband signal 208B based on the frame structure in control signal 200, that is, on the frame structure of FIG. 41.

Figure 46:
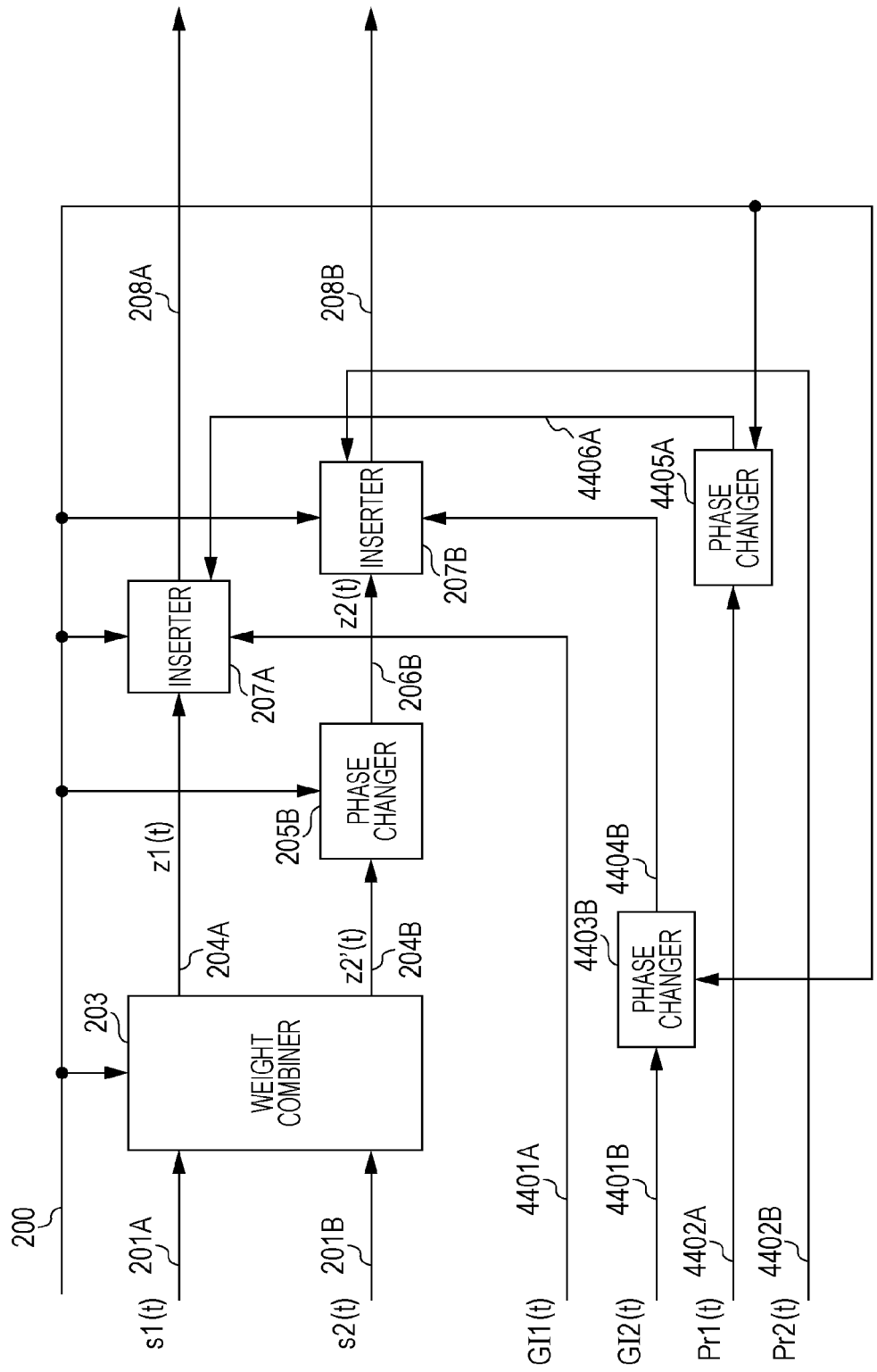
FIG. 46 is a diagram illustrating one exemplary configuration of the signal processor of FIG. 1.

FIG. 46 is a diagram illustrating the configuration of signal processor 106 of the transmission apparatus of FIG. 1, different from FIGS. 44 and 45. Parts that operate as in the cases of FIGS. 2, 44, and 45 are denoted with the same reference numerals. Detailed description thereof will be omitted.

Again, from the description of the eighth and ninth exemplary embodiments, it is important that formula (145) holds (however, K is not 0 (zero)). As a result, the phase change cycle of data block 3402 of FIG. 41 and the phase change cycle of guard 3401 of FIG. 41 are the same. This point is as described in the eighth and ninth exemplary embodiments.

A relationship between the phase change cycle of data block 3402 of FIG. 41 and the phase change cycle of guard 3401 of FIG. 41 is not limited to this example, but may be as described in the eighth and ninth exemplary embodiments.

Furthermore, in FIG. 46, phase changer 4405A is present. Phase changer 4405A is a section that performs phase change on preamble 3500 in FIG. 40.

Phase changer 4405A receives preamble signal 4402A and control signal 200. Based on the signal related to the frame structure included in control signal 200, phase changer 4405A performs phase change on preamble 4402A and outputs phase-changed preamble signal 4406A. Note that the phase change cycle in the preamble is as described in the eighth and ninth exemplary embodiments.

Inserter 207A receives precoded signal 204A, guard symbol signal (symbol of GI) 4401A, phase-changed preamble signal 4406A, and control signal 200. Inserter 207A outputs baseband signal 208A based on the frame structure signal in control signal 200, that is, on the frame structure of FIG. 40.

Inserter 207B receives phase-changed signal 206B, phase-changed guard symbol (symbol of GI) signal 4404B, preamble signal 4402B, and control signal 200. Inserter 207B outputs baseband signal 208B based on the frame structure in control signal 200, that is, on the frame structure of FIG. 41.

Figure 47:
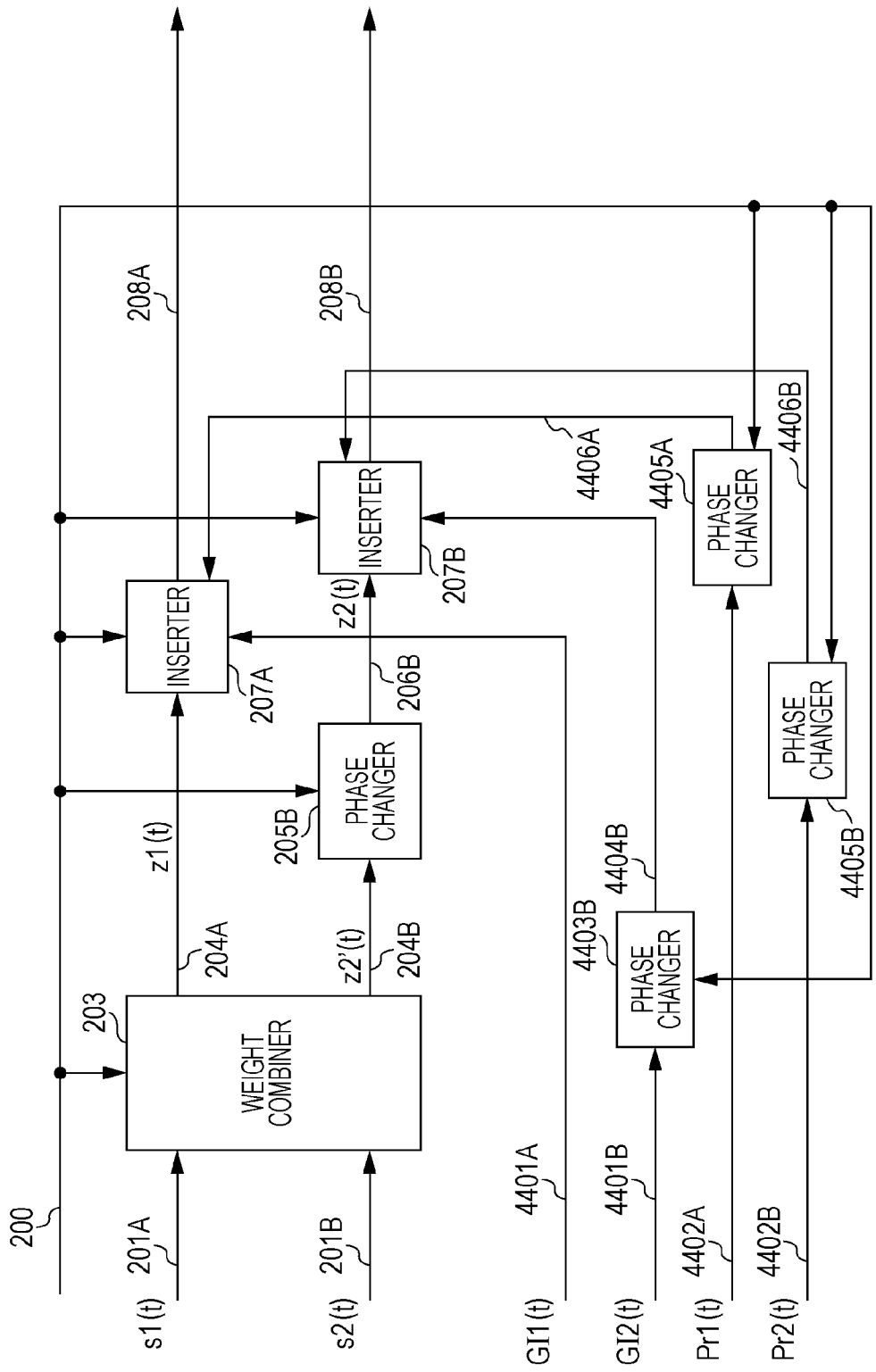
FIG. 47 is a diagram illustrating one exemplary configuration of the signal processor of FIG. 1.

FIG. 47 is a diagram illustrating the configuration of signal processor 106 of the transmission apparatus of FIG. 1, different from FIGS. 44 to 46. Parts that operate as in the cases of FIGS. 2 and 44 to 46 are denoted with the same reference numerals. Detailed description thereof will be omitted.

Again, from the description of the eighth and ninth exemplary embodiments, it is important that formula (145) holds (however, K is not 0 (zero)). As a result, the phase change cycle of data block 3402 of FIG. 41 and the phase change cycle of guard 3401 of FIG. 41 are the same. This point is as described in the eighth and ninth exemplary embodiments.

A relationship between the phase change cycle of data block 3402 of FIG. 41 and the phase change cycle of guard 3401 of FIG. 41 is not limited to this example, but may be as described in the eighth and ninth exemplary embodiments.

Furthermore, in FIG. 47, phase changer 4405A is present. Phase changer 4405A is a section that performs phase change on preamble 3500 in FIG. 40.

Phase changer 4405A receives preamble signal 4402A and control signal 200. Based on the signal related to the frame structure included in control signal 200, phase changer 4405A performs phase change on preamble 4402A and outputs phase-changed preamble signal 4406A. Note that the phase change cycle in the preamble is as described in the eighth and ninth exemplary embodiments.

Furthermore, in FIG. 47, phase changer 4405B is present. Phase changer 4405B is a section that performs phase change on preamble 3500 in FIG. 41.

Phase changer 4405B receives preamble signal 4402B and control signal 200. Based on the signal related to the frame structure included in control signal 200, phase changer 4405B performs phase change on preamble 4402B and outputs phase-changed preamble signal 4406B. Note that the phase change cycle in the preamble is as described in the eighth and ninth exemplary embodiments.

Inserter 207A receives precoded signal 204A, guard symbol signal (symbol of GI) 4401A, phase-changed preamble signal 4406A, and control signal 200. Inserter 207A outputs baseband signal 208A based on the frame structure signal in control signal 200, that is, on the frame structure of FIG. 40.

Inserter 207B receives phase-changed signal 206B, phase-changed guard symbol (symbol of GI) signal 4404B, phase-changed preamble signal 4406B, and control signal 200. Inserter 207B outputs baseband signal 208B based on the frame structure in control signal 200, that is, on the frame structure of FIG. 41.

Figure 48:
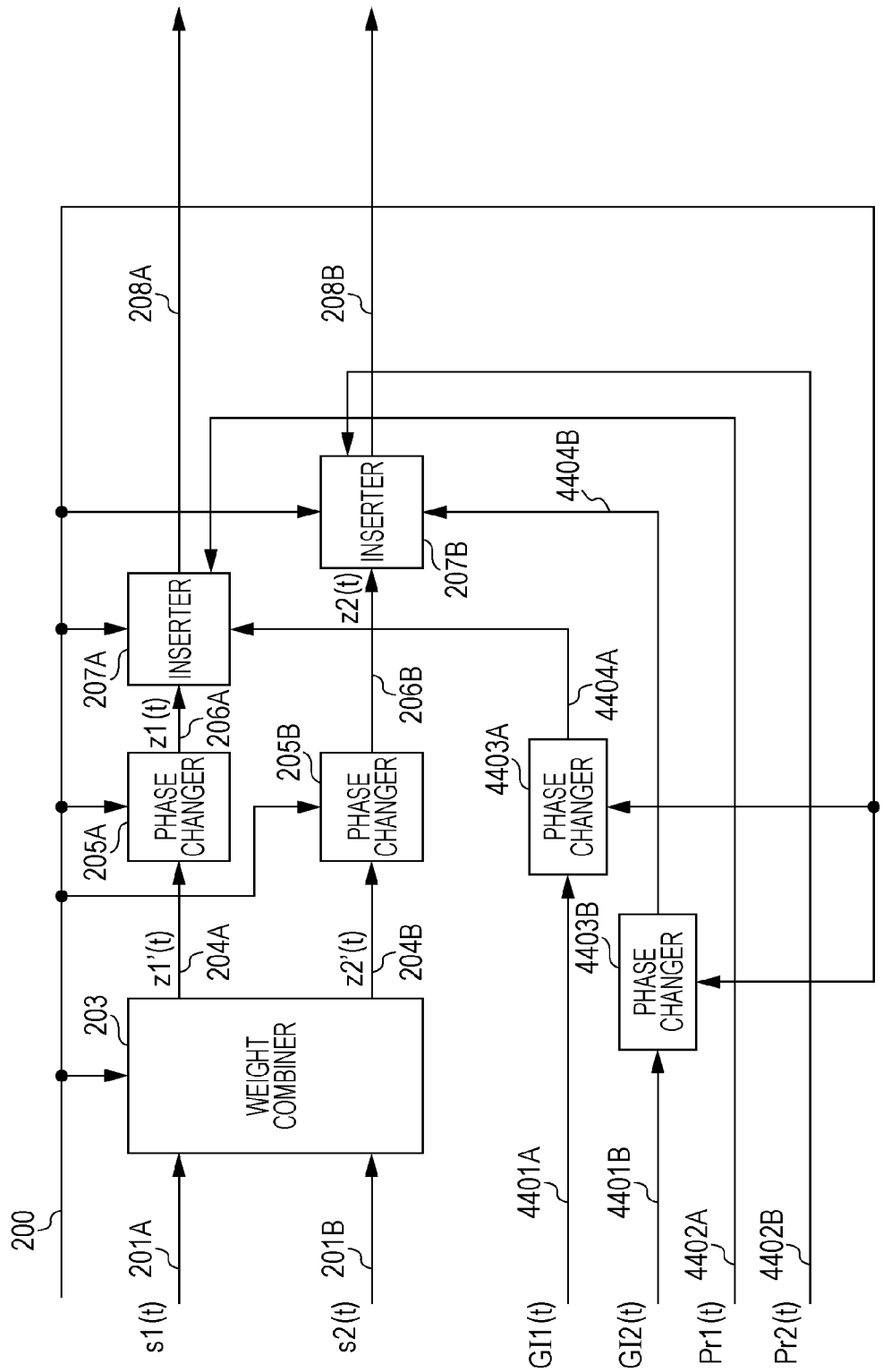
FIG. 48 is a diagram illustrating one exemplary configuration of the signal processor of FIG. 1.

FIG. 48 is a diagram illustrating the configuration of signal processor 106 of the transmission apparatus of FIG. 1. Parts that operate as in the cases of FIGS. 2 and 44 to 47 are denoted with the same reference numerals and have already been described, and thus description thereof will be omitted. The following describes an example in which the frame structures of FIGS. 40 and 41 are used. The frame structure is not necessarily as shown in FIGS. 40 and 41 but may be as shown in FIGS. 42 and 43. At this time, FIG. 40 is a frame structure of baseband signal 208A based on the frame structure (signal-processed signal 106_A of FIG. 1), whereas FIG. 41 is a frame structure of baseband signal 208B based on the frame structure (signal-processed signal 106_B of FIG. 1).

Mapped signal 201A in FIG. 48 (corresponding to mapped signal 105_1 in FIG. 1) is a signal corresponding to data block 3402 of FIG. 40, whereas mapped signal 201B (corresponding to mapped signal 105_2 in FIG. 1) is a signal corresponding to data block 3402 of FIG. 41.

Therefore, phase changer 205A is a section that performs phase change on data block 3402 of FIG. 40, whereas phase changer 205B is a section that performs phase change on data block 3402 of FIG. 41.

When the symbol number is i and input signal (204A) of phase changer 205A is I(i), output signal (206A) O(i) of phase changer 205A is represented by the following formula.

[Formula 146]

$$O(i)=e^{j\lambda_{D1}(i)} \times I(i) \qquad \text{Formula (146)}$$

Note that I(i) and O(i) can be defined as complex numbers (may be real numbers), whereas $\lambda_{D1}(i)$ is defined as a phase change value and is a real number. j is an imaginary unit. Note that $\lambda_{D1}(i)$ may be defined as 0 radians or more and less than $2\pi$ radians.

When input signal (204B) of phase changer 205B is I(i), output signal (206B) O(i) of phase changer 205B is represented by formula (143).

Guard symbol (symbol of GI) signal 4401A is a signal corresponding to guard 3401 in FIG. 40.

Guard symbol (symbol of GI) signal 4401B is a signal corresponding to guard 3401 in FIG. 41.

Phase changer 4403A receives guard symbol (symbol of GI) signal 4401A and control signal 200. Based on a signal related to the frame structure included in control signal 200, phase changer 4403A performs phase change on guard symbol (symbol of GI) signal 4401A, and outputs phase-changed guard symbol (symbol of GI) signal 4404A.

When the symbol number is i and input signal (4401A) of phase changer 4403A is I(i), output signal (4404A) of phase changer 4403A is represented by the following formula.

[Formula 147]

$$O(i)=e^{j\lambda_{G1}(i)} \times I(i) \qquad \text{Formula (147)}$$

Note that I(i) and O(i) can be defined as complex numbers (may be real numbers), whereas $\lambda_{G1}(i)$ is defined as a phase change value and is a real number. j is an imaginary unit. Note that $\lambda_{G1}(i)$ may be defined as 0 radians or more and less than $2\pi$ radians.

When input signal (4401B) of phase changer 4403B is I(i), output signal (4404B) O(i) of phase changer 4403B is represented by formula (144).

As an example of the description of the ninth and ninth exemplary embodiments, it is one important matter that the following formula holds.

[Formula 148]

$$\begin{aligned}(\lambda_{G2}(i) - \lambda_{G1}(i)) - (\lambda_{G2}(i-1) - \lambda_{G1}(i-1)) \\ = (\lambda_{D2}(i) - \lambda_{D1}(i)) - (\lambda_{D2}(i-1) - \lambda_{D1}(i-1)) \\ = K\end{aligned} \qquad \text{Formula (148)}$$

However, K is not 0 (zero), and the following formula holds.

[Formula 149]

$$\lambda_{G1}(i) - \lambda_{G1}(i-1) \neq 0 \qquad \text{Formula (149)}$$

[Formula 150]

$$\lambda_{G2}(i) - \lambda_{G2}(i-1) \neq 0 \qquad \text{Formula (150)}$$

[Formula 151]

$$\lambda_{D1}(i) - \lambda_{D1}(i-1) \neq 0 \qquad \text{Formula (151)}$$

[Formula 152]

$$\lambda_{D2}(i) - \lambda_{D2}(i-1) \neq 0 \qquad \text{Formula (152)}$$

As a result, the phase change cycle of data block 3402 of FIG. 40 and the phase change cycle of guard 3401 of FIG. 40 are the same. Also, the phase change cycle of data block 3402 of FIG. 41 and the phase change cycle of guard 3401 of FIG. 41 are the same. This point is as described in the eighth and ninth exemplary embodiments.

A relationship between the phase change cycle of data block 3402 of FIG. 40 and the phase change cycle of guard 3401 of FIG. 40 is not limited to this example, but may be as described in the eighth and ninth exemplary embodiments. Similarly, a relationship between the phase change cycle of data block 3402 of FIG. 41 and the phase change cycle of guard 3401 of FIG. 41 is not limited to this example, but may be as described in the eighth and ninth exemplary embodiments.

Signal 4402A is a preamble signal, which is a signal corresponding to preamble 3500 of FIG. 40. Signal 4402B is a preamble signal, which is a signal corresponding to preamble 3500 of FIG. 41.

Inserter 207A receives phase-changed signal 206A, phase-changed guard symbol (symbol of GI) signal 4404A, preamble signal 4402A, and control signal 200. Inserter 207A outputs baseband signal 208A based on the frame structure in control signal 200, that is, on the frame structure of FIG. 40.

Inserter 207B receives phase-changed signal 206B, phase-changed guard symbol (symbol of GI) signal 4404B, preamble signal 4402B, and control signal 200. Inserter 207B outputs baseband signal 208B based on the frame structure in control signal 200, that is, on the frame structure of FIG. 41.

Figure 49:
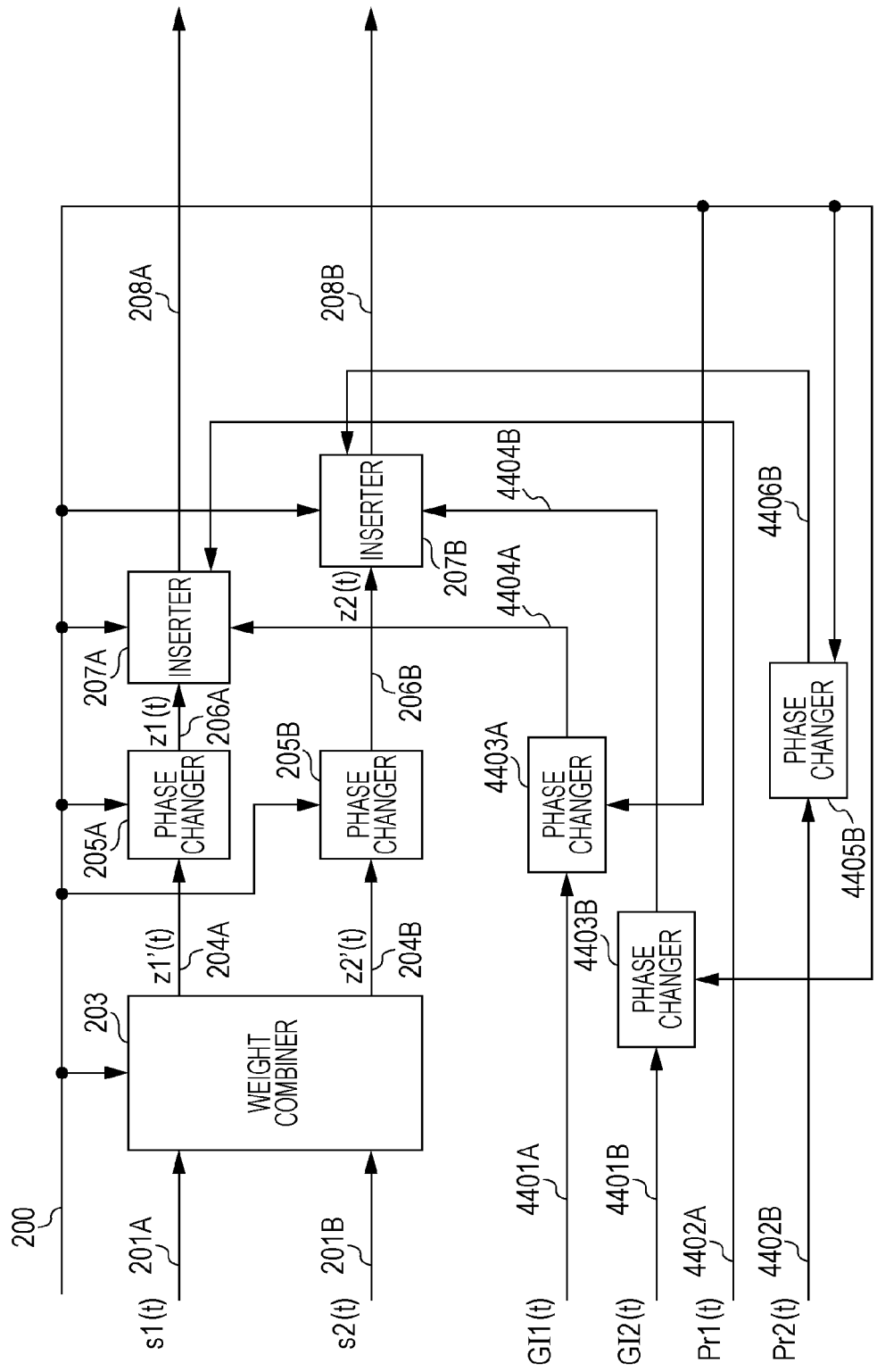
FIG. 49 is a diagram illustrating one exemplary configuration of the signal processor of FIG. 1.

FIG. 49 is a diagram illustrating the configuration of signal processor 106 of the transmission apparatus of FIG. 1, different from FIGS. 44 to 48. Parts that operate as in the cases of FIGS. 2 and 44 to 48 are denoted with the same reference numerals and have already been described. Therefore, description thereof will be omitted.

Again, from the description of the eighth and ninth exemplary embodiments, it is important that formula (148) to formula (152) hold (however, K is not 0 (zero)). As a result, the phase change cycle of data block 3402 of FIG. 41 and the phase change cycle of guard 3401 of FIG. 41 are the same. This point is as described in the eighth and ninth exemplary embodiments.

A relationship between the phase change cycle of data block 3402 of FIG. 40 and the phase change cycle of guard 3401 of FIG. 40 is not limited to this example, but may be as described in the eighth and ninth exemplary embodiments. Similarly, a relationship between the phase change cycle of data block 3402 of FIG. 41 and the phase change cycle of guard 3401 of FIG. 41 is not limited to this example, but may be as described in the eighth and ninth exemplary embodiments.

Furthermore, in FIG. 49, phase changer 4405B is present. Phase changer 4405B is a section that performs phase change on preamble 3500 in FIG. 41.

Phase changer 4405B receives preamble signal 4402B and control signal 200. Based on the signal related to the frame structure included in control signal 200, phase changer 4405B performs phase change on preamble 4402B and outputs phase-changed preamble signal 4406B. Note that the phase change cycle in the preamble is as described in the eighth and ninth exemplary embodiments.

Inserter 207A receives phase-changed signal 206A, phase-changed guard symbol (symbol of GI) signal 4404A, preamble signal 4402A, and control signal 200. Inserter 207A outputs baseband signal 208A based on the frame structure in control signal 200, that is, on the frame structure of FIG. 40.

Inserter 207B receives phase-changed signal 206B, phase-changed guard symbol (symbol of GI) signal 4404B, phase-changed preamble signal 4406B, and control signal 200. Inserter 207B outputs baseband signal 208B based on the frame structure in control signal 200, that is, on the frame structure of FIG. 41.

Figure 50:
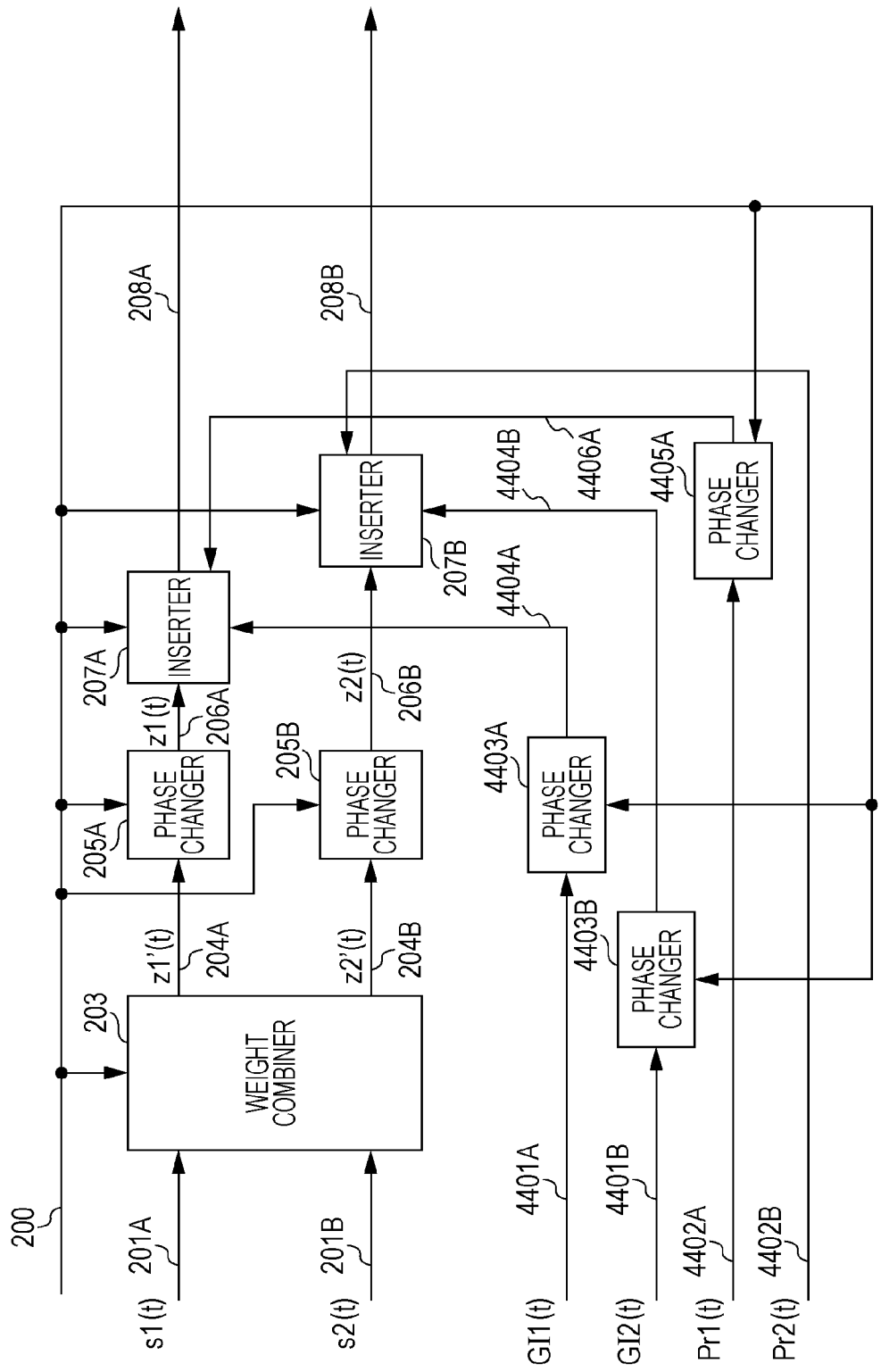
FIG. 50 is a diagram illustrating one exemplary configuration of the signal processor of FIG. 1.

FIG. 50 is a diagram illustrating the configuration of signal processing 106 of the transmission apparatus of FIG. 1, different from FIGS. 44 to 49. Parts that operate as in the cases of FIGS. 2 and 44 to 49 are denoted with the same reference numerals and have already been described. Therefore, description thereof will be omitted.

Again, from the description of the eighth and ninth exemplary embodiments, it is important that formula (148) to formula (152) hold (however, K is not 0 (zero)). As a result, the phase change cycle of data block 3402 of FIG. 41 and the phase change cycle of guard 3401 of FIG. 41 are the same. This point is as described in the eighth and ninth exemplary embodiments.

A relationship between the phase change cycle of data block 3402 of FIG. 40 and the phase change cycle of guard 3401 of FIG. 40 is not limited to this example, but may be as described in the eighth and ninth exemplary embodiments. Similarly, a relationship between the phase change cycle of data block 3402 of FIG. 41 and the phase change cycle of guard 3401 of FIG. 41 is not limited to this example, but may be as described in the eighth and ninth exemplary embodiments.

Furthermore, in FIG. 50, phase changer 4405A is present. Phase changer 4405A is a section that performs phase change on preamble 3500 in FIG. 40.

Phase changer 4405A receives preamble signal 4402A and control signal 200. Based on the signal related to the frame structure included in control signal 200, phase changer 4405A performs phase change on preamble 4402A and outputs phase-changed preamble signal 4406A. Note that the phase change cycle in the preamble is as described in the eighth and ninth exemplary embodiments.

Inserter 207A receives phase-changed signal 206A, phase-changed guard symbol (symbol of GI) signal 4404A, phase-changed preamble signal 4406A, and control signal 200. Inserter 207A outputs baseband signal 208A based on the frame structure in control signal 200, that is, on the frame structure of FIG. 40.

Inserter 207B receives phase-changed signal 206B, phase-changed guard symbol (symbol of GI) signal 4404B, preamble signal 4402B, and control signal 200. Inserter 207B outputs baseband signal 208B based on the frame structure in control signal 200, that is, on the frame structure of FIG. 41.

Figure 51:
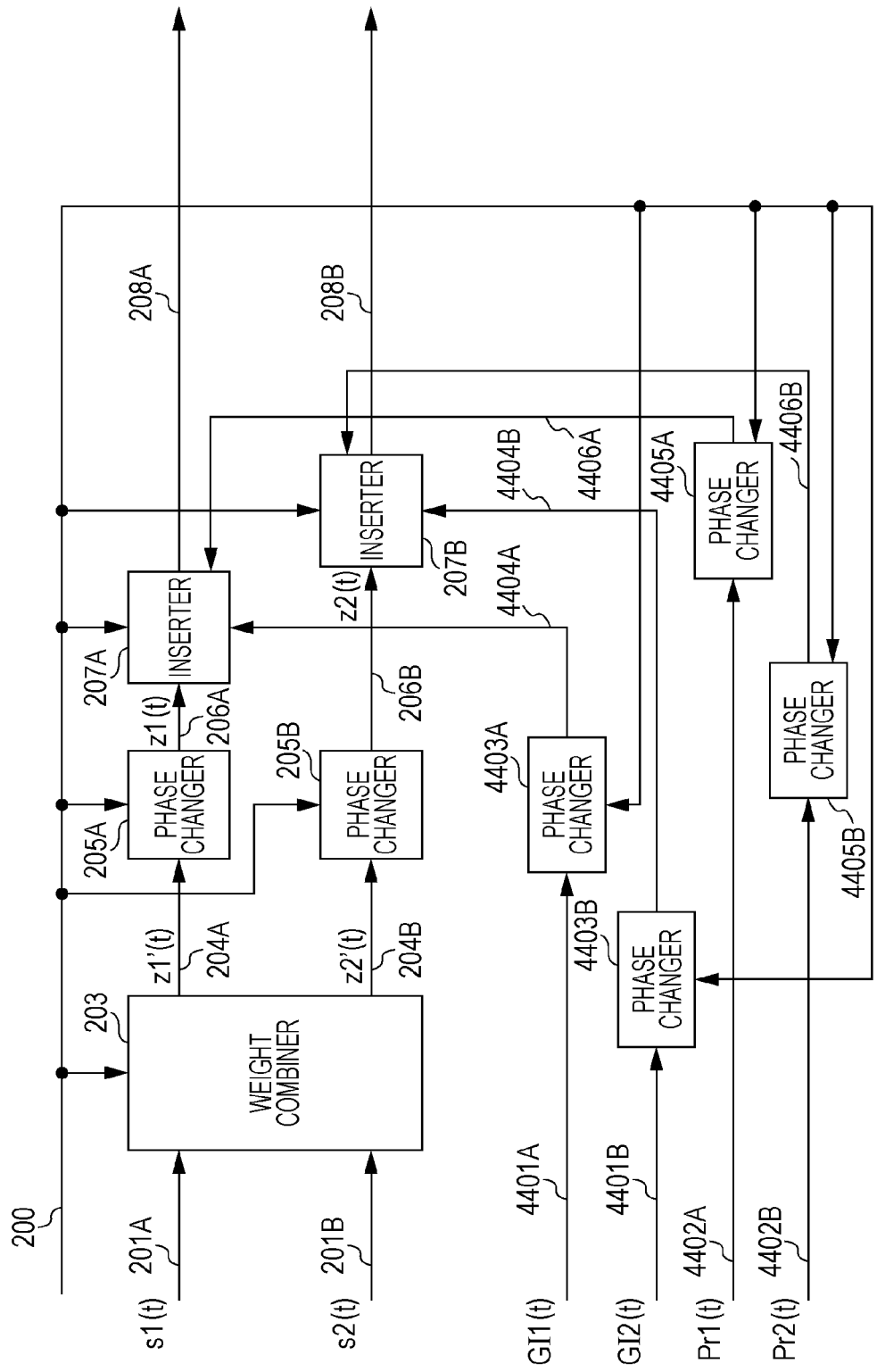
FIG. 51 is a diagram illustrating one exemplary configuration of the signal processor of FIG. 1.

FIG. 51 is a diagram illustrating the configuration of signal processor 106 of the transmission apparatus of FIG. 1, different from FIGS. 44 to 50. Parts that operate as in the cases of FIGS. 2 and 44 to 50 are denoted with the same reference numerals and have already been described. Therefore, description thereof will be omitted.

Again, from the description of the eighth and ninth exemplary embodiments, it is important that formula (148) to formula (152) hold (however, K is not 0 (zero)). As a result, the phase change cycle of data block 3402 of FIG. 41 and the phase change cycle of guard 3401 of FIG. 41 are the same. This point is as described in the eighth and ninth exemplary embodiments.

A relationship between the phase change cycle of data block 3402 of FIG. 40 and the phase change cycle of guard 3401 of FIG. 40 is not limited to this example, but may be as described in the eighth and ninth exemplary embodiments. Similarly, a relationship between the phase change cycle of data block 3402 of FIG. 41 and the phase change cycle of guard 3401 of FIG. 41 is not limited to this example, but may be as described in the eighth and ninth exemplary embodiments.

Furthermore, in FIG. 51, phase changer 4405A is present. Phase changer 4405A is a section that performs phase change on preamble 3500 in FIG. 40.

Phase changer 4405A receives preamble signal 4402A and control signal 200. Based on the signal related to the frame structure included in control signal 200, phase changer 4405A performs phase change on preamble 4402A and outputs phase-changed preamble signal 4406A. Note that the phase change cycle in the preamble is as described in the eighth and ninth exemplary embodiments.

Furthermore, in FIG. 51, phase changer 4405B is present. Phase changer 4405B is a section that performs phase change on preamble 3500 in FIG. 41.

Phase changer 4405B receives preamble signal 4402B and control signal 200. Based on the signal related to the frame structure included in control signal 200, phase changer 4405B performs phase change on preamble 4402B and outputs phase-changed preamble signal 4406B. Note that the phase change cycle in the preamble is as described in the eighth and ninth exemplary embodiments.

Inserter 207A receives phase-changed signal 206A, phase-changed guard symbol (symbol of GI) signal 4404A, phase-changed preamble signal 4406A, and control signal 200. Inserter 207A outputs baseband signal 208A based on the frame structure in control signal 200, that is, on the frame structure of FIG. 40.

Inserter 207B receives phase-changed signal 206B, phase-changed guard symbol (symbol of GI) signal 4404B, phase-changed preamble signal 4406B, and control signal 200. Inserter 207B outputs baseband signal 208B based on the frame structure in control signal 200, that is, on the frame structure of FIG. 41.

The eighth and ninth exemplary embodiments have described a case where the phase change cycle is set at 2. Advantages thereof will be described.

When the configuration of signal processor 106 of the transmission apparatus of FIG. 1 is as shown in FIG. 44, 45, 46, or 47, it is assumed that K in formula (145) satisfies K=$\pi$ radians.

FIG. 38 illustrates baseband signal 208A based on the frame structure with practice 3801 of FIG. 38. Note that in FIG. 38, a horizontal axis represents a frequency and a vertical axis represents amplitude.

The spectrum of baseband signal 208B based on the frame structure when K=$\pi$ radians is set will be described.

In FIG. 38, the spectrum obtained by shifting spectrum 3801 to the right is the spectrum formed by 3802_A and 3802_B. Consider a spectrum formed by spectra 3802_B and 3802_A as in FIG. 39 by shifting the spectrum of hatched 3802_B to the left. This spectrum will be the spectrum of baseband signal 208B based on the frame structure when K=$\pi$ radians is set.

When transmission is made so as to be in such a situation and the propagation environment of the base station and the terminal serving as a communication partner is a multipath environment, an influence of multipath of transmission signal 108A and an influence of multipath of transmission signal 108B are different from each other, making it more likely that a space diversity effect can be obtained. The space diversity effect decreases as K approaches 0. Therefore, "K having a value close to $\pi$" is a preferred condition for obtaining the space diversity effect.

When the configuration of signal processor 106 of the transmission apparatus of FIG. 1 is as shown in FIG. 48, 49, 50, or 51, it is assumed that K in formula (148) satisfies K=n radians. However, formula (149) to formula (152) are satisfied.

FIG. 38 illustrates baseband signal 208A based on the frame structure with solid line 3801 of FIG. 38. Note that in FIG. 38, a horizontal axis represents a frequency and a vertical axis represents amplitude.

The spectrum of baseband signal 208B based on the frame structure when K=π radians is set will be described.

In FIG. 38, the spectrum obtained by shifting spectrum 3801 to the right is the spectrum formed by 3802_A and 3802_B. Consider a spectrum formed by spectra 3802_B and 3802_A as in FIG. 39 by shifting the spectrum of hatched 3802_B to the left. This spectrum will be the spectrum of baseband signal 208B based on the frame structure when K=π radians is set.

When transmission is made so as to be in such a situation and the propagation environment of the base station and the terminal serving as a communication partner is a multipath environment, an influence of multipath of transmission signal 108A and an influence of multipath of transmission signal 108B are different from each other, making it more likely that a space diversity effect can be obtained. The space diversity effect decreases as K approaches 0. Therefore, "K having a value close to π" is a preferred condition for obtaining the space diversity effect.

Figure 52:
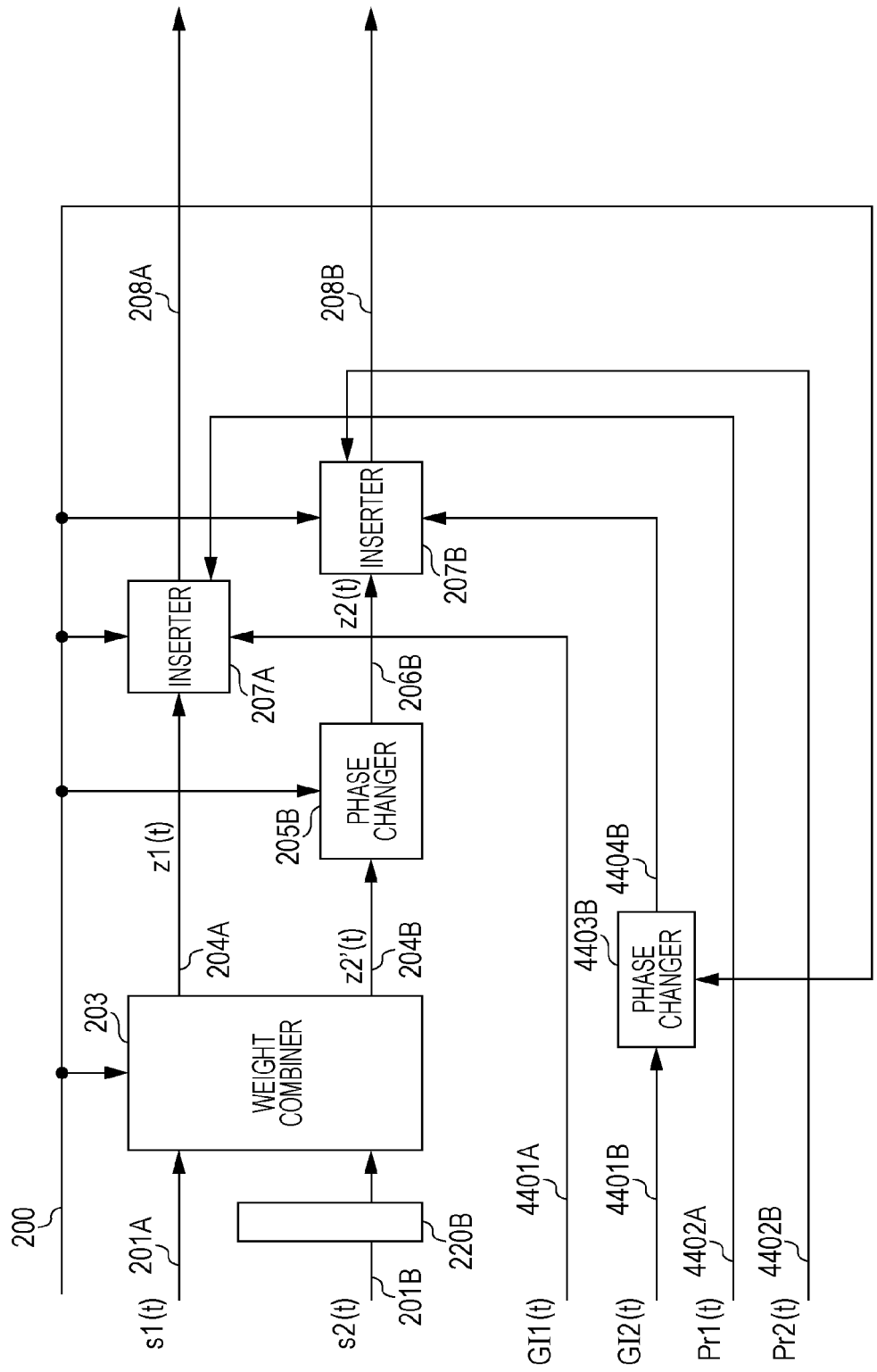
FIG. 52 is a diagram illustrating one exemplary configuration of the signal processor of FIG. 1.

FIG. 52 is a diagram illustrating the configuration of signal processor 106 of the transmission apparatus of FIG. 1, different from FIG. 44. Parts that operate as in the cases of FIGS. 2 and 44 are denoted with the same reference numerals. Detailed description thereof will be omitted.

The configuration of FIG. 52 differs from the configuration of FIG. 44 in that switcher 220B is provided. In response to a predetermined control signal, switcher 220B switches whether to input mapped signal 201B (corresponding to mapped signal 105_2 in FIG. 1) into weight combiner 203 (for example, ON/OFF setting of signal passage). Note that, in the present exemplary embodiment, a case where the setting of switcher 220B is OFF may be read as a case where mapped signal 201B is not present. Note that although not illustrated in FIG. 52, control signal 200 may be input into switcher 220B. When control signal 200 is input, switcher 220B may control ON/OFF of passage of signal 201B described below by using control signal 200.

When the setting of switcher 220B is ON, mapped signal 201B is input into weight combiner 203. This case will be similar to FIG. 44.

Meanwhile when the setting of switcher 220B is OFF, mapped signal 201B is not input into weight combiner 203. In this case, weight combiner 203 considers that, instead of mapped signal 201B, mapped signal 201A (corresponding to mapped signal 105_1 in FIG. 1) is input. Note that in this case, weight combiner 203 uses matrix F of formula (33) or (34). Note that when weight combiner 203 performs calculations using formula (33) or (34), weight combiner 203 may omit weighting, that is, may omit precoding calculations. In this case, signals 204A and 204B output from weight combiner 203 are the same signals. For example, signal 204A is a signal corresponding to mapped signal 201A, whereas signal 204B is a signal corresponding to mapped signal 201A. Note that in FIG. 52, when the setting of switcher 220B is OFF, weight combiner 203 may be eliminated.

Phase changer 205B may change the setting of the phase change cycle according to whether the setting of switcher 220B is ON or OFF. For example, when the setting of switcher 220B is ON, phase changer 205B changes the setting of the phase change cycle to any cycle that satisfies requirements described in the eighth and ninth exemplary embodiments, whereas when the setting of switcher 220B is OFF, phase changer 205B changes the setting of the phase change cycle to "2". However, the setting change of the phase change cycle according to whether the setting of switcher 220B is ON or OFF is not limited to this example. The phase change cycle value when ON and the phase change cycle value when OFF may be values different from above. Furthermore, in any one of the cases where the setting of switcher 220B is ON and OFF, phase changer 205B may omit phase change. Note that when "phase change is not performed", an output signal is generated and output without phase change on an input signal.

By setting the phase change cycle at "2" when the setting of switcher 220B is OFF, precoded signal 204A and signal 206B obtained by performing phase change on precoded signal 204B are the same signal with phase inverted. As described above, this will provide a high space diversity effect.

Note that like phase changer 205B, phase changer 4403B may also change the setting of the phase change cycle, and as described above, like phase changer 205B, sometimes phase changer 4403B may omit phase change. This allows inserter 207B to insert guard symbol (symbol of GI) signal 4404B that has undergone phase change at the same cycle as that of phase changer 205B to output baseband signal 208B based on the frame structure of FIG. 41.

Note that even when switcher 220B is not provided, phase changer 205B and phase changer 4403B may change the setting of the phase change cycle as described above. For example, phase changer 205B and phase changer 4403B may change the setting of the phase change cycle to any cycle satisfying the requirements described in the eighth and ninth exemplary embodiments at a predetermined timing. However, the setting change of the phase change cycle of phase changer 4403B is not limited to this example. That is, the phase change cycle value when the setting of switcher 220B is ON and the phase change cycle value when the setting of switcher 220B is OFF may be values different from above.

Figure 53:
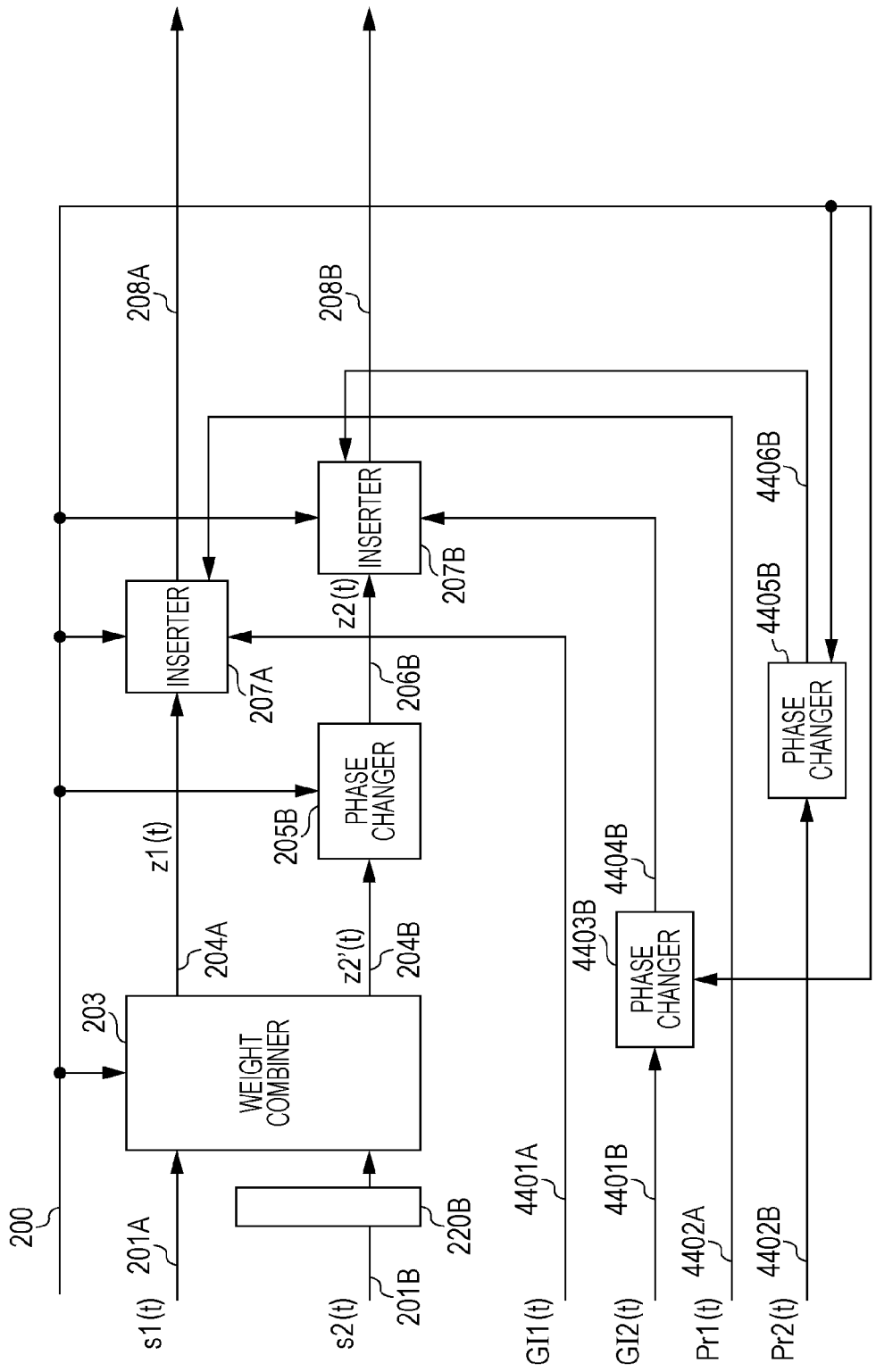
FIG. 53 is a diagram illustrating one exemplary configuration of the signal processor of FIG. 1.

FIG. 53 is a diagram illustrating the configuration of signal processor 106 of the transmission apparatus of FIG. 1, different from FIGS. 45 and 52. Parts that operate as in the cases of FIGS. 2, 45, and 52 are denoted with the same reference numerals. Detailed description thereof will be omitted. Note that although not illustrated in FIG. 53, control signal 200 may be input into switcher 220B. When control signal 200 is input, switcher 220B may control ON/OFF of passage of signal 201B described below by using control signal 200.

FIG. 53 is a diagram corresponding to a configuration in which switcher 220B similar to that in FIG. 52 is provided in the configuration of FIG. 45. In the configuration of FIG. 53, in addition to phase changers 205B and 4403B described in FIG. 52, phase changer 4405B also changes the setting of the phase change cycle in the same manner as phase changer 205B in accordance with the setting ON/OFF of switcher 220B.

This allows inserter 207B to insert preamble signal 4406B and guard symbol (symbol of GI) signal 4404B that have undergone phase change at the same cycle as that of phase changer 205B to output baseband signal 208B based on the frame structure of FIG. 41.

Figure 54:
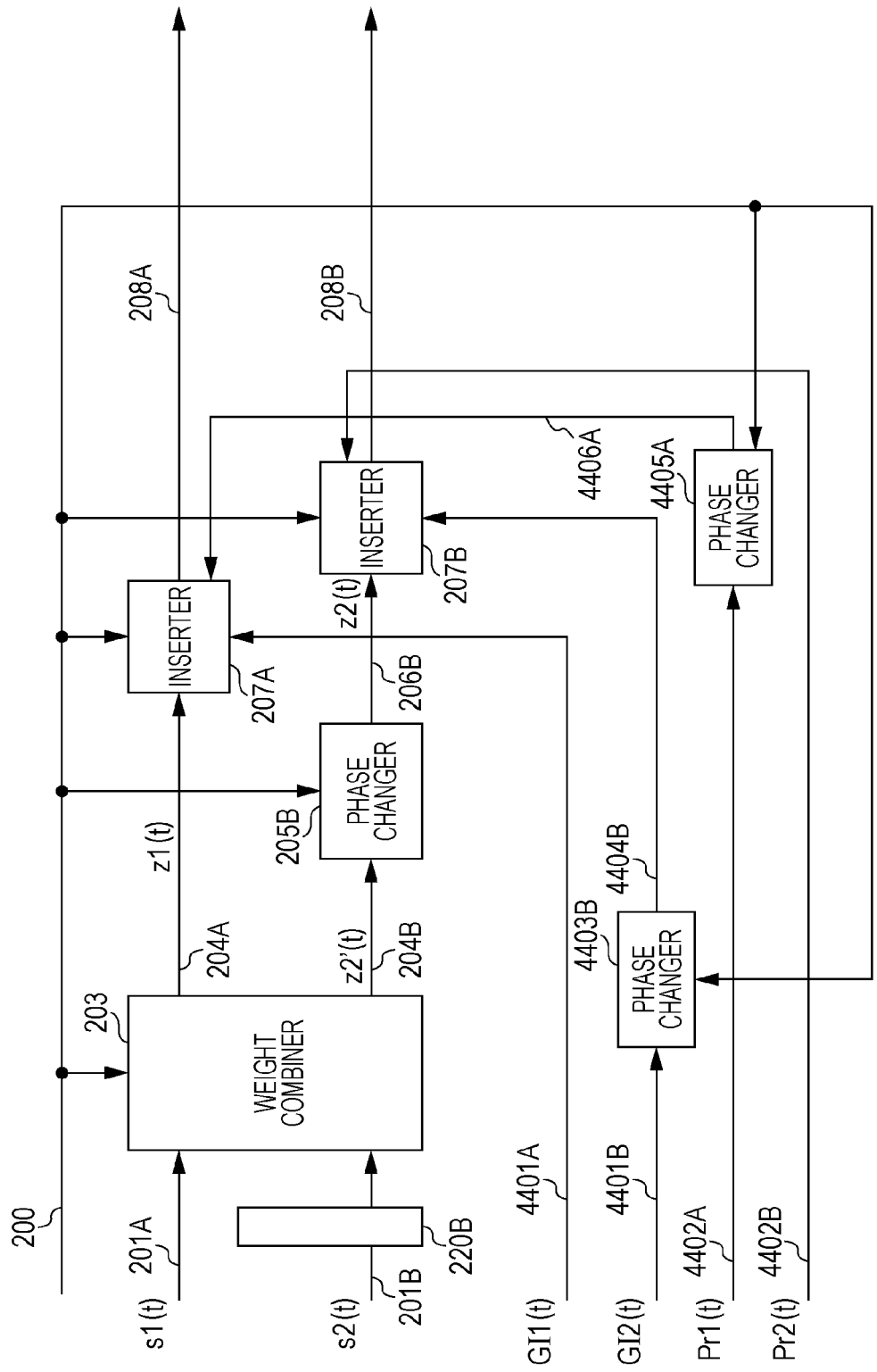
FIG. 54 is a diagram illustrating one exemplary configuration of the signal processor of FIG. 1.

FIG. 54 is a diagram illustrating the configuration of signal processor 106 of the transmission apparatus of FIG.

1, different from FIGS. 46 and 52. Parts that operate as in the cases of FIGS. 2, 46, and 52 are denoted with the same reference numerals. Detailed description thereof will be omitted. Note that although not illustrated in FIG. 54, control signal 200 may be input into switcher 220B. When control signal 200 is input, switcher 220B may control ON/OFF of passage of signal 201B described below by using control signal 200.

FIG. 54 is a diagram corresponding to a configuration in which switcher 220B similar to that in FIG. 52 is provided in the configuration of FIG. 46. In the configuration of FIG. 54, in addition to phase changers 205B and 4403B described in FIG. 52, phase changer 4405A also changes the setting of the phase change cycle in the same manner as phase changer 205B in accordance with the setting ON/OFF of switcher 220B.

This allows inserter 207A to insert preamble signal 4406A that has undergone phase change at the same cycle as that of phase changer 205B to output baseband signal 208A based on the frame structure of FIG. 40.

Figure 55:
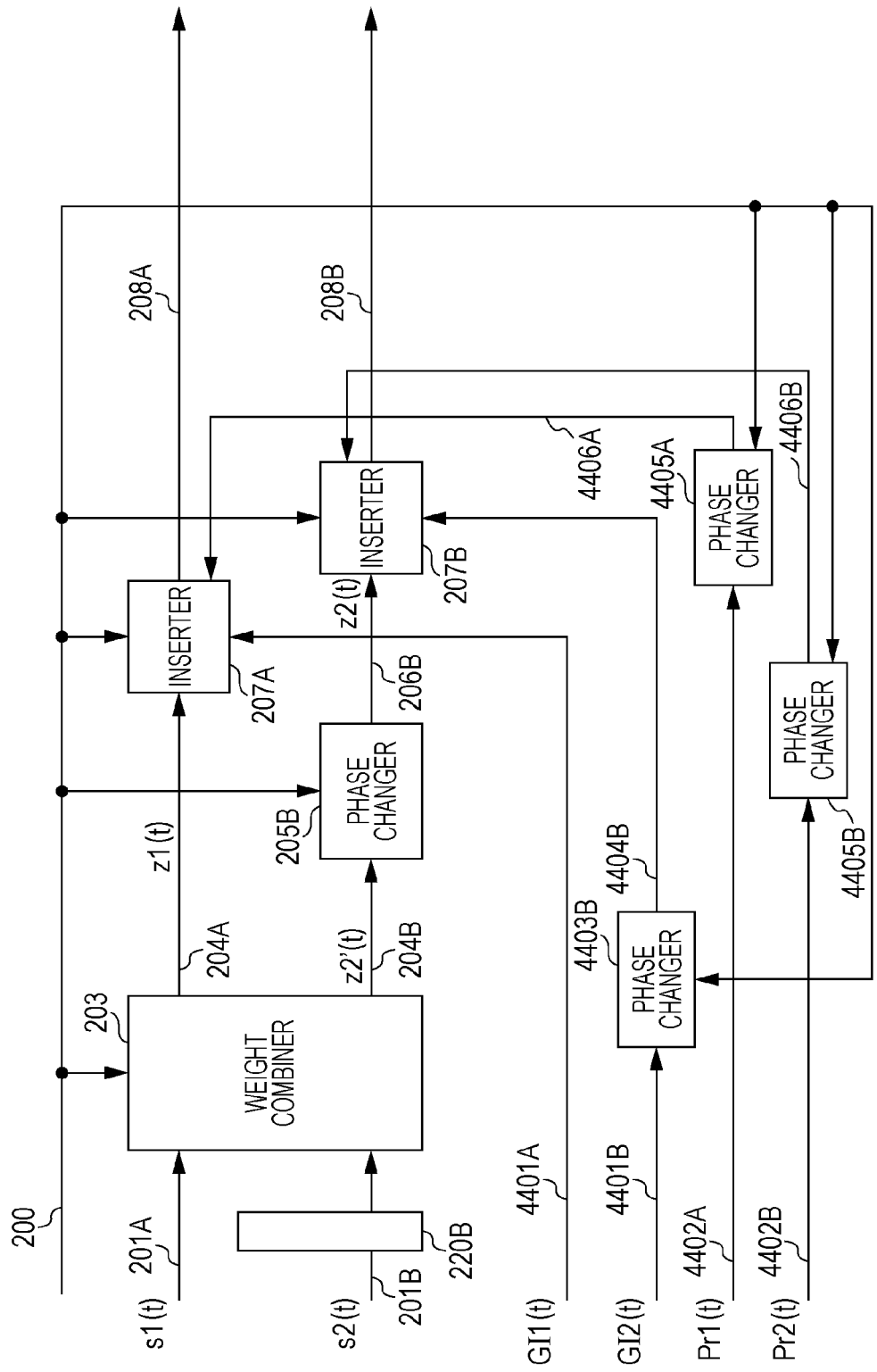
FIG. 55 is a diagram illustrating one exemplary configuration of the signal processor of FIG. 1.

FIG. 55 is a diagram illustrating the configuration of signal processor 106 of the transmission apparatus of FIG. 1, different from FIGS. 47 and 52 to 54. Parts that operate as in the cases of FIGS. 2, 47, and 52 to 54 are denoted with the same reference numerals. Detailed description thereof will be omitted. Note that although not illustrated in FIG. 55, control signal 200 may be input into switcher 220B. When control signal 200 is input, switcher 220B may control ON/OFF of passage of signal 201B described below by using control signal 200.

FIG. 55 is a diagram corresponding to a configuration in which switcher 220B similar to that in FIG. 52 is provided in the configuration of FIG. 47. In the configuration of FIG. 55, in addition to phase changers 205B and 4403B described in FIG. 52, phase changer 4405B described in FIG. 53 and phase changer 4405A described in FIG. 54 also change the setting of the phase change cycle in the same manner as phase changer 205B in accordance with the setting ON/OFF of switcher 220B.

This allows inserter 207A to insert preamble signal 4406A that has undergone phase change at the same cycle as that of phase changer 205B to output baseband signal 208A based on the frame structure of FIG. 40. This also allows inserter 207B to insert preamble signal 4406B and guard symbol (symbol of GI) signal 4404B that have undergone phase change at the same cycle as that of phase changer 205B to output baseband signal 208B based on the frame structure of FIG. 41.

Figure 56:
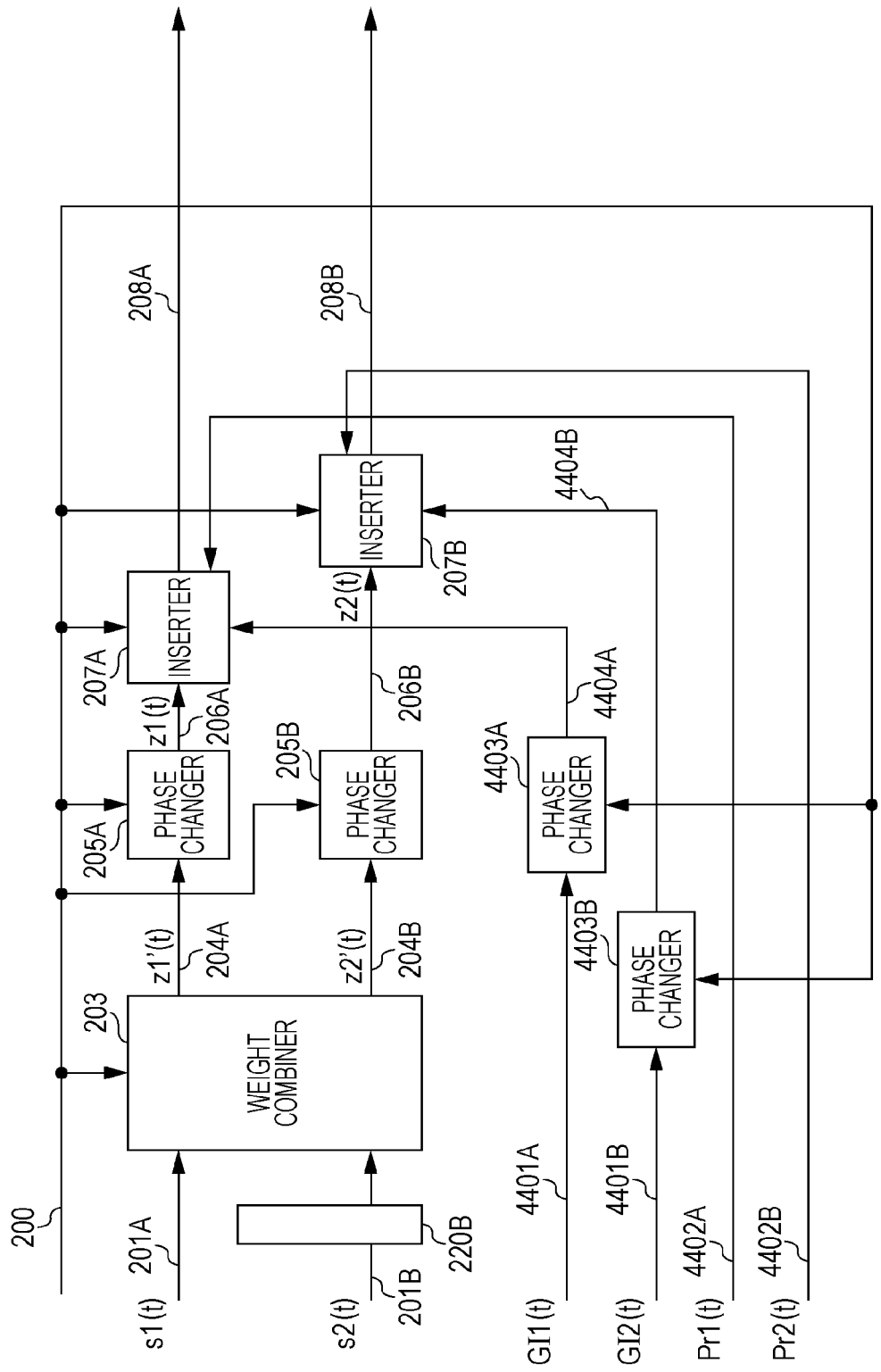
FIG. 56 is a diagram illustrating one exemplary configuration of the signal processor of FIG. 1.

FIG. 56 is a diagram illustrating the configuration of signal processor 106 of the transmission apparatus of FIG. 1, different from FIG. 48. Parts that operate as in the cases of FIGS. 2 and 48 are denoted with the same reference numerals. Detailed description thereof will be omitted.

The configuration of FIG. 56 differs from the configuration of FIG. 48 in that switcher 220B is provided. In response to a predetermined control signal, switcher 220B switches whether to input mapped signal 201B (corresponding to mapped signal 105_2 in FIG. 1) into weight combiner 203 (for example, signal ON/OFF). Note that, in the present exemplary embodiment, a case where the setting of switcher 220B is OFF may be read as a case where mapped signal 201B is not present. Note that although not illustrated in FIG. 56, control signal 200 may be input into switcher 220B. When control signal 200 is input, switcher 220B may control ON/OFF of passage of signal 201B described below by using control signal 200.

When the setting of switcher 220B is ON, mapped signal 201B is input into weight combiner 203. This case will be similar to FIG. 48.

Meanwhile when the setting of switcher 220B is OFF, mapped signal 201B is not input into weight combiner 203. In this case, weight combiner 203 considers that, instead of mapped signal 201B, mapped signal 201A (corresponding to mapped signal 105_1 in FIG. 1) is input. Note that in this case, weight combiner 203 uses matrix F of formula (33) or (34). Note that when weight combiner 203 performs calculations using formula (33) or (34), weight combiner 203 may omit weighting, that is, may omit precoding calculations. In this case, signals 204A and 204B output from weight combiner 203 are the same signals. For example, signal 204A is a signal corresponding to mapped signal 201A, whereas signal 204B is a signal corresponding to mapped signal 201A. Note that in FIG. 56, when the setting of switcher 220B is OFF, weight combiner 203 may be eliminated.

Phase changers 205A and 205B may change the setting of the phase change cycle according to whether the setting of switcher 220B is ON or OFF. For example, when the setting of switcher 220B is ON, phase changers 205A and 205B change the setting of the phase change cycle to any cycle that satisfies requirements described in the eighth and ninth exemplary embodiments, and when the setting of switcher 220B is OFF, phase changers 205A and 205B change the setting of the phase change cycle to "2". However, the setting change of the phase change cycle of phase changers 205A and 205B is not limited to this example. That is, the phase change cycle value when the setting of switcher 220B is ON and the phase change cycle value when the setting of switcher 220B is OFF may be values different from above. Note that in the above description, regardless of whether the setting of switcher 220B is ON or OFF, the same value is set in the value of the phase change cycle of phase changer 205A and the value of the phase change cycle of phase changer 205B. However, in both of the cases or one of the cases where the setting of switcher 220B is ON and OFF, values different from each other may be set for the value of the phase change cycle of phase changer 205A and the value of the phase change cycle of phase changer 205B. Furthermore, in any one of the cases where the setting of switcher 220B is ON and OFF, one of phase changers 205A and 205B may omit phase change. Alternatively, in any one of the cases where the setting of switcher 220B is ON and OFF, both of phase changers 205A and 205B may omit phase change. Note that when "phase change is not performed", an output signal is generated and output without phase change on an input signal.

By setting the phase change cycle at "2" when switcher 220B is OFF, signal 206A that has undergone phase change by phase changer 205A and signal 206B that has undergone phase change by phase changer 205B are the same signal with phase inverted. This will provide a high space diversity effect.

Note that phase changers 4403A and 4403B may also change the setting of the phase change cycle in the same manner as phase changers 205A and 205B. This allows inserter 207A to insert guard symbol (symbol of GI) signal 4404A that has undergone phase change at the same cycle as that of phase changer 205A to output baseband signal 208A based on the frame structure of FIG. 40. This also allows inserter 207B to insert guard symbol (symbol of GI) signal 4404B that has undergone phase change at the same cycle as that of phase changer 205B to output baseband signal 208B based on the frame structure of FIG. 41.

Note that even when switcher 220B is not provided, phase changers 205A and 205B and phase changers 4403A and 4403B may change the setting of the phase change cycle as described above. For example, phase changers 205A and 205B and phase changers 4403A and 4403B may change the setting of the phase change cycle to any cycle satisfying the requirements described in the eighth and ninth exemplary embodiments at a predetermined timing. However, the setting change of the phase change cycle of phase changers 4403A and 4403B is not limited to this example. That is, the phase change cycle value when the setting of switcher 220B is ON and the phase change cycle value when the setting of switcher 220B is OFF may be values different from above. Furthermore, in any one of the cases where the setting of switcher 220B is ON and OFF, one of phase changers 4403A and 4403B may omit phase change. Alternatively, in any one of the cases where the setting of switcher 220B is ON and OFF, both of phase changers 4403A and 4403B may omit phase change. Note that when "phase change is not performed", an output signal is generated and output without phase change on an input signal.

Figure 57:
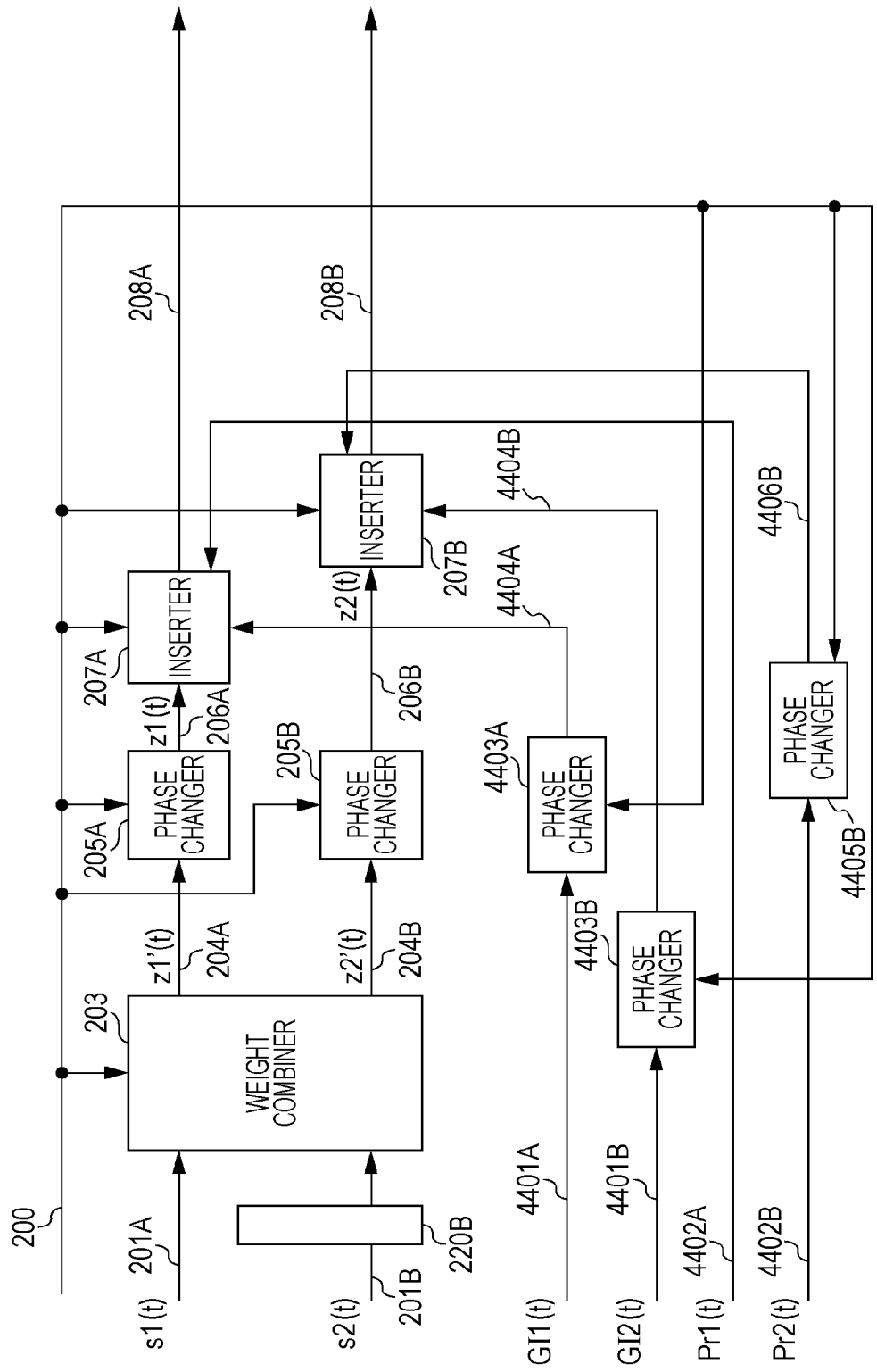
FIG. 57 is a diagram illustrating one exemplary configuration of the signal processor of FIG. 1.

FIG. 57 is a diagram illustrating the configuration of signal processor 106 of the transmission apparatus of FIG. 1, different from FIGS. 49 and 56. Parts that operate as in the cases of FIGS. 2, 49, and 56 are denoted with the same reference numerals. Detailed description thereof will be omitted. Note that although not illustrated in FIG. 57, control signal 200 may be input into switcher 220B. When control signal 200 is input, switcher 220B may control ON/OFF of passage of signal 201B described below by using control signal 200.

FIG. 57 is a diagram corresponding to a configuration in which switcher 220B similar to that in FIG. 56 is provided in the configuration of FIG. 49. In the configuration of FIG. 57, in addition to phase changers 205A, 205B, 4403A, and 4403B described in FIG. 56, phase changer 4405B also changes the setting of the phase change cycle in the same manner as phase changer 205B in accordance with the setting ON/OFF of switcher 220B. Note that as described in the configuration of FIG. 56, also in FIG. 57, regardless of whether the setting of switcher 220B is ON or OFF, the same value is set for the values of the phase change cycle of phase changers 205A and 205B. However, in both of the cases or one of the cases where the setting of switcher 220B is ON and OFF, values different from each other may be set for the value of the phase change cycle of phase changer 205A and the value of the phase change cycle of phase changer 205B. Also, for phase changers 4403A and 4403B, regardless of whether the setting of switcher 220B is ON or OFF, the same value is set for the value of the phase change cycle. However, in both of the cases or one of the cases where the setting of switcher 220B is ON and OFF, values different from each other may be set for the value of the phase change cycle of phase changer 4403A and the value of the phase change cycle of phase changer 4403B. Furthermore, in any one of the cases where the setting of switcher 220B is ON and OFF, one of phase changers 205A and 205B may omit phase change. Alternatively, in any one of the cases where the setting of switcher 220B is ON and OFF, both of phase changers 205A and 205B may omit phase change. In addition, in any one of the cases where the setting of switcher 220B is ON and OFF, one of phase changers 4403A and 4403B may omit phase change. Alternatively, in any one of the cases where the setting of switcher 220B is ON and OFF, both of phase changers 4403A and 4403B may omit phase change. Note that when "phase change is not performed", an output signal is generated and output without phase change on an input signal.

This allows inserter 207B to insert preamble signal 4406B and the guard symbol (symbol of GI) signal 4404B that have undergone phase change at the same cycle as that of phase changers 205A and 205B to output baseband signal 208B based on the frame structure of FIG. 41.

Figure 58:
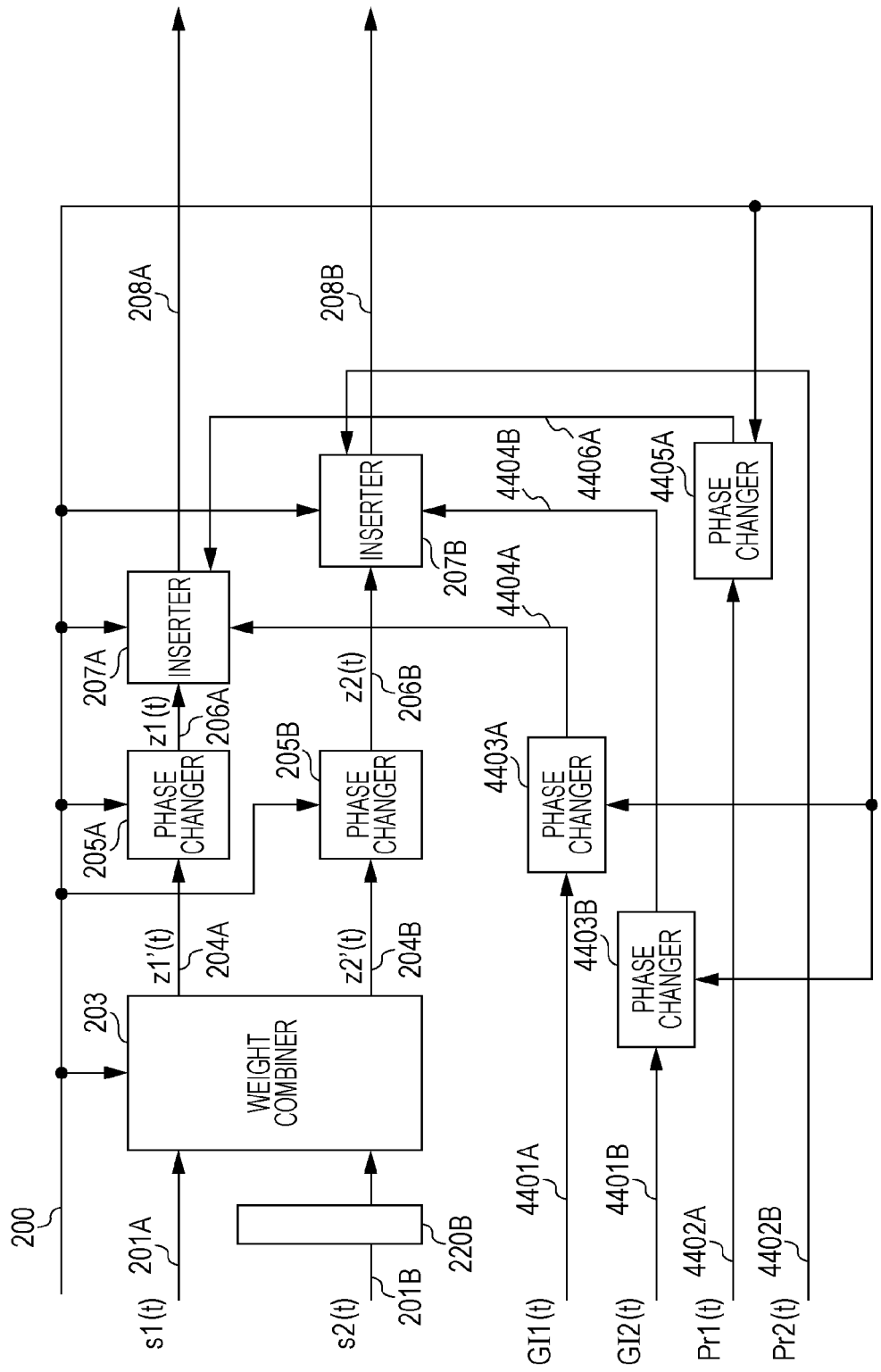
FIG. 58 is a diagram illustrating one exemplary configuration of the signal processor of FIG. 1.

FIG. 58 is a diagram illustrating the configuration of signal processor 106 of the transmission apparatus of FIG. 1, different from FIGS. 50 and 56. Parts that operate as in the cases of FIGS. 2, 50, and 56 are denoted with the same reference numerals. Detailed description thereof will be omitted. Note that although not illustrated in FIG. 58, control signal 200 may be input into switcher 220B. When control signal 200 is input, switcher 220B may control ON/OFF of passage of signal 201B described below by using control signal 200.

FIG. 58 is a diagram corresponding to a configuration in which switcher 220B similar to that in FIG. 56 is provided in the configuration of FIG. 50. In the configuration of FIG. 58, in addition to phase changers 205A, 205B, 4403A, and 4403B described in FIG. 56, phase changer 4405A also changes the setting of the phase change cycle in the same manner as phase changer 205A in accordance with the setting ON/OFF of switcher 220B. Note that as described in the configuration of FIG. 56, also in FIG. 58, regardless of whether the setting of switcher 220B is ON or OFF, the same value is set for the values of the phase change cycle of phase changers 205A and 205B. However, in both of the cases or one of the cases where the setting of switcher 220B is ON and OFF, values different from each other may be set for the value of the phase change cycle of phase changer 205A and the value of the phase change cycle of phase changer 205B. Also, for phase changers 4403A and 4403B, regardless of whether the setting of switcher 220B is ON or OFF, the same value is set for the value of the phase change cycle. However, in both of the cases or one of the cases where the setting of switcher 220B is ON and OFF, values different from each other may be set for the value of the phase change cycle of phase changer 4403A and the value of the phase change cycle of phase changer 4403B. Furthermore, in any one of the cases where the setting of switcher 220B is ON and OFF, one of phase changers 205A and 205B may omit phase change. Alternatively, in any one of the cases where the setting of switcher 220B is ON and OFF, both of phase changers 205A and 205B may omit phase change. In addition, in any one of the cases where the setting of switcher 220B is ON and OFF, one of phase changers 4403A and 4403B may omit phase change. Alternatively, in any one of the cases where the setting of switcher 220B is ON and OFF, both of phase changers 4403A and 4403B may omit phase change. Note that when "phase change is not performed", an output signal is generated and output without phase change on an input signal.

This allows inserter 207A to insert preamble signal 4406A and guard symbol (symbol of GI) signal 4404A that have undergone phase change at the same cycle as that of phase changers 205A and 205B to output baseband signal 208A based on the frame structure of FIG. 40.

Figure 59:
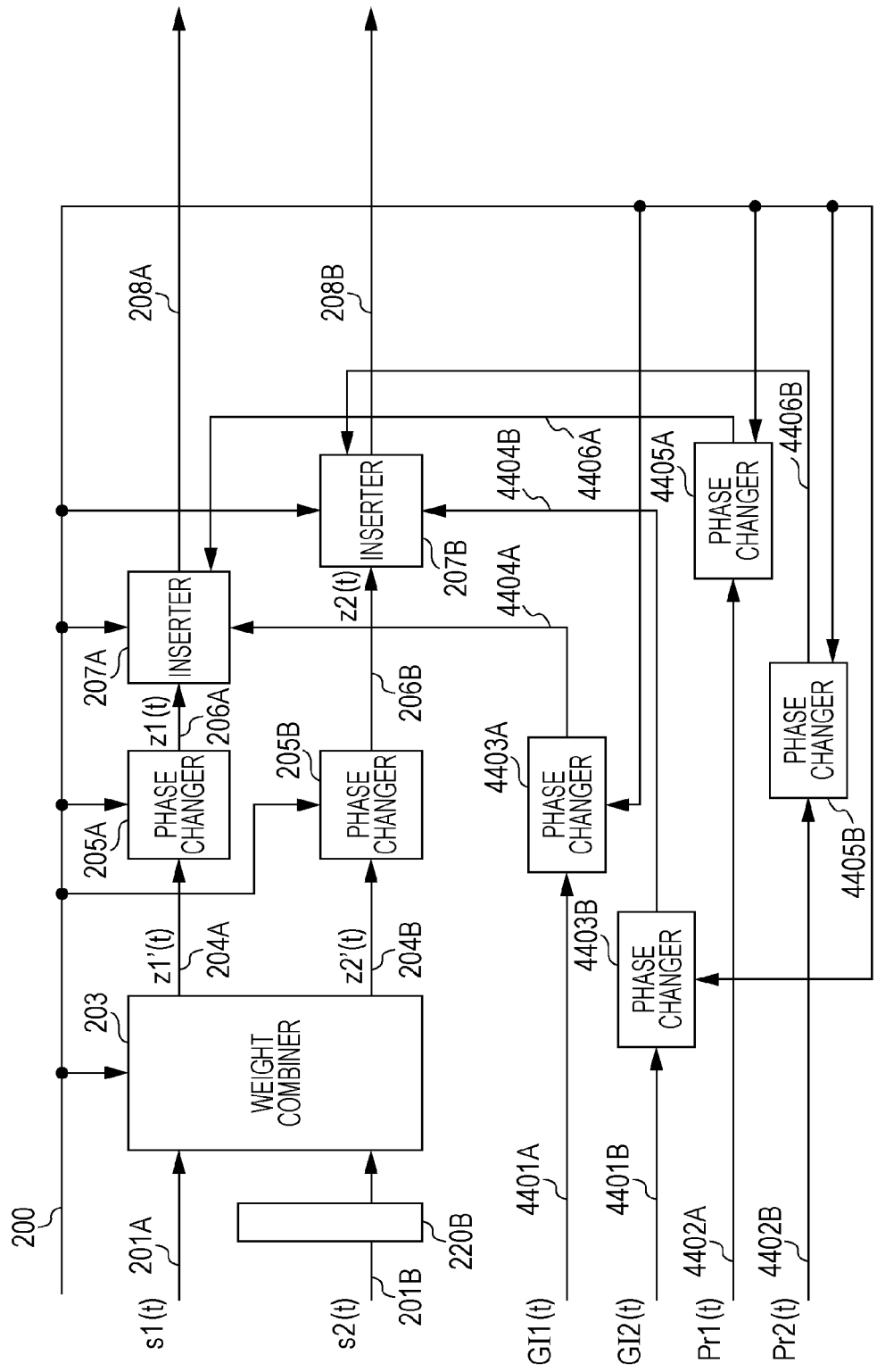
FIG. 59 is a diagram illustrating one exemplary configuration of the signal processor of FIG. 1.

FIG. 59 is a diagram illustrating the configuration of signal processor 106 of the transmission apparatus of FIG. 1, different from FIGS. 51 and 56 to 58. Parts that operate as in the cases of FIGS. 2, 51, and 56 to 58 are denoted with the same reference numerals. Detailed description thereof will be omitted. Note that although not illustrated in FIG. 59, control signal 200 may be input into switcher 220B. When control signal 200 is input, switcher 220B may control ON/OFF of passage of signal 201B described below by using control signal 200.

FIG. 59 is a diagram corresponding to a configuration in which switcher 220B similar to that in FIG. 56 is provided in the configuration of FIG. 51. In the configuration of FIG. 59, in addition to phase changers 205A, 205B, 4403A, and 4403B described in FIG. 56, phase changer 4405B described in FIG. 57 and phase changer 4405A described in FIG. 58 also change the setting of the phase change cycle in the same manner as phase changers 205A and 205B in accordance with the setting ON/OFF of switcher 220B. Note that as described in the configuration of FIG. 56, also in FIG. 59, regardless of whether the setting of switcher 220B is ON or OFF, the same value is set for the value of the phase change cycle of phase changers 205A and 205B. However, in both of the cases or one of the cases where the setting of switcher 220B is ON and OFF, values different from each other may be set for the value of the phase change cycle of phase changer 205A and the value of the phase change cycle of phase changer 205B. Also, for phase changers 4403A and 4403B, regardless of whether the setting of switcher 220B is ON or OFF, the same value is set for the value of the phase change cycle. However, in both of the cases or one of the cases where the setting of switcher 220B is ON and OFF, values different from each other may be set for the value of the phase change cycle of phase changer 4403A and the value of the phase change cycle of phase changer 4403B. Furthermore, for phase changers 4405A and 4405B, regardless of whether the setting of switcher 220B is ON or OFF, the same value is set for the value of the phase change cycle. However, in both of the cases or one of the cases where the setting of switcher 220B is ON and OFF, values different from each other may be set for the value of the phase change cycle of phase changer 4405A and the value of the phase change cycle of phase changer 4405B. Furthermore, in any one of the cases where the setting of switcher 220B is ON and OFF, one of phase changers 205A and 205B may omit phase change. Alternatively, in any one of the cases where the setting of switcher 220B is ON and OFF, both of phase changers 205A and 205B may omit phase change. In addition, in any one of the cases where the setting of switcher 220B is ON and OFF, one of phase changers 4403A and 4403B may omit phase change. Alternatively, in any one of the cases where the setting of switcher 220B is ON and OFF, both of phase changers 4403A and 4403B may omit phase change. In addition, in any one of the cases where the setting of switcher 220B is ON and OFF, one of phase changers 4405A and 4405B may omit phase change. Alternatively, in any one of the cases where the setting of switcher 220B is ON and OFF, both of phase changers 4405A and 4405B may omit phase change. Note that when "phase change is not performed", an output signal is generated and output without phase change on an input signal.

This allows inserter 207A to insert preamble signal 4406A and guard symbol (symbol of GI) signal 4404A that have undergone phase change at the same cycle as that of phase changers 205A and 205B to output baseband signal 208A based on the frame structure of FIG. 40. This also allows inserter 207B to insert preamble signal 4406B and guard symbol (symbol of GI) signal 4404B that have undergone phase change at the same cycle as that of phase changer 205B to output baseband signal 208B based on the frame structure of FIG. 41.

As described above, implementing the present exemplary embodiment makes it possible to obtain the advantageous effects described in the eighth and ninth exemplary embodiments.

Eleventh Exemplary Embodiment

In exemplary embodiments such as the first exemplary embodiment, for example, in FIGS. 2, 18 to 22, and 44 to 59, configurations have been described in which weight combiner 203, phase changer 205A, and/or phase changer 205B are present. The following will describe a configuration method for obtaining good reception quality in an environment where direct waves are dominant and an environment where multipath or the like is present.

First, as in FIGS. 2, 18, 19, 44 to 47, 52 to 55 and the like, a phase change method when weight combiner 203 and phase changer 205B are present will be described.

For example, as described in the first exemplary embodiment, it is assumed that a phase change value in phase changer 205B is y(i). Details are as described in the first exemplary embodiment. Note that i is a symbol number, and for example, i is an integer equal to or greater than 0.

For example, as described in the first exemplary embodiment, it is assumed that the phase change value y(i) is a cycle of N, and N values are prepared as the phase change values. Note that N is an integer equal to or greater than 2. Then, for example, Phase [0], Phase [1], Phase [2], Phase [3], . . . , Phase [N−2], and Phase [N−1] are prepared as the N values. That is, the N values are represented by Phase [k], and k is an integer between 0 and N−1 inclusive. Phase [k] is a real number between 0 radians and $2\pi$ radians inclusive. x is an integer between 0 and N−1 inclusive, y is an integer between 0 and N−1 inclusive, and x #y. Phase [x] ≠Phase [y] holds for all x and y satisfying these conditions. Note that a method for setting the phase change value y(i) assuming the cycle N is as described in other exemplary embodiments of this specification. Then, M values are extracted from Phase [0], Phase [1], Phase [2], Phase [3], . . . , Phase [N−2], and Phase [N−1]. These M values are represented as Phase_1 [0], Phase_1 [1], Phase_1 [2], . . . , Phase_1 [M−2], and Phase_1 [M−1]. That is, the M values are represented by Phase_1 [k], and k is an integer between 0 and M−1 inclusive. Note that M is an integer less than N and equal to or greater than 2.

At this time, the phase change value y(i) has any one value of Phase_1 [0], Phase_1 [1], Phase_1 [2], . . . , Phase_1 [M−2], and Phase_1 [M−1]. Phase_1 [0], Phase_1 [1], Phase_1 [2], . . . , Phase_1 [M−2], and Phase_1 [M−1] are each used at least once as the phase change value y(i).

For example, as one example thereof, there is a method in which the cycle of the phase change value y(i) is M. At this time, the following formula holds true.

[Formula 153]

$$y(i=x+y\times M)=\text{Phase\_1}[x] \quad \text{Formula (153)}$$

Note that x is an integer between 0 and M−1 inclusive. y is an integer equal to or greater than 0.

Figure 60:
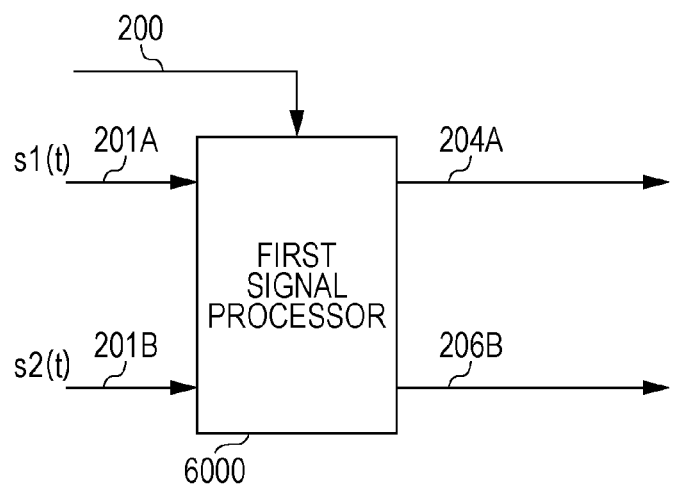
FIG. 60 is a diagram illustrating one exemplary configuration of a first signal processor.

Furthermore, as in FIG. 2 and the like, weight combiner 203 and phase changer 205B may individually perform a weighting process and a phase change process. The process of weight combiner 203 and the process of phase changer 205B may be performed by first signal processor 6000 as in FIG. 60. Note that in FIG. 60, parts operating in the same way as in FIG. 2 are denoted with the same reference numerals.

For example, in formula (3), when a matrix for weighting is F and a matrix about phase change is P, matrix W (=P×F) is prepared in advance. Then, first signal processor 6000 of FIG. 60 may generate signals 204A and 206B by using matrix W and signals 201A (s1 ($t$)) and 201B (s2($t$)).

Phase changers 209B, 209A, 4403B, 4403A, 4405B, and 4405A in FIGS. 2, 18, 19, 44 to 47, and 52 to 55 may perform or may omit signal processing of phase change.

As described above, in an environment where direct waves are dominant and multipath or the like is present due to the space diversity effect, setting the phase change value y(i) will make it more likely that the reception apparatus can obtain good reception quality. Furthermore, reducing a number of possible values of the phase change value y(i) as described above will make it more likely that a circuit scale of a transmission apparatus and the reception apparatus is reduced while an influence on data reception quality is reduced.

Next, as in FIGS. 20 to 22, 48 to 51, 56 to 59, and the like, description will be made of a phase change method when weight combiner 203 and phase changers 205A and 205B are present.

As described in other exemplary embodiments, it is assumed that the phase change value in phase changer 205B is given by y(i). Details are as described in the first exemplary embodiment. Note that i is a symbol number, and for example, i is an integer equal to or greater than 0.

For example, it is assumed that the phase change value y(i) is a cycle of Nb, and Nb values are prepared as the phase change values. Note that Nb is an integer equal to or greater than 2. Then, for example, as the Nb values, Phase_b [0], Phase_b [1], Phase_b [2], Phase_b [3], . . . , Phase_b [Nb-2], and Phase_b [Nb-1] are prepared. That is, the Nb values are represented by Phase_b [k], and k is an integer between 0 and Nb-1 inclusive. Phase_b [k] is a real number between 0 radians and $2\pi$ radians inclusive. x is an integer between 0 and Nb-1 inclusive, y is an integer between 0 and Nb-1 inclusive, and x #y. Phase_b [x]≠Phase_b [y] holds for all x and y satisfying these conditions. Note that a method for setting the phase change value y(i) assuming the cycle Nb is as described in other exemplary embodiments of this specification. Then, Mb values are extracted from Phase_b [0], Phase_b [1], Phase_b [2], Phase_b [3], . . . , Phase_b [Nb-2], and Phase_b [Nb-1]. These Mb values are represented as Phase_1, Phase_1 [1], Phase_1 [2], . . . , Phase_1 [Mb-2], and Phase_1 [Mb-1]. That is, the Mb values are represented by Phase_1 [k], and k is an integer between 0 and Mb-1 inclusive. Note that Mb is an integer less than Nb and equal to or greater than 2.

At this time, the phase change value y(i) has either value of Phase_1 [0], Phase_1 [1], Phase_1 [2], . . . , Phase_1 [Mb-2], and Phase_1 [Mb-1]. Phase_1 [0], Phase_1 [1], Phase_1 [2], . . . , Phase_1 [Mb-2], and Phase_1 [Mb-1] are each used at least once as the phase change value y(i).

For example, as one example thereof, there is a method in which the cycle of the phase change value y(i) is Mb. At this time, the following holds true.

[Formula 154]

$$y(i=x+y\times Mb)=\text{Phase\_1}[x] \qquad \text{Formula (154)}$$

Note that x is an integer between 0 and Mb-1 inclusive. y is an integer equal to or greater than 0.

As described in other exemplary embodiments, it is assumed that the phase change value in phase changer 205A is w(i). Note that i is a symbol number, and for example, i is an integer equal to or greater than 0. For example, it is assumed that the phase change value(i) is a cycle of Na, and Na values are prepared as the phase change values. Note that Na is an integer equal to or greater than 2. Then, for example, as the Na values, Phase_a [0], Phase_a [1], Phase_a [2], Phase_a [3], . . . , Phase_a [Na -2], and Phase_a [Na-1] are prepared. That is, the Na values are represented by Phase_a [k], and k is an integer between 0 and Na-1 inclusive. Phase_a [k] is a real number between 0 radians and $2\pi$ radians inclusive. x is an integer between 0 and Na-1 inclusive, y is an integer between 0 and Na-1 inclusive, and x #y. Phase_a [x] #Phase_a [y] holds for all x and y satisfying these conditions. Note that a method for setting the phase change value w(i) assuming the cycle Na is as described in other exemplary embodiments of this specification. Ma values are extracted from Phase_a , Phase_a [1], Phase_a [2], Phase_a [3], . . . , Phase_a [Na-2][0], and Phase_a [Na-1]. These Ma values are represented as Phase_2 [0], Phase_2 [1], Phase_2 [2], . . . , Phase_2 [Ma-2], and Phase_2 [Ma-1]. That is, the Ma values are represented by Phase_2 [k], and k is an integer between 0 and Ma-1 inclusive. Note that Ma is an integer less than Na and equal to or greater than 2.

At this time, the phase change value w(i) has either value of Phase_2 [0], Phase_2 [1], Phase_2 [2], . . . , Phase_2 [Ma-2], and Phase_2 [Ma-1]. Phase_2 [0], Phase_2 [1], Phase_2 [2], . . . , Phase_2 [Ma-2], and Phase_2 [Ma-1] are each used at least once as the phase change value w(i).

For example, as one example thereof, there is a method in which the cycle of the phase change value w(i) is Ma. At this time, the following holds true.

[Formula 155]

$$w(i=x+y\times Ma)=\text{Phase\_2}[x] \qquad \text{Formula (155)}$$

Note that x is an integer between 0 and Ma-1 inclusive. y is an integer equal to or greater than 0.

Figure 61:
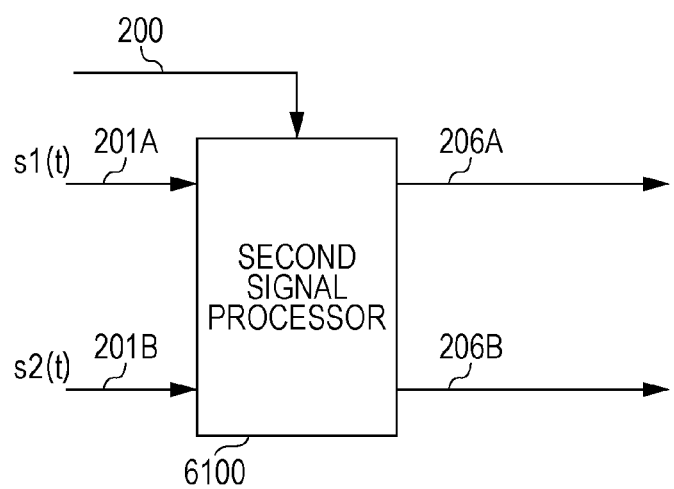
FIG. 61 is a diagram illustrating one exemplary configuration of a second signal processor.

Furthermore, as in FIG. 20 and the like, weight combiner 203 and phase changers 205A and 205B may individually perform the weighting process and the phase change process. The process of weight combiner 203 and the process of phase changers 205A and 205B may be performed by second signal processor 6100 as in FIG. 61. Note that in FIG. 61, parts operating in the same way as in FIGS. 2 and 20 are denoted with the same reference numerals.

For example, in formula (52), when a matrix for weighting is F and a matrix about phase change is P, matrix W (=P×F) is prepared in advance. Then, second signal processor 6100 of FIG. 61 may generate signals 206A and 206B by using matrix W and signals 201A (s1 ($t$)) and 201B (s2($t$)).

Phase changers 209B, 209A, 4403B, 4403A, 4405B, and 4405A in FIGS. 20 to 22, 48 to 51, and 56 to 59 may perform or may omit signal processing of phase change.

Na and Nb may be the same value or different values. Ma and Mb may be the same value or different values.

As described above, in an environment where direct waves are dominant and multipath or the like is present due to the space diversity effect, setting the phase change value y(i) and the phase change value w(i) will make it more likely that the reception apparatus can obtain good reception quality. Furthermore, reducing a number of possible values of the phase change value y(i) as described above will make it more likely that a circuit scale of a transmission apparatus and the reception apparatus is reduced while an influence on data reception quality is reduced.

Note that it is likely that the present exemplary embodiment is effective when applied to the phase change method described in other exemplary embodiments of this specification. However, the present exemplary embodiment can be similarly implemented even if applied to other phase change methods.

Twelfth Exemplary Embodiment

The present exemplary embodiment will describe a phase change method when weight combiner 203 and phase changer 205B are present as in FIGS. 2, 18, 19, 44 to 47, 52 to 55, and the like.

For example, as described in the exemplary embodiment, it is assumed that a phase change value in phase changer 205B is given by y(i). Details are as described in the first exemplary embodiment. Note that i is a symbol number, and for example, i is an integer equal to or greater than 0.

For example, it is assumed that the phase change value y(i) is a cycle of N. Note that N is an integer equal to or greater than 2. As the N values, Phase [0], Phase [1], Phase [2], Phase [3], . . . , Phase [N−2], and Phase [N−1] are prepared. That is, the N values are represented by Phase [k], and k is an integer between 0 and N−1 inclusive. Phase [k] is a real number between 0 radians and 2π radians inclusive. x is an integer between 0 and N−1 inclusive, y is an integer between 0 and N−1 inclusive, and x ≠y. Phase [x] ≠Phase [y] holds for all x and y satisfying these conditions. At this time, Phase [k] is represented by the following formula. Note that k is an integer between 0 and N−1 inclusive.

[Formula 156]

$$\text{Phase}[k] = \frac{k\pi}{N} \text{RADIAN} \qquad \text{Formula (156)}$$

Then, Phase [0], Phase [1], Phase [2], Phase [3], . . . , Phase [N−2], and Phase [N−1] are used to obtain the cycle N of the phase change value y(i). To obtain the cycle N, Phase [0], Phase [1], Phase [2], Phase [3], . . . , Phase [N−2], and Phase [N−1] may be arranged in anyway. Note that to obtain the cycle N, for example, the following holds.

[Formula 157]

$$y(i\ x+y\times N)=y(i=x+(y+1)\times N) \qquad \text{Formula (157)}$$

Note that x is an integer between 0 and N−1 inclusive, and y is an integer equal to or greater than 0. For all x and y satisfying these conditions, formula (157) holds.

Note that as in FIG. 2 and the like, weight combiner 203 and phase changer 205B may individually perform the weighting process and the phase change process. The process of weight combiner 203 and the process of phase changer 205B may be performed by first signal processor 6000 as in FIG. 60. Note that in FIG. 60, parts operating in the same way as in FIG. 2 are denoted with the same reference numerals.

For example, in formula (3), when a matrix for weighting is F and a matrix about phase change is P, matrix W (=P×F) is prepared in advance. Then, first signal processor 6000 of FIG. 60 may generate signals 204A and 206B by using matrix W and signals 201A (s1 (t)) and 201B (s2(t)).

Phase changers 209B, 209A, 4403B, 4403A, 4405B, and 4405A in FIGS. 2, 18, 19, 44 to 47, and 52 to 55 may perform or may omit signal processing of phase change.

As described above, in an environment where direct waves are dominant and multipath or the like is present due to the space diversity effect, setting the phase change value y(i) will make it more likely that the reception apparatus can obtain good reception quality. Furthermore, limiting a number of possible values of the phase change value y(i) as described above will make it more likely that a circuit scale of a transmission apparatus and the reception apparatus is reduced while an influence on data reception quality is reduced.

Next, as in FIGS. 20 to 22, 48 to 51, 56 to 59, and the like, description will be made of a phase change method when weight combiner 203 and phase changers 205A and 205B are present.

As described in other exemplary embodiments, it is assumed that the phase change value in phase changer 205B is given by y(i). Details are as described in the first exemplary embodiment. Note that i is a symbol number, and for example, i is an integer equal to or greater than 0.

For example, it is assumed that the phase change value y(i) is a cycle of Nb. Note that Nb is an integer equal to or greater than 2. As the Nb values, Phase_b [0], Phase_b [1], Phase_b [2], Phase_b [3], . . . , Phase_b [Nb−2], and Phase_b [Nb−1] are prepared. That is, the Nb values are represented by Phase_b [k], and k is an integer between 0 and Nb−1 inclusive. Phase_b [k] is a real number between 0 radians and 2n radians inclusive. x is an integer between 0 and Nb−1 inclusive, y is an integer between 0 and Nb−1 inclusive, and x ≠y. Phase_b [x]≠Phase_b [y] holds for all x and y satisfying these conditions. At this time, Phase_b [k] is represented by the following formula. Note that k is an integer between 0 and Nb−1 inclusive.

[Formula 158]

$$\text{Phase\_b}[k] = \frac{k\pi}{Nb} \text{RADIAN} \qquad \text{Formula (158)}$$

Then, Phase_b [0], hase_b [1], Phase_b [2], Phase_b [3], . . . , Phase_b [Nb−2], and Phase_b [Nb−1] are used to obtain the cycle Nb of the phase change value y(i). To obtain the cycle Nb, Phase_b [0], Phase_b [1], Phase_b [2], Phase_b [3], . . . , Phase_b [Nb−2], and Phase_b [Nb−1] may be arranged in any way. Note that to obtain the cycle Nb, for example, the following holds.

[Formula 159]

$$y(=x+y\times Nb)=y(i=x+(y+1)\times Nb) \qquad \text{Formula (159)}$$

Note that x is an integer between 0 and Nb−1 inclusive, and y is an integer equal to or greater than 0. For all x and y satisfying these conditions, formula (159) holds.

As described in other exemplary embodiments, it is assumed that the phase change value in phase changer 205A is w(i). Note that i is a symbol number, and for example, i is an integer equal to or greater than 0. For example, it is assumed that the phase change value w(i) is a cycle of Na. Note that Na is an integer equal to or greater than 2. As the Na values, Phase_a [0], Phase_a [1], Phase_a [2], Phase_a [3], . . . , Phase_a [Na−2], and Phase_a [Na−1] are prepared. That is, the Na values are represented by Phase_a [k], and k is an integer between 0 and Na−1 inclusive. Phase_a [k] is a real number between 0 radians and 2π radians inclusive. x is an integer between 0 and Na−1 inclusive, y is an integer between 0 and Na−1 inclusive, and x ≠y. Phase_a [x]≠Phase_a [y] holds for all x and y satisfying these conditions. At this time, Phase_a [k] is represented by the following formula. Note that k is an integer between 0 and Na−1 inclusive.

[Formula 160]

$$\text{Phase\_a}[k] = \frac{k\pi}{Na} \text{RADIAN} \quad \text{Formula (160)}$$

Then, Phase_a [0], Phase_a [1], Phase_a [2], Phase_a [3], . . . , Phase_a [Na−2], and Phase_a [Na−1] are used to obtain the cycle Na of the phase change value w(i). To obtain the cycle Na, Phase_a [0], Phase_a [1], Phase_a [2], Phase_a [3], . . . , Phase_a [Na−2], and Phase_a [Na−1] may be arranged in any way. Note that to obtain the cycle Na, for example, the following holds.

[Formula 161]

$$w(i=x+y\times Na)=w(i=x+(y+1)\times Na) \quad \text{Formula (161)}$$

Note that x is an integer between 0 and Na−1 inclusive, and y is an integer equal to or greater than 0. For all x and y satisfying these conditions, formula (161) holds.

Note that as in FIG. 20 and the like, weight combiner 203 and phase changers 205A and 205B may individually perform the weighting process and the phase change process. The process of weight combiner 203 and the process of phase changers 205A and 205B may be performed by second signal processor 6100 as in FIG. 61. Note that in FIG. 61, parts operating in the same way as in FIGS. 2 and 20 are denoted with the same reference numerals.

For example, in formula (52), when a matrix for weighting is F and a matrix about phase change is P, matrix W (=P×F) is prepared in advance. Then, second signal processor 6100 of FIG. 61 may generate signals 206A and 206B by using matrix W and signals 201A (s1 (t)) and 201B (s2(t)).

Phase changers 209B, 209A, 4403B, 4403A, 4405B, and 4405A in FIGS. 20 to 22, 48 to 51, and 56 to 59 may perform or may omit signal processing of phase change.

Na and Nb may be the same value or different values.

As described above, in an environment where direct waves are dominant and multipath or the like is present due to the space diversity effect, setting the phase change value y(i) and the phase change value w(i) will make it more likely that the reception apparatus can obtain good reception quality. Furthermore, limiting the number of possible values of the phase change value y(i) and the phase change value w(i) as described above will make it more likely that the circuit scale of the transmission apparatus and the reception apparatus is reduced while the influence on data reception quality is reduced.

Note that it is likely that the present exemplary embodiment is effective when applied to the phase change method described in other exemplary embodiments of this specification. However, the present exemplary embodiment can be similarly implemented even if applied to other phase change methods.

Of course, the present exemplary embodiment and the eleventh exemplary embodiment may be combined for implementation. That is, M phase change values may be extracted from formula (156). Mb phase change values may be extracted from formula (158), and Ma phase change values may be extracted from formula (160).

Thirteenth Exemplary Embodiment

The present exemplary embodiment will describe a phase change method when weight combiner 203 and phase changer 205B are present as in FIGS. 2, 18, 19, 44 to 47, 52 to 55, and the like.

For example, as described in the exemplary embodiment, it is assumed that a phase change value in phase changer 205B is y(i). Details are as described in the first exemplary embodiment. Note that i is a symbol number, and for example, i is an integer equal to or greater than 0.

For example, it is assumed that the phase change value y(i) is a cycle of N. Note that N is an integer equal to or greater than 2. As the N values, Phase [0], Phase [1], Phase [2], Phase [3], . . . , Phase [N−2], and Phase [N−1] are prepared. That is, the N values are represented by Phase [k], and k is an integer between 0 and N−1 inclusive. Phase [k] is a real number between 0 radians and 2π radians inclusive. x is an integer between 0 and N−1 inclusive, y is an integer between 0 and N−1 inclusive, and x #y. Phase [x] ≠Phase [y] holds for all x and y satisfying these conditions. At this time, Phase [k] is represented by the following formula. Note that k is an integer between 0 and N−1 inclusive.

[Formula 162]

$$\text{Phase}[k] = \frac{k \times 2 \times \pi}{N} \text{RADIAN} \quad \text{Formula (162)}$$

Then, Phase [0], Phase [1], Phase [2], Phase [3], . . . , Phase [N−2], and Phase [N−1] are used to obtain the cycle N of the phase change value y(i). To obtain the cycle N, Phase [0], Phase [1], Phase [2], Phase [3], . . . , Phase [N−2], and Phase [N−1] may be arranged in anyway. Note that to obtain the cycle N, for example, the following holds.

[Formula 163]

$$y(i=x+y\times N)=y(i=x+(y+1)\times N) \quad \text{Formula (163)}$$

Note that x is an integer between 0 and N−1 inclusive, and y is an integer equal to or greater than 0. For all x and y satisfying these conditions, formula (163) holds.

Note that as in FIG. 2 and the like, weight combiner 203 and phase changer 205B may individually perform the weighting process and the phase change process. The process of weight combiner 203 and the process of phase changer 205B may be performed by first signal processor 6000 as in FIG. 60. Note that in FIG. 60, parts operating in the same way as in FIG. 2 are denoted with the same reference numerals.

For example, in formula (3), when a matrix for weighting is F and a matrix about phase change is P, matrix W (=P×F) is prepared in advance. Then, first signal processor 6000 of FIG. 60 may generate signals 204A and 206B by using matrix W and signals 201A (s1 (t)) and 201B (s2(t)).

Phase changers 209B, 209A, 4403B, 4403A, 4405B, and 4405A in FIGS. 2, 18, 19, 44 to 47, and 52 to 55 may perform or may omit signal processing of phase change.

As described above, by setting the phase change value y(i), possible values of the phase change value y(i) are uniformly present on a complex plane from a viewpoint of phase, providing a space diversity effect. In an environment where direct waves are dominant and multipath or the like is present, this will make it more likely that the reception apparatus can obtain good reception quality.

Next, as in FIGS. 20 to 22, 48 to 51, 56 to 59, and the like, description will be made of a phase change method when weight combiner 203 and phase changers 205A and 205B are present.

As described in other exemplary embodiments, it is assumed that the phase change value in phase changer 205B is y(i). Details are as described in the first exemplary embodiment. Note that i is a symbol number, and for example, i is an integer equal to or greater than 0.

For example, it is assumed that the phase change value y(i) is a cycle of Nb. Note that Nb is an integer equal to or greater than 2. As the Nb values, Phase_b [0], Phase_b [1], Phase_b [2], Phase_b [3], ..., Phase_b [Nb−2], and Phase_b [Nb−1] are prepared. That is, the Nb values are represented by Phase_b [k], and k is an integer between 0 and Nb−1 inclusive. Phase_b [k] is a real number between 0 radians and 2n radians inclusive. x is an integer between 0 and Nb−1 inclusive, y is an integer between 0 and Nb−1 inclusive, and x ≠ y. Phase_b [x]≠Phase_b [y] holds for all x and y satisfying these conditions. At this time, Phase_b [k] is represented by the following formula. Note that k is an integer between 0 and Nb−1 inclusive.

[Formula 164]

$$\text{Phase\_b}[k] = \frac{k \times 2 \times \pi}{Nb} \text{RADIAN} \qquad \text{Formula (164)}$$

Then, Phase_b [0], Phase_b [1], Phase_b [2], Phase_b [3], ..., Phase_b [Nb−2], and Phase_b [Nb−1] are used to obtain the cycle Nb of the phase change value y(i). To obtain the cycle Nb, Phase_b [0], Phase_b [1], Phase_b [2], Phase_b [3], ..., Phase_b [Nb−2], and Phase_b [Nb−1] may be arranged in any way. Note that to obtain the cycle Nb, for example, the following holds.

[Formula 165]

$$y(i=x+y\times Nb)=y(i=x+(y+1)\times Nb) \qquad \text{Formula (165)}$$

Note that x is an integer between 0 and Nb−1 inclusive, and y is an integer equal to or greater than 0. For all x and y satisfying these conditions, formula (165) holds.

As described in other exemplary embodiments, it is assumed that the phase change value in phase changer 205A is w(i). Note that i is a symbol number, and for example, i is an integer equal to or greater than 0. For example, it is assumed that the phase change value w(i) is a cycle of Na. Note that Na is an integer equal to or greater than 2. As the Na values, Phase_a [0], Phase_a [1], Phase_a [2], Phase_a [3], ..., Phase_a [Na−2], and Phase_a [Na−1] are prepared. That is, the Na values are represented by Phase_a [k], and k is an integer between 0 and Na−1 inclusive. Phase_a [k] is a real number between 0 radians and 2π radians inclusive. x is an integer between 0 and Na−1 inclusive, y is an integer between 0 and Na−1 inclusive, and x ≠ y. Phase_a [x]≠Phase_a [y] holds for all x and y satisfying these conditions. At this time, Phase_a [k] is represented by the following formula. Note that k is an integer between 0 and Na−1 inclusive.

[Formula 166]

$$\text{Phase\_a}[k] = \frac{k \times 2 \times \pi}{Na} \text{RADIAN} \qquad \text{Formula (166)}$$

Then, Phase_a [0], Phase_a [1], Phase_a [2], Phase_a [3], ..., Phase_a [Na−2], and Phase_a [Na−1] are used to obtain the cycle Na of the phase change value w(i). To obtain the cycle Na, Phase_a [0], Phase_a [1], Phase_a [2], Phase_a [3], ..., Phase_a [Na−2], and Phase_a [Na−1] may be arranged in any way. Note that to obtain the cycle Na, for example, the following holds.

[Formula 167]

$$w(i=x+y\times Na)=w(i=x+(y+1)\times Na) \qquad \text{Formula (167)}$$

Note that x is an integer between 0 and Na−1 inclusive, and y is an integer equal to or greater than 0. For all x and y satisfying these conditions, formula (167) holds.

Note that as in FIG. 20 and the like, weight combiner 203 and phase changers 205A and 205B may individually perform the weighting process and the phase change process. The process of weight combiner 203 and the process of phase changers 205A and 205B may be performed by second signal processor 6100 as in FIG. 61. Note that in FIG. 61, parts operating in the same way as in FIGS. 2 and 20 are denoted with the same reference numerals.

For example, in formula (52), when a matrix for weighting is F and a matrix about phase change is P, matrix W (=P×F) is prepared in advance. Then, second signal processor 6100 of FIG. 61 may generate signals 206A and 206B by using matrix W and signals 201A (s1 (t)) and 201B (s2(t)).

Phase changers 209B, 209A, 4403B, 4403A, 4405B, and 4405A in FIGS. 20 to 22, 48 to 51, and 56 to 59 may perform or may omit signal processing of phase change.

Na and Nb may be the same value or different values.

As described above, by setting the phase change value y(i) and the phase change value w(i), possible values of the phase change value y(i) and the phase change value w(i) are uniformly present on a complex plane from a viewpoint of phase, providing a space diversity effect. In an environment where direct waves are dominant and multipath or the like is present, this will make it more likely that the reception apparatus can obtain good reception quality.

Note that it is likely that the present exemplary embodiment is effective when applied to the phase change method described in other exemplary embodiments of this specification. However, the present exemplary embodiment can be similarly implemented even if applied to other phase change methods.

Of course, the present exemplary embodiment and the eleventh exemplary embodiment may be combined for implementation. That is, M phase change values may be extracted from formula (162). Mb phase change values may be extracted from formula (164), and Ma phase change values may be extracted from formula (166).

Supplementary 5

Regarding the modulation scheme, even when a modulation scheme other than the modulation scheme described in this specification is used, the exemplary embodiments and other information described in this specification can be implemented. For example, non-uniform (NU)-QAM, π/2 shift BPSK, π/4 shift QPSK, and a PSK scheme in which the phase of a certain value is shifted, and the like may be used.

Phase changers 209A, 209B, 4403A, 4403B, 4405A, and 4405B may be cyclic delay diversity (CDD) and cyclic shift diversity (CSD).

Supplementary 6

The present disclosure has described that, for example, in FIGS. 2, 18 to 22, 28 to 33, and 44 to 61, mapped signal s1 (t) and mapped signal s2(t) transmit data different from each other, but the present disclosure is not limited to this example. That is, mapped signal s1 (t) and mapped signal s2(t) may transmit the same data. For example, when symbol number i=a (a is an integer equal to or greater than 0, for example), mapped signal s1(*i*=a) and mapped signal s2(*i*=a) may transmit the same data.

Note that the method by which mapped signal s1(*i*=a) and mapped signal s2(*i*=a) transmit the same data is not limited to the above scheme. For example, mapped signal s1(*i*=a) and mapped signal s2(*i*=b) may transmit the same data (b is an integer equal to or greater than 0, and a #b). Furthermore, the first data sequence may be transmitted using a plurality of symbols s1(*i*), and the same data as the first data sequence may be transmitted using a plurality of symbols s2(*i*).

INDUSTRIAL APPLICABILITY

The present disclosure can be widely applied to communication systems that transmit modulated signals from a plurality of antennas.

REFERENCE MARKS IN THE DRAWINGS 102 error correction encoder
104 mapper
106 signal processor
107A, 107B wireless unit
109A, 109B antenna unit

The invention claimed is:

1. An integrated circuit comprising:
at least one input which, in operation, receives an input; and
circuitry, which is coupled to the at least one input and which, in operation, controls:
receiving a first precoded signal and a second precoded signal, wherein, when a first phase change is enabled at a communication partner apparatus, the first phase change is applied in generating the first precoded signal, and the first phase change and a second phase change are applied in generating the second precoded signal, wherein an amount of the first phase change is cyclically switched; and
performing reception processing of the received first precoded signal by using the first phase change, performing reception processing of the received second precoded signal by using the first phase change and the second phase change, and obtaining a data signal, wherein the second phase change is not used to perform the reception processing of the received first precoded signal.

2. The integrated circuit according to claim 1, wherein when the first phase change is enabled at the communication partner apparatus, π/2 shift BPSK (binary phase shift keying) is used and the amount of the first phase change is switched symbol by symbol.

3. The integrated circuit according to claim 1, wherein when the first phase change is enabled at the communication partner apparatus, π/2 shift BPSK (binary phase shift keying) is used and the amount of the first phase change is switched between zero and π/2.

4. The integrated circuit according to claim 1, wherein an amount of the second phase change is selected from a plurality of candidate amounts and the selected amount is used as a fixed value of the second phase change.

5. The integrated circuit according to claim 1, wherein the circuitry, in operation, further controls receiving a control signal relating to a modulation method used by the communication partner apparatus to generate the first precoded signal and the second precoded signal.

* * * * *